United States Patent
Adib et al.

(10) Patent No.: US 11,608,290 B2
(45) Date of Patent: Mar. 21, 2023

(54) DELAMINATION RESISTANT GLASS CONTAINERS WITH HEAT-TOLERANT COATINGS

(71) Applicant: CORNING INCORPORATED, Corning, NY (US)

(72) Inventors: Kaveh Adib, Corning, NY (US); Dana Craig Bookbinder, Corning, NY (US); Theresa Chang, Painted Post, NY (US); Paul Stephen Danielson, Dundee, NY (US); Steven Edward DeMartino, Painted Post, NY (US); Melinda Ann Drake, Corning, NY (US); Andrei Gennadyevich Fadeev, Elmira, NY (US); James Patrick Hamilton, Horseheads, NY (US); Robert Michael Morena, Lindley, NY (US); Santona Pal, Painted Post, NY (US); John Stephen Peanasky, Big Flats, NY (US); Chandan Kumar Saha, Franklin, MI (US); Robert Anthony Schaut, Painted Post, NY (US); Susan Lee Schiefelbein, Ithaca, NY (US); Christopher Lee Timmons, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 562 days.

(21) Appl. No.: 16/355,797

(22) Filed: Mar. 17, 2019

(65) Prior Publication Data

US 2019/0210768 A1 Jul. 11, 2019

Related U.S. Application Data

(63) Continuation of application No. 13/930,647, filed on Jun. 28, 2013, now Pat. No. 10,273,049.

(Continued)

(51) Int. Cl.
*B65D 23/08* (2006.01)
*B65D 1/40* (2006.01)
(Continued)

(52) U.S. Cl.
CPC ............ *C03C 3/087* (2013.01); *A61J 1/1468* (2015.05); *B32B 17/06* (2013.01); *B65D 1/40* (2013.01);
(Continued)

(58) Field of Classification Search
CPC . C08G 73/105; C08G 73/1071; C09D 179/08
See application file for complete search history.

(56) References Cited

U.S. PATENT DOCUMENTS 2,106,744 A 2/1938 Hood et al.
2,323,643 A 7/1943 Barton
(Continued)

FOREIGN PATENT DOCUMENTS

CA 853121 A 10/1970
CA 1333785 C 1/1995
(Continued)

OTHER PUBLICATIONS

Singapore Written Opinion and Search Report dated Jan. 20, 2021, for SG Patent Application No. 10201704148S. pp. 1-10.
(Continued)

*Primary Examiner* — Queenie S Dehghan
(74) *Attorney, Agent, or Firm* — Dinsmore & Shohl LLP

(57) ABSTRACT

Disclosed herein are delamination resistant glass pharmaceutical containers which may include a glass body having a Class HGA1 hydrolytic resistance when tested according to the ISO 720:1985 testing standard. The glass body may have an interior surface and an exterior surface. The interior surface of the glass body does not comprise a boron-rich layer when the glass body is in an as-formed condition. A
(Continued)

heat-tolerant coating may be bonded to at least a portion of the exterior surface of the glass body. The heat-tolerant coating may have a coefficient of friction of less than about 0.7 and is thermally stable at a temperature of at least 250° C. for 30 minutes.

29 Claims, 60 Drawing Sheets

Related U.S. Application Data

(60) Provisional application No. 61/665,682, filed on Jun. 28, 2012.

(51) Int. Cl.

| | | |
|---|---|---|
| *A61J 1/14* | (2006.01) | |
| *C03C 3/087* | (2006.01) | |
| *B65D 25/14* | (2006.01) | |
| *B32B 17/06* | (2006.01) | |
| *C03C 17/34* | (2006.01) | |
| *C03C 17/00* | (2006.01) | |
| *C03C 17/32* | (2006.01) | |
| *C03C 17/30* | (2006.01) | |
| *C08G 73/10* | (2006.01) | |
| *C09D 179/08* | (2006.01) | |
| *C03C 21/00* | (2006.01) | |
| *C03C 17/42* | (2006.01) | |
| *C03B 23/047* | (2006.01) | |
| *C08K 5/544* | (2006.01) | |

(52) U.S. Cl.
CPC ......... *B65D 23/0814* (2013.01); *B65D 25/14* (2013.01); *C03B 23/047* (2013.01); *C03C 17/005* (2013.01); *C03C 17/30* (2013.01); *C03C 17/32* (2013.01); *C03C 17/3405* (2013.01); *C03C 17/42* (2013.01); *C03C 21/002* (2013.01); *C08G 73/105* (2013.01); *C08G 73/1071* (2013.01); *C08K 5/544* (2013.01); *C09D 179/08* (2013.01); *C03C 2217/78* (2013.01); *C03C 2218/111* (2013.01); *Y10T 428/131* (2015.01)

(56) References Cited

U.S. PATENT DOCUMENTS

| | | |
|---|---|---|
| 2,691,548 A | 10/1954 | Feucht et al. |
| 2,753,304 A | 7/1956 | Orozco |
| 2,947,615 A | 8/1960 | Greene et al. |
| 3,023,139 A | 2/1962 | Tetterode |
| 3,058,177 A | 10/1962 | Taylor et al. |
| 3,287,311 A | 11/1966 | Edwards |
| 3,323,889 A | 6/1967 | Carl et al. |
| 3,395,069 A | 7/1968 | Plueddemann |
| 3,441,432 A | 4/1969 | Levene |
| 3,445,267 A | 5/1969 | Layne |
| 3,473,906 A | 10/1969 | Graham et al. |
| 3,481,726 A | 12/1969 | Fischer et al. |
| 3,577,256 A | 5/1971 | Benford, Jr. et al. |
| 3,607,186 A | 9/1971 | Bognar |
| 3,674,690 A | 7/1972 | Clow et al. |
| 3,772,061 A | 11/1973 | McCoy et al. |
| 3,772,135 A | 11/1973 | Hara et al. |
| 3,779,732 A | 12/1973 | Spanoudis |
| 3,790,430 A | 2/1974 | Mochel |
| 3,791,809 A | 2/1974 | Lau |
| 3,801,361 A | 4/1974 | Kitaj |
| 3,811,921 A | 5/1974 | Crawford et al. |
| 3,819,346 A | 6/1974 | Southwick et al. |
| 3,844,754 A | 10/1974 | Grubb et al. |
| 3,876,410 A | 4/1975 | Scholes |
| 3,878,960 A | 4/1975 | Jonsson et al. |
| 3,900,329 A | 8/1975 | Grubb et al. |
| 3,926,604 A | 12/1975 | Smay et al. |
| 3,958,073 A | 5/1976 | Trevisan et al. |
| 3,967,995 A | 7/1976 | Fabianic |
| 3,975,175 A | 8/1976 | Foster et al. |
| 3,989,864 A | 11/1976 | Hey et al. |
| 4,021,218 A | 5/1977 | Watanabe |
| 4,023,953 A | 5/1977 | Megles et al. |
| 4,030,904 A | 6/1977 | Battye et al. |
| 4,056,208 A | 11/1977 | Prejean |
| 4,056,651 A | 11/1977 | Scola |
| 4,065,317 A | 12/1977 | Baak et al. |
| 4,065,589 A | 12/1977 | Lenard et al. |
| 4,086,373 A | 4/1978 | Tobias et al. |
| 4,093,759 A | 6/1978 | Otsuki et al. |
| 4,130,677 A | 12/1978 | Huntsberger |
| 4,161,556 A | 7/1979 | Lenard et al. |
| 4,164,402 A | 8/1979 | Watanabe |
| 4,214,886 A | 7/1980 | Shay et al. |
| 4,215,165 A | 7/1980 | Gras et al. |
| 4,238,041 A | 12/1980 | Jönsson et al. |
| 4,264,658 A | 4/1981 | Tobias et al. |
| 4,280,944 A | 7/1981 | Saito et al. |
| 4,315,573 A | 2/1982 | Bradley et al. |
| 4,385,086 A | 5/1983 | Nakayama et al. |
| 4,386,164 A | 5/1983 | Moser |
| 4,395,527 A | 7/1983 | Berger |
| 4,431,692 A | 2/1984 | Hofmann et al. |
| 4,558,110 A | 12/1985 | Lee |
| 4,595,548 A | 6/1986 | St. Clair et al. |
| 4,603,061 A | 7/1986 | St. Clair et al. |
| 4,620,985 A | 11/1986 | Goodburn et al. |
| 4,636,411 A | 1/1987 | Dubois et al. |
| 4,654,235 A | 3/1987 | Effenberger et al. |
| 4,668,268 A | 5/1987 | Lindner et al. |
| 4,680,373 A | 7/1987 | Gallagher et al. |
| 4,689,085 A | 8/1987 | Plueddemann |
| 4,696,994 A | 9/1987 | Nakajima et al. |
| 4,748,228 A | 5/1988 | Shoji et al. |
| 4,749,614 A | 6/1988 | Andrews et al. |
| 4,767,414 A | 8/1988 | Williams et al. |
| 4,778,727 A | 10/1988 | Tesoro et al. |
| 4,842,889 A | 6/1989 | Hu et al. |
| 4,860,906 A | 8/1989 | Pellegrini et al. |
| 4,870,034 A | 9/1989 | Kiefer |
| 4,880,895 A | 11/1989 | Higashi et al. |
| 4,882,210 A | 11/1989 | Romberg et al. |
| 4,902,106 A | 2/1990 | Dijon et al. |
| 4,923,960 A | 5/1990 | Chen, Sr. et al. |
| 4,931,539 A | 6/1990 | Hayes |
| 4,961,976 A | 10/1990 | Hashimoto et al. |
| 4,961,996 A | 10/1990 | Carre et al. |
| 4,983,255 A | 1/1991 | Gruenwald et al. |
| 4,988,288 A | 1/1991 | Melgaard |
| 5,002,359 A | 3/1991 | Sayegh |
| 5,036,145 A | 7/1991 | Echterling et al. |
| 5,037,701 A | 8/1991 | Carre et al. |
| 5,049,421 A | 9/1991 | Kosh |
| 5,112,658 A | 5/1992 | Skutnik et al. |
| 5,114,757 A | 5/1992 | Linde et al. |
| 5,120,341 A | 6/1992 | Nozawa et al. |
| 5,124,618 A | 6/1992 | Ohtaka et al. |
| 5,137,751 A | 8/1992 | Burgess et al. |
| 5,230,429 A | 7/1993 | Etheredge, III |
| 5,232,783 A | 8/1993 | Pawar et al. |
| 5,246,782 A | 9/1993 | Kennedy et al. |
| 5,251,071 A | 10/1993 | Kusukawa et al. |
| 5,252,703 A | 10/1993 | Nakajima et al. |
| 5,258,487 A | 11/1993 | Okinoshima et al. |
| 5,281,690 A | 1/1994 | Flaim et al. |
| 5,286,527 A | 2/1994 | Blum et al. |
| 5,306,537 A | 4/1994 | Gustafson et al. |
| 5,310,862 A | 5/1994 | Nomura et al. |
| 5,326,601 A | 7/1994 | Kawano et al. |
| 5,336,925 A | 8/1994 | Moss et al. |
| 5,337,537 A | 8/1994 | Soughan |
| 5,403,700 A | 4/1995 | Heller et al. |
| 5,476,692 A | 12/1995 | Ellis et al. |

(56) References Cited

U.S. PATENT DOCUMENTS

| | | |
|---|---|---|
| 5,482,768 A | 1/1996 | Kawasato et al. |
| 5,488,092 A | 1/1996 | Kausch et al. |
| 5,489,558 A | 2/1996 | Moffatt et al. |
| 5,498,758 A | 3/1996 | Scholes et al. |
| 5,504,830 A | 4/1996 | Ngo et al. |
| 5,594,231 A | 1/1997 | Pellicori et al. |
| 5,601,905 A | 2/1997 | Watanabe et al. |
| 5,633,079 A | 5/1997 | Shoshi et al. |
| 5,721,181 A | 2/1998 | Sehgal et al. |
| 5,736,251 A | 4/1998 | Pinchuk |
| 5,736,476 A | 4/1998 | Watzke et al. |
| 5,756,144 A | 5/1998 | Wolff et al. |
| 5,849,369 A | 12/1998 | Ogawa |
| 5,851,200 A | 12/1998 | Higashikawa et al. |
| 5,853,833 A | 12/1998 | Sudo et al. |
| 5,908,542 A | 6/1999 | Lee et al. |
| 5,908,794 A | 6/1999 | Maeda et al. |
| 5,916,632 A | 6/1999 | Mishina et al. |
| 5,938,919 A | 8/1999 | Najafabadi |
| 5,979,714 A | 11/1999 | Bleile et al. |
| 6,013,333 A | 1/2000 | Carson et al. |
| 6,046,758 A | 4/2000 | Brown et al. |
| 6,048,911 A | 4/2000 | Shustack et al. |
| 6,084,034 A | 7/2000 | Miyama et al. |
| 6,096,432 A | 8/2000 | Sakaguchi et al. |
| 6,156,399 A | 12/2000 | Spallek et al. |
| 6,156,435 A | 12/2000 | Gleason et al. |
| 6,200,658 B1 | 3/2001 | Walther et al. |
| 6,204,212 B1 | 3/2001 | Kunert et al. |
| 6,214,429 B1 | 4/2001 | Zou et al. |
| 6,232,428 B1 | 5/2001 | Deets et al. |
| 6,277,950 B1 | 8/2001 | Yang et al. |
| 6,346,315 B1 | 2/2002 | Sawatsky |
| 6,358,519 B1 | 3/2002 | Waterman |
| 6,444,783 B1 | 9/2002 | Dodd et al. |
| 6,472,068 B1 | 10/2002 | Glass et al. |
| 6,482,509 B2 | 11/2002 | Buch-Rasmussen et al. |
| 6,518,211 B1 | 2/2003 | Bradshaw et al. |
| 6,537,626 B1 | 3/2003 | Spallek et al. |
| 6,561,275 B2 | 5/2003 | Glass et al. |
| 6,586,039 B2 | 7/2003 | Heinz et al. |
| 6,599,594 B1 | 7/2003 | Walther et al. |
| 6,627,377 B1 | 9/2003 | Itatani et al. |
| 6,627,569 B1 | 9/2003 | Naumann et al. |
| 6,737,105 B2 | 5/2004 | Richard |
| 6,797,396 B1 | 9/2004 | Liu et al. |
| 6,818,576 B2 | 11/2004 | Ikenishi et al. |
| 6,852,393 B2 | 2/2005 | Gandon |
| 6,866,158 B1 | 3/2005 | Sommer et al. |
| 6,921,788 B1 | 7/2005 | Izawa et al. |
| 6,939,819 B2 | 9/2005 | Usui et al. |
| 6,989,181 B2 | 1/2006 | Brandt |
| 7,087,307 B2 | 8/2006 | Nagashima et al. |
| 7,215,473 B2 | 5/2007 | Fleming |
| 7,236,296 B2 | 6/2007 | Liu et al. |
| 7,315,125 B2 | 1/2008 | Kass |
| 7,470,999 B2 | 12/2008 | Saito et al. |
| 7,569,653 B2 | 8/2009 | Landon |
| 7,619,042 B2 | 11/2009 | Poe et al. |
| 7,845,346 B2 | 12/2010 | Langford et al. |
| 7,871,554 B2 | 1/2011 | Oishi et al. |
| 7,980,096 B2 | 7/2011 | Bartsch |
| 7,985,188 B2 | 7/2011 | Felts et al. |
| 8,048,938 B2 | 11/2011 | Poe et al. |
| 8,053,492 B2 | 11/2011 | Poe et al. |
| 8,110,652 B2 | 2/2012 | Bito et al. |
| 8,234,883 B2 | 8/2012 | Krall, Jr. et al. |
| 8,273,801 B2 | 9/2012 | Baikerikar et al. |
| 8,277,945 B2 | 10/2012 | Anderson et al. |
| 8,302,428 B2 | 11/2012 | Borrelli et al. |
| 8,309,627 B2 | 11/2012 | Poe et al. |
| 8,324,304 B2 | 12/2012 | Burch et al. |
| 8,415,337 B1 | 4/2013 | Krishna |
| 8,518,545 B2 | 8/2013 | Akiba et al. |
| 8,522,575 B2 | 9/2013 | Wada |
| 8,784,371 B2 | 7/2014 | Alexandre |
| 8,820,119 B2 | 9/2014 | Kuwabara et al. |
| 9,010,150 B2 | 4/2015 | Kuwabara et al. |
| 9,034,442 B2 | 5/2015 | Chang et al. |
| 9,096,461 B2 | 8/2015 | Brix |
| 9,107,805 B2 | 8/2015 | Langsdorf et al. |
| 9,272,946 B2 | 3/2016 | Chang et al. |
| 9,346,707 B2 | 5/2016 | Danielson et al. |
| 9,428,302 B2 | 8/2016 | Fadeev et al. |
| 2002/0016438 A1 | 2/2002 | Sugo et al. |
| 2002/0037943 A1 | 3/2002 | Madsen |
| 2002/0069616 A1 | 6/2002 | Odell et al. |
| 2002/0081401 A1 | 6/2002 | Hessok et al. |
| 2002/0155216 A1 | 10/2002 | Reitz et al. |
| 2002/0182410 A1 | 12/2002 | Szum et al. |
| 2003/0031799 A1 | 2/2003 | Haque |
| 2003/0072932 A1 | 4/2003 | Gandon |
| 2004/0048997 A1 | 3/2004 | Sugo |
| 2004/0096588 A1 | 5/2004 | Brandt |
| 2004/0105985 A1 | 6/2004 | Henze et al. |
| 2004/0199138 A1 | 10/2004 | McBay et al. |
| 2005/0048297 A1 | 3/2005 | Fukuda et al. |
| 2005/0061033 A1 | 3/2005 | Petrany et al. |
| 2005/0170722 A1 | 8/2005 | Keese |
| 2005/0199571 A1 | 9/2005 | Geisler et al. |
| 2006/0068982 A1 | 3/2006 | Fechner et al. |
| 2006/0099360 A1 | 5/2006 | Farha |
| 2006/0233675 A1 | 10/2006 | Stein |
| 2006/0260360 A1 | 11/2006 | Dick et al. |
| 2006/0267250 A1 | 11/2006 | Gerretz et al. |
| 2007/0010700 A1 | 1/2007 | Bensmann et al. |
| 2007/0060465 A1 | 3/2007 | Varshneya et al. |
| 2007/0065366 A1 | 3/2007 | Soliani Raschini et al. |
| 2007/0082135 A1 | 4/2007 | Lee |
| 2007/0116907 A1 | 5/2007 | Landon |
| 2007/0157919 A1 | 7/2007 | Marandon |
| 2007/0178256 A1 | 8/2007 | Landon |
| 2007/0187280 A1 | 8/2007 | Haines et al. |
| 2007/0224427 A1 | 9/2007 | Kunita et al. |
| 2007/0225823 A1 | 9/2007 | Hawkins et al. |
| 2007/0289492 A1 | 12/2007 | Wynne et al. |
| 2007/0293388 A1 | 12/2007 | Zuyev et al. |
| 2008/0008838 A1 | 1/2008 | Arpac et al. |
| 2008/0069970 A1 | 3/2008 | Wu |
| 2008/0071228 A1 | 3/2008 | Wu et al. |
| 2008/0114096 A1 | 5/2008 | Qu et al. |
| 2008/0121621 A1 | 5/2008 | Stockum et al. |
| 2008/0199618 A1 | 8/2008 | Wen et al. |
| 2008/0214777 A1 | 9/2008 | Poe |
| 2008/0281260 A1 | 11/2008 | William et al. |
| 2008/0292496 A1 | 11/2008 | Madsen |
| 2008/0308444 A1 | 12/2008 | McClain et al. |
| 2009/0048537 A1 | 2/2009 | Lydon et al. |
| 2009/0092759 A1 | 4/2009 | Chen et al. |
| 2009/0104387 A1 | 4/2009 | Postupack et al. |
| 2009/0126404 A1 | 5/2009 | Sakhrani et al. |
| 2009/0155490 A1 | 6/2009 | Bicker et al. |
| 2009/0155506 A1 | 6/2009 | Martin et al. |
| 2009/0155570 A1 | 6/2009 | Bonnet et al. |
| 2009/0162530 A1 | 6/2009 | Nesbitt |
| 2009/0162664 A1 | 6/2009 | Ou |
| 2009/0176108 A1 | 7/2009 | Toyama et al. |
| 2009/0197048 A1 | 8/2009 | Amin et al. |
| 2009/0197088 A1 | 8/2009 | Murata |
| 2009/0197390 A1 | 8/2009 | Rothwell et al. |
| 2009/0203929 A1 | 8/2009 | Hergenrother et al. |
| 2009/0208175 A1 | 8/2009 | Hongo et al. |
| 2009/0208657 A1 | 8/2009 | Siebenlist et al. |
| 2009/0215607 A1 | 8/2009 | Dejneka et al. |
| 2009/0220761 A1 | 9/2009 | Dejneka et al. |
| 2009/0239759 A1 | 9/2009 | Balch |
| 2009/0247699 A1 | 10/2009 | Buehler et al. |
| 2009/0269597 A1 | 10/2009 | Bito et al. |
| 2009/0275462 A1 | 11/2009 | Murata |
| 2009/0286058 A1 | 11/2009 | Shibata et al. |
| 2009/0297857 A1 | 12/2009 | Pascal et al. |
| 2009/0325776 A1 | 12/2009 | Murata |
| 2010/0009154 A1 | 1/2010 | Allan et al. |
| 2010/0044268 A1 | 2/2010 | Haines et al. |

(56) References Cited

U.S. PATENT DOCUMENTS

| | | |
|---|---|---|
| 2010/0047521 A1 | 2/2010 | Amin et al. |
| 2010/0056666 A1 | 3/2010 | Poe et al. |
| 2010/0062188 A1 | 3/2010 | Miyamoto et al. |
| 2010/0063244 A1 | 3/2010 | Poe et al. |
| 2010/0087307 A1 | 4/2010 | Murata et al. |
| 2010/0089097 A1 | 4/2010 | Brack et al. |
| 2010/0101628 A1 | 4/2010 | Poe et al. |
| 2010/0203270 A1 | 8/2010 | Langsdorf et al. |
| 2010/0246016 A1 | 9/2010 | Carlson et al. |
| 2010/0249309 A1 | 9/2010 | Lewin et al. |
| 2010/0264645 A1 | 10/2010 | Jones et al. |
| 2010/0273019 A1 | 10/2010 | Kitaike et al. |
| 2010/0297393 A1 | 11/2010 | Wu |
| 2010/0317506 A1 | 12/2010 | Fechner et al. |
| 2011/0014475 A1 | 1/2011 | Murata |
| 2011/0045219 A1 | 2/2011 | Stewart et al. |
| 2011/0062619 A1 | 3/2011 | Laine et al. |
| 2011/0065576 A1 | 3/2011 | Campbell et al. |
| 2011/0091732 A1 | 4/2011 | Lu et al. |
| 2011/0098172 A1 | 4/2011 | Brix |
| 2011/0159318 A1 | 6/2011 | Endo et al. |
| 2011/0165393 A1 | 7/2011 | Bayne et al. |
| 2011/0177252 A1 | 7/2011 | Kanagasabapathy et al. |
| 2011/0177987 A1 | 7/2011 | Lenting et al. |
| 2011/0186464 A1 | 8/2011 | Carta et al. |
| 2011/0189486 A1 | 8/2011 | Wendell, Jr. |
| 2011/0200804 A1 | 8/2011 | Tomamoto |
| 2011/0200805 A1 | 8/2011 | Tomamoto et al. |
| 2011/0226658 A1 | 9/2011 | Tata-Venkata et al. |
| 2011/0272322 A1 | 11/2011 | Kamagata et al. |
| 2011/0274916 A1 | 11/2011 | Murata |
| 2011/0313363 A1 | 12/2011 | D'Souza et al. |
| 2012/0016076 A1 | 1/2012 | Kim et al. |
| 2012/0034435 A1 | 2/2012 | Borrelli et al. |
| 2012/0052293 A1 | 3/2012 | Poe et al. |
| 2012/0052302 A1 | 3/2012 | Matusick et al. |
| 2012/0060558 A1 | 3/2012 | Haselhorst et al. |
| 2012/0061342 A1 | 3/2012 | Perrot |
| 2012/0097159 A1 | 4/2012 | Iyer et al. |
| 2012/0107174 A1 | 5/2012 | Zambaux |
| 2012/0142829 A1 | 6/2012 | Ichinose |
| 2012/0148770 A1 | 6/2012 | Rong et al. |
| 2012/0172519 A1 | 7/2012 | Dörr et al. |
| 2012/0199203 A1 | 8/2012 | Nishizawa et al. |
| 2012/0251748 A1 | 10/2012 | Ashmead et al. |
| 2012/0282449 A1 | 11/2012 | Gross |
| 2012/0297829 A1 | 11/2012 | Endo et al. |
| 2013/0011650 A1 | 1/2013 | Akiba et al. |
| 2013/0071078 A1 | 3/2013 | Bennett et al. |
| 2013/0095261 A1* | 4/2013 | Ahn .......... C03C 3/06 428/34.4 |
| 2013/0101590 A1* | 4/2013 | Arnett .......... C07K 14/70503 424/139.1 |
| 2013/0101596 A1* | 4/2013 | DeMartino .......... C03C 3/091 428/34.4 |
| 2013/0101792 A1 | 4/2013 | Pranov |
| 2013/0109116 A1 | 5/2013 | Cavuoti et al. |
| 2013/0122306 A1 | 5/2013 | Bookbinder et al. |
| 2013/0171456 A1* | 7/2013 | Fadeev .......... C03C 17/32 428/429 |
| 2013/0211344 A1 | 8/2013 | Rodriguez et al. |
| 2013/0216742 A1 | 8/2013 | DeMartino et al. |
| 2013/0224407 A1 | 8/2013 | Fadeev et al. |
| 2013/0287755 A1* | 10/2013 | Greene .......... C12N 9/18 424/94.5 |
| 2013/0299380 A1 | 11/2013 | Zambaux et al. |
| 2013/0327740 A1* | 12/2013 | Adib .......... A61J 1/1468 65/30.14 |
| 2014/0031499 A1 | 1/2014 | Cho et al. |
| 2014/0034544 A1 | 2/2014 | Chang et al. |
| 2014/0069202 A1 | 3/2014 | Fisk |
| 2014/0151370 A1 | 6/2014 | Chang et al. |
| 2014/0220327 A1 | 8/2014 | Adib et al. |
| 2014/0339194 A1 | 11/2014 | Gu et al. |
| 2015/0107303 A1 | 4/2015 | Bookbinder et al. |
| 2015/0203631 A1 | 7/2015 | Miyazaki et al. |
| 2015/0274583 A1 | 10/2015 | An et al. |
| 2016/0145150 A1 | 5/2016 | Bookbinder et al. |
| 2018/0116907 A1* | 5/2018 | Fadeev ............... C03C 17/005 |
| 2018/0303708 A1* | 10/2018 | Fadeev ............... C03C 21/002 |
| 2019/0076331 A1* | 3/2019 | Fadeev ............... C03C 17/005 |
| 2020/0268608 A1* | 8/2020 | Fadeev ............... C03C 17/30 |

FOREIGN PATENT DOCUMENTS

| | | |
|---|---|---|
| CN | 1060861 A | 5/1992 |
| CN | 2483332 Y | 3/2002 |
| CN | 1648009 A | 8/2005 |
| CN | 1222478 C | 10/2005 |
| CN | 1963650 A | 5/2007 |
| CN | 101190969 A | 6/2008 |
| CN | 101479355 A | 7/2009 |
| CN | 101585666 A | 11/2009 |
| CN | 201390409 Y | 1/2010 |
| CN | 201404453 Y | 2/2010 |
| CN | 101717189 A | 6/2010 |
| CN | 101831175 A | 9/2010 |
| CN | 201694531 U | 1/2011 |
| CN | 102066462 A | 5/2011 |
| CN | 202006114 U | 10/2011 |
| CN | 102317168 A | 1/2012 |
| CN | 102452797 A | 5/2012 |
| CN | 103562324 A | 2/2014 |
| CN | 104194618 A | 12/2014 |
| CN | 104508008 A | 4/2015 |
| DE | 2138159 A1 | 2/1973 |
| DE | 4128634 A1 | 3/1993 |
| DE | 4130414 A1 | 4/1993 |
| DE | 29702816 U1 | 4/1997 |
| DE | 102004011009 A | 9/2005 |
| DE | 102011085267 A1 | 5/2013 |
| EP | 0176062 A2 | 4/1986 |
| EP | 0330456 A1 | 8/1989 |
| EP | 0515801 A1 | 12/1992 |
| EP | 1464631 A2 | 6/2004 |
| EP | 2031124 A1 | 3/2009 |
| EP | 0524802 B2 | 10/2009 |
| EP | 2540682 A1 | 1/2013 |
| FR | 93015 E | 1/1969 |
| FR | 2033431 A5 | 12/1970 |
| FR | 2515633 A1 | 5/1983 |
| FR | 2973804 A1 | 10/2012 |
| GB | 702292 A | 1/1954 |
| GB | 720778 A | 12/1954 |
| GB | 966731 A | 8/1964 |
| GB | 1267855 A | 3/1972 |
| GB | 1529386 A | 10/1978 |
| IN | 231117 B | 3/2009 |
| JP | S49104910 A | 10/1974 |
| JP | S49115088 A | 11/1974 |
| JP | S5156819 A | 5/1976 |
| JP | 54054124 A | 4/1979 |
| JP | S55104949 A | 8/1980 |
| JP | S5663845 A | 5/1981 |
| JP | 56155044 A | 12/1981 |
| JP | S5738346 A | 3/1982 |
| JP | S5767035 A | 4/1982 |
| JP | S57123223 A | 7/1982 |
| JP | S58156553 A | 9/1983 |
| JP | 60254022 A | 12/1985 |
| JP | 62047623 A | 3/1987 |
| JP | 62140257 A | 6/1987 |
| JP | S62172081 A | 7/1987 |
| JP | 63236731 A | 10/1988 |
| JP | S63270330 A | 11/1988 |
| JP | H01201047 A | 8/1989 |
| JP | H01201048 A | 8/1989 |
| JP | 1279058 A | 11/1989 |
| JP | H02153846 A | 6/1990 |
| JP | H02225344 A | 9/1990 |
| JP | H0437632 A | 2/1992 |
| JP | H05213631 A | 8/1993 |
| JP | H0645481 B2 | 6/1994 |

(56) References Cited

FOREIGN PATENT DOCUMENTS

| | | |
|---|---|---|
| JP | 7223845 A | 8/1995 |
| JP | H083510 A | 1/1996 |
| JP | H08151564 A | 6/1996 |
| JP | H08245242 A | 9/1996 |
| JP | H09241033 A | 9/1997 |
| JP | 11171593 A | 6/1999 |
| JP | 11314931 A | 11/1999 |
| JP | 2000007372 A | 1/2000 |
| JP | 2000211644 A | 8/2000 |
| JP | 2000219621 A | 8/2000 |
| JP | 2001033348 A | 2/2001 |
| JP | 2001072441 A | 3/2001 |
| JP | 2001180969 A | 7/2001 |
| JP | 2001192239 A | 7/2001 |
| JP | 2001229526 A | 8/2001 |
| JP | 2001236634 A | 8/2001 |
| JP | 2001294447 A | 10/2001 |
| JP | 2001302284 A | 10/2001 |
| JP | 2002003241 A | 1/2002 |
| JP | 2002249340 A | 9/2002 |
| JP | 2003053259 A | 2/2003 |
| JP | 2003128439 A | 5/2003 |
| JP | 2003146699 A | 5/2003 |
| JP | 2004161993 A | 6/2004 |
| JP | 2004315285 A | 11/2004 |
| JP | 2006104052 A | 4/2006 |
| JP | 2006291049 A | 10/2006 |
| JP | 2007204728 A | 8/2007 |
| JP | 2008195602 A | 8/2008 |
| JP | 2009108181 A | 5/2009 |
| JP | 2009523105 A | 6/2009 |
| JP | 2009175600 A | 8/2009 |
| JP | 2009204780 A | 9/2009 |
| JP | 2009207618 A | 9/2009 |
| JP | 2010059038 A | 3/2010 |
| JP | 4483331 B2 | 6/2010 |
| JP | 2010202413 A | 9/2010 |
| JP | 2010274091 A | 12/2010 |
| JP | 2011001253 A | 1/2011 |
| JP | 2011057547 A | 3/2011 |
| JP | 2011236100 A | 11/2011 |
| JP | 2012180276 A | 9/2012 |
| JP | 2012224824 A | 11/2012 |
| JP | 2013003310 A | 1/2013 |
| JP | 2013516387 A | 5/2013 |
| KR | 1006303090000 | 9/2006 |
| RO | 83460 A2 | 3/1984 |
| RU | 2071492 C1 | 1/1997 |
| RU | 2220219 C1 | 12/2003 |
| SU | 722865 A1 | 3/1980 |
| SU | 990700 A | 1/1983 |
| SU | 1025680 A1 | 6/1983 |
| SU | 1293134 A1 | 2/1987 |
| TW | 201034993 A | 10/2010 |
| TW | 201113233 A | 4/2011 |
| TW | 201213260 A | 4/2012 |
| TW | 201223895 A | 6/2012 |
| WO | 90/05031 A1 | 5/1990 |
| WO | 95/10487 A1 | 4/1995 |
| WO | 97/25932 A1 | 7/1997 |
| WO | 2001017569 A2 | 3/2001 |
| WO | 2007016516 A2 | 2/2007 |
| WO | 2007097376 A1 | 8/2007 |
| WO | 2008050500 A1 | 5/2008 |
| WO | 2008134315 A2 | 11/2008 |
| WO | 2008134315 A3 | 12/2008 |
| WO | 2009002660 A2 | 12/2008 |
| WO | 2009028862 A1 | 3/2009 |
| WO | 2009095569 A1 | 8/2009 |
| WO | 2009108285 A2 | 9/2009 |
| WO | 2010115728 A2 | 10/2010 |
| WO | 2010129758 A1 | 11/2010 |
| WO | 2011001501 A1 | 1/2011 |
| WO | 2011047840 A2 | 4/2011 |
| WO | 2011069338 A1 | 6/2011 |
| WO | 2011073106 A1 | 6/2011 |
| WO | 2011080543 A1 | 7/2011 |
| WO | 2011103798 A1 | 9/2011 |
| WO | 2011121811 A1 | 10/2011 |
| WO | 2011145661 A1 | 11/2011 |
| WO | 2012026290 A1 | 3/2012 |
| WO | 2012047950 A1 | 4/2012 |
| WO | 2013063290 A1 | 5/2013 |
| WO | 2013130724 A2 | 9/2013 |
| WO | 2014005030 A1 | 1/2014 |
| ZA | 9706079 A | 3/1998 |

OTHER PUBLICATIONS

Singapore Written Opinion and Search Report dated Jan. 25, 2021, for SG Patent Application No. 10201705439Y. pp. 1-10.
English Translation of Chinese 1st Office Action & Search Report dated Jan. 12, 2021, for CN Patent Application No. 201811406323.5. pp. 1-11.
English Translation of Japanese Decision on Rejection dated Nov. 14, 2018, for JP Patent Application No. 2015-545049. pp. 1-5.
English Translation of Japanese 2nd Office Action dated Jul. 24, 2018, for JP Patent Application No. 2015-545120. pp. 1-15.
Non-Final Office Action dated Feb. 6, 2019 for U.S. Appl. No. 15/280,101, filed Sep. 29, 2016. pp. 1-14.
English Translation of Japanese 1st Office Action dated Feb. 13, 2019 for JP Patent Application No. 2018-019178. pp. 1-5.
Non-Final Office Action dated Dec. 12, 2019, for U.S. Appl. No. 15/508,815, filed Mar. 3, 2017. pp. 1-9.
International Search Report & Written Opinion dated Feb. 26, 2014 for International Patent Application No. PCT/US2013/071447 filed Nov. 22, 2013. pp. 1-13.
International Search Report & Written Opinion dated Feb. 26, 2014 for International Patent Application No. PCT/US2013/071460 filed Nov. 22, 2013. pp. 1-12.
International Search Report & Written Opinion dated Feb. 26, 2014 for International Patent Application No. PCT/US2013/071473 filed Nov. 22, 2013. pp. 1-13.
Non-Final Office Action dated Mar. 20, 2014 relating to U.S. Appl. No. 14/057,697, filed Oct. 18, 2013. pp. 1-14.
International Search Report & Written Opinion dated May 6, 2014 for International Patent Application No. PCT/US2013/071776 filed Nov. 26, 2013. pp. 1-12.
U. Watjen, et al. "The Certification of a Reference Material for the Determination of the Alkali Leaching From Pharmaceutical Glass Containers IRMM-435", 2006, XP055114934, Retrieved from the Internet: URL: http://www.irmm.jrc.be/html/reference_materials_catalogue/catalogue/attachments/IRMM-435_report.pdf.
Non-Final Office Action dated Aug. 13, 2014 relating to U.S. Appl. No. 13/780,740, filed Feb. 28, 2013 pp. 1-43.
Non-Final Office Action dated Sep. 9, 2014 relating to U.S. Appl. No. 14/057,697, filed Oct. 18, 2013 pp. 1-15.
U.S. Pharmacopeial Convention Medicines Compendium, "<660> Containers-Glass" [online], (2014). Retrieved from the Internet: <URL: https://mc.usp.org/general-chapters>. pp. 1-5.
European Pharmacopeia, 5th edition, 3.2 Containers, [online]. Retrieved from the Internet: <URL: http://pharmacyebooks.com/2009/09/european-pharmacopoeia-5-0-online.html>. 4 Pages, (2005).
Ciullo, P.A., Industrial Minerals and Their Uses—A Handbook and Formulary. William Andrew Publishing/Noyes, (1996). ISBN: 0-8155-1408-5. Online version available at: <URL: http://app.knovel.com/hotlink/toc/id:kpIMTUAHFB/industrial-minerals-their/industrial-minerals-their>. pp. 1-7.
Final Office Action dated Jul. 16, 2014 relating to U.S. Appl. No. 14/052,048, filed Oct. 11, 2013. pp. 1-9.
Plueddemann, Edwin, "Silane Coupling Agents," Springer Science+Business Media, LLC (1982). ISBN: 978-1-4899-0344-0. pp. 1-18.
Non-Final Office Action dated Nov. 14, 2014 relating to U.S. Appl. No. 14/075,605, filed Nov. 8, 2013 pp. 1-9.
Non-Final Office Action dated Jan. 29, 2015 relating to U.S. Appl. No. 13/780,740, filed Feb. 28, 2013. pp. 1-79.
Hawley's Condensed Chemical Dictionary Melting Points, 2007. pp. 1-5.

(56) References Cited

OTHER PUBLICATIONS

Non-Final Office Action dated Mar. 4, 2015 relating to U.S. Appl. No. 14/057,697, filed Oct. 18, 2013. pp. 1-12.
Final Office Action dated May 6, 2015 relating to U.S. Appl. No. 13/780,740, filed Feb. 28, 2013. pp. 1-36.
English Machine Translation of CN 101831175 A, published Sep. 15, 2010, University of Science and Technology Liaoning, pp. 1-13.
Pappalardo, L. T., "DSC Evaluation of Epoxy and Polyimide-Impregnated Laminates (Prepregs)"; Journal of Applied Polymer Science, vol. 21, 809-820, John Wiley & Sons, Inc. (1977).
Keramid and Kerimide 601, Scifinder American Chemical Society (ACS) (2015); pp. 1-5.
Polyimide—Hawley's Condensed Chemical Dictionary—Wiley Online (2007); 1 Page.
Tyzor (Du Pont)—Hawley's Condensed Chemical Dictionary—Wiley Online (2007). 1 Page.
McKeen, L., "Fatigue and Tribological Properties of Plastics and Elastomers," 2d Ed 7 Polyimides, (2010); 25 Pages.
Final Office Action dated Jun. 3, 2015 relating to U.S. Appl. No. 14/075,605, filed Nov. 8, 2013. pp. 1-12.
Non-Final Office Action dated Oct. 6, 2015 relating to U.S. Appl. No. 13/780,754, filed Feb. 28, 2013; pp. 1-24.
Non-Final Office Action dated Oct. 6, 2015 relating to U.S. Appl. No. 14/812,898, filed Jul. 29, 2015; pp. 1-22.
Non-Final Office Action dated Oct. 7, 2015 relating to U.S. Appl. No. 13/827,732, filed Mar. 14, 2013; pp. 1-22.
Singapore Search Report & Written Opinion dated Jan. 12, 2016 for SG Patent Application No. 11201408732U. pp. 1-9.
Non-Final Office Action dated Feb. 10, 2016 for U.S. Appl. No. 14/812,898, filed Jul. 29, 2015. pp. 1-11.
Non-Final Office Action dated Feb. 10, 2016 for U.S. Appl. No. 13/780,754, filed Feb. 28, 2013. pp. 1-11.
Australian first Examination Report dated Mar. 4, 2016 for AU Patent Application No. 2013271436. pp. 1-4.
Singapore Written Opinion dated Feb. 23, 2016 for SG Patent Application No. 11201504070P. pp. 1-9.
Chinese 2nd Office Action & Search Report dated May 19, 2016 for CN Patent Application No. 201380022462.7. pp. 1-11.
Singapore Written Opinion dated May 4, 2016 for SG Patent Application No. 11201503964W. pp. 1-10.
Karlsson, S. et al., The technology of chemical glass strengthening—a review. Glass Technology: European Journal of Glass Science and Technology A, Apr. 30, 2010, vol. 51, No. 2, pp. 41-54.
Singapore Written Opinion dated May 4, 2016 for SG Patent Application No. 11201504033T. pp. 1-9.
Liu, Y.H. et al., Tunable water-based lubrication behavior of alkyl- and fluoroalkyl-silanes, Chinese Science Bulletin, May 31, 2012, vol. 57, No. 15, pp. 1879-1885. doi: 10.1007/s11434-012-5106-2.
Cichomski, M. et al., Investigation of the structure of fluoroalkylsilanes deposited on alumina surface, Applied Surface Science, Jun. 18, 2012, vol. 258, No. 24, pp. 9849-9855.
Kimble Chase, 2008-2009 Catalog (International Edition), pp. 26-60.
Non-Final Office Action dated Aug. 23, 2016 for U.S. Appl. No. 14/075,630, filed Nov. 8, 2013. pp. 1-11.
Non-Final Office Action dated Sep. 28, 2016 for U.S. Appl. No. 14/075,620, filed Nov. 8, 2013. pp. 1-28.
Non-Final Office Action dated Sep. 27, 2016 for U.S. Appl. No. 14/812,902, filed Jul. 29, 2015. pp. 1-37.
Choi, et al., "Organic/Inorganic Imide Nanocomposites from Aminophenylsilsesquioxanes", American Chemical Society, (2003), Chem. Mater. 15, 3365-3375.
Non-Final Office Action dated Oct. 5, 2016, for U.S. Appl. No. 13/930,647, filed Jun. 28, 2013. pp. 1-30.
English Translation of Chinese 3rd Office Action dated Sep. 30, 2019, for CN 201611002783.2. pp. 1-4.
Notice of Allowance dated Jan. 7, 2015 relating to U.S. Appl. No. 14/052,048, filed Oct. 11, 2013. pp. 1-10.
Notice of Allowance dated Jun. 26, 2015 relating to U.S. Appl. No. 14/057,697, filed Oct. 18, 2013.
Non-Final Office Action dated Jul. 14, 2015 relating to U.S. Appl. No. 14/088,556, filed Nov. 25, 2013; pp. 1-17.
Schwarzenbach, et al., "Interferon a-2a interactions on Glass Vial Surfaces Measured by Atomic Force Microscopy", PDS J. Pharmaceutical Science and Technology, vol. 56, No. 2, Mar.-Apr. 2002, pp. 78-89.
Shelby, "Introduction to Glass Science and Technology", Royal Chemistry, Jan. 1, 2005—Technology & Engineering, p. 193.
Non-Final Office Action dated Mar. 23, 2016 for U.S. Appl. No. 13/827,732, filed Mar. 14, 2013. pp. 1-28.
Yashchishin, et al., "Homogeneity and lamination of sheet glass," L'vov Mechanized Glass Works, Translated from Steklo i Keramika, No. 4, Apr. 1978, p. 192-194.
Cerdan-Diaz, et al., "Improving chemical durability and resistance to corrosion/delamination through chemistry enhancement in glass manufacturing," Glass Delamination Scientific Symposium, May 25, 2011, Arlington, VA, p. 1-29.
Non-Final Office Action dated Mar. 9, 2016 for U.S. Appl. No. 13/912,457, filed Jun. 7, 2013. pp. 1-31.
Non-Final Office Action dated May 19, 2016 for U.S. Appl. No. 14/812,902, filed Jul. 29, 2015. pp. 1-15.
Flaim, et al., "High Refractive Index Polymer Coatings for Optoelectronics Applications," Society of Photo-Optical Instrumentation for Engineers (2003), SPIE Proceedings of Optical Systems Design 2003. pp. 1-12.
Non-Final Office Action dated Jun. 15, 2016 for U.S. Appl. No. 13/780,754, filed Feb. 28, 2013. pp. 1-25.
Non-Final Office Action dated Jun. 15, 2016 for U.S. Appl. No. 14/812,898, filed Jul. 29, 2015. pp. 1-24.
"Lyophilization: Growing with Biotechnology", Genetic Engineering & Biotechnology News, Sep. 15, 2005, vol. 25, No. 16, acquired from https://www.genengnews.com/magazine/35/lyophilization-growing-with-biotechnology/ (Year 2005). pp. 1-7.
Non-Final Office Action dated Mar. 4, 2021, for U.S. Appl. No. 16/996,758, filed Aug. 18, 2020. pp. 1-12.
Chinese 1st Office Action & Search Report dated Aug. 25, 2020, for CN Patent Application No. 201680057620.6. pp. 1-27.
Non-Final Office Action dated Sep. 1, 2020 for U.S. Appl. No. 15/337,695, filed Oct. 28, 2016. pp. 1-25.
"DuPont Teflon PFA TE-7224 Aqueous Fluoropolymers made with Echelon Dispersion Technology" [online]. Dupont, 2006. Retrieved from the Internet: <URL: http://www2.dupont.com/Teflon_Industrial/en_US/assets/downloads/k15758.pdf>.
"Spectroscopic Ellipsometry Methods for Thin Absorbing Coatings", by Hilfiker et al. from Society of Vacuum Coaters 505/856-7188, pp. 511-516, 51st Annual Technical Conference Proceedings, Chicago, IL, April 19-24, (2008).
"Thermal Stability of the Silica-Aminopropylsilane-Polyimide Interface", Linde, et al. Journal of Polymer Science, Polymer Chemistry Edition, vol. 22, 3043-3062, John Wiley & Sons, Inc. (1984).
Anderson, et al., "Polyimide-Substrate Bonding Studies Using γ-APS Coupling Agent", IEEE Transactions on Components, Hybrids, and Manufacturing Technology, vol. CHMT-9, No. 4, p. 364-369, Dec. 1986.
Benitez, et al., "SiOx-SiNx functional coatings by PECVD of organosilicon monomers other than silane", Annual Technical Conference Proceedings—Society of Vacuum Coaters (2002), 45th, 280-285; ISSN: 0731-1699.
Cho, et al. "Adhesion behavior of PDMS-containing polyimide to glass", Journal of Adhesion Science and Technology 12:3, pp. 253-269, Taylor & Francis (1998), DOI: 10.1163/156856198X00867.
De Rosa, et al., "Scratch Resistant Polymide Coatings for Aluminosilicate Glass Surfaces", The Journal of Adhesion, 78: 113-127, Taylor & Francis (2002), ISSN: 0021-8464.
Dow Corning, "A Guide to Silane Solutions: Fiberglass and Composites", Silicones Simplified [online], Dow Corning Corporation, 2009. Retrieved from the Internet: <URL: https://www.xiameter.com/en/ExploreSilicones/Documents/95-728-01%20Fiberglass%20and%20Composites.pdf>.
Dow Corning, Resins and Intermediates Selection Guide; Paints & Inks Solutions, p. 1-8, 2010.

(56) References Cited

OTHER PUBLICATIONS

Ennis, et al., "Glass Vials for Small Volume Parenterals: Influence of drug and manufacturing process on glass delamination," Pharmaceutical Development and Technology, 6(3): p. 393-405, (2001).

Francen, et al., "Fluorochemical glass treatments", The Glass Industry (1965), 46(10), 594-7; 628-9; ISSN: 0017-1026.

G. L. Witucki, "A Silane Primer: Chemistry and Applications of Alkoxy Silanes", Journal of Coatings Technology, (vol. 65) pp. 57-60, Federation of Societies for Coatings Technology, Blue Bell, Pennsylvania (Jul. 1993).

Gelest, Inc., MSDS, Material Safety Data Sheet, Aminopropylsilsesquioxane Oligomer, 22-25%—WSA-9911 [online], Gelest, Inc. Morrisville, PA, 2008. Retrieved from the Internet: <URL: http://shop.gelest.com/Product.aspx?catnum=WSA-9911&Index=0&TotalCount=1>.

Guadagnino, et al., "Delamination Propensity of Pharmaceutical Glass Containers by Accelerated Testing with Different Extraction Media," PDA Journal of Pharmaceutical Science and Technology, Mar. / Apr. 2012, vol. 66, No. 2,116-125. DOI: 10.5731/pdajpst.2012.00853.

Iacocca, et al., "Corrosive attack of glass by a pharmaceutical compound," Journal of Materials Science, 42:801-811, Springer Science+Business Media, LLC (2007), DOI: 10.1007/s10853-006-0156-y.

Iacocca, et al., "Factors Affecting the Chemical Durability of Glass Used in the Pharmaceutical Industry", AAPS PharmSciTech, vol. 11, No. 3, pp. 1340-1349, Sep. 2010.

Jiang, et al., "Novel Mechanism of Glass Delamination in Type 1A Borosilicate Vials Containing Frozen Protein Formulations", PDA Journal of Pharmaceutical Science and Technology, Jul. / Aug. 2013, vol. 67, No. 4, 323-335.

Jin, et al., "Preparation and characterization of poly(phthalazinone ether ketone)/SiO2 hybrid composite thin films with low friction coefficient", Journal of Sol-Gel Science and Technology, Springer Science+Business Media, LLC (2008), 46(2), 208-216; ISSN: 0928-0707.

Jin, et al., "Preparation and investigation of the tribological behavior of poly(phthalazinone ether keytone)/silica thin films", Chinese Journal of Materials Research. vol. 22, No. 1, pp. 26-30. Feb. 25, 2008. ISSN: 1005-3093. Published by: Chinese Academy of Sciences, No. 1, Beijing, China.

Metwalli et al., Journal of Colloid and Interface Science 298 (2006) 825-831.

Poe, et al., "Zero CTE polyimides for athermal optical membranes", Proceedings of SPIE, vol. 7061, Issue: Novel Optical Systems Design and Optimization XI, p. 706114/1-706114/9, Journal, 2008, Publisher: Society of Photo-Optical Instrumentation Engineers, ISSN: 0277-786X.

Rupertus, V., "PDA Europe Thanks Universe of Pre-Filled Syringes: Two ways to minimize the delamination risk of glass containers," P&M—EU; PDA Letter, p. 42-23, Jan. 2012.

Schmid, et al., "Recommendations on Delamination Risk Mitigation & Prediction for Type I Pharmaceutical Containers Made of Tubing Glass", Nuova Ompi: Glass Division, p. 40-42, Frederick Furness Publishing (2012).

Schmid, et al., "Glass Delamination: Facts—Prevention—Recommendations", Stevanato Group Market Update, News Issue 5, May 2011, p. 1-4.

Schott North America, Inc., "Schott Type 1 plus: SiO2 coating resists delamination" [online], Schott North America, Inc., retrieved from the internet: <URL: http://www.us.schott.com/pharmaceutical_packaging/english/download/flyer_type_i_plus_us.pdf>.

Schwarzenbach, et al., "Topological Structure and Chemical Composition of Inner Surfaces of Borosilicate Vials," PDA Journal of Pharmaceutical Science and Technology, May / Jun. 2004, vol. 58, No. 3, 169-175.

Sloey, et al., "Determining the Delamination Propensity of Pharmaceutical Glass Vials Using a Direct Stress Method," PDA Journal of Pharmaceutical Science and Technology, Jan. / Feb. 2013, vol. 67, No. 1, 35-42. DOI: 10.5731/pdajpst.2013.00900.

Smay, G. L., "The characteristics of high-temperature resistant organic polymers and the feasibility of their use as glass coating materials", Journal of Materials Science, 20 (4), pp. 1494-1500, Chapman & Hall Ind. (1985), ISSN: 0022-2461.

U.S. Department of Health & Human Services, "Advisory to Drug Manufactures: Formation of Glass Lamellae in Certain Injectable Drugs" [online] U.S. Food & Drug Administration, Mar. 25, 2011, retrieved from the internet: <URL: http://www.fda.gov/Drugs/DrugSafety/ucm248490.htm>.

Wagner, C., "PDA/FDA Glass Quality Conference: an alternative glass packing solution to reduce delamination risks," [PowerPoint Presentation] PDA/FDA Glass Quality Conference, Washington, D.C., Jun. 4-5, 2012.

Wahab, et al., "Silica- and Silsesquioxane-Containing Polymer Nanohybrids", Macromolecules Containing Metal and Metal-Like Elements, vol. 4: Group IVA Polymers, Chapter 6, 2005 John Wiley & Sons, Inc.

Walther, et al., "Pharmaceutical Vials with Extremely High Chemical Inertness" [online], PDA Journal of Pharmaceutical Science and Technology, May / Jun. 2002, vol. 56, No. 3, 124-129 (abstract); retrieved from the internet: <URL: http://journal.pda.org/content/56/3/124.abstract>.

Non-Final Office Action dated Jul. 30, 2013 relating to U.S. Appl. No. 13/780,740, filed Feb. 28, 2013. pp. 1-34.

International Search Report and Written Opinion dated Oct. 2, 2013, relating to International Patent Application No. PCT/US2013/044686 filed Jun. 7, 2013. pp. 1-17.

International Search Report & Written Opinion dated Oct. 28, 2013 for International Patent Application No. PCT/US2013/028187 filed Feb. 28, 2013. pp. 1-13.

Huang, et al., "Cubic silsesquioxane-polymide nanocomposites with improved thermomerchanical and dielectric properties", Acta Materialia, Elsevier, vol. 53, No. 8, pp. 2395-2404, May 1, 2005; ISSN: 1359-6454.

International Search Report & Written Opinion dated Oct. 28, 2013 for International Patent Application No. PCT/US2013/048589 filed Jun. 28, 2013. pp. 1-15.

Final Office Action dated Jan. 28, 2014 relating to U.S. Appl. No. 13/780,740, filed Feb. 28, 2013. pp. 1-37.

International Search Report & Written Opinion dated Jan. 16, 2014 for International Patent Application No. PCT/US2013/066370 filed Oct. 23, 2013. pp. 1-12.

Pantano, Carlo G.,"The Role of Coatings and Other Surface Treatments in the Strength of Glass", [online], Department of Materials Science and Engineering Materials Research Institute, The Pennsylvania State University, University Park, PA. 2009. Retrieved from the Internet: <URL: http://www.gmic.org/Strength%20In%20Glass/Pantano%20Pac%20Rim.pdf>. pp. 1-55.

Non-Final Office Action dated Mar. 10, 2014 relating to U.S. Appl. No. 14/052,048, filed Oct. 11, 2013 pp. 1-11.

ASTM, "Standard Specification for Glasses in Laboratory Apparatus," Designation E438-92 (Reapproved 2006). Retrieved from the Internet: <URL: http://enterprise2.astm.org/DOWNLOAD/E438-92R06.1656713-1.pdf>. p. 1.

International Search Report & Written Opinion dated Feb. 26, 2014 for International Patent Application No. PCT/US2013/071437 filed Nov. 22, 2013. pp. 1-12.

International Search Report and Written Opinion dated Nov. 20, 2015 for PCT/US2015/048592 filed Sep. 1, 2015. pp. 1-11.

Chao-Ching Chang et al., Synthesis and Optical Properties of Soluble Polyimide/Titania Hybrid Thin Films, Macromol. Mater. Eng., (2006), Issue 12, vol. 291, pp. 1521-1528.

Yang-Yen Yu, et al., High transparent polyimide/titania multi-layer anti-reflective hybrid films, Thin Solid Films 519 (2011) 4731-4736.

Qiu, et al., "Morphology and size control of inorganic particles in polyimide hybrids by using SiO2-TiO2 mixed oxide", Polymer 44 (2003) 5821-5826.

Extended European Search Report dated Jan. 8, 2016 for EP Patent Application No. 15290254.0. pp. 1-6.

Japanese 1st Office Action dated Sep. 26, 2017, for JP Patent Application No. 2015-545127. pp. 1-18.

Russian 1st Office Action and Search Report dated Oct. 25, 2017, for RU Patent Application No. 2015125706. pp. 1-12.

(56) References Cited

OTHER PUBLICATIONS

Kitaygorodsky I.I. et al., "Technology of Glass", The state publishing house of literature on construction, architecture and building materials, third edition, revised, Moscow, Russia, 1961.
Notice of Allowance dated Nov. 7, 2017, for U.S. Appl. No. 13/780,754. pp. 1-14.
Liu et al., "Influences of heating temperature on mechanical properties of polydimethylsiloxane", Sensors and Actuators A: Physical, 2009, vol. 151, p. 42-45.
Japanese 1st Office Action dated Oct. 24, 2017, for Japanese Patent Application No. 2015-545160. pp. 1-8.
Russian 1st Office Action and Search Report and English Translation dated Nov. 10, 2017 for RU Patent Application No. 2015125912. pp. 1-16.
Non-Final Office Action dated Nov. 13, 2017 for U.S. Appl. No. 15/656,634, filed Jul. 21, 2017. pp. 1-31.
Russian Decision of Grant dated Nov. 8, 2017, for RU Patent Application No. 2014138998. pp. 1-20.
Russian 1st Office Action and Search Report and English Translation dated Oct. 27, 2017, for RU Patent Application No. 2015125783. pp. 1-13.
English Translation of Taiwan 2nd Office Action & Search Report dated Dec. 4, 2017, for TW Patent Application No. 102143473. pp. 1-2.
Korean 1st Office Action and English Translation dated Dec. 14, 2017, for KR Patent Application No. 2015-7017413 pp. 1-10.
Final Office Action dated Jan. 24, 2018, for U.S. Appl. No. 14/075,620, filed Nov. 8, 2013. pp. 1-41.
Dean et al., "Pharmaceutical Packaging Technology", CRC Press. Nov. 2000. p. 149.
Russian 1st Office Action & Search Report and English Translation dated Oct. 27, 2017, for RU Patent Application No. 2015125913. pp. 1-13.
Japanese 1st Office Action dated Nov. 14, 2017, for JP Patent Application No. 2015-545129. pp. 1-8.
Non-Final Office Action dated Feb. 9, 2018, for U.S. Appl. No. 15/331,120, filed Oct. 21, 2016. pp. 1-26.
FIOLAX clear technical data sheet acquired from http://www.us.schott.com/d/tubing/7c1860b0-5313-4d48-a12f-fa1ac06bc4a9/schott-tubing-datasheet-fiolax-clear-english.pdf. Originally published online Feb. 2010. pp. 1-3.
Chinese 3rd Office Action and English Translation dated Apr. 25, 2018, for CN Patent Application No. 201380061171.9. pp. 1-21.
Japanese Final Office Action dated Jul. 24, 2018 for JP Patent Application No. 2015-545124. pp. 1-6.
Non-Final Office Action dated May 30, 2019, for U.S. Appl. No. 15/337,695, filed Oct. 28, 2016. pp. 1-13.
English Translation of Japanese 1st Office Action dated Mar. 6, 2019 for JP Patent Application No. 2018-006413. pp. 1-11.
Non-Final Office Action dated Oct. 28, 2016, for U.S. Appl. No. 14/949,320, filed Nov. 23, 2015 pp. 1-16.
Wagner, Steven Robert, "High temperature-high humidity for polyimide coatings for aluminosilicate glass surfaces"; The Libraries at Alfred University; Scholes Library Catalog; (2001), pp. 1-81; OCLC: 671453753.
Non-Final Office Action dated Jan. 12, 2017, for U.S. Appl. No. 14/812,898, filed Jul. 29, 2015. pp. 1-44.
English Machine Translation of detailed description of DE 102004011009 published Sep. 29, 2005; Machine Translation acquired on Jan. 8, 2016. pp. 1-11.
Hasegawa et al., "Photophysics, photochemistry, and optical properties of polyimides", Elsevier Science Ltd; Prog. Poly. Sci. 26 (2001), pp. 259-335.
Non-Final Office Action dated Feb. 15, 2017, for U.S. Appl. No. 13/780,740, filed Feb. 28, 2013. pp. 1-39.
Non-Final Office Action dated Jan. 24, 2017, for U.S. Appl. No. 15/331,113, filed Oct. 21, 2016. pp. 1-50.
"Parylene Conformal Coating Specification and Properties", acquired from http://www.nbtc.cornell.edu/sites/default/files/Parylene%20Information%20Sheets.pdf on Dec. 20, 2016.
Rx-360 Consortium; "Highlights from Jun. 2011 Glass Container Delamination Scientific Symposium"; Report published Jul. 9, 2011; pp. 1-13.
Non-Final Office Action dated Feb. 22, 2017, for U.S. Appl. No. 13/827,732, filed Mar. 14, 2013. pp. 1-34.
Jannotti et al. "Photoelastic Measurement of High Stress Profiles in Ion-exchanged Glass", Int. J. Appl. Glass Sci., 2011, vol. 2, p. 275-281.
Canadian Official Action dated Mar. 6, 2017 for CA Patent Application No. 2,864,919. pp. 1-4.
English Translation of Japanese 1st Office Action dated Feb. 21, 2017, for JP Patent Application No. 2014-558980; pp. 1-6.
English Translation of Chinese 1st Office Action & Search Report dated Feb. 20, 2017 for CN Patent Application No. 201380062549.7; pp. 1-11.
Non-Final Office Action dated Mar. 9, 2017 for U.S. Appl. No. 15/331,120, filed Oct. 21, 2016 pp. 1-43.
"Schott Technical Glasses: Physical and Technical Properties" acquired from http://www.us.schott.com/tubing/english/download/schott-brochure-technical-glasses_us.pdf on Jan. 17, 2017 pp. 1-76.
Non-Final Office Action dated Mar. 8, 2017 for U.S. Appl. No. 13/912,457, filed Jun. 7, 2013. pp. 1-34.
Non-Final Office Action dated Mar. 21, 2017 for U.S. Appl. No. 14/075,630, filed Nov. 8, 2013. pp. 1-35.
Non-Final Office Action dated Apr. 6, 2017 for U.S. Appl. No. 14/812,902, filed Jul. 29, 2015. pp. 1-43.
Non-Final Office Action dated Apr. 18, 2017, for U.S. Appl. No. 15/374,338, filed Dec. 9, 2016. pp. 1-45.
Non-Final Office Action dates Mar. 29, 2017 for U.S. Appl. No. 13/780,754, filed Feb. 28, 2013. pp. 1-41.
Non-Final Office Action dated May 30, 2017 for U.S. Appl. No. 14/075,620, filed Nov. 8, 2013. pp. 1-61.
Non-Final Office Action dated May 31, 2017 for U.S. Appl. No. 14/075,593, filed Nov. 8, 2013. pp. 1-51.
English Translation of Taiwan Official Communication dated Apr. 17, 2017 & Search Report dated Feb. 20, 2017, for TW Patent Application No. 102143473. pp. 1-3.
English Translation of Japanese Office Action dated May 30, 2017 for JP Patent Application No. 2015-520574. pp. 1-9.
English Translation of Russian Official Communication and Search Report dated Jun. 5, 2017 for RU Patent Application No. 2014154053 pp. 1-9.
Borba s rasslaivaniem stekla v farmatsevticheskoy upakovke (Glass delamination control in a pharmaceutical package) Henning Katte Glass International, May 2012. pp. 25-30.
English Translation of Taiwan Search Report dated May 20, 2017 for TW Patent Application No. 102143475. pp. 1-2.
Non-Final Office Action dated Jul. 7, 2017 for U.S. Appl. No. 14/949,320, filed Nov. 23, 2015. pp. 1-15.
English Translation of Japanese 2nd Office Action dated Aug. 20, 2019, for JP Patent Application No. 2018-019178. pp. 1-5.
English Translation of Korean 2nd Office Action dated Sep. 10, 2019, for KR Patent Application No. 2019-7008449 pp. 1-2.
English Translation of Chinese 1st Office Action & Search Report dated Sep. 9, 2019, for CN Patent Application No. 201710851535.3. pp. 1-10.
English Translation of Russian Decision on Grant dated Oct. 4, 2019, for RU Patent Application No. 2018136739. pp. 1-22.
Final Office Action dated Mar. 12, 2021, for U.S. Appl. No. 15/337,695, filed Oct. 28, 2016. pp. 1-23.
Non-Final Office Action dated Jun. 8, 2021, for U.S. Appl. No. 15/280,101, filed Sep. 29, 2016 pp. 1-22.
Japanese 1st Office Action dated Jun. 30, 2021, for JP Patent Application No. 2020-82562. pp. 1-12.
Japanese 1st Office Action dated Jul. 28, 2021, for JP Patent Application No. 2020-110294. pp. 1-6.
Extended European Search Report dated Sep. 8, 2021, for EP Patent Application No. 21187669.3. pp. 1-11.
Shallenberger J. R. et al: Adsorption of polyamides and polyamide-silane mixtures at glass surfaces, Surface and Interface Analysis, vol. 35, No. 8, Aug. 1, 2003 (Aug. 1, 2003), pp. 667-672, XP055081787, ISSN: 0142-2421, DOI: 10.1002/sia.1589.

(56) References Cited

OTHER PUBLICATIONS

Wohl C. J. et al: Modification of the surface properties of polyimide films using polyhedral oligomeric silsesquioxane deposition and oxygen plasma exposure, Applied Surface Science, Elsevier, Amsterdam, NL, vol. 255, No. 18, Jun. 30, 2009 (Jun. 30, 2009), pp. 8135-8144, XP026221236, ISSN: 0169-4332, DOI: 10.1016/J.APSUSC.2009.05.030.
Japanese Office Action dated Mar. 7, 2022, pertaining to JP Patent Application No. 2021-039178.
Final Office Action dated Jan. 14, 2022, pertaining to U.S. Appl. No. 17/213,859, filed Mar. 26, 2021, 32 pgs.
Final Office Action dated Jan. 11, 2022, pertaining to U.S. Appl. No. 15/857,557, filed Dec. 28, 2017, 16 pgs.
Canadian Exam Report dated Jan. 18, 2022, pertaining to Canadian Appl. No. 3061514, 3 pgs.
Extended European Search Report dated Jan. 11, 2022, pertaining to European Appl. No. 21191737.2, 12 pgs.
Japanese Office Action dated Jun. 15, 2022, pertaining to JP Patent Application No. 2021-111266, 10 pgs.
Taiwan Office Action dated Apr. 18, 2022, pertaining to TW Patent Application No. 110124379, 5 pgs.
European Extended Search Report dated May 10, 2022, pertaining to EP Patent Application No. 22153571.9, 6 pgs.

\* cited by examiner

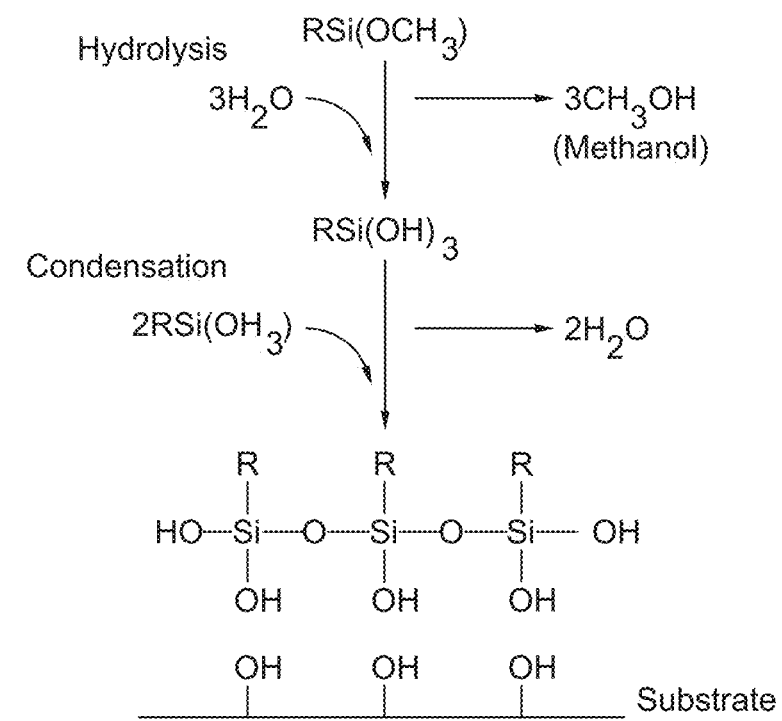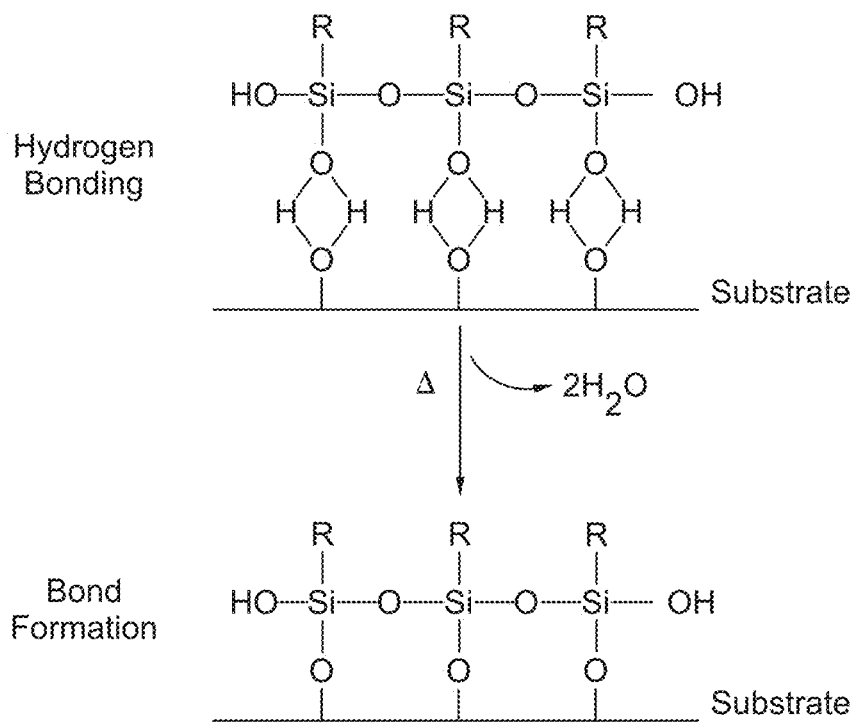
FIG. 9

3ON SCRATCH ON TWO VIAL TYPES

| | VIAL #S | NORMAL LOAD (N) | | | COF | | |
|---|---|---|---|---|---|---|---|
| | | AVG | MIN | MAX | AVG | ST. DEV. | MAX |
| | 1&2 | 31 | 28 | 34 | 0.42 | 0.18 | 0.66 |
| | 3&4 | 31 | 29 | 36 | 0.45 | 0.18 | 0.7 |
| | 5&6 | 30 | 28 | 34 | 0.45 | 0.11 | 0.64 |
| | 7&8 | 29 | 26 | 32 | 0.33 | 0.14 | 0.54 |
| | 9&10 | 30 | 28 | 33 | 0.16 | 0.15 | 0.59 |
| | 11&12 | 28 | 25 | 33 | 0.16 | 0.09 | 0.6 |
| | 12&14 | 30 | 29 | 33 | 0.22 | 0.16 | 0.61 |
| | 15&16 | 31 | 28 | 35 | 0.53 | 0.11 | 0.71 |
| | AVERAGE | 30 | 28 | 34 | 0.38 | 0.14 | 0.63 |
| REF. COMP. IX@450 COATED 0.1/0.1 APS/NOV 800 | 1&2 | 30 | 28 | 31 | 0.12 | 0.04 | 0.34 |
| | 3&4 | 28 | 24 | 31 | 0.16 | 0.08 | 0.34 |
| | 5&6 | 40 | 30 | 44 | 0.08 | 0.02 | 0.19 |
| | 7&8 | 30 | 27 | 31 | 0.08 | 0.05 | 0.38 |
| | 9&10 | 30 | 28 | 30 | 0.08 | 0.03 | 0.22 |
| | 11&12 | 31 | 30 | 33 | 0.12 | 0.04 | 0.23 |
| | 12&14 | 30 | 29 | 32 | 0.15 | 0.07 | 0.41 |
| | 15&16 | 30 | 28 | 32 | 0.09 | 0.02 | 0.19 |
| | AVERAGE | 31 | 28 | 33 | 0.11 | 0.04 | 0.29 |

FIG. 36

| FORMULATION | RELATIVE THICKNESS | CONDITION |
|---|---|---|
| 0.1% APS/1.0% KAPTON | 10 | AS IS |
| 0.1% APS/0.1% KAPTON | 1 | AS IS |
| | | |
| 0.1 APS 0.5 DC806A | 5 | 1 H TUMBLE |
| 0.1 APS 0.1 DC806A | 1 | 1 H TUMBLE |
| 0.1 APS 0.1 KAPTON | 1 | 1 H TUMBLE |
| 0.1 APS 0.5 KAPTON | 5 | 1 H TUMBLE |
| 1.0% DC255 | 10 | 0.5 H TUMBLE |
| 1.0% DC255 | 10 | 1 H TUMBLE |
| 1.0% DC255 | 10 | 2 H TUMBLE |
| 1.0% DC255 | 10 | AS IS |
| 1.0% KAPTON | 10 | FILING LINE |
| 0.1 APS 0.1 NOVA800 | 1 | 6 MIN TUMBLE |
| 0.1 APS 0.1 NOVA800 | 1 | 15 MIN TUMBLE |
| 1.0 GAPS/1.0 DC806A | 10 | 6 MIN TUMBLE |
| 1.0 GAPS/1.0 DC806A | 10 | 15 MIN TUMBLE |
| 1.0 GAPS/1.0 DC806A | 10 | AS IS |
| 0.1 APS 0.1 NOVA800 | 1 | AS IS |
| TYPE 1B BARE | 0 | 30N (3), 50N (1) |
| 1.0 GAPS/1.0 DC806A | 10 | 30N SCRATCH 3 |
| 1.0 GAPS/1.0 DC806A | 10 | 50N_SCRATCH 1 |
| 0.1 APS 0.1 NOVA800 | 1 | 30N SCRATCH 3 |
| 0.1 APS 0.1 NOVA800 | 1 | 50N_SCRATCH 1 |

FIG. 40

BEFORE

| VIALS | Z-LOAD AVG | Z-LOAD MAX | COF AVG | COF ST. DEV. | COF MAX | FX MAX |
|---|---|---|---|---|---|---|
| 1&2 | 34 | 36 | 0.11 | 0.03 | 0.23 | 8 |
| 3&4 | 30 | 32 | 0.14 | 0.02 | 0.18 | 5 |
| 5&6 | 34 | 36 | 0.09 | 0.02 | 0.19 | 6 |
| 7&8 | 31 | 33 | 0.07 | 0.01 | 0.02 | 4 |
| 9&10 | 31 | 33 | 0.08 | 0.01 | 0.14 | 4 |

AFTER

3) APS/NOVA LYOPHILLIZED

| VIALS | Z-LOAD AVG | Z-LOAD MAX | COF AVG | COF ST. DEV. | COF MAX | FX MAX |
|---|---|---|---|---|---|---|
| 1&2 | 37 | 39 | 0.06 | 0.01 | 0.09 | 3 |
| 3&4 | 40 | 43 | 0.06 | 0.01 | 0.14 | 6 |
| 5&6 | 30 | 31 | 0.05 | 0.01 | 0.09 | 3 |
| 7&8 | 30 | 31 | 0.05 | 0.01 | 0.07 | 2 |
| 9&10 | 30 | 32 | 0.05 | 0.01 | 0.16 | 5 |

FIG. 47

| VIALS | Z-LOAD AVG | Z-LOAD MAX | COF AVG | COF ST. DEV. | COF MAX | FX MAX |
|---|---|---|---|---|---|---|
| 1&2 | 34 | 36 | 0.11 | 0.03 | 0.23 | 8 |
| 3&4 | 30 | 32 | 0.14 | 0.02 | 0.18 | 5 |
| 5&6 | 34 | 36 | 0.09 | 0.02 | 0.19 | 6 |
| 7&8 | 31 | 33 | 0.07 | 0.01 | 0.02 | 4 |
| 9&10 | 31 | 33 | 0.08 | 0.01 | 0.14 | 4 |

2) APS/NOVA AUTOCLAVED

| VIALS | Z-LOAD AVG | Z-LOAD MAX | COF AVG | COF ST. DEV. | COF MAX | FX MAX |
|---|---|---|---|---|---|---|
| 1&2 | 36 | 39 | 0.08 | 0.02 | 0.18 | 6 |
| 3&4 | 37 | 40 | 0.09 | 0.01 | 0.16 | 5 |
| 5&6 | 30 | 31 | 0.06 | 0.01 | 0.1 | 3 |
| 7&8 | 30 | 31 | 0.07 | 0.01 | 0.1 | 3 |
| 9&10 | 30 | 31 | 0.07 | 0.01 | 0.14 | 4 |

FIG. 48

| 12h DP Sample | Silanes ratio | Coating composition |
|---|---|---|
| 540 #1 | 1:1 | 0.5 GAP/0.5 Aminophenyltrimethoxysilane + 1.0% Nova |
| 540 #2 | 1:0.5 | 0.5 GAP/0.25 Aminophenyltrimethoxysilane + 1.0% Nova |
| 540 #3 | 1:0.2 | 0.5 GAP/0.1 Aminophenyltrimethoxysilane + 1.0% Nova |

| 540 Target Load | Vial Set | Fz (N) Avg | Fz (N) Max | COF Avg | COF Max | COF Std. Dev. | Fx (N) Max |
|---|---|---|---|---|---|---|---|
| 30 | 1 | 30 | 32 | 0.21 | 0.26 | 0.02 | 8 |
|  | 2 | 30 | 32 | 0.21 | 0.41 | 0.04 | 13 |
|  | 3 | 30 | 33 | 0.32 | 0.68 | 0.1 | 19 |
| 20 | 1 | 20 | 22 | 0.21 | 0.24 | 0.02 | 5 |
|  | 2 | 20 | 21 | 0.22 | 0.31 | 0.02 | 6 |
|  | 3 | 21 | 23 | 0.29 | 0.61 | 0.1 | 13 |

FIG. 51

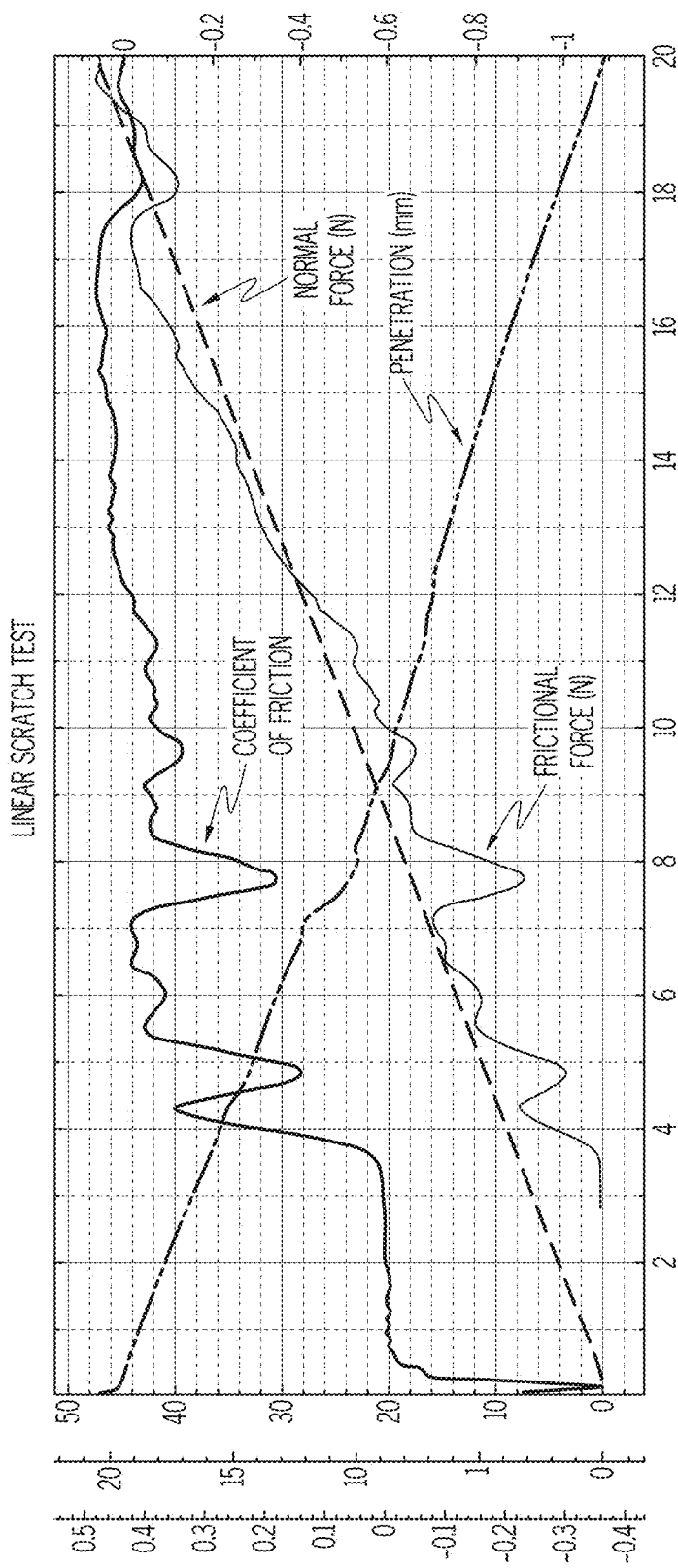
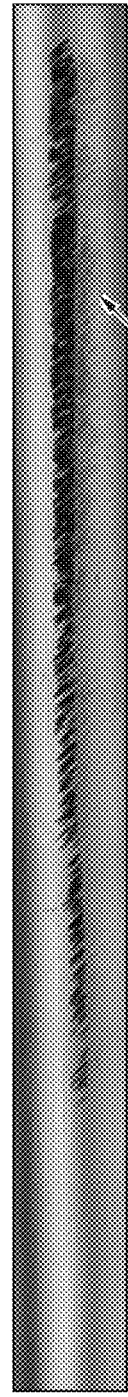
FIG. 65

DELAMINATION RESISTANT GLASS CONTAINERS WITH HEAT-TOLERANT COATINGS

CROSS REFERENCE TO RELATED APPLICATIONS

The present specification is a continuation to U.S. patent application Ser. No. 13/930,647 filed Jun. 28, 2013 and entitled "Delamination Resistant Glass Containers With Heat-Tolerant Coatings," which itself claims priority to U.S. Provisional Patent Application No. 61/665,682 filed Jun. 28, 2012 and entitled "Delamination Resistant Glass Containers with Heat Resistant Coatings," each of which is incorporated by reference herein.

BACKGROUND

Field

The present specification generally relates to glass containers and, more specifically, to glass containers for use in storing perishable products including, without limitation, pharmaceutical formulations.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical formulations contained therein. Glasses having suitable chemical durability include those glass compositions within the ASTM standard "Type 1A" and "Type 1B" glass compositions which have a proven history of chemical durability.

Although Type 1A and Type 1B glass compositions are commonly used in pharmaceutical packages, they do suffer from several deficiencies, including a tendency for the interior surfaces of the pharmaceutical package to shed glass particulates or "delaminate" following exposure to pharmaceutical solutions.

In addition, use of glass in pharmaceutical packaging may also be limited by the mechanical performance of the glass. Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package.

Accordingly, a need exists for alternative glass containers for use as pharmaceutical packages which have improved resistance to mechanical damage and which exhibit a reduced propensity to delaminate.

SUMMARY

According to one embodiment, a glass container may include a glass body having an interior surface and an exterior surface. At least the interior surface of the glass body may have a delamination factor of less than or equal to 10 and a threshold diffusivity of greater than about 16 $\mu m^2/hr$ at a temperature less than or equal to 450° C. A heat-tolerant coating may be bonded to at least a portion of the exterior surface of the glass body. The heat-tolerant coating may be thermally stable at a temperature of at least 260° C. for 30 minutes.

In another embodiment, a glass container may include a glass body having an interior surface and an exterior surface. At least the interior surface of the glass body may have a delamination factor of less than or equal to 10 and a threshold diffusivity of greater than about 16 $\mu m^2/hr$ at a temperature less than or equal to 450° C. A heat-tolerant coating may be bonded to at least a portion of the exterior surface of the glass body. The exterior surface of the glass body with the heat-tolerant coating may have a coefficient of friction of less than about 0.7.

In another embodiment, a glass container may include a glass body having an interior surface and an exterior surface. At least the interior surface of the glass body may have a threshold diffusivity of greater than about 16 $\mu m^2/hr$ at a temperature less than or equal to 450° C. An interior region may extend between the interior surface of the glass body and the exterior surface of the glass body. The interior region may have a persistent layer homogeneity. A heat-tolerant coating may be bonded to at least a portion of the exterior surface of the glass body. The heat-tolerant coating may be thermally stable at a temperature of at least 260° C. for 30 minutes.

In another embodiment, a glass container may include a glass body having an interior surface and an exterior surface. The interior surface may have a persistent surface homogeneity. At least the interior surface of the glass body may have a threshold diffusivity of greater than about 16 $\mu m^2/hr$ at a temperature less than or equal to 450° C. A heat-tolerant coating may be bonded to at least a portion of the exterior surface of the glass body. The heat-tolerant coating maybe thermally stable at a temperature of at least 260° C. for 30 minutes.

In another embodiment, a glass container may include a glass body having an interior surface and an exterior surface. The glass body may be formed from an alkali aluminosilicate glass composition which has a threshold diffusivity of greater than about 16 $\mu m^2/hr$ at a temperature less than or equal to 450° C. and a type HGA1 hydrolytic resistance according to ISO 720. The glass composition may be substantially free of boron and compounds of boron such that at least the interior surface of the glass body has a delamination factor of less than or equal to 10. A heat-tolerant coating may be bonded to at least a portion of the exterior surface of the glass body. The heat-tolerant coating may be thermally stable at a temperature of at least 260° C. for 30 minutes.

In another embodiment, a glass container may include a glass body having an interior surface and an exterior surface. The glass body may be formed from a glass composition comprising: from about 74 mol. % to about 78 mol. % $SiO_2$; from about 4 mol. % to about 8 mol. % alkaline earth oxide, wherein the alkaline earth oxide comprises MgO and CaO and a ratio (CaO (mol. %)/(CaO (mol. %)+MgO (mol. %))) is less than or equal to 0.5; X mol. % $Al_2O_3$, wherein X is greater than or equal to about 4 mol. % and less than or equal to about 8 mol. %; and Y mol. % alkali oxide, wherein the alkali oxide comprises $Na_2O$ in an amount greater than or equal to about 9 mol. % and less than or equal to about 15 mol. %, a ratio of Y:X is greater than 1. The glass body may have a delamination factor less than or equal to 10. A heat-tolerant coating may be positioned on the exterior surface of the glass body and comprise a low-friction layer and a coupling agent layer, the low-friction layer comprising a polymer chemical composition and the coupling agent layer comprising at least one of: a mixture of a first silane chemical composition, a hydrolysate thereof, or an oligomer thereof, and a second silane chemical composition, a hydrolysate thereof, or an oligomer thereof, wherein the first silane chemical composition is an aromatic silane chemical composition and the second silane chemical composition is an aliphatic silane chemical composition; and a chemical composition formed from the oligomerization of at least the first silane chemical composition and the second silane chemical composition.

In another embodiment, a glass container may include a glass body having an interior surface and an exterior surface. The glass body may be formed from a glass composition comprising from about 74 mol. % to about 78 mol. % $SiO_2$; alkaline earth oxide comprising both CaO and MgO, wherein the alkaline earth oxide comprises CaO in an amount greater than or equal to about 0.1 mol. % and less than or equal to about 1.0 mol. % and a ratio (CaO (mol. %)/(CaO (mol. %)+MgO (mol. %))) is less than or equal to 0.5; X mol. % $Al_2O_3$, wherein X is greater than or equal to about 2 mol. % and less than or equal to about 10 mol. %; and Y mol. % alkali oxide, wherein the alkali oxide comprises from about 0.01 mol. % to about 1.0 mol. % $K_2O$ and a ratio of Y:X is greater than 1, wherein the glass body has a delamination factor less than or equal to 10. A heat-tolerant coating may be positioned on the exterior surface of the glass body and comprise a low-friction layer and a coupling agent layer. The low-friction layer may include a polymer chemical composition and the coupling agent layer may include at least one of a mixture of a first silane chemical composition, a hydrolysate thereof, or an oligomer thereof, and a second silane chemical composition, a hydrolysate thereof, or an oligomer thereof, wherein the first silane chemical composition is an aromatic silane chemical composition and the second silane chemical composition is an aliphatic silane chemical composition; and a chemical composition formed from the oligomerization of at least the first silane chemical composition and the second silane chemical composition.

Additional features and advantages of the embodiments of the glass containers described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 9 schematically depicts the reaction steps of a silane bonding to a substrate, according to one or more embodiments shown and described herein;

FIG. 36 contains a Table reporting the load and measured coefficient of friction for Type 1B glass vials and vials formed from a Reference Glass Composition that were ion exchanged and coated, according to one or more embodiments shown and described herein;

FIG. 40 contains a Table reporting different heat-tolerant coating compositions which were tested under lyophilization conditions, according to one or more embodiments shown and described herein;

FIG. 47 shows the coefficient of friction for APS/Novastrat® 800 coated vials before and after lyophilization, according to one or more embodiments shown and described herein;

FIG. 48 shows the coefficient of friction for APS/Novastrat® 800 coated vials before and after autoclaving, according to one or more embodiments shown and described herein;

FIG. 51 contains a Table illustrating the change in the coefficient of friction with variations in the composition of the coupling agent of a heat-tolerant coating applied to a glass container as described herein;

FIG. 65 graphically depicts the coefficient of friction, scratch penetration, applied normal force, and frictional force (y-ordinates) as a function of the length of the applied scratch (x-ordinate) for the thermally treated vials of a Comparative Example;

DETAILED DESCRIPTION

Figure 1:
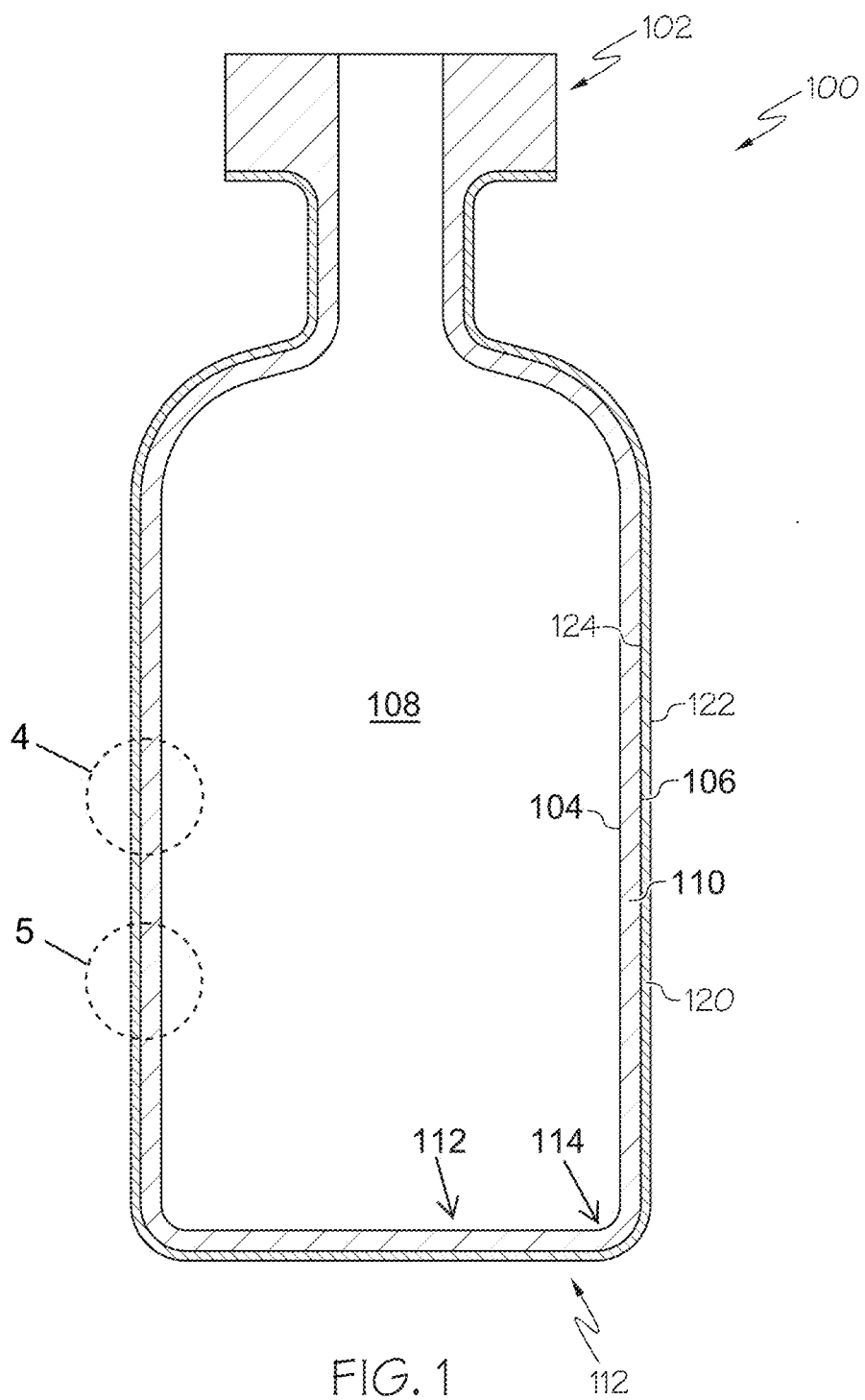
FIG. 1 schematically depicts a cross section of a glass container with a heat-tolerant coating, according to one or more embodiments shown and described herein.

Reference will now be made in detail to embodiments of glass containers, examples of which are illustrated in the accompanying drawings. Whenever possible, the same reference numerals will be used throughout the drawings to refer to the same or like parts. In one embodiment, a glass container includes a glass body with an interior surface, an exterior surface and a wall thickness extending from the interior surface to the exterior surface. At least the interior surface of the glass body is delamination resistant. A heat-tolerant coating may be positioned on the exterior surface of the glass body. The heat-tolerant coating may include a coupling agent layer in direct contact with the exterior surface of the glass body. The coupling agent layer may include at least one silane composition. The heat-tolerant coating may also include a frictive coating layer in direct contact with the coupling agent layer. The heat-tolerant coating may be thermally stable at temperatures greater than or equal to 260° C. In some embodiments, the heat-tolerant coating may be thermally stable at temperatures less than or equal to 400° C. The exterior surface of the glass body with the heat-tolerant coating may have a coefficient of friction of less than about 0.7 relative to a second pharmaceutical container having the same heat-tolerant coating. The glass container is particularly well suited for the packaging of pharmaceutical formulations. The glass container and the properties of the glass container will be described in more detail herein with specific reference to the appended drawings.

In the embodiments of the glass containers described herein, the concentration of constituent components (e.g., $SiO_2$, $Al_2O_3$, $B_2O_3$ and the like) of the glass composition from which the glass containers are formed are specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol. %.

The term "chemical durability," as used herein, refers to the ability of the glass composition to resist degradation upon exposure to specified chemical conditions. Specifically, the chemical durability of the glass compositions described herein was assessed according to 3 established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." Each standard and the classifications within each standard are described in further detail herein. Alternatively, the chemical durability of a glass composition may be assessed according to USP <660> entitled "Surface Glass Test," and or European Pharmacopeia 3.2.1 entitled "Glass Containers For Pharmaceutical Use" which assess the durability of the surface of the glass.

The term "softening point," as used herein, refers to the temperature at which the viscosity of the glass composition is $1 \times 10^{7.6}$ poise.

The term "annealing point," as used herein, refers to the temperature at which the viscosity of the glass composition is $1 \times 10^{13}$ poise.

The terms "strain point" and $T_{\text{strain}}$ as used herein, refers to the temperature at which the viscosity of the glass composition is $3 \times 10^{14}$ poise.

The term "CTE," as used herein, refers to the coefficient of thermal expansion of the glass composition over a temperature range from about room temperature (RT) to about 300° C.

Conventional glass containers or glass packages for containing pharmaceutical compositions are generally formed from glass compositions which are known to exhibit chemical durability and low thermal expansion, such as alkali borosilicate glasses. While alkali borosilicate glasses exhibit good chemical durability, container manufacturers have observed silica-rich glass flakes dispersed in the solution contained in the glass containers. This phenomena is referred to as delamination. Delamination occurs particularly when the solution has been stored in direct contact with the glass surface for long time periods (months to years). Accordingly, a glass which exhibits good chemical durability may not necessarily be resistant to delamination.

Delamination refers to a phenomenon in which glass particles are released from the surface of the glass following a series of leaching, corrosion, and/or weathering reactions. In general, the glass particles are silica-rich flakes of glass which originate from the interior surface of the package as a result of the leaching of modifier ions into a solution contained within the package. These flakes may generally be from about 1 nm to about 2 μm thick with a width greater than about 50 μm. As these flakes are primarily composed of silica, the flakes generally do not further degrade after being released from the surface of the glass.

It has heretofore been hypothesized that delamination is due to the phase separation which occurs in alkali borosilicate glasses when the glass is exposed to the elevated temperatures used for reforming the glass into a container shape.

However, it is now believed that the delamination of the silica-rich glass flakes from the interior surfaces of the glass containers is due to the compositional characteristics of the glass container in its as-formed condition. Specifically, the high silica content of alkali borosilicate glasses causes the glass to have relatively high melting and forming temperatures. However, the alkali and borate components in the glass composition melt and/or vaporize at much lower temperatures. In particular, the borate species in the glass are highly volatile and evaporate from the surface of the glass at the high temperatures necessary to form and reform the glass.

Specifically, glass stock is reformed into glass containers at high temperatures and in direct flames. The high temperatures needed at higher equipment speeds cause the more volatile borate species to evaporate from portions of the surface of the glass. When this evaporation occurs within the interior volume of the glass container, the volatilized borate species are re-deposited in other areas of the glass container surface causing compositional heterogeneities in the glass container surface, particularly with respect to the near-surface regions of the interior of the glass container (i.e., those regions at or directly adjacent to the interior surfaces of the glass container). For example, as one end of a glass tube is closed to form the bottom or floor of the container, borate species may evaporate from the bottom portion of the tube and be re-deposited elsewhere in the tube. The evaporation of material from the heel and floor portions of the container is particularly pronounced as these areas of the container undergo the most extensive re-formation and, as such, are exposed to the highest temperatures. As a result, the areas of the container exposed to higher temperatures may have silica-rich surfaces. Other areas of the container which are amenable to boron deposition may have a boron-rich layer at the surface. Areas amenable to boron deposition which are at a temperature greater than the anneal point of the glass composition but less than the hottest temperature the glass is subjected to during reformation can lead to boron incorporation on the surface of the glass. Solutions contained in the container may leach the boron from the boron-rich layer. As the boron-rich layer is leached from the glass, a high silica glass network (gel) remains which swells and strains during hydration and eventually spalls from the surface.

One conventional solution to delamination is to coat the interior surface of the body of the glass container with an inorganic coating, such as $SiO_2$. This coating may have a thickness from about 100 nm to 200 nm and prevents the contents of the container from contacting the interior surface of the body and causing delamination. However, the application of such coatings may be difficult and require additional manufacturing and/or inspection steps, thereby increasing the overall cost of container manufacture. Further, if the contents of the container penetrate the coating and contact the interior surface of the body, such as through a discontinuity in the coating, the resultant delamination of the glass body may cause portions of the coating to detach from the interior surface of the body.

The glass containers described herein are chemically durable and resistant to degradation as determined by the DIN 12116 standard, the ISO 695 standard, the ISO 719 standard and the ISO 720 standard. In addition, the glass containers described herein have homogenous compositional characteristics in the as-formed condition and, as such, exhibit an improved resistance to delamination without requiring any additional processing. Moreover, the glass containers described herein also include a high temperature coating applied to the exterior surface of the glass container which improves the resistance of the glass container to frictive damage and is also thermally stable at elevated temperatures. The glass containers described herein are also amenable to strengthening by ion exchange which further enhances the mechanical durability of the glass containers.

Referring now to FIG. 1, a glass container 100 for storing perishable products, such as pharmaceutical formulations, biologics, vaccines, food stuffs, or the like, is schematically depicted in cross section. The glass container 100 generally comprises a glass body 102. The glass body 102 extends between an interior surface 104 and an exterior surface 106 and generally encloses an interior volume 108. In the embodiment of the glass container 100 shown in FIG. 1, the glass body 102 generally comprises a wall portion 110 and a second wall portion, such as floor portion 112. The wall portion 110 may transition into the second wall portion, such as the floor portion 112, through a heel portion 114. The glass body 102 has a wall thickness $T_W$ which extends from the interior surface 104 to the exterior surface 106. The glass container 100 also includes a heat-tolerant coating 120 which is positioned on the exterior surface of the glass body 102. The heat-tolerant coating is thermally stable. The phrase "thermally stable," when used to describe the organic coating, refers to the ability of the coating to remain adhered to the glass container following exposure to elevated temperatures for a predetermined period of time as well as the ability of the coating to retain its physical properties following exposure to elevated temperatures for a predetermined period of time, as will be described in further detail herein. The heat-tolerant coating 120 may cover the entire exterior surface 106 of the glass body 102 or, alternatively, a portion of the exterior surface 106 of the glass body 102. In the embodiments described herein the interior surface 104 of the glass container may be uncoated. The term "uncoated," as used herein, means that the surface is free from inorganic coatings, organic coatings, or coatings which include a combination of inorganic components and organic components such that the contents stored in the interior volume 108 of the glass container 100 are in direct contact with the glass from which the glass container 100 is formed.

While the glass container 100 is depicted in FIG. 1 as having a specific shape form (i.e., a vial), it should be understood that the glass container 100 may have other shape forms, including, without limitation, vacutainers, cartridges, syringes, syringe barrels, ampoules, bottles, flasks, phials, tubes, beakers, or the like.

The glass body 102 of the glass container 100 is formed from an alkali aluminosilicate glass composition which is resistant to delamination such that at least the interior surface 104 of the glass container 100 is resistant to delamination. The phrase "resistant to delamination" means that the surface of the glass has a reduced propensity to degradation and the shedding of glass flakes upon exposure to and intimate contact with a specified solution under specified conditions. In the embodiments described herein, the resistance of the glass container to delamination may be characterized in terms of a delamination factor, as described in further detail herein.

In some embodiments, the entire glass body 102 of the glass container is formed from a glass composition which is resistant to delamination. However, in other embodiments, only the interior surface of the glass body 102 may be formed from a glass composition which is resistant to delamination, such as when the glass body has a laminated construction. Embodiments of suitable glass compositions include the alkali aluminosilicate glass compositions described in U.S. patent application Ser. No. 13/660,394 filed Oct. 25, 2012 and entitled "Glass Compositions With Improved Chemical And Mechanical Durability," the entirety of which is incorporated herein by reference. The alkali aluminosilicate glass composition generally includes a combination of $SiO_2$ and one or more alkali oxides, such as $Na_2O$ and/or $K_2O$. The glass composition may also include $Al_2O_3$ and at least one alkaline earth oxide. In some embodiments, the glass compositions may be free from boron and compounds containing boron. The glass compositions are resistant to chemical degradation and are also suitable for chemical strengthening by ion exchange. In some embodiments the glass compositions may further comprise minor amounts of one or more additional oxides such as, for example, $SnO_2$, $ZrO_2$, $ZnO$, $TiO_2$, $As_2O_3$ or the like. These components may be added as fining agents and/or to further enhance the chemical durability of the glass composition.

In the embodiments of the glass container 100 described herein, the glass container is formed from a glass composition in which $SiO_2$ is the largest constituent of the composition and, as such, is the primary constituent of the resulting glass network. $SiO_2$ enhances the chemical durability of the glass and, in particular, the resistance of the glass composition to decomposition in acid and the resistance of the glass composition to decomposition in water. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. In the embodiments described herein, the glass composition generally comprises $SiO_2$ in an amount greater than or equal to 67 mol. % and less than or equal to about 80 mol. % or even less than or equal to 78 mol. %. In some embodiments, the amount of $SiO_2$ in the glass composition may be greater than about 68 mol. %, greater than about 69 mol. % or even greater than about 70 mol. %. In some other embodiments, the amount of $SiO_2$ in the glass composition may be greater than 72 mol. %, greater than 73 mol. % or even greater than 74 mol. %. For example, in some embodiments, the glass composition may include from about 68 mol. % to about 80 mol. % or even to about 78 mol. % $SiO_2$. In some other embodiments the glass composition may include from about 69 mol. % to about 80 mol. % or even to about 78 mol. % $SiO_2$. In some other embodiments the glass composition may include from about 70 mol. % to about 80 mol. % or even to about 78 mol. % $SiO_2$. In still other embodiments, the glass composition comprises $SiO_2$ in an amount greater than or equal to 70 mol. % and less than or equal to 78 mol. %. In some embodiments, $SiO_2$ may be present in the glass composition in an amount from about 72 mol. % to about 78 mol. %. In some other embodiments, $SiO_2$ may be present in the glass composition in an amount from about 73 mol. % to about 78 mol. %. In other embodiments, $SiO_2$ may be present in the glass composition in an amount from about 74 mol. % to about 78 mol. %. In still other embodiments, $SiO_2$ may be present in the glass composition in an amount from about 70 mol. % to about 76 mol. %.

The glass composition from which the glass container 100 is formed further includes $Al_2O_3$. $Al_2O_3$, in conjunction with alkali oxides present in the glass compositions such as $Na_2O$ or the like, improves the susceptibility of the glass to ion exchange strengthening. In the embodiments described herein, $Al_2O_3$ is present in the glass compositions in X mol. % while the alkali oxides are present in the glass composition in Y mol. %. The ratio Y:X in the glass compositions described herein is greater than about 0.9 or even greater than or equal to about 1 in order to facilitate the aforementioned susceptibility to ion exchange strengthening. Specifically, the diffusion coefficient or diffusivity D of the glass composition relates to the rate at which alkali ions penetrate into the glass surface during ion exchange. Glasses which have a ratio Y:X greater than about 0.9 or even greater than about 1 have a greater diffusivity than glasses which have a ratio Y:X less than 0.9. Glasses in which the alkali ions have a greater diffusivity can obtain a greater depth of layer for a given ion exchange time and ion exchange temperature than glasses in which the alkali ions have a lower diffusivity. Moreover, as the ratio of Y:X increases, the strain point, anneal point, and softening point of the glass decreases, such that the glass is more readily formable. In addition, for a given ion exchange time and ion exchange temperature, it has been found that compressive stresses induced in glasses which have a ratio Y:X greater than about 0.9 and less than or equal to 2 are generally greater than those generated in glasses in which the ratio Y:X is less than 0.9 or greater than 2. Accordingly, in some embodiments, the ratio of Y:X is greater than 0.9 or even greater than 1. In some embodiments, the ratio of Y:X is greater than 0.9, or even greater than 1, and less than or equal to about 2. In still other embodiments, the ratio of Y:X may be greater than or equal to about 1.3 and less than or equal to about 2.0 in order to maximize the amount of compressive stress induced in the glass for a specified ion exchange time and a specified ion exchange temperature.

However, if the amount of $Al_2O_3$ in the glass composition is too high, the resistance of the glass composition to acid attack is diminished. Accordingly, the glass compositions described herein generally include $Al_2O_3$ in an amount greater than or equal to about 2 mol. % and less than or equal to about 10 mol. %. In some embodiments, the amount of $Al_2O_3$ in the glass composition is greater than or equal to about 4 mol. % and less than or equal to about 8 mol. %. In some other embodiments, the amount of $Al_2O_3$ in the glass composition is greater than or equal to about 5 mol. % to less than or equal to about 7 mol. %. In some other embodiments, the amount of $Al_2O_3$ in the glass composition is greater than or equal to about 6 mol. % to less than or equal to about 8 mol. %. In still other embodiments, the amount of $Al_2O_3$ in the glass composition is greater than or equal to about 5 mol. % to less than or equal to about 6 mol. %.

The glass composition from which the glass container 100 is formed also includes one or more alkali oxides such as $Na_2O$ and/or $K_2O$. The alkali oxides facilitate the ion exchangeability of the glass composition and, as such, facilitate chemically strengthening the glass. The alkali oxide may include one or more of $Na_2O$ and $K_2O$. The alkali oxides are generally present in the glass composition in a total concentration of Y mol. %. In some embodiments described herein, Y may be greater than about 2 mol. % and less than or equal to about 18 mol. %. In some other embodiments, Y may be greater than about 8 mol. %, greater than about 9 mol. %, greater than about 10 mol. % or even greater than about 11 mol. %. For example, in some embodiments described herein Y is greater than or equal to about 8 mol. % and less than or equal to about 18 mol. %. In still other embodiments, Y may be greater than or equal to about 9 mol. % and less than or equal to about 14 mol. %.

The ion exchangeability of the glass container 100 is primarily imparted to the glass container 100 by the amount of the alkali oxide $Na_2O$ initially present in the glass composition from which the glass container 100 is formed prior to ion exchange strengthening of the glass container. Accordingly, in the embodiments of the glass containers described herein, the alkali oxide present in the glass composition from which the glass container 100 is formed includes at least $Na_2O$. Specifically, in order to achieve the desired compressive strength and depth of layer in the glass container upon ion exchange strengthening, the glass compositions from which the glass container 100 is formed includes $Na_2O$ in an amount from about 2 mol. % to about 15 mol. %. In some embodiments the glass composition from which the glass container 100 is formed includes at least about 8 mol. % of $Na_2O$ based on the molecular weight of the glass composition. For example, the concentration of $Na_2O$ may be greater than 9 mol. %, greater than 10 mol. % or even greater than 11 mol. %. In some embodiments, the concentration of $Na_2O$ may be greater than or equal to 9 mol. % or even greater than or equal to 10 mol. %. For example, in some embodiments the glass composition may include $Na_2O$ in an amount greater than or equal to about 9 mol. % and less than or equal to about 15 mol. % or even greater than or equal to about 9 mol. % and less than or equal to 13 mol. %.

As noted above, the alkali oxide in the glass composition from which the glass container 100 is formed may further include $K_2O$. The amount of $K_2O$ present in the glass composition also relates to the ion exchangeability of the glass composition. Specifically, as the amount of $K_2O$ present in the glass composition increases, the compressive stress obtainable through ion exchange decreases as a result of the exchange of potassium and sodium ions. Accordingly, it is desirable to limit the amount of $K_2O$ present in the glass composition. In some embodiments, the amount of $K_2O$ is greater than or equal to 0 mol. % and less than or equal to 3 mol. %. In some embodiments, the amount of $K_2O$ is less or equal to 2 mol. % or even less than or equal to 1.0 mol. %. In embodiments where the glass composition includes $K_2O$, the $K_2O$ may be present in a concentration greater than or equal to about 0.01 mol. % and less than or equal to about 3.0 mol. % or even greater than or equal to about 0.01 mol. % and less than or equal to about 2.0 mol. %. In some embodiments, the amount of $K_2O$ present in the glass composition is greater than or equal to about 0.01 mol. % and less than or equal to about 1.0 mol. %. Accordingly, it should be understood that $K_2O$ need not be present in the glass composition. However, when $K_2O$ is included in the glass composition, the amount of $K_2O$ is generally less than about 3 mol. % based on the molecular weight of the glass composition.

The alkaline earth oxides present in the composition from which the glass container 100 is formed generally improve the meltability of the glass batch materials and increase the chemical durability of the glass composition and the glass container 100. In the embodiments of the glass container 100 described herein, the total mol. % of alkaline earth oxides present in the glass compositions is generally less than the total mol. % of alkali oxides present in the glass compositions in order to improve the ion exchangeability of the glass composition. In the embodiments described herein, the glass compositions from which the glass container 100 is formed generally include from about 3 mol. % to about 13 mol. % of alkaline earth oxide. In some of these embodiments, the amount of alkaline earth oxide in the glass composition may be from about 4 mol. % to about 8 mol. % or even from about 4 mol. % to about 7 mol. %.

The alkaline earth oxide in the glass composition from which the glass container 100 is formed may include MgO, CaO, SrO, BaO or combinations thereof. In some embodiments, the alkaline earth oxide includes MgO, CaO or combinations thereof. For example, in the embodiments described herein the alkaline earth oxide includes MgO. MgO is present in the glass composition in an amount which is greater than or equal to about 3 mol. % and less than or equal to about 8 mol. % MgO. In some embodiments, MgO may be present in the glass composition in an amount which is greater than or equal to about 3 mol. % and less than or equal to about 7 mol. % or even greater than or equal to 4 mol. % and less than or equal to about 7 mol. % by molecular weight of the glass composition.

In some embodiments, the alkaline earth oxide may further include CaO. In these embodiments CaO is present in the glass composition in an amount from about 0 mol. % to less than or equal to 6 mol. % by molecular weight of the glass composition. For example, the amount of CaO present in the glass composition from which the glass container 100 is formed may be less than or equal to 5 mol. %, less than or equal to 4 mol. %, less than or equal to 3 mol. %, or even less than or equal to 2 mol. %. In some of these embodiments, CaO may be present in the glass composition from which the glass container 100 is formed in an amount greater than or equal to about 0.1 mol. % and less than or equal to about 1.0 mol. %. For example, CaO may be present in the glass composition in an amount greater than or equal to about 0.2 mol. % and less than or equal to about 0.7 mol. % or even in an amount greater than or equal to about 0.3 mol. % and less than or equal to about 0.6 mol. %.

In the embodiments described herein, the glass compositions from which the glass container 100 is formed are generally rich in MgO, (i.e., the concentration of MgO in the glass composition is greater than the concentration of the other alkaline earth oxides in the glass composition including, without limitation, CaO). Forming the glass container 100 from a glass composition in which the glass composition is MgO-rich improves the hydrolytic resistance of the resultant glass, particularly following ion exchange strengthening. Moreover, glass compositions which are MgO-rich generally exhibit improved ion exchange performance relative to glass compositions which are rich in other alkaline earth oxides. Specifically, glasses formed from MgO-rich glass compositions generally have a greater diffusivity than glass compositions which are rich in other alkaline earth oxides, such as CaO. The greater diffusivity enables the formation of a deeper depth of layer in the glass during ion exchange strengthening. MgO-rich glass compositions also enable a higher compressive stress to be achieved in the surface of the glass compared to glass compositions which are rich in other alkaline earth oxides such as CaO. In addition, it is generally understood that as the ion exchange process proceeds and alkali ions penetrate more deeply into the glass, the maximum compressive stress achieved at the surface of the glass may decrease with time. However, glasses formed from glass compositions which are MgO-rich exhibit a lower reduction in compressive stress than glasses formed from glass compositions that are CaO-rich or rich in other alkaline earth oxides (i.e., glasses which are MgO-poor). Thus, MgO-rich glass compositions enable glasses which have higher compressive stress at the surface and greater depths of layer than glasses which are rich in other alkaline earth oxides.

In order to fully realize the benefits of MgO in the glass compositions described herein, it has been determined that the ratio of the concentration of CaO to the sum of the concentration of CaO and the concentration of MgO in mol. % (i.e., (CaO/(CaO+MgO)) should be minimized. Specifically, it has been determined that (CaO/(CaO+MgO)) should be less than or equal to 0.5. In some embodiments (CaO/(CaO+MgO)) is less than or equal to 0.3 or even less than or equal to 0.2. In some other embodiments (CaO/(CaO+MgO)) may even be less than or equal to 0.1.

Boron oxide ($B_2O_3$) is a flux which may be added to glass compositions from which the glass container 100 is formed to reduce the viscosity at a given temperature (e.g., the strain, anneal and softening temperatures) thereby improving the formability of the glass. However, it has been found that additions of boron significantly decrease the diffusivity of sodium and potassium ions in the glass composition which, in turn, adversely impacts the ion exchange performance of the resultant glass. In particular, it has been found that additions of boron significantly increase the time required to achieve a given depth of layer relative to glass compositions which are boron free. Accordingly, in some embodiments described herein, the amount of boron added to the glass composition is minimized in order to improve the ion exchange performance of the glass composition.

For example, it has been determined that the impact of boron on the ion exchange performance of a glass composition can be mitigated by controlling the ratio of the concentration of $B_2O_3$ to the difference between the total concentration of the alkali oxides (i.e., $R_2O$, where R is the alkali metals) and alumina (i.e., $B_2O_3$ (mol. %)/($R_2O$ (mol. %)-$Al_2O_3$ (mol. %))). In particular, it has been determined that when the ratio of $B_2O_3/(R_2O—Al_2O_3)$ is greater than or equal to about 0 and less than about 0.3 or even less than about 0.2, the diffusivities of alkali oxides in the glass compositions are not diminished and, as such, the ion exchange performance of the glass composition is maintained. Accordingly, in some embodiments, the ratio of $B_2O_3/(R_2O—Al_2O_3)$ is greater than 0 and less than or equal to 0.3. In some of these embodiments, the ratio of $B_2O_3/(R_2O—Al_2O_3)$ is greater than 0 and less than or equal to 0.2. In some embodiments, the ratio of $B_2O_3/(R_2O—Al_2O_3)$ is greater than 0 and less than or equal to 0.15 or even less than or equal to 0.1. In some other embodiments, the ratio of $B_2O_3/(R_2O—Al_2O_3)$ may be greater than 0 and less than or equal to 0.05. Maintaining the ratio $B_2O_3/(R_2O—Al_2O_3)$ to be less than or equal to 0.3 or even less than or equal to 0.2 permits the inclusion of $B_2O_3$ to lower the strain point, anneal point and softening point of the glass composition without the $B_2O_3$ adversely impacting the ion exchange performance of the glass.

In the embodiments described herein, the concentration of $B_2O_3$ in the glass composition from which the glass container 100 is formed is generally less than or equal to about 4 mol. %, less than or equal to about 3 mol. %, less than or equal to about 2 mol. %, or even less than or equal to 1 mol. %. For example, in embodiments where $B_2O_3$ is present in the glass composition, the concentration of $B_2O_3$ may be greater than about 0.01 mol. % and less than or equal to 4 mol. %. In some of these embodiments, the concentration of $B_2O_3$ may be greater than about 0.01 mol. % and less than or equal to 3 mol. % In some embodiments, the $B_2O_3$ may be present in an amount greater than or equal to about 0.01 mol. % and less than or equal to 2 mol. %, or even less than or equal to 1.5 mol. %. Alternatively, the $B_2O_3$ may be present in an amount greater than or equal to about 1 mol. % and less than or equal to 4 mol. %, greater than or equal to about 1 mol. % and less than or equal to 3 mol. % or even greater than or equal to about 1 mol. % and less than or equal to 2 mol. %. In some of these embodiments, the concentration of $B_2O_3$ may be greater than or equal to about 0.1 mol. % and less than or equal to 1.0 mol. %.

While in some embodiments the concentration of $B_2O_3$ in the glass composition is minimized to improve the forming properties of the glass without detracting from the ion exchange performance of the glass, in some other embodiments the glass compositions are free from boron and compounds of boron such as $B_2O_3$. Specifically, it has been determined that forming the glass composition without boron or compounds of boron improves the ion exchangeability of the glass compositions by reducing the process time and/or temperature required to achieve a specific value of compressive stress and/or depth of layer.

In some embodiments, the glass compositions from which the glass container 100 is formed are free from phosphorous and compounds containing phosphorous including, without limitation, $P_2O_5$. Specifically, it has been determined that formulating the glass composition without phosphorous or compounds of phosphorous increases the chemical durability of the glass container.

In addition to the $SiO_2$, $Al_2O_3$, alkali oxides and alkaline earth oxides, the glass composition from which the glass container 100 is formed may optionally further comprise one or more fining agents such as, for example, $SnO_2$, $As_2O_3$, and/or $Cl^-$ (from NaCl or the like). When a fining agent is present in the glass composition from which the glass container 100 is formed, the fining agent may be present in an amount less than or equal to about 1 mol. % or even less than or equal to about 0.4 mol. %. For example, in some embodiments the glass composition may include $SnO_2$ as a fining agent. In these embodiments $SnO_2$ may be present in the glass composition in an amount greater than about 0 mol. % and less than or equal to about 1 mol. % or even an amount greater than or equal to about 0.01 mol. % and less than or equal to about 0.30 mol. %.

Moreover, the glass compositions described herein may comprise one or more additional metal oxides to further improve the chemical durability of the glass composition. For example, the glass composition may further include ZnO, $TiO_2$, or $ZrO_2$, each of which further improves the resistance of the glass composition to chemical attack. In these embodiments, the additional metal oxide may be present in an amount which is greater than or equal to about 0 mol. % and less than or equal to about 2 mol. %. For example, when the additional metal oxide is ZnO, the ZnO may be present in an amount greater than or equal to 1 mol. % and less than or equal to about 2 mol. %. When the additional metal oxide is $ZrO_2$ or $TiO_2$, the $ZrO_2$ or $TiO_2$ may be present in an amount less than or equal to about 1 mol. %. However, it should be understood that these constituent components are optional and that, in some embodiments, the glass composition may be formed without these constituent components. For example, in some embodiments, the glass composition may be substantially free of zinc and/or compounds containing zinc. Likewise, the glass composition may be substantially free of titanium and/or compounds containing titanium. Similarly, the glass composition may be substantially free of zircon and/or compounds containing zircon.

While various concentration ranges of constituent components of the glass compositions have been described herein, it should be understood that each concentration range may be applicable to a variety of embodiments of glass compositions. In one exemplary embodiment, a glass composition may include from about 67 mol. % to about 78 mol. % $SiO_2$; from about 3 mol. % to about 13 mol. % alkaline earth oxide, wherein the alkaline earth oxide comprises CaO in an amount greater than or equal to 0.1 mol. % and less than or equal to 1.0 mol. %, and a ratio (CaO (mol. %)/(CaO (mol. %)+MgO (mol. %))) is less than or equal to 0.5; X mol. % $Al_2O_3$, wherein X is greater than or equal to 2 mol. % and less than or equal to about 10 mol. %; and Y mol. % alkali oxide, wherein a ratio of Y:X is greater than 1.

In another exemplary embodiment, glass composition may include from about 72 mol. % to about 78 mol. % $SiO_2$; from about 4 mol. % to about 8 mol. % alkaline earth oxide, wherein the alkaline earth oxide comprises MgO and CaO and a ratio (CaO (mol. %)/(CaO (mol. %)+MgO (mol. %))) is less than or equal to 0.5; X mol. % $Al_2O_3$, wherein X is greater than or equal to about 4 mol. % and less than or equal to about 8 mol. %.; and Y mol. % alkali oxide, wherein the alkali oxide comprises $Na_2O$ in an amount greater than or equal to about 9 mol. % and less than or equal to about 15 mol. %, a ratio of Y:X is greater than 1.

In yet another exemplary embodiment, the glass composition may include from about 74 mol. % to about 78 mol. % $SiO_2$; from about 4 mol. % to about 8 mol. % alkaline earth oxide, wherein the alkaline earth oxide comprises both MgO and CaO and a ratio (CaO (mol. %)/(CaO (mol. %)+MgO (mol. %))) is less than or equal to 0.5; X mol. % $Al_2O_3$, wherein X is greater than or equal to about 2 mol. % and less than or equal to about 10 mol. % and Y mol. % alkali oxide, wherein the alkali oxide comprises $Na_2O$ in an amount greater than or equal to about 9 mol. % and less than or equal to about 15 mol. %, a ratio of Y:X is greater than 1, and the glass composition is free of boron and compounds of boron.

In another exemplary embodiment, the glass composition may include from about 74 mol. % to about 78 mol. % $SiO_2$; from about 4 mol. % to about 8 mol. % alkaline earth oxide, wherein the alkaline earth oxide comprises MgO and CaO and a ratio (CaO (mol. %)/(CaO (mol. %)+MgO (mol. %))) is less than or equal to 0.5; X mol. % $Al_2O_3$, wherein X is greater than or equal to about 4 mol. % and less than or equal to about 8 mol. %; and Y mol. % alkali oxide, wherein the alkali oxide comprises $Na_2O$ in an amount greater than or equal to about 9 mol. % and less than or equal to about 15 mol. %, a ratio of Y:X is greater than 1.

In yet another exemplary embodiment, the glass composition may include from about 74 mol. % to about 78 mol. % $SiO_2$; alkaline earth oxide comprising both CaO and MgO, wherein the alkaline earth oxide comprises CaO in an amount greater than or equal to about 0.1 mol. % and less than or equal to about 1.0 mol. % and a ratio (CaO (mol. %)/(CaO (mol. %)+MgO (mol. %))) is less than or equal to 0.5; X mol. % $Al_2O_3$, wherein X is greater than or equal to about 2 mol. % and less than or equal to about 10 mol. %; and Y mol. % alkali oxide, wherein the alkali oxide comprises from about 0.01 mol. % to about 1.0 mol. % $K_2O$ and a ratio of Y:X is greater than 1.

In addition, it has been found that certain species of the constituent components of the glass composition from which glass containers may be formed may be volatile at the glass forming and reforming temperatures which, in turn, may lead to compositional heterogeneities and subsequent delamination of the glass container. Forming and reforming temperatures of the glass composition generally correspond to the temperatures at which the glass composition has a viscosity in the range from about 200 poise to about 20 kpoise or even from about 1 kpoise to about 10 kpoise. Accordingly, in some embodiments, the glass composition from which the glass containers are formed are free from constituent components which form species that volatilize at temperatures corresponding to a viscosity in the range from about 200 poise to about 50 kilopoise. In other embodiments, the glass compositions from which the glass containers are formed are free from constituent components which form species that volatilize at temperatures corresponding to a viscosity in the range from about 1 kilopoise to about 10 kilopoise.

The glass compositions described herein are formed by mixing a batch of glass raw materials (e.g., powders of $SO_2$, $Al_2O_3$, alkali oxides, alkaline earth oxides and the like) such that the batch of glass raw materials has the desired composition. Thereafter, the batch of glass raw materials is heated to form a molten glass composition which is subsequently cooled and solidified to form the glass composition. During solidification (i.e., when the glass composition is plastically deformable) the glass composition may be shaped using standard forming techniques to shape the glass composition into a desired final form. Alternatively, the glass composition may be shaped into a stock form, such as a sheet, tube or the like, and subsequently reheated and formed into the glass container 100.

The glass compositions described herein may be shaped into various forms such as, for example, sheets, tubes or the like. However, given the chemical durability of the glass composition, the glass compositions described herein are particularly well suited for use in the formation of pharmaceutical packages for containing a pharmaceutical formulation, such as liquids, powders and the like. For example, the glass compositions described herein may be used to form glass containers such as vials, ampoules, cartridges, syringe bodies and/or any other glass container for storing pharmaceutical formulations. Moreover, the ability to chemically strengthen the glass compositions through ion exchange can be utilized to improve the mechanical durability of such pharmaceutical packaging. Accordingly, it should be understood that, in at least one embodiment, the glass compositions are incorporated in a pharmaceutical package in order to improve the chemical durability and/or the mechanical durability of the pharmaceutical packaging.

Still referring to FIG. 1, the presence of alkali oxides in the glass composition from which the glass container 100 is formed facilitates chemically strengthening the glass by ion exchange. Specifically, alkali ions, such as potassium ions, sodium ions and the like, are sufficiently mobile to facilitate ion exchange. In some embodiments, the glass composition is ion exchangeable to form a compressive stress layer having a depth of layer of greater than or equal to about 3 $\mu m$ and up to about 150 $\mu m$. For example, in some embodiments, the glass composition is ion exchangeable to form a compressive stress layer having a depth of layer greater than or equal to 10 $\mu m$. In some embodiments, the depth of layer may be greater than or equal to about 25 $\mu m$ or even greater than or equal to about 50 $\mu m$. In some other embodiments, the depth of the layer may be greater than or equal to 75 $\mu m$ or even greater than or equal to 100 $\mu m$. In still other embodiments, the depth of layer may be greater than or equal to 10 $\mu m$ and less than or equal to about 100 $\mu m$. In some embodiments, the depth of layer may be greater than or equal to about 30 $\mu m$ and less than or equal to about 150 $\mu m$. In some embodiments, the depth of layer may be greater than or equal to about 30 $\mu m$ and less than or equal to about 80 $\mu m$. In some other embodiments, the depth of layer may be greater than or equal to about 35 $\mu m$ and less than or equal to about 50 $\mu m$. The compressive stress at the surfaces of the glass container (i.e., the exterior surface 106 and/or the interior surface 104) is greater than or equal to about 200 MPa. For example, in some embodiments, the compressive stress may be greater than or equal to 300 MPa or even greater than or equal to about 350 MPa after ion exchange strengthening. In some embodiments, the compressive at the surfaces of the glass container may be greater than or equal to about 300 MPa and less than or equal to about 750 MPa. In some other embodiments, the compressive at the surfaces of the glass container may be greater than or equal to about 400 MPa and less than or equal to about 700 MPa. In still other embodiments, the compressive at the surfaces of the glass container may be greater than or equal to about 500 MPa and less than or equal to about 650 MPa.

Various ion exchange techniques may be used to achieve the desired compressive stress and depth of layer in the glass container 100. For example, in some embodiments, the glass container is ion exchange strengthened by submerging the glass container in a molten salt bath and holding the glass container in the salt bath for a predetermined time and predetermined temperature in order to exchange larger alkali ions in the salt bath for smaller alkali ions in the glass and thereby achieve the desired depth of layer and compressive stress. The salt bath may include 100% $KNO_3$ or a mixture of $KNO_3$ and $NaNO_3$. For example, in one embodiment the molten salt bath may include $KNO_3$ with up to about 10% $NaNO_3$. The temperature of the molten salt bath may be greater than or equal to about 350° C. and less than or equal to 500° C. In some embodiments, the temperature of the molten salt bath may be greater than or equal to 400° C. and less than or equal to 500° C. In still other embodiments, the temperature of the molten salt bath may be greater than or equal to 450° C. and less than or equal to 475° C. The glass container may be held in the molten salt bath from about greater than or equal to 0.5 hours to less than or equal to about 30 hours or event less than or equal to 20 hours in order to achieve the desired depth of layer and compressive stress. For example, in some embodiments the glass container may be held in the molten salt bath for greater than or equal to 4 hours and less than or equal to about 12 hours. In other embodiments, the glass container may be held in the molten salt bath for greater than or equal to about 5 hours and less than or equal to about 8 hours. In one exemplary embodiment, the glass container may be ion exchanged in a molten salt bath which comprises 100% $KNO_3$ at a temperature greater than or equal to about 400° C. and less than or equal to about 500° C. for a time period greater than or equal to about 5 hours and less than or equal to about 8 hours.

The glass containers described herein may have a hydrolytic resistance of HGB2 or even HGB1 under ISO 719 and/or a hydrolytic resistance of HGA2 or even HGA1 under ISO 720 (as described further herein) in addition to having improved mechanical characteristics due to ion exchange strengthening. In some embodiments described herein the glass articles may have compressive stress layers which extend from the surface into the glass article to a depth of layer greater than or equal to 25 $\mu m$ or even greater than or equal to 35 $\mu m$. In some embodiments, the depth of layer may be greater than or equal to 40 $\mu m$ or even greater than or equal to 50 $\mu m$. The surface compressive stress of the glass article may be greater than or equal to 250 MPa, greater than or equal to 350 MPa, or even greater than or equal to 400 MPa. The glass compositions described herein facilitate achieving the aforementioned depths of layer and surface compressive stresses more rapidly and/or at lower temperatures than conventional glass compositions due to the enhanced alkali ion diffusivity of the glass compositions as described hereinabove. For example, the depths of layer (i.e., greater than or equal to 25 $\mu m$) and the compressive stresses (i.e., greater than or equal to 250 MPa) may be achieved by ion exchanging the glass article in a molten salt bath of 100% $KNO_3$ (or a mixed salt bath of $KNO_3$ and $NaNO_3$) for a time period of less than or equal to 5 hours, or even less than or equal to 4.5 hours, at a temperature less than or equal to 500° C. or even less than or equal to 450° C. In some embodiments, the time period for achieving these depths of layer and compressive stresses may be less than or equal to 4 hours or even less than or equal to 3.5 hours. The temperature for achieving these depths of layers and compressive stresses may be less than or equal to 400° C.

These improved ion exchange characteristics can be achieved when the glass composition from which the glass container 100 is formed has a threshold diffusivity of greater than about 16 $\mu m^2/hr$ at a temperature less than or equal to 450° C. or even greater than or equal to 20 $\mu m^2/hr$ at a temperature less than or equal to 450° C. In some embodiments, the threshold diffusivity may be greater than or equal to about 25 $\mu m^2/hr$ at a temperature less than or equal to 450° C. or even 30 $\mu m^2/hr$ at a temperature less than or equal to 450° C. In some other embodiments, the threshold diffusivity may be greater than or equal to about 35 $\mu m^2/hr$ at a temperature less than or equal to 450° C. or even 40 $\mu m^2/hr$ at a temperature less than or equal to 450° C. In still other embodiments, the threshold diffusivity may be greater than or equal to about 45 $\mu m^2/hr$ at a temperature less than or equal to 450° C. or even 50 $\mu m^2/hr$ at a temperature less than or equal to 450° C.

The glass compositions from which the glass container 100 is formed may generally have a strain point greater than or equal to about 525° C. and less than or equal to about 650° C. The glasses may also have an anneal point greater than or equal to about 560° C. and less than or equal to about 725° C. and a softening point greater than or equal to about 750° C. and less than or equal to about 960° C.

In the embodiments described herein the glass compositions have a CTE of less than about $70 \times 10^{-7} K^{-1}$ or even less than about $60 \times 10^{-7} K^{-1}$. These lower CTE values improve the survivability of the glass to thermal cycling or thermal stress conditions relative to glass compositions with higher CTEs.

Further, the glass compositions from which the glass container 100 may be formed are chemically durable and resistant to degradation as determined by the DIN 12116 standard, the ISO 695 standard, the ISO 719 standard, and the ISO 720 standard.

The ISO 695 standard is a measure of the resistance of the glass to decomposition when placed in a basic solution. In brief, the ISO 695 standard utilizes a polished glass sample which is weighed and then placed in a solution of boiling 1M NaOH+0.5M $Na_2CO_3$ for 3 hours. The sample is then removed from the solution, dried and weighed again. The glass mass lost during exposure to the basic solution is a measure of the base durability of the sample with smaller numbers indicative of greater durability. As with the DIN 12116 standard, the results of the ISO 695 standard are reported in units of mass per surface area, specifically $mg/dm^2$. The ISO 695 standard is broken into individual classes. Class A1 indicates weight losses of up to 75 $mg/dm^2$; Class A2 indicates weight losses from 75 $mg/dm^2$ up to 175 $mg/dm^2$; and Class A3 indicates weight losses of more than 175 $mg/dm^2$.

The ISO 720 standard is a measure of the resistance of the glass to degradation in purified, $CO_2$-free water. In brief, the ISO 720 standard protocol utilizes crushed glass grains which are placed in contact with the purified, $CO_2$-free water under autoclave conditions (121° C., 2 atm) for 30 minutes. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 720 standard is broken into individual types. Type HGA1 is indicative of up to 62 μg extracted equivalent of $Na_2O$ per gram of glass tested; Type HGA2 is indicative of more than 62 μg and up to 527 μg extracted equivalent of $Na_2O$ per gram of glass tested; and Type HGA3 is indicative of more than 527 μg and up to 930 μg extracted equivalent of $Na_2O$ per gram of glass tested.

The ISO 719 standard is a measure of the resistance of the glass to degradation in purified, $CO_2$-free water. In brief, the ISO 719 standard protocol utilizes crushed glass grains which are placed in contact with the purified, $CO_2$-free water at a temperature of 98° C. at 1 atmosphere for 30 minutes. The solution is then titrated colorimetrically with dilute HCl to neutral pH. The amount of HCl required to titrate to a neutral solution is then converted to an equivalent of $Na_2O$ extracted from the glass and reported in μg $Na_2O$ per weight of glass with smaller values indicative of greater durability. The ISO 719 standard is broken into individual types. Type HGB1 is indicative of up to 31 μg extracted equivalent of $Na_2O$; Type HGB2 is indicative of more than 31 μg and up to 62 μg extracted equivalent of $Na_2O$; Type HGB3 is indicative of more than 62 μg and up to 264 μg extracted equivalent of $Na_2O$; Type HGB4 is indicative of more than 264 μg and up to 620 μg extracted equivalent of $Na_2O$; and Type HGB5 is indicative of more than 620 μg and up to 1085 μg extracted equivalent of $Na_2O$. The glass compositions described herein have an ISO 719 hydrolytic resistance of type HGB2 or better with some embodiments having a type HGB1 hydrolytic resistance.

The glass compositions described herein have an acid resistance of at least class S3 according to DIN 12116 both before and after ion exchange strengthening with some embodiments having an acid resistance of at least class S2 or even class S1 following ion exchange strengthening. In some other embodiments, the glass compositions may have an acid resistance of at least class S2 both before and after ion exchange strengthening with some embodiments having an acid resistance of class S1 following ion exchange strengthening. Further, the glass compositions described herein have a base resistance according to ISO 695 of at least class A2 before and after ion exchange strengthening with some embodiments having a class A1 base resistance at least after ion exchange strengthening. The glass compositions described herein also have an ISO 720 type HGA2 hydrolytic resistance both before and after ion exchange strengthening with some embodiments having a type HGA1 hydrolytic resistance after ion exchange strengthening and some other embodiments having a type HGA1 hydrolytic resistance both before and after ion exchange strengthening. The glass compositions described herein have an ISO 719 hydrolytic resistance of type HGB2 or better with some embodiments having a type HGB1 hydrolytic resistance. It should be understood that, when referring to the above referenced classifications according to DIN 12116, ISO 695, ISO 720 and ISO 719, a glass composition or glass article which has "at least" a specified classification means that the performance of the glass composition is as good as or better than the specified classification. For example, a glass article which has a DIN 12116 acid resistance of "at least class S2" may have a DIN 12116 classification of either S1 or S2.

With respect to the USP <660> test and/or the European Pharmacopeia 3.2.1 test, the glass containers described herein have a Type 1 chemical durability. As noted above, the USP <660> and European Pharmacopeia 3.2.1 tests are performed on intact glass containers rather than crushed grains of glass and, as such, the USP <660> and European Pharmacopeia 3.2.1 tests may be used to directly assess the chemical durability of the interior surface of the glass containers.

In addition to being chemically durable and resistant to degradation as determined by the DIN 12116 standard, the ISO 695 standard, the ISO 719 standard and the ISO 720 standard, the glass containers described herein have homogenous compositional characteristics in the as-formed condition, as described in U.S. patent application Ser. No. 13/912,457 filed Jun. 7, 2013 and entitled "Delamination Resistant Glass Containers," the entirety of which is incorporated herein by reference. As such, the glass containers exhibit an improved resistance to delamination. It is believed that the improved delamination resistance of the glass containers is due to forming the glass containers from glass compositions which are substantially free from volatile species, such as species formed from phosphorous, which, in turn, leads to a more homogenous composition profile both through the thickness of the glass container and over the interior surfaces of the glass containers.

Figure 2:
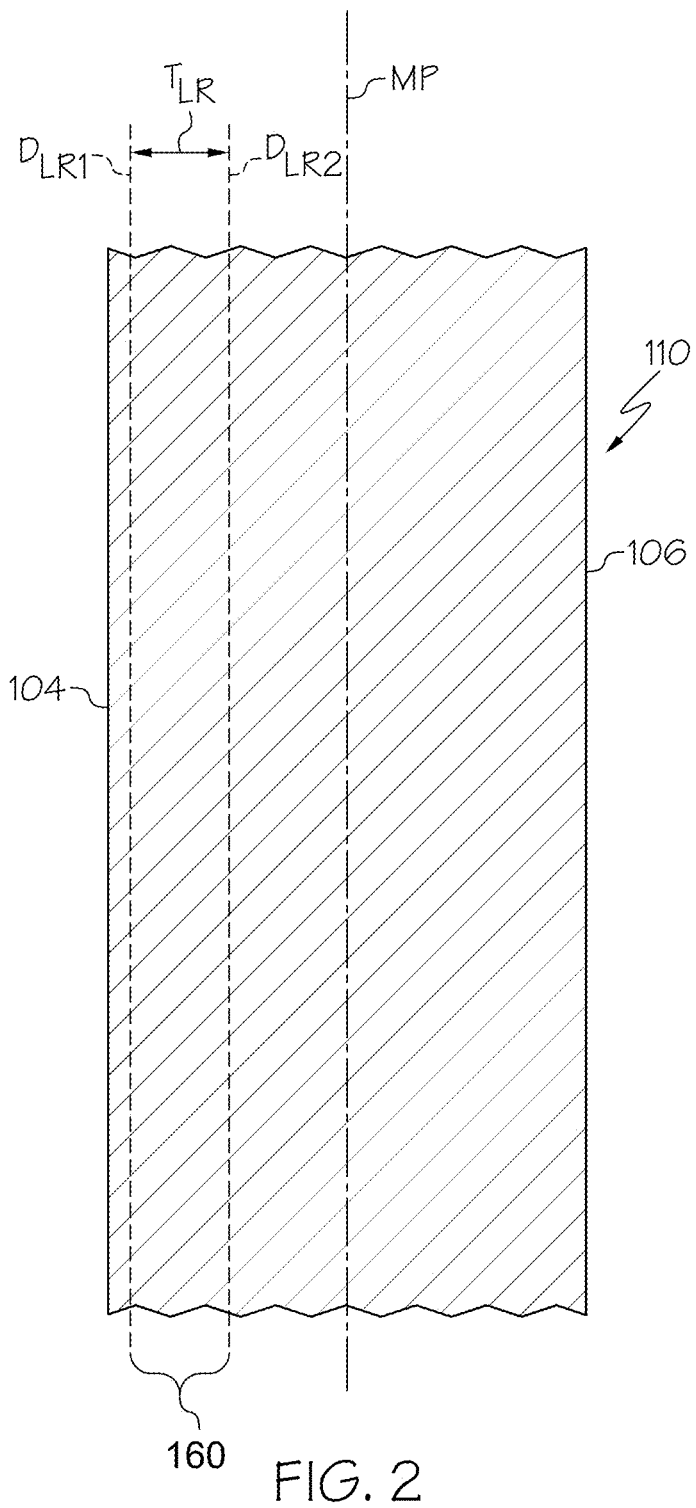
FIG. 2 schematically depicts a portion of the sidewall of the glass container of FIG. 1.

Referring now to FIGS. 1 and 2, the glass containers described herein have a homogenous composition through the thickness of the glass body 102 in each of the wall, heel, and floor portions. Specifically, FIG. 2 schematically depicts a partial cross section of a wall portion 110 of the glass container 100. The glass body 102 of the glass container 100 has an interior region 160 which extends from about 10 nm below the interior surface 104 of the glass container 100 (indicated in FIG. 2 as $D_{LR1}$) into the thickness of the wall portion 110 to a depth $D_{LR2}$ from the interior surface 104 of the glass container. The interior region extending from about 10 nm below the interior surface 104 is differentiated from the composition in the initial 5-10 nm below the surface due to experimental artifacts. At the start of a DSIMS analysis, the initial 5-10 nm is not included in the analysis because of three concerns: variable sputtering rate of ions from the surface as a result of adventitious carbon, establishment of a steady state charge in part due to the variable sputtering rate, and mixing of species while establishing a steady state sputtering condition. As a result, the first two data points of the analysis are excluded, as shown in the exemplary plots of FIGS. 25A, 25B and 26. Accordingly, it should be understood that the interior region 160 has a thickness $T_{LR}$ which is equal to the $D_{LR2}$-$D_{LR1}$. The glass composition within the interior region has a persistent layer homogeneity which, in conjunction with the thickness $T_{LR}$ of the interior region, is sufficient to prevent delamination of the glass body following long term exposure to a solution contained in the interior volume of the glass container. In some embodiments, the thickness $T_{LR}$ is at least about 100 nm. In some embodiments, the thickness $T_{LR}$ is at least about 150 nm. In some other embodiments, the thickness $T_{LR}$ is at least about 200 nm or even about 250 nm. In some other embodiments, the thickness $T_{LR}$ is at least about 300 nm or even about 350 nm. In yet other embodiments, the thickness $T_{LR}$ is at least about 500 nm. In some embodiments, the interior region 160 may extend to a thickness $T_{LR}$ of at least about 1 µm or even at least about 2 µm.

While the interior region is described herein above as extending from 10 nm below the interior surface 104 of the glass container 100 into the thickness of the wall portion 110 to a depth $D_{LR2}$ from the interior surface 104 of the glass container, it should be understood that other embodiments are possible. For example, it is hypothesized that, despite the experimental artifacts noted above, the interior region with the persistent layer homogeneity may actually extend from the surface interior surface of the 104 of the glass container 100 into the thickness of the wall portion. Accordingly, in some embodiments, the thickness $T_{LR}$ may extend from the interior surface to the depth $D_{LR2}$. In these embodiments, the thickness $T_{LR}$ may be at least about 100 nm. In some embodiments, the thickness $T_{LR}$ is at least about 150 nm. In some other embodiments, the thickness $T_{LR}$ is at least about 200 nm or even about 250 nm. In some other embodiments, the thickness $T_{LR}$ is at least about 300 nm or even about 350 nm. In yet other embodiments, the thickness $T_{LR}$ is at least about 500 nm. In some embodiments, the interior region 160 may extend to a thickness $T_{LR}$ of at least about 1 µm or even at least about 2 µm.

In the embodiments described herein, the phrase "persistent layer homogeneity" means that the concentration of the constituent components (e.g., $SiO_2$, $Al_2O_3$, $Na_2O$, etc.) of the glass composition in the interior region do not vary from the concentration of the same constituent components at the midpoint of a thickness of the glass body (i.e., at a point along the midpoint line MP which evenly bisects the glass body between the interior surface 104 and the exterior surface 106) by an amount which would result in delamination of the glass body upon long term exposure to a solution contained within the glass container. In the embodiments described herein, the persistent layer homogeneity in the interior region of the glass body is such that an extrema (i.e., the minimum or maximum) of a layer concentration of each of the constituent components of the glass composition in the interior region 160 is greater than or equal to about 80% and less than or equal to about 120% of the same constituent component at a midpoint of a thickness of the glass body when the glass container 100 is in as-formed condition. In other embodiments, the persistent layer homogeneity in the interior region of the glass body is such that the extrema of the layer concentration of each of the constituent components of the glass composition in the interior region 160 is greater than or equal to about 90% and less than or equal to about 110% of the same constituent component at the midpoint of the thickness of the glass body when the glass container 100 is in as-formed condition. In still other embodiments, the persistent layer homogeneity in the interior region of the glass body is such that the extrema of the layer concentration of each of the constituent components of the glass composition in the interior region 160 is greater than or equal to about 92% and less than or equal to about 108% of the same constituent component at the midpoint of the thickness of the glass body when the glass container 100 is in as-formed condition. In some embodiments, the persistent layer homogeneity is exclusive of constituent components of the glass composition which are present in an amount less than about 2 mol. %.

The term "as-formed condition," as used herein, refers to the composition of the glass container 100 after the glass container has been formed from glass stock but prior to the container being exposed to any additional processing steps, such as ion-exchange strengthening, coating, ammonium sulfate treatment or the like. In the embodiments described herein, the layer concentration of the constituent components in the glass composition is determined by collecting a composition sample through the thickness of the glass body in the area of interest using dynamic secondary ion mass spectroscopy. In the embodiments described herein, the composition profile is sampled from areas of the interior surface 104 of the glass body 102. The sampled areas have a maximum area of 1 $mm^2$. This technique yields a compositional profile of the species in the glass as a function of depth from the interior surface of the glass body for the sampled area.

Forming the glass container with a persistent layer homogeneity as described above, generally improves the resistance of the glass container to delamination. Specifically, providing an interior region which is homogenous in composition (i.e., the extrema of the concentration of the constituent components in the interior region is within +/−20% of the same constituent components at the midpoint of the thickness of the glass body) avoids the localized concentration of constituent components of the glass composition which may be susceptible to leaching which, in turn, mitigates the loss of glass particles from the interior surface of the glass container in the event that these constituent components are leached from the glass surface.

As noted herein, the container in as-formed condition is free from coatings, including inorganic and/or organic coatings applied to the interior surface of the of the glass body. Accordingly, it should be understood that the body of the glass container is formed from a substantially unitary composition which extends from the interior surface of the body to a depth of at least 250 nm or even at least 300 nm. The term "unitary composition" refers to the fact that the glass from which the portion of the body extending from the interior surface into the thickness of the body to a depth of at least 250 nm or even at least than 300 nm is a single composition of material as compared to a coating material applied to another material of either the same or different composition. For example, in some embodiments, the body of the container may be constructed from a single glass composition. In another embodiment, the body of the container may be constructed from a laminated glass such that the interior surface of the body has a unitary composition which extends from the interior surface to a depth of at least 250 nm or even at least 300 nm. The glass container may include an interior region which extends from either the interior surface or from 10 nm below the interior surface to a depth of at least 100 nm, as noted above. This interior region may have a persistent layer homogeneity.

Figure 3:
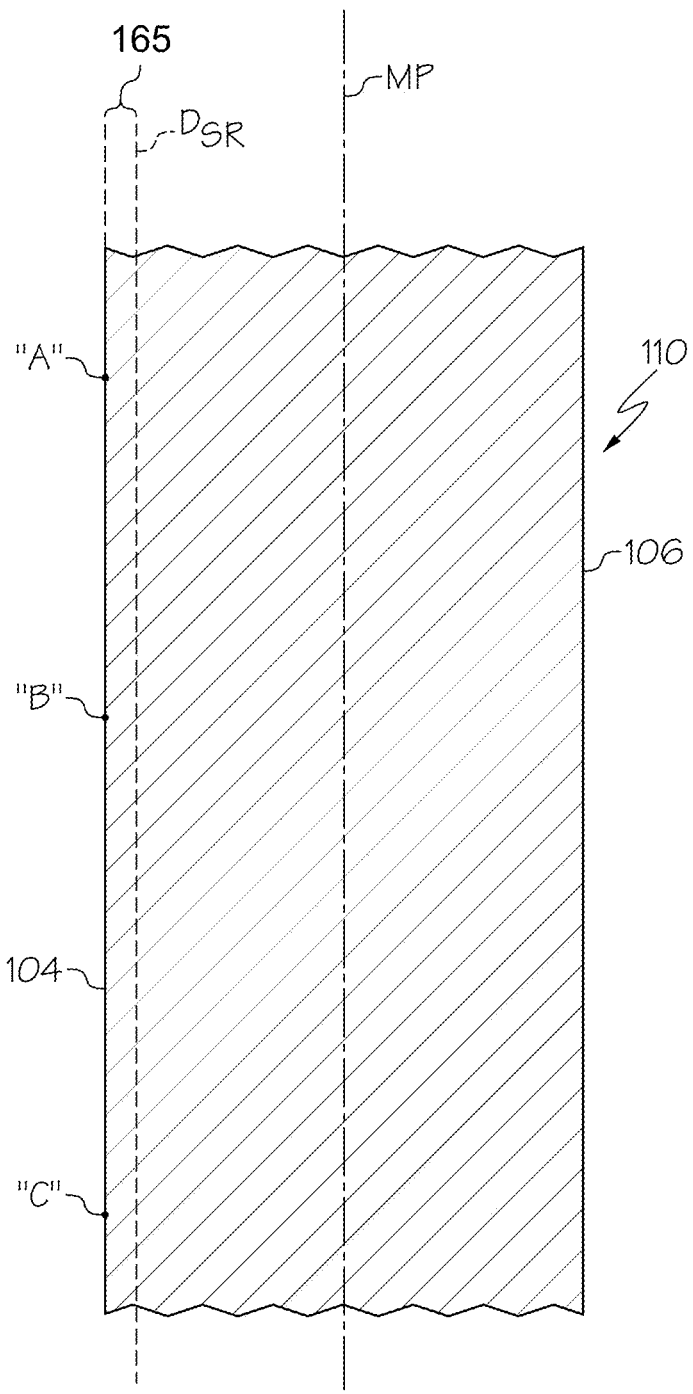
FIG. 3 schematically depicts a portion of the sidewall of the glass container of FIG. 1.

Referring now to FIGS. 1 and 3, the glass containers described herein may also have a homogenous surface composition over the interior surface 104 of the glass body 102 including in the wall, heel, and floor portions. FIG. 3 schematically depicts a partial cross section of a wall portion 110 of the glass container 100. The glass container 100 has a surface region 165 which extends over the entire interior surface of the glass container. The surface region 165 has a depth $D_{SR}$ which extends from the interior surface 104 of the glass container 100 into a thickness of the glass body towards the exterior surface. Accordingly, it should be understood that the surface region 165 has a thickness $T_{SR}$ which is equal to the depth $D_{SR}$. In some embodiments, the surface region extends to a depth $D_{SR}$ of at least about 10 nm from the interior surface 104 of the glass container 100. In some other embodiments, the surface region 165 may extend to a depth $D_{SR}$ of at least about 50 nm. In some other embodiments, the surface region 165 may extend to a depth $D_{SR}$ from about 10 nm to about 50 nm. Accordingly, it should be understood that the surface region 165 extends to a shallower depth than the interior region 160. The glass composition of the surface region has a persistent surface homogeneity which, in conjunction with the depth $D_{SR}$ of the interior region, is sufficient to prevent delamination of the glass body following long term exposure to a solution contained in the interior volume of the glass container.

In the embodiments described herein, the phrase "persistent surface homogeneity" means that the concentration of the constituent components (e.g., $SiO_2$, $Al_2O_3$, $Na_2O$, etc.) of the glass composition at a discrete point in the surface region do not vary from the concentration of the same constituent components at any second discrete point in the surface region by an amount which would result in delamination of the glass body upon long term exposure to a solution contained within the glass container. In the embodiments described herein, the persistent surface homogeneity in the surface region is such that, for a discrete point on the interior surface 104 of the glass container, the extrema (i.e., the minimum or maximum) of the surface concentration of each of the constituent components in the surface region 165 at a discrete point is greater than or equal to about 70% and less than or equal to about 130% of the same constituent components in the surface region 165 at any second discrete point on the interior surface 104 of the glass container 100 when the glass container 100 is in as-formed condition. For example, FIG. 3 depicts three discrete points (A, B, and C) on the interior surface 104 of the wall portion 110. Each point is separated from an adjacent point by at least about 3 mm. The extrema of the surface concentration of each of the constituent components in the surface region 165 at point "A" is greater than or equal to about 70% and less than or equal to about 130% of the same constituent components in the surface region 165 at points "B" and "C". When referring to the heel portion of the container, the discrete points may be approximately centered at the apex of the heel with adjacent points located at least 3 mm from the apex of the heel along the floor portion of the container and along the wall portion of the container, the distance between the points being limited by the radius of the vial and the height of the sidewall (i.e., the point where the sidewall transitions to the shoulder of the vial.

In some embodiments, the persistent surface homogeneity in the surface region is such that the extrema of the surface concentration of each of the constituent components of the glass composition in the surface region 165 for any discrete point on the interior surface 104 of the glass container 100 is greater than or equal to about 75% and less than or equal to about 125% of the same constituent component in the surface region 165 at any second discrete point on the interior surface 104 of the glass container 100 when the glass container 100 is in as-formed condition. In some other embodiments, the persistent surface homogeneity in the surface region is such that the extrema of the surface concentration of each of the constituent components of the glass composition in the surface region 165 for any discrete point on the interior surface 104 of the glass container 100 is greater than or equal to about 80% and less than or equal to about 120% of the same constituent component in the surface region 165 at any second discrete point on the interior surface 104 of the glass container 100 when the glass container 100 is in as-formed condition. In still other embodiments, the persistent surface homogeneity in the surface region is such that the extrema of the surface concentration of each of the constituent components of the glass composition in the surface region 165 for any discrete point on the interior surface 104 of the glass container 100 is greater than or equal to about 85% and less than or equal to about 115% of the same constituent component in the surface region 165 at any second discrete point on the interior surface 104 of the glass container 100 when the glass container 100 is in as-formed condition. In the embodiments described herein, the surface concentration of the constituent components of the glass composition in the surface region is measured by photoelectron spectroscopy. In some embodiments, the persistent surface homogeneity in the surface region is exclusive of constituent components of the glass composition which are present in an amount less than about 2 mol. %.

The homogeneity of the surface concentration of the glass constituent components in the surface region 165 is generally an indication of the propensity of the glass composition to delaminate and shed glass particles from the interior surface 104 of the glass container 100. When the glass composition has a persistent surface homogeneity in the surface region 165 (i.e., when the extrema of the surface concentration of the glass constituent components in the surface region 165 at a discrete point on the interior surface 104 are within +/−30% of the same constituent components in the surface region 165 at any second discrete point on the interior surface 104), the glass composition has improved resistance to delamination.

It should now be understood that the glass containers described herein have a persistent layer homogeneity and/or a persistent surface homogeneity, each of which improves the resistance of the glass containers to delamination. The persistent layer homogeneity and/or the persistent surface homogeneity are present not only in the sidewall portions of the glass containers, but also in the heel and floor portions of the glass container such that the surfaces of the glass container bounding the interior volume are resistant to delamination.

As noted above, delamination may result in the release of silica-rich glass flakes into a solution contained within the glass container after extended exposure to the solution. Accordingly, the resistance to delamination may be characterized by the number of glass particulates present in a solution contained within the glass container after exposure to the solution under specific conditions. In order to assess the long-term resistance of the glass container to delamination, an accelerated delamination test was utilized. The test was performed on both ion-exchanged and non-ion-exchanged glass containers. The test consisted of washing the glass container at room temperature for 1 minute and depyrogenating the container at about 320° C. for 1 hour. Thereafter a solution of 20 mM glycine with a pH of 10 in water is placed in the glass container to 80-90% fill, the glass container is closed, and rapidly heated to 100° C. and then heated from 100° C. to 121° C. at a ramp rate of 1 deg/min at a pressure of 2 atmospheres. The glass container and solution are held at this temperature for 60 minutes, cooled to room temperature at a rate of 0.5 deg./min and the heating cycle and hold are repeated. The glass container is then heated to 50° C. and held for ten or more days for elevated temperature conditioning. After heating, the glass container is dropped from a distance of at least 18″ onto a firm surface, such as a laminated tile floor, to dislodge any flakes or particles that are weakly adhered to the inner surface of the glass container. The distance of the drop may be scaled appropriately to prevent larger sized vials from fracturing on impact.

Thereafter, the solution contained in the glass container is analyzed to determine the number of glass particles present per liter of solution. Specifically, the solution from the glass container is directly poured onto the center of a Millipore Isopore Membrane filter (Millipore #ATTP02500 held in an assembly with parts #AP1002500 and #M000025A0) attached to vacuum suction to draw the solution through the filter within 10-15 seconds for 5 mL. Thereafter, another 5 mL of water was used as rinse to remove buffer residue from the filter media. Particulate flakes are then counted by differential interference contrast microscopy (DIC) in the reflection mode as described in "Differential interference contrast (DIC) microscopy and modulation contrast microscopy" from Fundamentals of light microscopy and digital imaging. New York: Wiley-Liss, pp 153-168. The field of view is set to approximately 1.5 mm×1.5 mm and particles larger than 50 microns are counted manually. There are 9 such measurements made in the center of each filter membrane in a 3×3 pattern with no overlap between images. If larger areas of the filter media are analyzed, results can be normalized to equivalent area (i.e., 20.25 mm$^2$). The images collected from the optical microscope are examined with an image analysis program (Media Cybernetic's ImagePro Plus version 6.1) to measure and count the number of glass flakes present. This was accomplished as follows: all of the features within the image that appeared darker than the background by simple grayscale segmentation were highlighted; the length, width, area, and perimeter of all of the highlighted features that have a length greater than 25 micrometers are then measured; any obviously non-glass particles are then removed from the data; the measurement data is then exported into a spreadsheet. Then, all of the features greater than 25 micrometers in length and brighter than the background are extracted and measured; the length, width, area, perimeter, and X-Y aspect ratio of all of the highlighted features that have a length greater than 25 micrometers are measured; any obviously non-glass particles are removed from the data; and the measurement data is appended to the previously exported data in the spreadsheet. The data within the spreadsheet is then sorted by feature length and broken into bins according to size. The reported results are for features greater than 50 micrometers in length. Each of these groups were then counted and the counts reported for each of the samples.

A minimum of 100 mL of solution is tested. As such, the solution from a plurality of small containers may be pooled to bring the total amount of solution to 100 mL. For containers having a volume greater than 10 mL, the test is repeated for a trial of 10 containers formed from the same glass composition under the same processing conditions and the result of the particle count is averaged for the 10 containers to determine an average particle count. Alternatively, in the case of small containers, the test is repeated for a trial of 10 vials, each of which is analyzed and the particle count averaged over the multiple trials to determine an average particle count per trial. Averaging the particle count over multiple containers accounts for potential variations in the delamination behavior of individual containers. Table 1 summarizes some non-limiting examples of sample volumes and numbers of containers for testing:

TABLE 1

Table of Exemplary Test Specimens

| Nominal Vial Capacity (mL) | Vial Max Volume (mL) | Minimum Solution per Vial (mL) | Number of Vials in a Trial | Number of Trials | Total Solution Tested (mL) |
|---|---|---|---|---|---|
| 2.0 | 4.0 | 3.2 | 10 | 4 | 128 |
| 3.5 | 7.0 | 5.6 | 10 | 2 | 112 |
| 4.0 | 6.0 | 4.8 | 10 | 3 | 144 |
| 5.0 | 10.0 | 8.0 | 10 | 2 | 160 |
| 6.0 | 10.0 | 8.0 | 10 | 2 | 160 |
| 8.0 | 11.5 | 9.2 | 10 | 2 | 184 |
| 10.0 | 13.5 | 10.8 | 10 | 1 | 108 |
| 20.0 | 26.0 | 20.8 | 10 | 1 | 208 |
| 30.0 | 37.5 | 30.0 | 10 | 1 | 300 |
| 50.0 | 63.0 | 50.4 | 10 | 1 | 504 |

It should be understood that the aforementioned test is used to identify particles which are shed from the interior wall(s) of the glass container due to delamination and not tramp particles present in the container from forming processes or particles which precipitate from the solution enclosed in the glass container as a result of reactions between the solution and the glass. Specifically, delamination particles may be differentiated from tramp glass particles based on the aspect ratio of the particle (i.e., the ratio of the maximum length of the particle to the thickness of the particle, or a ratio of the maximum and minimum dimensions). Delamination produces particulate flakes or lamellae which are irregularly shaped and typically have a maximum length greater than about 50 μm but often greater than about 200 μm. The thickness of the flakes is usually greater than about 100 nm and may be as large as about 1 μm. Thus, the minimum aspect ratio of the flakes is typically greater than about 50. The aspect ratio may be greater than about 100 and sometimes greater than about 1000. In contrast, tramp glass particles will generally have a low aspect ratio which is less than about 3. Accordingly, particles resulting from delamination may be differentiated from tramp particles based on aspect ratio during observation with the microscope. Other common non-glass particles include hairs, fibers, metal particles, plastic particles, and other contaminants and are thus excluded during inspection. Validation of the results can be accomplished by evaluating interior regions of the tested containers. Upon observation, evidence of skin corrosion/pitting/flake removal, as described in "Nondestructive Detection of Glass Vial Inner Surface Morphology with Differential Interference Contrast Microscopy" from Journal of Pharmaceutical Sciences 101(4), 2012, pages 1378-1384, is noted.

In the embodiments described herein, the number of particles present following accelerated delamination testing may be utilized to establish a delamination factor for the set of vials tested. In the embodiments described herein, trials of glass containers which average less than 10 glass particles with a minimum length of about 50 μm and an aspect ratio of greater than about 50 per trial following accelerated delamination testing are considered to have a delamination factor of 10. In the embodiments described herein, trials of glass containers which average less than 9 glass particles with a minimum length of about 50 μm and an aspect ratio of greater than about 50 per trial following accelerated delamination testing are considered to have a delamination factor of 9. In the embodiments described herein, trials of glass containers which average less than 8 glass particles with a minimum length of about 50 μm and an aspect ratio of greater than about 50 per trial following accelerated delamination testing are considered to have a delamination factor of 8. In the embodiments described herein, trials of glass containers which average less than 7 glass particles with a minimum length of about 50 μm and an aspect ratio of greater than about 50 per trial following accelerated delamination testing are considered to have a delamination factor of 7. In the embodiments described herein, trials of glass containers which average less than 6 glass particles with a minimum length of about 50 μm and an aspect ratio of greater than about 50 per trial following accelerated delamination testing are considered to have a delamination factor of 6. In the embodiments described herein, trials of glass containers which average less than 5 glass particles with a minimum length of about 50 μm and an aspect ratio of greater than about 50 per trial following accelerated delamination testing are considered to have a delamination factor of 5. In the embodiments described herein, trials of glass containers which average less than 4 glass particles with a minimum length of about 50 μm and an aspect ratio of greater than about 50 per trial following accelerated delamination testing are considered to have a delamination factor of 4. In the embodiments described herein, trials of glass containers which average less than 3 glass particles with a minimum length of about 50 μm and an aspect ratio of greater than about 50 per trial following accelerated delamination testing are considered to have a delamination factor of 3. In the embodiments described herein, trials of glass containers which average less than 2 glass particles with a minimum length of about 50 μm and an aspect ratio of greater than about 50 per trial following accelerated delamination testing are considered to have a delamination factor of 2. In the embodiments described herein, trials of glass containers which average less than 1 glass particle with a minimum length of about 50 μm and an aspect ratio of greater than about 50 per trial following accelerated delamination testing are considered to have a delamination factor of 1. In the embodiments described herein, trials of glass containers which have 0 glass particles with a minimum length of about 50 μm and an aspect ratio of greater than about 50 per trial following accelerated delamination testing are considered to have a delamination factor of 0. Accordingly, it should be understood that the lower the delamination factor, the better the resistance of the glass container to delamination. In the embodiments described herein, the glass containers have a delamination factor of 10 or lower (e.g., a delamination factor of 3, 2, 1 or 0).

Glass containers having the characteristics described hereinabove (i.e., homogenous compositions over the interior surface and through the thickness as well as resistance to delamination) are obtained by forming the glass containers from glass compositions in which the constituent components of the glass composition form species with relatively low vapor pressures (i.e., species with a low volatility) at the temperatures required to reform the glass containers from glass stock into the desired container shape. Because these constituent components form species with relatively low vapor pressures at the reforming temperatures, the constituent components are less likely to volatilize and evaporate from the surfaces of the glass, thereby forming a glass container with a compositionally homogenous surface over the interior of the glass container and through the thickness of the glass container.

In addition to being chemically durable and resistant to degradation as determined by the DIN 12116 standard, the ISO 695 standard, the ISO 719 standard and the ISO 720 standard, and having an improved resistance to delamination, the glass containers described herein also include a heat-tolerant coating which improves the resistance of the glass container to frictive damage. The coating is thermally stable at elevated temperatures and, as such, is suitable for use on pharmaceutical packages which undergo elevated temperature processing prior to filling.

Figure 4:
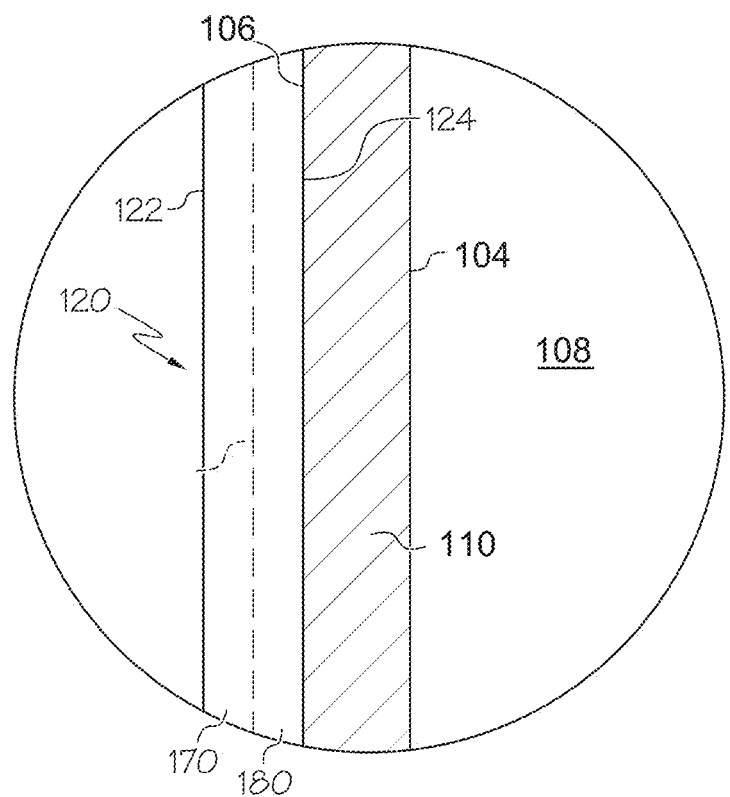
FIG. 4 schematically depicts a cross section of a glass container with a heat-tolerant coating comprising a low-friction layer and a coupling agent layer, according to one or more embodiments shown and described herein.

Referring to FIGS. 1 and 4, the heat-tolerant coating 120 is positioned on the exterior surface 106 is of the glass container 100. In some embodiments, the heat-tolerant coating 120 may comprise an coupling agent layer 180 that is in direct contact with the exterior surface 106 of the glass container 100 and may further comprise a low-friction layer 170 that is in direct contact with the coupling agent layer 180. However, it should be understood that, in some embodiments, the heat-tolerant coating 120 may not include a coupling agent layer 180 and the low-friction layer 170 may be in direct contact with the exterior surface 106 of the glass container 100. In some embodiments, the heat-tolerant coating 120 is a coating as described in U.S. patent application Ser. No. 13/780,740 filed Feb. 28, 2013 and entitled "Glass Articles With Low Friction Coatings," the entirety of which is incorporated herein by reference.

Generally, a heat-tolerant coating may be applied to a surface of a glass article, such as a container that may be used as a pharmaceutical package. The heat-tolerant coating may provide advantageous properties to the coated glass article such as a reduced coefficient of friction and increased damage resistance. The reduced coefficient of friction may impart improved strength and durability to the glass article by mitigating frictive damage to the glass. Further, the heat-tolerant coating may maintain the aforementioned improved strength and durability characteristics following exposure to elevated temperatures and other conditions, such as those experienced during packaging and pre-packaging steps utilized in packaging pharmaceuticals, such as, for example, depyrogenation, autoclaving and the like. Accordingly, the heat-tolerant coatings and glass articles with the heat-tolerant coating are thermally stable.

The heat-tolerant coating may generally comprise a coupling agent, such as a silane, and a polymer chemical composition, such as a polyimide. In some embodiments, the coupling agent may be disposed in a coupling agent layer positioned on the surface of the glass article and the polymer chemical composition may be disposed in a low-friction layer positioned on the coupling agent layer. Accordingly, it should be understood that the low-friction layer comprises a polymer chemical composition. In other embodiments, the coupling agent and the polymer chemical composition may be mixed in a single layer to form the heat-tolerant coating.

FIG. 1 schematically depicts a cross section of a glass container 100 with a heat-tolerant coating 120. The heat-tolerant coating 120 is positioned on at least a portion of the exterior surface 106 of the glass body 102. In some embodiments, the heat-tolerant coating 120 may be positioned on substantially the entire exterior surface 106 of the glass body 102. The heat-tolerant coating 120 has an outer surface 122 and a glass body contacting surface 124 at the interface of the glass body 102 and the heat-tolerant coating 120. The heat-tolerant coating 120 may be bonded to the glass body 102 at the exterior surface 106.

Now referring to FIGS. 1 and 4, in one embodiment, the heat-tolerant coating 120 comprises a bi-layered structure. FIG. 4 shows a cross section of a glass container 100, where the heat-tolerant coating comprises a low-friction layer 170 and a coupling agent layer 180. A polymer chemical composition may be contained in low-friction layer 170 and a coupling agent may be contained in a coupling agent layer 180. The coupling agent layer 180 may be in direct contact with the exterior surface 106 of the wall portion 110. The low-friction layer 170 may be in direct contact with the coupling agent layer 180 and may form the outer surface 122 of the heat-tolerant coating 120. In some embodiments the coupling agent layer 180 is bonded to the wall portion 110 and the low-friction layer 170 is bonded to the coupling agent layer 180 at an interface. However, it should be understood that, in some embodiments, the heat-tolerant coating 120 may not include a coupling agent, and the polymer chemical composition may be disposed in a low-friction layer 170 in direct contact with the exterior surface 106 of the of the wall portion 110. In another embodiment, the polymer chemical composition and coupling agent may be substantially mixed in a single layer. In some other embodiments, the low-friction layer may be positioned over the coupling agent layer, meaning that the low-friction layer 170 is in an outer layer relative to the coupling agent layer 180 and the wall portion 110 of the glass container 100. As used herein, a first layer positioned "over" a second layer means that the first layer could be in direct contact with the second layer or separated from the second layer, such as with a third layer disposed between the first and second layers.

Figure 5:
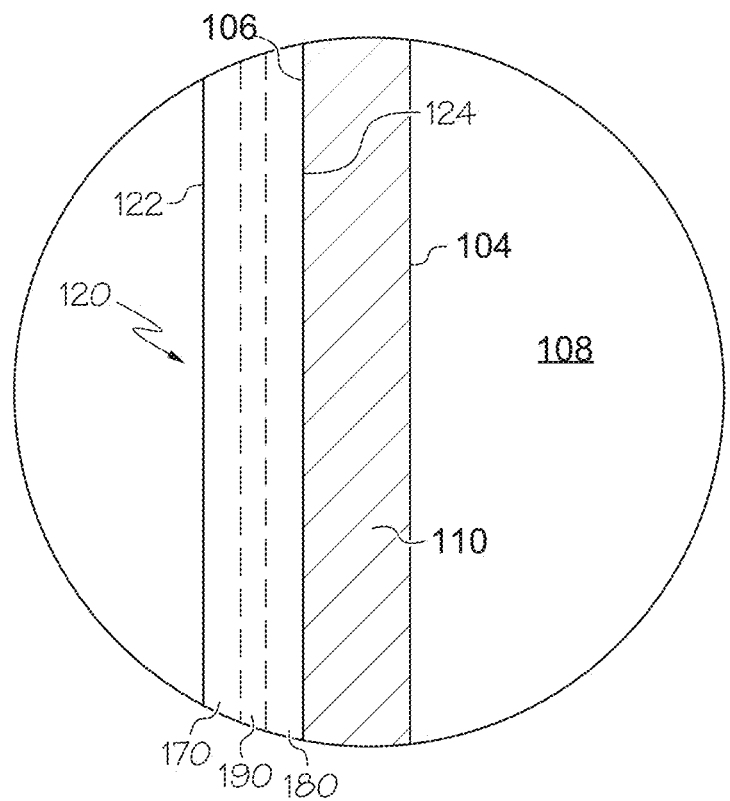
FIG. 5 schematically depicts a cross section of a glass container with a heat-tolerant coating comprising a low-friction layer, a coupling agent layer, and an interface layer, according to one or more embodiments shown and described herein.

Referring now to FIG. 5, in one embodiment, the heat-tolerant coating 120 may further comprise an interface layer 190 positioned between the coupling agent layer 180 and the low-friction layer 170. The interface layer 190 may comprise one or more chemical compositions of the low-friction layer 170 bound with one or more of the chemical compositions of the coupling agent layer 180. In this embodiment, the interface of the coupling agent layer and low-friction layer forms an interface layer 190 where bonding occurs between the polymer chemical composition and the coupling agent. However, it should be understood that in some embodiments, there may be no appreciable layer at the interface of the coupling agent layer 180 and low-friction layer 170 where the polymer and coupling agent are chemically bound to one another as described above with reference to FIG. 4.

The heat-tolerant coating 120 applied to the glass body 102 may have a thickness of less than about 100 µm or even less than or equal to about 1 µm. In some embodiments, the thickness of the heat-tolerant coating 120 may be less than or equal to about 100 nm thick. In other embodiments, the heat-tolerant coating 120 may be less than about 90 nm thick, less than about 80 nm thick, less than about 70 nm thick, less than about 60 nm thick, less than about 50 nm, or even less than about 25 nm thick. In some embodiments, the heat-tolerant coating 120 may not be of uniform thickness over the entirety of the glass body 102. For example, the glass container 100 may have a thicker heat-tolerant coating 120 in some areas, due to the process of contacting the glass body 102 with one or more coating solutions that form the heat-tolerant coating 120. In some embodiments, the heat-tolerant coating 120 may have a non-uniform thickness. For example, the coating thickness may be varied over different regions of a glass container 100, which may promote protection is a selected region.

In embodiments which include at least two layers, such as the low-friction layer 170, interface layer 190, and/or coupling agent layer 180, each layer may have a thickness of less than about 100 µm or even less than or equal to about 1 µm. In some embodiments, the thickness of each layer may be less than or equal to about 100 nm. In other embodiments, each layer may be less than about 90 nm thick, less than about 80 nm thick, less than about 70 nm thick, less than about 60 nm thick, less than about 50 nm, or even less than about 25 nm thick.

As noted herein, in some embodiments, the heat-tolerant coating 120 comprises a coupling agent. The coupling agent may improve the adherence or bonding of the polymer chemical composition to the glass body 102, and is generally disposed between the glass body 102 and the polymer chemical composition or mixed with the polymer chemical composition. Adhesion, as used herein, refers to the strength of adherence or bonding of the heat-tolerant coating prior to and following a treatment applied to the glass container, such as a thermal treatment. Thermal treatments include, without limitation, autoclaving, depyrogenation, lyophilization, or the like.

In one embodiment, the coupling agent may comprise at least one silane chemical composition. As used herein, a "silane" chemical composition is any chemical composition comprising a silane moiety, including functional organosilanes, as well as silanols formed from silanes in aqueous solutions. The silane chemical compositions of the coupling agent may be aromatic or aliphatic. In some embodiments, the at least one silane chemical composition may comprise an amine moiety, such as a primary amine moiety or a secondary amine moiety. Furthermore, the coupling agent may comprise hydrolysates and/or oligomers of such silanes, such as one or more silsesquioxane chemical compositions that are formed from the one or more silane chemical compositions. The silsesquioxane chemical compositions may comprise a full cage structure, partial cage structure, or no cage structure.

The coupling agent may comprise any number of different chemical compositions, such as one chemical composition, two different chemical compositions, or more than two different chemical compositions including oligomers formed from more than one monomeric chemical composition. In one embodiment, the coupling agent may comprise at least one of (1) a first silane chemical composition, hydrolysate thereof, or oligomer thereof, and (2) a chemical composition formed from the oligomerization of at least the first silane chemical composition and a second silane chemical composition. In another embodiment, the coupling agent comprises a first and second silane. As used herein, a "first" silane chemical composition and a "second" silane chemical composition are silanes having different chemical compositions. The first silane chemical composition may be an aromatic or an aliphatic chemical composition, may optionally comprise an amine moiety, and may optionally be an alkoxysilane. Similarly, the second silane chemical composition may be an aromatic or an aliphatic chemical composition, may optionally comprise an amine moiety, and may optionally be an alkoxysilane.

For example, in one embodiment, only one silane chemical composition is applied as the coupling agent. In such an embodiment, the coupling agent may comprise a silane chemical composition, hydrolysate thereof, or oligomer thereof.

In another embodiment, multiple silane chemical compositions may be applied as the coupling agent. In such an embodiment, the coupling agent may comprise at least one of (1) a mixture of the first silane chemical composition and a second silane chemical composition, and (2) a chemical composition formed from the oligomerization of at least the first silane chemical composition and the second silane chemical composition.

Referring to the embodiments described above, the first silane chemical composition, second silane chemical composition, or both, may be aromatic chemical compositions. As used herein, an aromatic chemical composition contains one or more six-carbon rings characteristic of the benzene series and related organic moieties. The aromatic silane chemical composition may be an alkoxysilane such as, but not limited to, a dialkoxysilane chemical composition, hydrolysate thereof, or oligomer thereof, or a trialkoxysilane chemical composition, hydrolysate thereof, or oligomer thereof. In some embodiments, the aromatic silane may comprise an amine moiety, and may be an alkoxysilane comprising an amine moiety. In another embodiment, the aromatic silane chemical composition may be an aromatic alkoxysilane chemical composition, an aromatic acyloxysilane chemical composition, an aromatic halogen silane chemical composition, or an aromatic aminosilane chemical composition. In another embodiment, the aromatic silane chemical composition may be selected from the group consisting of aminophenyl, 3-(m-aminophenoxy) propyl, N-phenylaminopropyl, or (chloromethy) phenyl substituted alkoxy, acyloxy, halogen, or amino silanes. For example, the aromatic alkoxysilane may be, but is not limited to, aminophenyltrimethoxy silane (sometimes referred to herein as "APhTMS"), aminophenyldimethoxy silane, aminophenyltriethoxy silane, aminophenyldiethoxy silane, 3-(m-aminophenoxy) propyltrimethoxy silane, 3-(m-aminophenoxy) propyldimethoxy silane, 3-(m-aminophenoxy) propyltriethoxy silane, 3-(m-aminophenoxy) propyldiethoxy silane, N-phenylaminopropyltrimethoxysilane, N-phenylaminopropyldimethoxysilane, N-phenylaminopropyltriethoxysilane, N-phenylaminopropyldiethoxysilane, hydrolysates thereof, or oligomerized chemical composition thereof. In an exemplary embodiment, the aromatic silane chemical composition may be aminophenyltrimethoxy silane.

Referring again to the embodiments described above, the first silane chemical composition, second silane chemical composition, or both, may be aliphatic chemical compositions. As used herein, an aliphatic chemical composition is non-aromatic, such as a chemical composition having an open chain structure, such as, but not limited to, alkanes, alkenes, and alkynes. For example, in some embodiments, the coupling agent may comprise a chemical composition that is an alkoxysilane and may be an aliphatic alkoxysilane such as, but not limited to, a dialkoxysilane chemical composition, a hydrolysate thereof, or an oligomer thereof, or a trialkoxysilane chemical composition, a hydrolysate thereof, or an oligomer thereof. In some embodiments, the aliphatic silane may comprise an amine moiety, and may be an alkoxysilane comprising an amine moiety, such as an aminoalkyltrialkoxysilane. In one embodiment, an aliphatic silane chemical composition may be selected from the group consisting of 3-aminopropyl, N-(2-aminoethyl)-3-aminopropyl, vinyl, methyl, N-phenylaminopropyl, (N-phenylamino)methyl, N-(2-Vinylbenzylaminoethyl)-3-aminopropyl substituted alkoxy, acyloxy, halogen, or amino silanes, hydrolysates thereof, or oligomers thereof. Aminoalkyltrialkoxysilanes, include, but are not limited to, 3-aminopropyltrimethoxy silane (sometimes referred to herein as "GAPS"), 3-aminopropyldimethoxy silane, 3-aminopropyltriethoxy silane, 3-aminopropyldiethoxy silane, N-(2-aminoethyl)-3-aminopropyltrimethoxysilane, N-(2-aminoethyl)-3-aminopropyldimethoxysilane, N-(2-aminoethyl)-3-aminopropyltriethoxysilane, N-(2-aminoethyl)-3-aminopropyldiethoxysilane, hydrolysates thereof, and oligomerized chemical composition thereof. In other embodiments, the aliphatic alkoxysilane chemical composition may not contain an amine moiety, such as an alkyltrialkoxysilane or alkylbialkoxysilane. Such alkyltrialkoxysilanes or alkylbialkoxysilanes include, but are not limited to, vinyltrimethoxy silane, vinyldimethoxy silane, vinyltriethoxy silane, vinyldiethoxy silane, methyltrimethoxysilane, methyltdimethoxysilane, methyltriethoxysilane, methyldiethoxysilane, hydrolysates thereof, or oligomerized chemical composition thereof. In an exemplary embodiment, the aliphatic silane chemical composition is 3-aminopropyltrimethoxy silane.

It has been found that forming the coupling agent from combinations of different chemical compositions, particularly combinations of silane chemical compositions, may improve the thermal stability of the heat-tolerant coating 120. For example, it has been found that combinations of aromatic silanes and aliphatic silanes, such as those described above, improve the thermal stability of the heat-tolerant coating, thereby producing a coating which retains its the mechanical properties, such as coefficient of friction and adhesion performance following a heat treatment at elevated temperatures. Accordingly, in one embodiment the coupling agent comprises a combination of aromatic and aliphatic silanes. In these embodiments, the ratio of aliphatic silanes to aromatic silanes (aliphatic:aromatic) may be from about 1:3 to about 1:0.2. If the coupling agent comprises two or more chemical composition, such as at least an aliphatic silane and an aromatic silane, the ratio by weight of the two chemical compositions may be any ratio, such as a weight ratio of a first silane chemical composition to a second silane chemical composition (first silane:second silane) of about 0.1:1 to about 10:1. For example, in some embodiments the ration may be from 0.5:1 to about 2:1, such as 2:1, 1:1, 0.5:1. In some embodiments, the coupling agent may comprise combinations of multiple aliphatic silanes and/or multiple aromatic silanes, which could be applied to the glass container in one or multiple steps with or without organic or inorganic fillers. In some embodiments, the coupling agent comprises oligomers, such as silsesquioxanes, formed from both the aliphatic and aromatic silanes.

In an exemplary embodiment, the first silane chemical composition is an aromatic silane chemical composition and the second silane chemical composition is an aliphatic silane chemical composition. In one exemplary embodiment, the first silane chemical composition is an aromatic alkoxysilane chemical composition comprising at least one amine moiety and the second silane chemical composition is an aliphatic alkoxysilane chemical composition comprising at least one amine moiety. In another exemplary embodiment, the coupling agent comprises an oligomer of one or more silane chemical compositions, wherein the oligomer is a silsesquioxane chemical composition and at least one of the silane chemical compositions comprises at least one aromatic moiety and at least one amine moiety. In one particular exemplary embodiment, the first silane chemical composition is aminophenyltrimethoxy silane and the second silane chemical composition is 3-aminopropyltrimethoxy silane. The ratio of aromatic silane to aliphatic silane may be about 1:1. In another particular exemplary embodiment, the coupling agent comprises an oligomer formed from aminophenyltrimethoxy and 3-aminopropyltrimethoxy. In another embodiment, the coupling agent may comprise both a mixture of aminophenyltrimethoxy and 3-aminopropyltrimethoxy and oligomers formed from the two.

In another embodiment, the coupling agent may comprise a chemical composition that is an aminoalkylsilsesquioxane. In one embodiment the coupling agent comprises aminopropylsilsesquioxane (APS) oligomer (commercially available as an aqueous solution from Gelest).

In one embodiment, the aromatic silane chemical composition is a chlorosilane chemical composition.

In another embodiment, the coupling agent may comprise chemical composition that are hydrolyzed analogs of aminoalkoxysilanes such as, but not limited to, (3-Aminopropyl)silantriol, N-(2-Aminoethyl)-3-aminopropyl-silantriol and/or mixtures thereof.

In another embodiment, the coupling agent may be an inorganic material, such as metal and/or a ceramic film. Non-limiting examples of suitable inorganic materials used as the coupling agent include titanates, zirconates, tin, titanium, and/or oxides thereof.

In one embodiment, the coupling agent is applied to the exterior surface 106 of the glass body 102 by contacting with the diluted coupling agent by a submersion process. The coupling agent may be mixed in a solvent when applied to the glass body 102. In another embodiment, the coupling agent may be applied to the glass body 102 by a spray or other suitable means. The glass body 102 with coupling agent may then be dried at around 120° C. for about 15 min, or any time and temperature sufficient to adequately liberate the water and/or other organic solvents present on the exterior surface 106 of the wall portion 110.

Referring to FIG. 4, in one embodiment, the coupling agent is positioned on the glass container as a coupling agent layer 180 and is applied as a solution comprising about 0.5 wt % of a first silane and about 0.5 wt % of a second silane (total 1 wt % silane) mixed with at least one of water and an organic solvent, such as, but not limited to, methanol. However, it should be understood that the total silane concentration in the solution may be more or less than about 1 wt %, such as from about 0.1 wt % to about 10 wt %, from about 0.3 wt % to about 5.0 wt %, or from about 0.5 wt % to about 2.0 wt %. For example, in one embodiment, the weight ratio of organic solvent to water (organic solvent:water) may be from about 90:10 to about 10:90, and, in one embodiment, may be about 75:25. The weight ratio of silane to solvent may affect the thickness of the coupling agent layer, where increased percentages of silane chemical composition in the coupling agent solution may increase the thickness of the coupling agent layer 180. However, it should be understood that other variables may affect the thickness of the coupling agent layer 180 such as, but not limited, the specifics of the dip coating process, such as the withdraw speed from the bath. For example, a faster withdraw speed may form a thinner coupling agent layer 180.

In another embodiment, the coupling agent layer 180 may be applied as a solution comprising 0.1 vol. % of a commercially available aminopropylsilsesquioxane oligomer. Coupling agent layer solutions of other concentrations may be used, including but not limited to, 0.01-10.0 vol. % aminopropylsilsesquioxane oligomer solutions.

As noted herein, the low-friction layer of the heat-tolerant coating includes a polymer chemical composition. The polymer chemical composition may be a thermally stable polymer or mixture of polymers, such as but not limited to, polyimides, polybenzimidazoles, polysulfones, polyetheretheketones, polyetherimides, polyamides, polyphenyls, polybenzothiazoles, polybenzoxazoles, polybisthiazoles, and polyaromatic heterocyclic polymers with and without organic or inorganic fillers. The polymer chemical composition may be formed from other thermally stable polymers, such as polymers that do not degrade at temperatures in the range of from 200° C. to 400° C., including 250° C., 300° C., and 350° C. These polymers may be applied with or without a coupling agent.

In one embodiment, the polymer chemical composition is a polyimide chemical composition. If the heat-tolerant coating 120 comprises a polyimide, the polyimide composition may be derived from a polyamic acid, which is formed in a solution by the polymerization of monomers. One such polyamic acid is Novastrat® 800 (commercially available from NeXolve). A curing step imidizes the polyamic acid to form the polyimide. The polyamic acid may be formed from the reaction of a diamine monomer, such as a diamine, and an anhydride monomer, such as a dianhydride. As used herein, polyimide monomers are described as diamine monomers and dianhydride monomers. However, it should be understood that while a diamine monomer comprises two amine moieties, in the description that follows, any monomer comprising at least two amine moieties may be suitable as a diamine monomer. Similarly, it should be understood that while a dianhydride monomer comprises two anhydride moieties, in the description that follows any monomer comprising at least two anhydride moieties may be suitable as a dianhydride monomer. The reaction between the anhydride moieties of the anhydride monomer and amine moieties of the diamine monomer forms the polyamic acid. Therefore, as used herein, a polyimide chemical composition that is formed from the polymerization of specified monomers refers to the polyimide that is formed following the imidization of a polyamic acid that is formed from those specified monomers. Generally, the molar ratio of the total anhydride monomers and diamine monomers may be about 1:1. While the polyimide may be formed from only two distinct chemical compositions (one anhydride monomer and one diamine monomer), at least one anhydride monomer may be polymerized and at least one diamine monomer may be polymerized to from the polyimide. For example, one anhydride monomer may be polymerized with two different diamine monomers. Any number of monomer specie combinations may be used. Furthermore, the ratio of one anhydride monomer to a different anhydride monomer, or one or more diamine monomer to a different diamine monomer may be any ratio, such as between about 1:0.1 to 0.1:1, such as about 1:9, 1:4, 3:7, 2:3:, 1:1, 3:2, 7:3, 4:1 or 1:9.

The anhydride monomer from which, along with the diamine monomer, the polyimide is formed may comprise any anhydride monomer. In one embodiment, the anhydride monomer comprises a benzophenone structure. In an exemplary embodiment, benzophenone-3,3',4,4'-tetracarboxylic dianhydride may be at least one of the anhydride monomer from which the polyimide is formed. In other embodiments, the diamine monomer may have an anthracene structure, a phenanthrene structure, a pyrene structure, or a pentacene structure, including substituted versions of the above mentioned dianhydrides.

Figure 6:
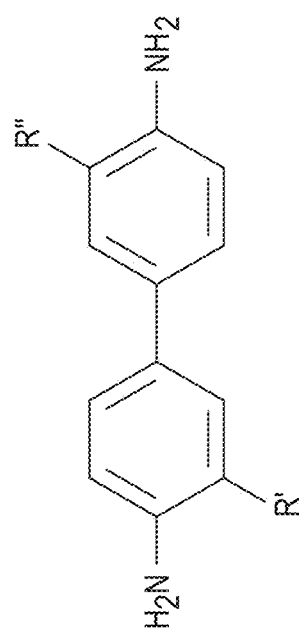
FIG. 6 depicts an example of a diamine monomer chemical composition, according to one or more embodiments shown and described herein.
Figure 7:
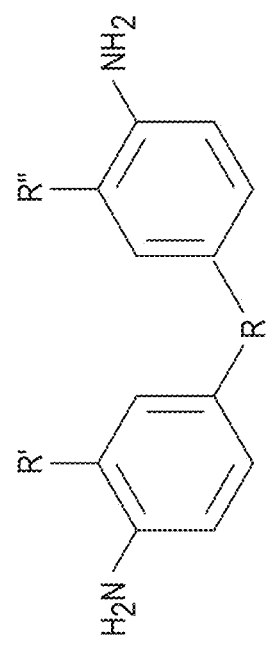
FIG. 7 depicts an example of a diamine monomer chemical composition, according to one or more embodiments shown and described herein.

The diamine monomer from which, along with the anhydride monomer, the polyimide is formed may comprise any diamine monomer. In one embodiment, the diamine monomer comprises at least one aromatic ring moiety. FIGS. 6 and 7 show examples of diamine monomers that, along with one or more selected anhydride monomer, may form the polyimide comprising the polymer chemical composition. The diamine monomer may have one or more carbon molecules connecting two aromatic ring moieties together, as shown in FIG. 6, wherein R of FIG. 7 corresponds to an alkyl moiety comprising one or more carbon atoms. Alternatively, the diamine monomer may have two aromatic ring moieties that are directly connected and not separated by at least one carbon molecule, as shown in FIG. 7. The diamine monomer may have one or more alkyl moieties, as represented by R' and R" in FIGS. 6 and 7. For example, in FIGS. 6 and 7, R' and R" may represent an alkyl moiety such as methyl, ethyl, propyl, or butyl moieties, connected to one or more aromatic ring moieties. For example, the diamine monomer may have two aromatic ring moieties wherein each aromatic ring moiety has an alkyl moiety connected thereto and adjacent an amine moiety connected to the aromatic ring moiety. It should be understood that R' and R", in both FIGS. 6 and 7, may be the same chemical moiety or may be different chemical moieties. Alternatively, R' and/or R", in both FIGS. 6 and 7, may represent no atoms at all.

Two different chemical compositions of diamine monomers may form the polyimide. In one embodiment, a first diamine monomer comprises two aromatic ring moieties that are directly connected and not separated by a linking carbon molecule, and a second diamine monomer comprises two aromatic ring moieties that are connected with at least one carbon molecule connecting the two aromatic ring moieties. In one exemplary embodiment, the first diamine monomer, the second diamine monomer, and the anhydride monomer have a molar ratio (first diamine monomer:second diamine monomer:anhydride monomer) of about 0.465:0.035:0.5. However, the ratio of the first diamine monomer and the second diamine monomer may vary in a range of about 0.01:0.49 to about 0.40:0.10, while the anhydride monomer ratio remains at about 0.5.

In one embodiment, the polyimide composition is formed from the polymerization of at least a first diamine monomer, a second diamine monomer, and an anhydride monomer, wherein the first and second diamine monomers are different chemical compositions. In one embodiment, the anhydride monomer is a benzophenone, the first diamine monomer comprises two aromatic rings directly bonded together, and the second diamine monomer comprises two aromatic rings bonded together with at least one carbon molecule connecting the first and second aromatic rings. The first diamine monomer, the second diamine monomer, and the anhydride monomer may have a molar ratio (first diamine monomer:second diamine monomer:anhydride monomer) of about 0.465:0.035:0.5.

In an exemplary embodiment, the first diamine monomer is ortho-Tolidine, the second diamine monomer is 4,4'-methylene-bis(2-methylaniline), and the anhydride monomer is benzophenone-3,3',4,4'-tetracarboxylic dianhydride. The first diamine monomer, the second diamine monomer, and the anhydride monomer may have a molar ratio (first diamine monomer:second diamine monomer:anhydride monomer) of about 0.465:0.035:0.5.

Figure 8:
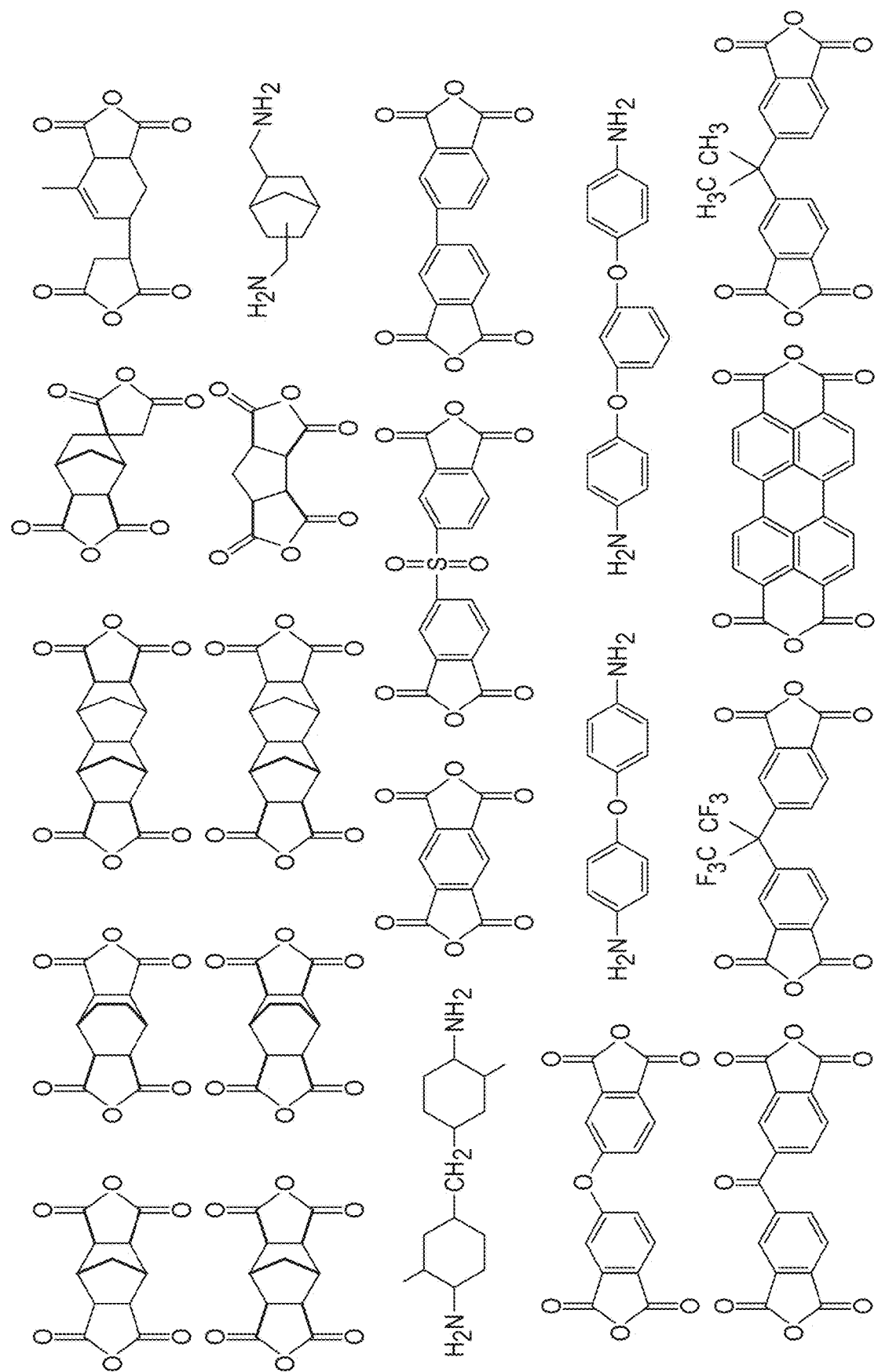
FIG. 8 depicts the chemical structures of monomers that may be used as polyimide coatings applied to glass containers, according to one or more embodiments shown and described herein.

In some embodiments, the polyimide may be formed from the polymerization of one or more of: bicyclo[2.2.1]heptane-2,3,5,6-tetracarboxylic dianhydride, cyclopentane-1,2,3,4-tetracarboxylic 1,2,3,4-dianhydride, bicyclo[2.2.2]octane-2, 3,5,6-tetracarboxylic dianhydride, 4arH,8acH)-decahydro-1t,4t:5c,8c-dimethanonaphthalene-2t,3t,6c,7c-tetracarboxylic 2,3:6,7-dianhydride, 2c,3c,6c,7c-tetracarboxylic 2,3:6,7-dianhydride, 5-endo-carboxymethylbicyclo[2.2.1]-heptane-2-exo,3-exo,5-exo-tricarboxylic acid 2,3:5,5-dianhydride, 5-(2,5-Dioxotetrahydro-3-furanyl)-3-methyl-3-cyclohexene-1,2-dicarboxylic anhydride, isomers of Bis(aminomethyl) bicyclo[2.2.1]heptane, or 4,4'-Methylenebis(2-methylcyclohexylamine), Pyromellitic dianhydride (PMDA) 3,3',4,4'-Biphenyl dianhydride (4,4'-BPDA), 3,3', 4,4'-Benzophenone dianhydride (4,4'-BTDA), 3,3',4,4'-Oxydiphthalic anhydride (4,4'-ODPA), 1,4-Bis(3,4-dicarboxyl-phenoxy)benzene dianhydride (4,4'-HQDPA), 1,3-Bis(2,3-dicarboxyl-phenoxy)benzene dianhydride (3,3'-HQDPA), 4,4'-Bis(3,4-dicarboxyl phenoxyphenyl)-isopropylidene dianhydride (4,4'-BPADA), 4,4'-(2,2,2-Trifluoro-1-pentafluorophenylethylidene) diphthalic dianhydride (3FDA), 4,4'-Oxydianiline (ODA), m-Phenylenediamine (MPD), p-Phenylenediamine (PPD), m-Toluenediamine (TDA), 1,4-Bis(4-aminophenoxy)benzene (1,4,4-APB), 3,3'-(m-Phenylenebis(oxy))dianiline (APB), 4,4'-Diamino-3,3'-dimethyldiphenylmethane (DMMDA), 2,2'-Bis(4-(4-aminophenoxy)phenyl)propane (BAPP), 1,4-Cyclohexanediamine 2,2'-Bis[4-(4-aminophenoxy) phenyl] hexafluoroisopropylidene (4-BDAF), 6-Amino-1-(4'-aminophenyl)-1,3,3-trimethylindane (DAPI), Maleic anhydride (MA), Citraconic anhydride (CA), Nadic anhydride (NA), 4-(Phenylethynyl)-1,2-benzenedicarboxylic acid anhydride (PEPA), 4,4'-diaminobenzanilide (DABA), 4,4'-(hexafluoroisopropylidene)di-phthalicanhydride (6-FDA), Pyromellitic dianhydride, benzophenone-3,3',4,4'-tetracarboxylic dianhydride, 3,3',4,4'-biphenyltetracarboxylic dianhydride, 4,4'-(hexafluoroisopropylidene)diphthalic anhydride, perylene-3,4,9,10-tetracarboxylic dianhydride, 4,4'-oxydiphthalic anhydride, 4,4'-(hexafluoroisopropylidene)diphthalic anhydride, 4,4'-(4,4'-Isopropylidenediphenoxy)bis (phthalic anhydride), 1,4,5,8-Naphthalenetetracarboxylic dianhydride, 2,3,6,7-Naphthalenetetracarboxylic dianhydride, as well as those materials described in U.S. Pat. Nos. 7,619,042, 8,053,492, 4,880,895, 6,232,428, 4,595,548, WO Pub. No. 2007/016516, U.S. Pat. Pub. No. 2008/0214777, U.S. Pat. Nos. 6,444,783, 6,277,950, and 4,680,373. FIG. 8 depicts the chemical structure of some suitable monomers that may be used to form a polyimide coating applied to the glass body 102. In another embodiment, the polyamic acid solution from which the polyimide is formed may comprise poly (pyromellitic dianhydride-co-4,4'-oxydianiline) amic acid (commercially available from Aldrich).

In another embodiment, the polymer chemical composition may comprise a fluoropolymer. The fluoropolymer may be a copolymer wherein both monomers are highly fluorinated. Some of the monomers of the fluoropolymer may be fluoroethylene. In one embodiment, the polymer chemical composition comprises an amorphous fluoropolymer, such as, but not limited to, Teflon AF (commercially available from DuPont). In another embodiment, the polymer chemical composition comprises perfluoroalkoxy (PFA) resin particles, such as, but not limited to, Teflon PFA TE-7224 (commercially available from DuPont).

In another embodiment, the polymer chemical composition may comprise a silicone resin. The silicone resin may be a highly branched 3-dimensional polymer which is formed by branched, cage-like oligosiloxanes with the general formula of $R_nSi(X)_mO_y$, where R is a non reactive substituent, usually methyl or phenyl, and X is OH or H. While not wishing to be bound by theory, it is believed that curing of the resin occurs through a condensation reaction of S—OH moieties with a formation of Si—O—Si bonds. The silicone resin may have at least one of four possible functional siloxane monomeric units, which include M-resins, D-resins, T-resins, and Q-resins, wherein M-resins refer to resins with the general formula $R_3SiO$, D-resins refer to resins with the general formula $R_2SiO_2$, T-resins refer to resins with the general formula $RSiO_3$, and Q-resins refer to resins with the general formula $SiO_4$ (a fused quartz). In some embodiments resins are made of D and T units (DT resins) or from M and Q units (MQ resins). In other embodiments, other combinations (MDT, MTQ, QDT) are also used.

In one embodiment, the polymer chemical composition comprises phenylmethyl silicone resins due to their higher thermal stability compared to methyl or phenyl silicone resins. The ratio of phenyl to methyl moieties in the silicone resins may be varied in the polymer chemical composition. In one embodiment, the ratio of phenyl to methyl is about 1.2. In another embodiment, the ratio of phenyl to methyl is about 0.84. In other embodiments, the ratio of phenyl to methyl moieties may be about 0.5, 0.6, 0.7, 0.8, 0.9, 1.0, 1.1, 1.3, 1.4, or 1.5. In one embodiment, the silicone resin is DC 255 (commercially available from Dow Corning). In another embodiment, the silicone resin is DC806A (commercially available from Dow Corning). In other embodiments, the polymer chemical composition may comprise any of the DC series resins (commercially available for Dow Corning), and/or Hardsil Series AP and AR resins (commercially available from Gelest). The silicone resins can be used without a coupling agent or with a coupling agent.

In another embodiment, the polymer chemical composition may comprise silsesquioxane-based polymers, such as but not limited to T-214 (commercially available from Honeywell), SST-3M01 (commercially available from Gelest), POSS Imiclear (commercially available from Hybrid Plastics), and FOX-25 (commercially available from Dow Corning). In one embodiment, the polymer chemical composition may comprise a silanol moiety.

Referring again to FIGS. 1 and 4, the heat-tolerant coating 120 may be applied in a multi stage process, wherein the glass body 102 is contacted with the coupling agent solution to form the coupling agent layer 180 (as described above), and dried, and then contacted with a polymer chemical composition solution, such as a polymer or polymer precursor solution, such as by a submersion process, or alternatively, the polymer chemical composition layer 170 may be applied by a spray or other suitable means, and dried, and then cured at high temperatures. Alternatively, if a coupling agent layer 180 is not used, the polymer chemical composition of the low-friction layer 170 may be directly applied to the exterior surface 106 of the glass body 102. In another embodiment, the polymer chemical composition and the coupling agent may be mixed in the heat-tolerant coating 120, and a solution comprising the polymer chemical composition and the coupling agent may be applied to the glass body 102 in a single coating step.

In one embodiment, the polymer chemical composition comprises a polyimide wherein a polyamic acid solution is applied over the coupling agent layer 180. In other embodiments, a polyamic acid derivative may be used, such as, for example, a polyamic acid salt, a polyamic acid ester, or the like. In one embodiment, the polyamic acid solution may comprise a mixture of 1 vol. % polyamic acid and 99 vol. % organic solvent. The organic solvent may comprise a mixture of toluene and at least one of N,N-Dimethylacetamide (DMAc), N,N-Dimethylformamide (DMF), and 1-Methyl-2-pyrrolidinone (NMP) solvents, or a mixture thereof. In one embodiment the organic solvent solution comprises about 85 vol. % of at least one of DMAc, DMF, and NMP, and about 15 vol. % toluene. However, other suitable organic solvents may be used. The glass container 100 may then be dried at around 150° C. for about 20 minutes, or any time and temperature sufficient to adequately liberate the organic solvent present in the heat-tolerant coating 120.

In the layered heat-tolerant coating embodiment, after the glass body 102 is contacted with the coupling agent to form the coupling agent layer 180 and polyamic acid solution to from the low-friction layer 170, the glass container 100 may be cured at high temperatures. The glass container 100 may be cured at 300° C. for about 30 minutes or less, or may be cured at a temperature higher than 300° C., such as at least 320° C., 340° C., 360° C., 380° C., or 400° C. for a shorter time. It is believed, without being bound by theory, that the curing step imidizes the polyamic acid in the low-friction layer 170 by reaction of carboxylic acid moieties and amide moieties to create a low-friction layer 170 comprising a polyimide. The curing may also promote bonds between the polyimide and the coupling agent. The glass container 100 is then cooled to room temperature.

Furthermore, without being bound by limitation, it is believed that the curing of the coupling agent, polymer chemical composition, or both, drives off volatile materials, such as water and other organic molecules. As such, these volatile materials that are liberated during curing are not present when the article, if used as a container, is thermally treated (such as for depyrogenation) or contacted by the material in which it is a package for, such as a pharmaceutical. It should be understood that the curing processes described herein are separate heating treatments than other heating treatments described herein, such as those heating treatments similar or identical to processes in the pharmaceutical packaging industry, such as depyrogenation or the heating treatments used to define thermal stability, as described herein.

In one embodiment, the coupling agent comprises a silane chemical composition, such as an alkoxysilane, which may improve the adhesion of the polymer chemical composition to the glass body. Without being bound by theory, it is believed that alkoxysilane molecules hydrolyze rapidly in water forming isolated monomers, cyclic oligomers, and large intramolecular cyclics. In various embodiments, the control over which species predominates may be determined by silane type, concentration, pH, temperature, storage condition, and time. For example, at low concentrations in aqueous solution, aminopropyltrialkoxysilane (APS) may be stable and form trisilanol monomers and very low molecular weight oligomeric cyclics.

It is believed, still without being bound by theory, that the reaction of one or more silanes chemical compositions to the glass body may involve several steps. As shown in FIG. 9, in some embodiments, following hydrolysis of the silane chemical composition, a reactive silanol moiety may be formed, which can condense with other silanol moieties, for example, those on the surface of a substrate, such as a glass body. After the first and second hydrolysable moieties are hydrolyzed, a condensation reaction may be initialized. In some embodiments, the tendency toward self condensation can be controlled by using fresh solutions, alcoholic solvents, dilution, and by careful selection of pH ranges. For example, silanetriols are most stable at pH 3-6, but condense rapidly at pH 7-9.3, and partial condensation of silanol monomers may produce silsesquioxanes. As shown in FIG. 9, the silanol moieties of the formed species may form hydrogen bonds with silanol moieties on the substrate, and during drying or curing a covalent bond may be formed with the substrate with elimination of water. For example, a moderate cure cycle (110° C. for 15 min) may leave silanol moieties remaining in free form and, along with any silane organofunctionality, may bond with the subsequent topcoat, providing improved adhesion.

In some embodiments, the one or more silane chemical compositions of the coupling agent may comprise an amine moiety. Still without being bound by theory, it is believed that this amine moiety may act as a base catalyst in the hydrolysis and co-condensation polymerization and enhance the adsorption rate of the silanes having an amine moiety on a glass surface. It may also create a high pH (9.0-10.0) in aqueous solution that conditions the glass surface and increases density of surface silanol moieties. Strong interaction with water and protic solvents maintains solubility and stability of a silane having an amine moiety chemical composition, such as APS.

In an exemplary embodiment, the glass body may comprise ion-exchanged glass and the coupling agent may be a silane. In some embodiments, adhesion of the heat-tolerant coating to an ion-exchanged glass body may stronger than adhesion of the heat-tolerant coating to a non-ion-exchanged glass body. It is believed, without being bound by theory, that any of several aspects of ion-exchanged glass may promote bonding and/or adhesion, as compared with non-ion-exchanged glass. First, ion-exchanged glass may have enhanced chemical/hydrolytic stability that may affect stability of the coupling agent and/or its adhesion to glass surface. Non-ion-exchanged glass typically has inferior hydrolytic stability and under humid and/or elevated temperature conditions, alkali metals could migrate out of the glass body to the interface of the glass surface and coupling agent layer (if present), or even migrate into the coupling agent layer, if present. If alkali metals migrate, as described above, and there is a change in pH, hydrolysis of Si—O—Si bonds at the glass/coupling agent layer interface or in the coupling agent layer itself may weaken either the coupling agent mechanical properties or its adhesion to the glass. Second, when ion-exchanged glasses are exposed to strong oxidant baths, such as potassium nitrite baths, at elevated temperatures, such as 400° C. to 450° C., and removed, organic chemical compositions on the surface of the glass are removed, making it particularly well suited for silane coupling agents without further cleaning. For example, a non-ion-exchanged glass may have to be exposed to an additional surface cleaning treatment, adding time and expense to the process.

Figure 10:
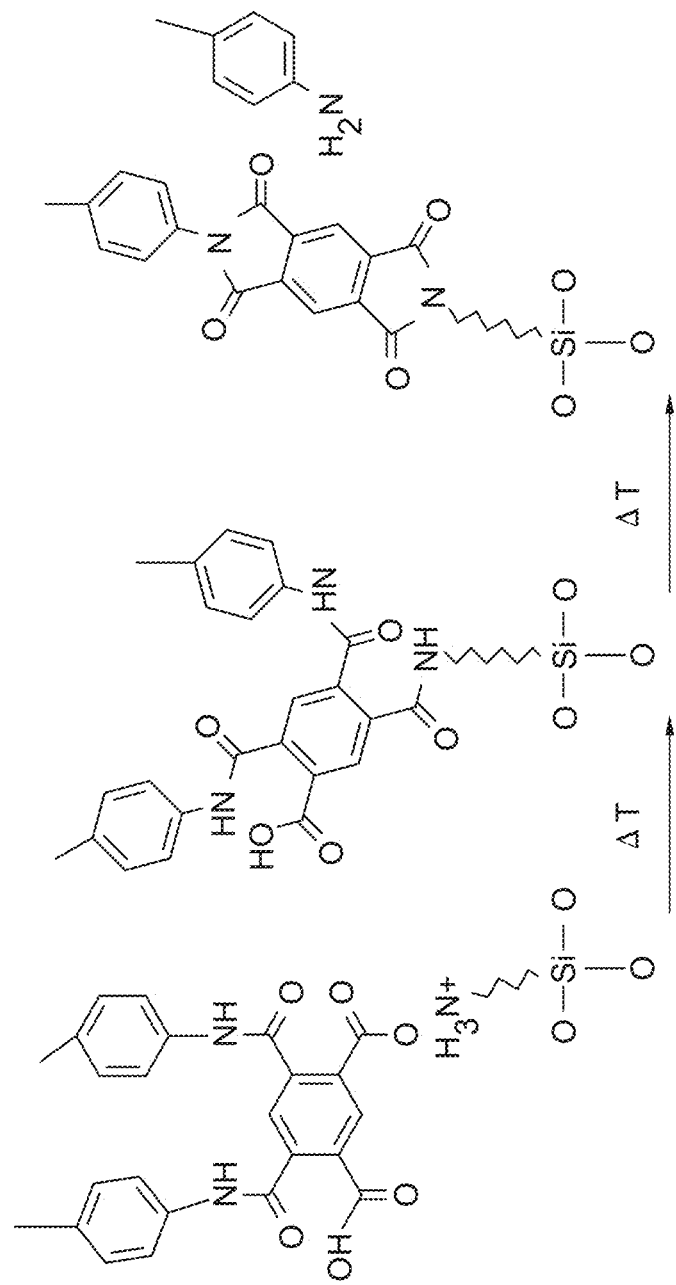
FIG. 10 schematically depicts the reaction steps of a polyimide bonding to a silane, according to one or more embodiments shown and described herein.

In one exemplary embodiment, the coupling agent may comprise at least one silane comprising an amine moiety and the polymer chemical composition may comprise a polyimide chemical composition. Now referring to FIG. 10, without being bound by theory, it is believed that the interaction between this amine moiety interaction and the polyamic acid precursor of the polyimide follows a stepwise process. As shown in FIG. 10, the first step is formation of a polyamic acid salt between a carboxyl moiety of the polyamic acid and the amine moiety. The second step is thermal conversion of the salt into an amide moiety. The thirds step is further conversion of the amide moiety into an imide moiety with scission of the polymer amide bonds. The result is a covalent imide attachment of a shortened polymer chain (polyimide chain) to an amine moiety of the coupling agent, as shown in FIG. 10.

Various properties of the glass containers (i.e., coefficient of friction, horizontal compression strength, 4-point bend strength) may be measured when the glass containers are in an as-coated condition (i.e., following application of the coating without any additional treatments) or following one or more processing treatments, such as those similar or identical to treatments performed on a pharmaceutical filling line, including, without limitation, washing, lyophilization, depyrogenation, autoclaving, or the like.

Depyrogentation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to depyrogenate a glass container, such as the glass containers described herein. For example, as described herein, the glass containers may be exposed to temperatures of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

As used herein, lyophilization conditions (i.e., freeze drying) refer to a process in which a sample is filled with a liquid that contains protein and then frozen at −100° C., followed by water sublimation for 20 hours at −15° C. under vacuum.

As used herein, autoclave conditions refer to steam purging a sample for 10 minutes at 100° C., followed by a 20 minute dwelling period wherein the sample is exposed to a 121° C. environment, followed by 30 minutes of heat treatment at 121° C.

The coefficient of friction (μ) of the portion of the glass container with the heat-tolerant coating may have a lower coefficient of friction than a surface of an uncoated glass container formed from a same glass composition. A coefficient of friction (μ) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for glass container 100 is reported as the coefficient of friction between the exterior surface of a first glass container (having an outer diameter of between about 16.00 mm and about 17.00 mm) and the exterior surface of second glass container which is identical to the first glass container, wherein the first and second glass containers have the same glass body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a glass container which exhibits a maximum coefficient of friction at a specific applied load will also exhibit the same or better (i.e., lower) maximum coefficient of friction at a lesser load. For example, if a glass container exhibits a maximum coefficient of friction of 0.5 or lower under an applied load of 50 N, the glass container will also exhibit a maximum coefficient of friction of 0.5 or lower under an applied load of 25 N.

Figure 11:
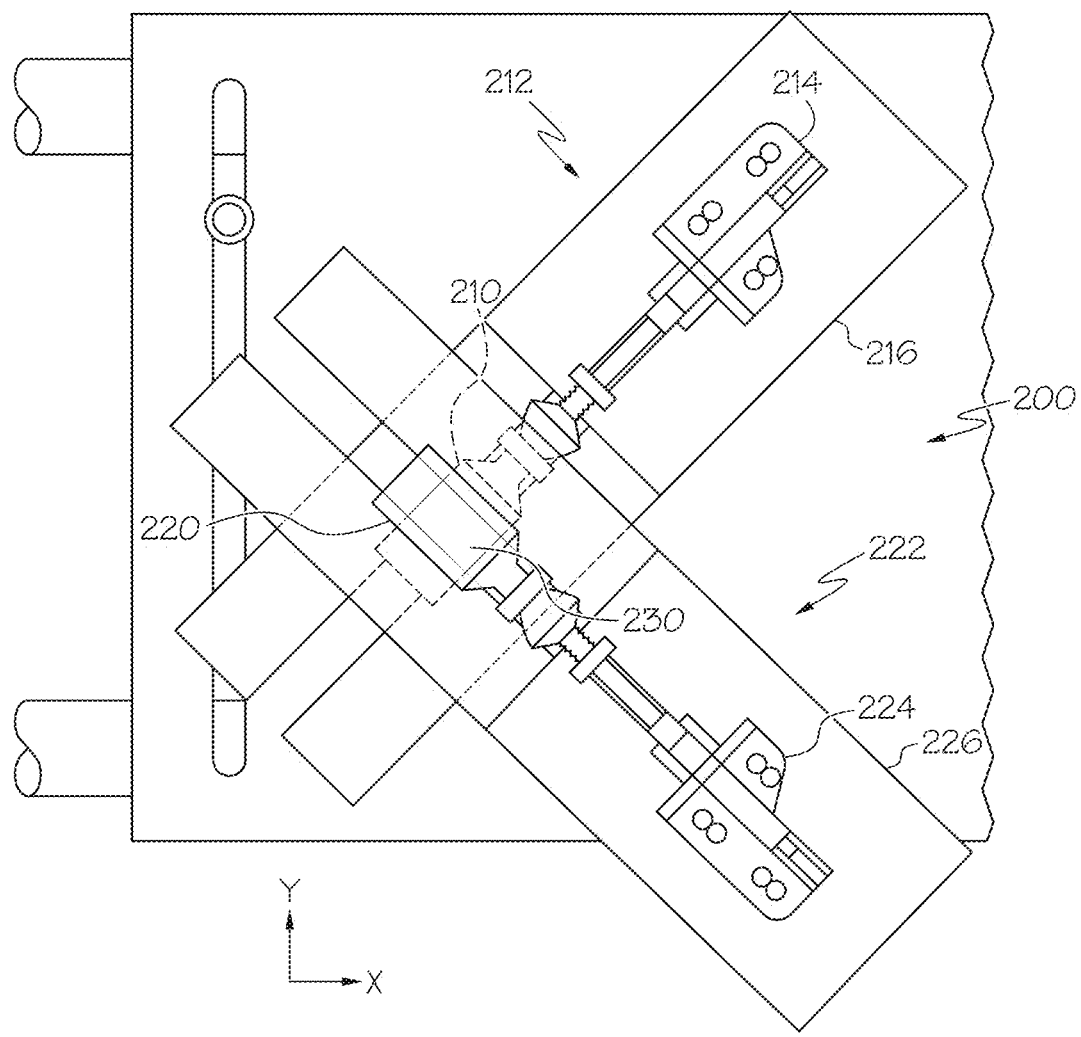
FIG. 11 schematically depicts a testing jig for determining the coefficient of friction between two surfaces, according to one or more embodiments shown and described herein.

In the embodiments described herein, the coefficient of friction of the glass containers (both coated and uncoated) is measured with a vial-on-vial testing jig. The testing jig 200 is schematically depicted in FIG. 11. The same apparatus may also be used to measure the frictive force between two glass containers positioned in the jig. The vial-on-vial testing jig 200 comprises a first clamp 212 and a second clamp 222 arranged in a cross configuration. The first clamp 212 comprises a first securing arm 214 attached to a first base 216. The first securing arm 214 attaches to the first glass container 210 and holds the first glass container 210 stationary relative to the first clamp 212. Similarly, the second clamp 222 comprises a second securing arm 224 attached to a second base 226. The second securing arm 224 attaches to the second glass container 220 and holds it stationary relative to the second clamp 222. The first glass container 210 is positioned on the first clamp 212 and the second glass container 220 is positioned of the second clamp 222 such that the long axis of the first glass container 210 and the long axis of the second glass container 220 are positioned at about a 90° angle relative to one another and on a horizontal plane defined by the x-y axis.

A first glass container 210 is positioned in contact with the second glass container 220 at a contact point 230. A normal force is applied in a direction orthogonal to the horizontal plane defined by the x-y axis. The normal force may be applied by a static weight or other force applied to the second clamp 222 upon a stationary first clamp 212. For example, a weight may be positioned on the second base 226 and the first base 216 may be placed on a stable surface, thus inducing a measurable force between the first glass container 210 and the second glass container 220 at the contact point 230. Alternatively, the force may be applied with a mechanical apparatus, such as a UMT (universal mechanical tester) machine.

The first clamp 212 or second clamp 222 may be moved relative to the other in a direction which is at a 45° angle with the long axis of the first glass container 210 and the second glass container 220. For example, the first clamp 212 may be held stationary and the second clamp 222 may be moved such that the second glass container 220 moves across the first glass container 210 in the direction of the x-axis. A similar setup is described by R. L. De Rosa et al., in "Scratch Resistant Polyimide Coatings for Alumino Silicate Glass surfaces" in The Journal of Adhesion, 78: 113-127, 2002. To measure the coefficient of friction, the force required to move the second clamp 222 and the normal force applied to first and second glass containers 210,220 are measured with load cells and the coefficient of friction is calculated as the quotient of the frictive force and the normal force. The jig is operated in an environment of 25° C. and 50% relative humidity.

In the embodiments described herein, the portion of the glass container with the heat-tolerant coating has a coefficient of friction of less than or equal to about 0.7 relative to a like-coated glass container, as determined with the vial-on-vial jig described above. In other embodiments, the coefficient of friction may be less than or equal to about 0.6, or even less than or equal to about 0.5. In some embodiments, the portion of the glass container with the heat-tolerant coating has a coefficient of friction of less than or equal to about 0.4 or even less than or equal to about 0.3. Glass containers with coefficients of friction less than or equal to about 0.7 generally exhibit improved resistance to frictive damage and, as a result, have improved mechanical properties. For example, conventional glass containers (without a heat-tolerant coating) may have a coefficient of friction of greater than 0.7.

In some embodiments described herein, the coefficient of friction of the portion of the glass container with the heat-tolerant coating is at least 20% less than a coefficient of friction of a surface of an uncoated glass container formed from a same glass composition. For example, the coefficient of friction of the portion of the glass container with the heat-tolerant coating may be at least 20% less, at least 25% less, at least 30% less, at least 40% less, or even at least 50% less than a coefficient of friction of a surface of an uncoated glass container formed from a same glass composition.

In some embodiments, the portion of the glass container with the heat-tolerant coating may have a coefficient of friction of less than or equal to about 0.7 after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the portion of the glass container with the heat-tolerant coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the glass container with the heat-tolerant coating may not increase by more than about 30% after exposure to a temperature of about 260° C. for 30 minutes. In other embodiments, coefficient of friction of the portion of the glass container with the heat-tolerant coating may not increase by more than about 30% (i.e., about 25%, about 20%, about 15%, or event about 10%) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the glass container with the heat-tolerant coating may not increase by more than about 0.5 (i.e., about 0.45, about 0.04, about 0.35, about 0.3, about 0.25, about 0.2, about 0.15, about 0.1, or event about 0.5) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the glass container with the heat-tolerant coating may not increase at all after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the glass container with the heat-tolerant coating may have a coefficient of friction of less than or equal to about 0.7 after being submerged in a water bath at a temperature of about 70° C. for 10 minutes. In other embodiments, the portion of the glass container with the heat-tolerant coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the glass container with the heat-tolerant coating may not increase by more than about 30% after being submerged in a water bath at a temperature of about 70° C. for 10 minutes. In other embodiments, coefficient of friction of the portion of the glass container with the heat-tolerant coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the glass container with the heat-tolerant coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the glass container with the heat-tolerant coating may have a coefficient of friction of less than or equal to about 0.7 after exposure to lyophilization conditions. In other embodiments, the portion of the glass container with the heat-tolerant coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the glass container with the heat-tolerant coating may not increase by more than about 30% after exposure to lyophilization conditions. In other embodiments, coefficient of friction of the portion of the glass container with the heat-tolerant coating may not increase by more than about 30% (i.e., about 25%, about 20%, about 15%, or event about 10%) after exposure to lyophilization conditions. In some embodiments, the coefficient of friction of the portion of the glass container with the heat-tolerant coating may not increase at all after exposure to lyophilization conditions.

In some embodiments, the portion of the glass container with the heat-tolerant coating may have a coefficient of friction of less than or equal to about 0.7 after exposure to autoclave conditions. In other embodiments, the portion of the glass container with the heat-tolerant coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the glass container with the heat-tolerant coating may not increase by more than about 30% after exposure to autoclave conditions. In other embodiments, coefficient of friction of the portion of the glass container with the heat-tolerant coating may not increase by more than about 30% (i.e., about 25%, about 20%, about 15%, or event about 10%) after exposure to autoclave conditions. In some embodiments, the coefficient of friction of the portion of the coated glass container with the heat-tolerant coating may not increase at all after exposure to autoclave conditions.

The glass containers described herein have a horizontal compression strength. Referring to FIG. 1, the horizontal compression strength, as described herein, is measured by positioning the glass container 100 horizontally between two parallel platens which are oriented in parallel to the long axis of the glass container. A mechanical load is then applied to the glass container 100 with the platens in the direction perpendicular to the long axis of the glass container. The load rate for vial compression is 0.5 in/min, meaning that the platens move towards each other at a rate of 0.5 in/min. The horizontal compression strength is measured at 25° C. and 50% relative humidity. A measurement of the horizontal compression strength can be given as a failure probability at a selected normal compression load. As used herein, failure occurs when the glass container ruptures under a horizontal compression in least 50% of samples. In some embodiments, a coated glass container may have a horizontal compression strength at least 10%, 20%, or 30% greater than an uncoated vial.

Referring now to FIGS. 1 and 11, the horizontal compression strength measurement may also be performed on an abraded glass container. Specifically, operation of the testing jig 200 may create damage on the outer surface 122 of the coated glass container, such as a surface scratch or abrasion that weakens the strength of the coated glass container 100. The glass container is then subjected to the horizontal compression procedure described above, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N.

The coated glass containers can be evaluated for horizontal compression strength following a heat treatment. The heat treatment may be exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded, as described above. In one embodiment, the horizontal compression strength of the coated glass container is not reduced by more than about 20% after being exposed to a heat treatment of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

The coated glass containers described herein may be thermally stable after heating to a temperature of at least 260° C. for a time period of 30 minutes. The phrase "thermally stable," as used herein, means that the heat-tolerant coating applied to the glass container remains substantially intact on the surface of the glass container after exposure to the elevated temperatures such that, after exposure, the mechanical properties of the coated glass container, specifically the coefficient of friction and the horizontal compression strength, are only minimally affected, if at all. This indicates that the heat-tolerant coating remains adhered to the surface of the glass following elevated temperature exposure and continues to protect the glass container from mechanical insults such as abrasions, impacts and the like.

In the embodiments described herein, a coated glass container is considered to be thermally stable if the coated glass article meets both a coefficient of friction standard and a horizontal compression strength standard after heating to the specified temperature and remaining at that temperature for the specified time. To determine if the coefficient of friction standard is met, the coefficient of friction of a first coated glass container is determined in as-received condition (i.e., prior to any thermal exposure) using the testing jig depicted in FIG. 11 and a 30 N applied load. A second coated glass container (i.e., a glass container having the same glass composition and the same coating composition as the first coated glass container) is thermally exposed under the prescribed conditions and cooled to room temperature. Thereafter, the coefficient of friction of the second glass container is determined using the testing jig depicted in FIG. 11 to abrade the coated glass container with a 30 N applied load resulting in an abraded area (i.e., a "scratch") having a length of approximately 20 mm. If the coefficient of friction of the second coated glass container is less than 0.7 and the surface of the glass of the second glass container in the abraded area does not have any observable damage, then the coefficient of friction standard is met for purposes of determining the thermal stability of the heat-tolerant coating. The term "observable damage," as used herein means that the surface of the glass in the abraded area of the glass container contains less than six glass checks per 0.5 cm of length of the abraded area when observed with a Nomarski or differential interference contrast (DIC) spectroscopy microscope at a magnification of 100× with LED or halogen light sources. A standard definition of a glass check or glass checking is described in G. D. Quinn, "NIST Recommended Practice Guide: Fractography of Ceramics and Glasses," NIST special publication 960-17 (2006).

To determine if the horizontal compression strength standard is met, a first coated glass container is abraded in the testing jig depicted in FIG. 11 under a 30 N load to form a 20 mm scratch. The first coated glass container is then subjected to a horizontal compression test, as described herein, and the retained strength of the first coated glass container is determined. A second coated glass container (i.e., a glass container having the same glass composition and the same coating composition as the first coated glass container) is thermally exposed under the prescribed conditions and cooled to room temperature. Thereafter, the second coated glass container is abraded in the testing jig depicted in FIG. 11 under a 30 N load. The second coated glass container is then subjected to a horizontal compression test, as described herein, and the retained strength of the second coated glass container is determined. If the retained strength of the second coated glass container does not decrease by more than about 20% relative to the first coated glass container then the horizontal compression strength standard is met for purposes of determining the thermal stability of the heat-tolerant coating.

In the embodiments described herein, the coated glass containers are considered to be thermally stable if the coefficient of friction standard and the horizontal compression strength standard are met after exposing the coated glass containers to a temperature of at least about 260° C. for a time period of about 30 minutes (i.e., the coated glass containers are thermally stable at a temperature of at least about 260° C. for a time period of about 30 minutes). The thermal stability may also be assessed at temperatures from about 260° C. up to about 400° C. For example, in some embodiments, the coated glass containers will be considered to be thermally stable if the standards are met at a temperature of at least about 270° C. or even about 280° C. for a time period of about 30 minutes. In still other embodiments, the coated glass containers will be considered to be thermally stable if the standards are met at a temperature of at least about 290° C. or even about 300° C. for a time period of about 30 minutes. In further embodiments, the coated glass containers will be considered to be thermally stable if the standards are met at a temperature of at least about 310° C. or even about 320° C. for a time period of about 30 minutes. In still other embodiments, the coated glass containers will be considered to be thermally stable if the standards are met at a temperature of at least about 330° C. or even about 340° C. for a time period of about 30 minutes. In yet other embodiments, the coated glass containers will be considered to be thermally stable if the standards are met at a temperature of at least about 350° C. or even about 360° C. for a time period of about 30 minutes. In some other embodiments, the coated glass containers will be considered to be thermally stable if the standards are met at a temperature of at least about 370° C. or even about 380° C. for a time period of about 30 minutes. In still other embodiments, the coated glass containers will be considered to be thermally stable if the standards are met at a temperature of at least about 390° C. or even about 400° C. for a time period of about 30 minutes.

The coated glass containers disclosed herein may also be thermally stable over a range of temperatures, meaning that the coated glass containers are thermally stable by meeting the coefficient of friction standard and horizontal compression strength standard at each temperature in the range. For example, in the embodiments described herein, the coated glass containers may be thermally stable from at least about 260° C. to a temperature of less than or equal to about 400° C. In some embodiments, the coated glass containers may be thermally stable in a range from at least about 260° C. to about 350° C. In some other embodiments, the coated glass containers may be thermally stable from at least about 280° C. to a temperature of less than or equal to about 350° C. In still other embodiments, the coated glass containers may be thermally stable from at least about 290° C. to about 340° C. In another embodiment, the coated glass container may be thermally stable at a range of temperatures of about 300° C. to about 380° C. In another embodiment, the coated glass container may be thermally stable at a range of temperatures from about 320° C. to about 360° C.

The coated glass containers described herein have a four point bend strength. To measure the four point bend strength of a glass container, a glass tube that is the precursor to the coated glass container 100 is utilized for the measurement. The glass tube has a diameter that is the same as the glass container but does not include a glass container base or a glass container mouth (i.e., prior to forming the tube into a glass container). The glass tube is then subjected to a four point bend stress test to induce mechanical failure. The test is performed at 50% relative humidity with outer contact members spaced apart by 9" and inner contact members spaced apart by 3" at a loading rate of 10 mm/min.

The four point bend stress measurement may also be performed on a coated and abraded tube. Operation of the testing jig 200 may create an abrasion on the tube surface such as a surface scratch that weakens the strength of the tube, as described in the measurement of the horizontal compression strength of an abraded vial. The glass tube is then subjected to a four point bend stress test to induce mechanical failure. The test is performed at 25° C. and at 50% relative humidity using outer probes spaced apart by 9" and inner contact members spaced apart by 3" at a loading rate of 10 mm/min, while the tube is positioned such that the scratch is put under tension during the test.

In some embodiments, the four point bend strength of a glass tube with a heat-tolerant coating after abrasion shows on average at least 10%, 20%, or even 50% higher mechanical strength than that for an uncoated glass tube abraded under the same conditions.

In some embodiments, after the coated glass container 100 is abraded by an identical glass container with a 30 N normal force, the coefficient of friction of the abraded area of the coated glass container 100 does not increase by more than about 20% following another abrasion by an identical glass container with a 30 N normal force at the same spot, or does not increase at all. In other embodiments, after the coated glass container 100 is abraded by an identical glass container with a 30 N normal force, the coefficient of friction of the abraded area of the coated glass container 100 does not increase by more than about 15% or even 10% following another abrasion by an identical glass container with a 30 N normal force at the same spot, or does not increase at all. However, it is not necessary that all embodiments of the coated glass container 100 display such properties.

Mass loss refers to a measurable property of the coated glass container 100 which relates to the amount of volatiles liberated from the coated glass container 100 when the coated glass container is exposed to a selected elevated temperature for a selected period of time. Mass loss is generally indicative of the mechanical degradation of the coating due to thermal exposure. Since the glass body of the coated glass container does not exhibit measureable mass loss at the temperatures reported, the mass loss test, as described in detail herein, yields mass loss data for only the heat-tolerant coating that is applied to the glass container. Multiple factors may affect mass loss. For example, the amount of organic material that can be removed from the coating may affect mass loss. The breakdown of carbon backbones and side chains in a polymer will result in a theoretical 100% removal of the coating. Organometallic polymer materials typically lose their entire organic component, but the inorganic component remains behind. Thus, mass loss results are normalized based upon how much of the coating is organic and inorganic (e.g., % silica of the coating) upon complete theoretical oxidation.

To determine the mass loss, a coated sample, such as a coated glass vial, is initially heated to 150° C. and held at this temperature for 30 minutes to dry the coating, effectively driving off $H_2O$ from the coating. The sample is then heated from 150° C. to 350° C. at a ramp rate of 10° C./min in an oxidizing environment, such as air. For purposes of mass loss determination, only the data collected from 150° C. to 350° C. is considered. In some embodiments, the heat-tolerant coating has a mass loss of less than about 5% of its mass when heated from a temperature of 150° C. to 350° C. at a ramp rate of about 10° C./minute. In other embodiments, the heat-tolerant coating has a mass loss of less than about 3% or even less than about 2% when heated from a temperature of 150° C. to 350° C. at a ramp rate of about 10° C./minute. In some other embodiments, the heat-tolerant coating has a mass loss of less than about 1.5% when heated from a temperature of 150° C. to 350° C. at a ramp rate of about 10° C./minute. In some other embodiments, the heat-tolerant coating loses substantially none of its mass when heated from a temperature of 150° C. to 350° C. at a ramp rate of about 10° C./minute.

Mass loss results are based on a procedure wherein the weight of a coated glass container is compared before and after a heat treatment, such as a ramping temperature of 10°/minute from 150° C. to 350° C., as described herein. The difference in weight between the pre-heat treatment and post-heat treatment vial is the weight loss of the coating, which can be standardized as a percent weight loss of the coating such that the pre-heat treatment weight of the coating (weight not including the glass body of the container and following the preliminary heating step) is known by comparing the weight on an uncoated glass container with a pre-treatment coated glass container. Alternatively, the total mass of coating may be determined by a total organic carbon test or other like means.

Figure 12:
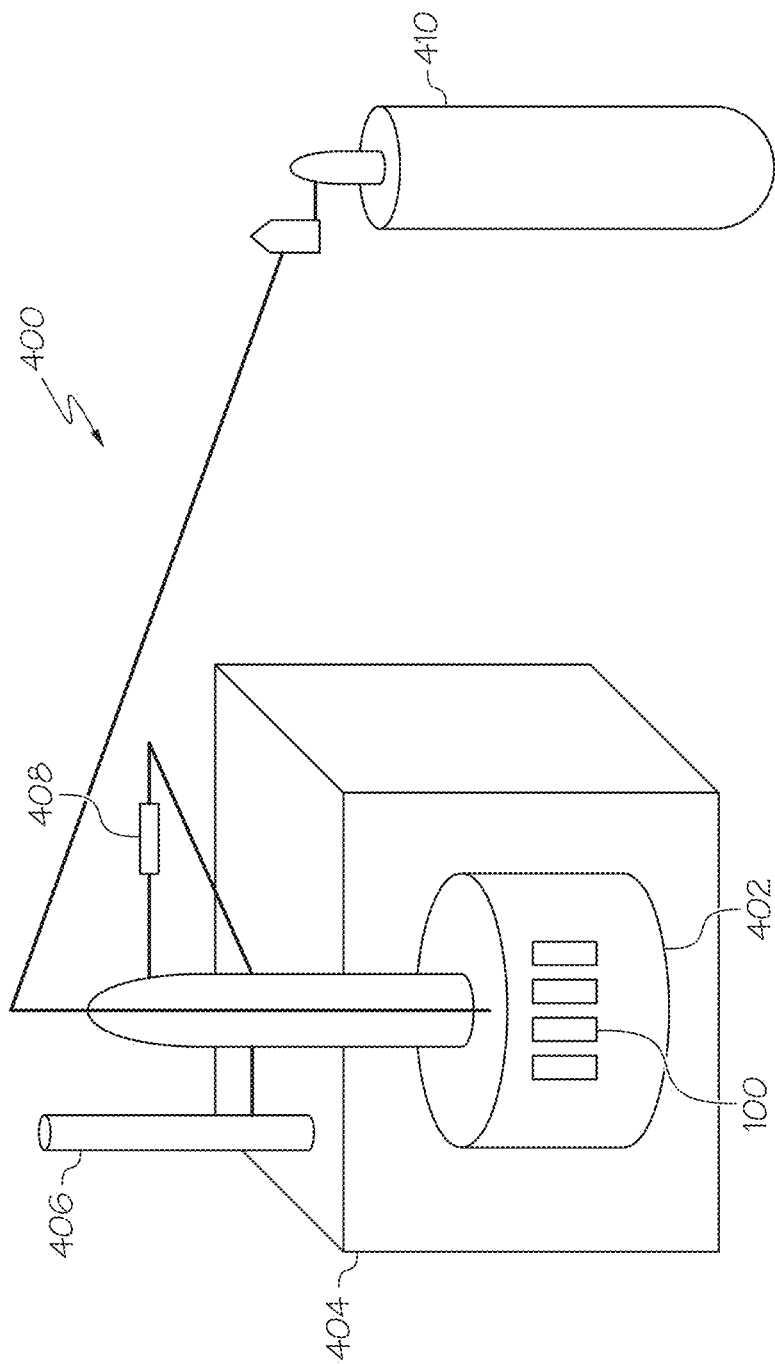
FIG. 12 schematically depicts an apparatus for testing the mass loss of a glass container, according to one or more embodiments shown and described herein.

Outgassing refers to a measurable property of the coated glass container 100 which relates to the amount of volatiles liberated from the coated glass container 100 when the coated glass container is exposed to a selected elevated temperature for a selected period of time. Outgassing measurements are reported herein as an amount by weight of volatiles liberated per the surface area of the glass container having the coating during exposure to the elevated temperature for a time period. Since the glass body of the coated glass container does not exhibit measureable outgassing at the temperatures reported for outgassing, the outgassing test, as described in detail above, yields outgassing data for substantially only the low-friction coating that is applied to the glass container. Outgassing results are based on a procedure wherein a coated glass container 100 is placed in a glass sample chamber 402 of the apparatus 400 depicted in FIG. 12. A background sample of the empty sample chamber is collected prior to each sample run. The sample chamber is held under a constant 100 ml/min air purge as measured by rotometer 406 while the furnace 404 is heated to 350° C. and held at that temperature for 1 hour to collect the chamber background sample. Thereafter, the coated glass container 100 is positioned in the sample chamber 402 and the sample chamber is held under a constant 100 ml/min air purge and heated to an elevated temperature and held at temperature for a period of time to collect a sample from a coated glass container 100. The glass sample chamber 402 is made of Pyrex, limiting the maximum temperature of the analysis to 600° C. A Carbotrap 300 adsorbent trap 408 is assembled on the exhaust port of the sample chamber to adsorb the resulting volatile species as they are released from the sample and are swept over the absorbent resin by the air purge gas 410 where the volatile species are adsorbed. The absorbent resin is then placed directly into a Gerstel Thermal Desorption unit coupled directly to a Hewlett Packard 5890 Series II gas chromatograph/Hewlett Packard 5989 MS engine. Outgassing species are thermally desorbed at 350° C. from the adsorbent resin and cryogenically focused at the head of a non-polar gas chromatographic column (DB-5MS). The temperature within the gas chromatograph is increased at a rate of 10° C./min to a final temperature of 325° C., so as to provide for the separation and purification of volatile and semi-volatile organic species. The mechanism of separation has been demonstrated to be based on the heats of vaporization of different organic species resulting in, essentially, a boiling point or distillation chromatogram. Following separation, purified species are analyzed by traditional electron impact ionization mass spectrometric protocols. By operating under standardized conditions, the resulting mass spectra may be compared with existing mass spectral libraries.

In some embodiments, the coated glass containers described herein exhibit an outgassing of less than or equal to about 54.6 ng/cm$^2$, less than or equal to about 27.3 ng/cm$^2$, or even less than or equal to about 5.5 ng/cm$^2$ during exposure to elevated temperature of about, 250° C., about 275° C., about 300° C., about 320° C., about 360° C., or even about 400° C. for time periods of about 15 minutes, about 30 minutes, about 45 minutes, or about 1 hour. Furthermore, the coated glass containers may be thermally stable in a specified range of temperatures, meaning that the coated containers exhibit a certain outgassing, as described above, at every temperature within the specified range. Prior to outgassing measurements, the coated glass containers may be in as-coated condition (i.e., immediately following application of the heat-tolerant coating) or following any one of depyrogenation, lyophilization, or autoclaving. In some embodiments, the coated glass container 100 may exhibit substantially no outgassing.

In some embodiments, outgassing data may be used to determine mass loss of the heat-tolerant coating. A pre-heat treatment coating mass can be determined by the thickness of the coating (determined by SEM image or other manner), the density of heat-tolerant coating, and the surface area of the coating. Thereafter, the coated glass container can be subjected to the outgassing procedure, and mass loss can be determined by finding the ratio of the mass expelled in outgassing to the pre-heat treatment mass.

Figure 13:
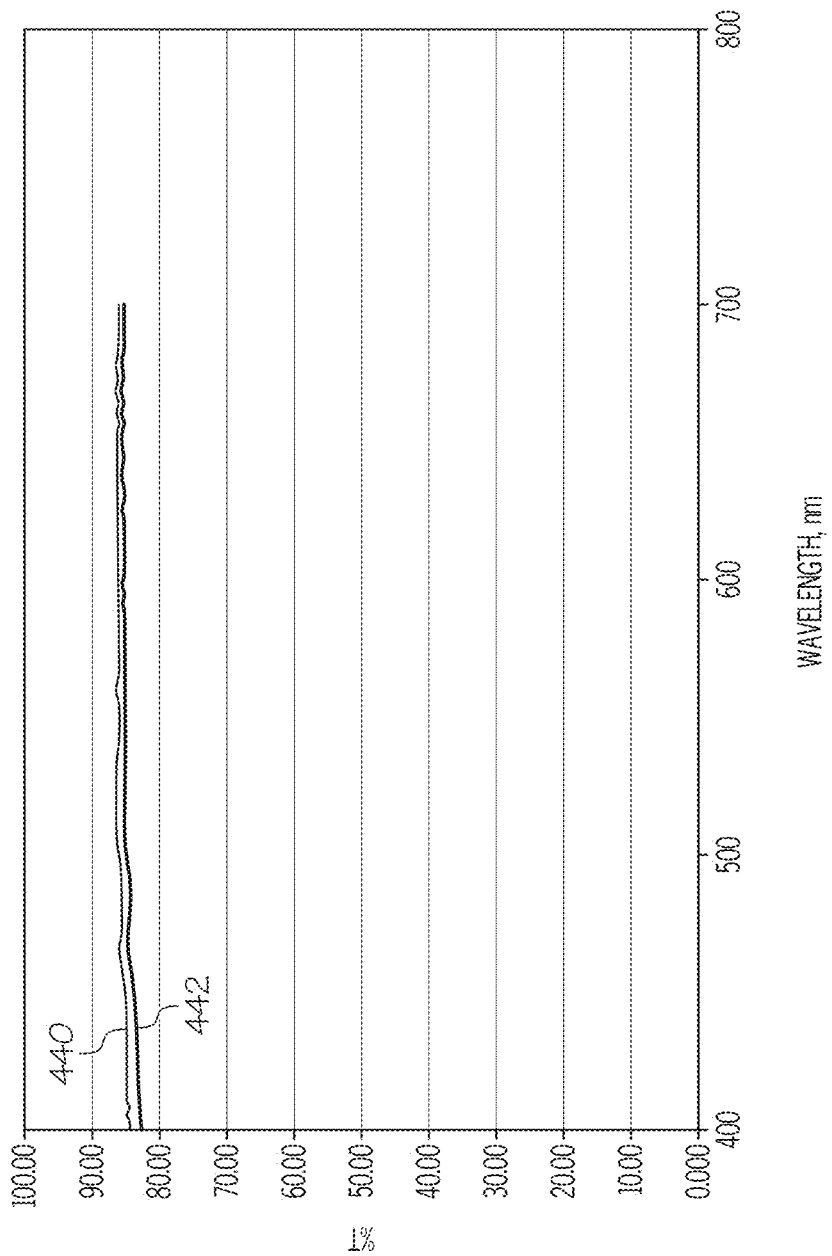
FIG. 13 graphically depicts the light transmittance data for coated and uncoated vials measured in the visible light spectrum from 400-700 nm, according to one or more embodiments shown and described herein.

Referring to FIG. 13, the transparency and color of the coated container may be assessed by measuring the light transmission of the container within a range of wavelengths between 400-700 nm using a spectrophotometer. The measurements are performed such that a light beam is directed normal to the container wall such that the beam passes through the heat-tolerant coating twice, first when entering the container and then when exiting it. In some embodiments, the light transmission through the coated glass container may be greater than or equal to about 55% of a light transmission through an uncoated glass container for wavelengths from about 400 nm to about 700 nm. As described herein, a light transmission can be measured before a thermal treatment or after a thermal treatment, such as the heat treatments described herein. For example, for each wavelength of from about 400 nm to about 700 nm, the light transmission may be greater than or equal to about 55% of a light transmission through an uncoated glass container. In other embodiments, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

As described herein, a light transmission can be measured before an environmental treatment, such as a thermal treatment described herein, or after an environmental treatment. For example, following a heat treatment of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, or after exposure to lyophilization conditions, or after exposure to autoclave conditions, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

In some embodiments, the coated glass container 100 may be perceived as colorless and transparent to the naked human eye when viewed at any angle. In some other embodiments, the heat-tolerant coating 120 may have a perceptible tint, such as when the heat-tolerant coating 120 comprises a polyimide formed from poly(pyromellitic dianhydride-co-4,4'-oxydianiline) amic acid commercially available from Aldrich.

In some embodiments, the coated glass container 100 may have a heat-tolerant coating 120 that is capable of receiving an adhesive label. That is, the coated glass container 100 may receive an adhesive label on the coated surface such that the adhesive label is securely attached. However, the ability of attachment of an adhesive label is not a requirement for all embodiments of the coated glass containers 100 described herein.

EXAMPLES

The embodiments of the glass containers described herein will be further clarified by the following examples.

Example 1

Six exemplary inventive glass compositions (compositions A-F) were prepared. The specific compositions of each exemplary glass composition are reported below in Table 2. Multiple samples of each exemplary glass composition were produced. One set of samples of each composition was ion exchanged in a molten salt bath of 100% KNO$_3$ at a temperature of 450° C. for at least 5 hours to induce a compressive layer in the surface of the sample. The compressive layer had a surface compressive stress of at least 500 MPa and a depth of layer of at least 45 μm.

The chemical durability of each exemplary glass composition was then determined utilizing the DIN 12116 standard, the ISO 695 standard, and the ISO 720 standard described above. Specifically, non-ion exchanged test samples of each exemplary glass composition were subjected to testing according to one of the DIN 12116 standard, the ISO 695 standard, or the ISO 720 standard to determine the acid resistance, the base resistance or the hydrolytic resistance of the test sample, respectively. The hydrolytic resistance of the ion exchanged samples of each exemplary composition was determined according to the ISO 720 standard. To determine the hydrolytic resistance of the ion exchanged samples, the glass was crushed to the grain size required in the ISO 720 standard, ion exchanged ion exchanged in a molten salt bath of 100% KNO$_3$ at a temperature of 450° C. for at least 5 hours to induce a compressive stress layer in the individual grains of glass, and then tested according to the ISO 720 standard. The average results of all samples tested are reported below in Table 2.

As shown in Table 2, exemplary glass compositions A-F all demonstrated a glass mass loss of less than 5 mg/dm$^2$ and greater than 1 mg/dm$^2$ following testing according to the DIN 12116 standard with exemplary glass composition E having the lowest glass mass loss at 1.2 mg/dm$^2$. Accordingly, each of the exemplary glass compositions were classified in at least class S3 of the DIN 12116 standard, with exemplary glass composition E classified in class S2. Based on these test results, it is believed that the acid resistance of the glass samples improves with increased SiO$_2$ content.

Further, exemplary glass compositions A-F all demonstrated a glass mass loss of less than 80 mg/dm$^2$ following testing according to the ISO 695 standard with exemplary glass composition A having the lowest glass mass loss at 60 mg/dm$^2$. Accordingly, each of the exemplary glass compositions were classified in at least class A2 of the ISO 695 standard, with exemplary glass compositions A, B, D and F classified in class A1. In general, compositions with higher silica content exhibited lower base resistance and compositions with higher alkali/alkaline earth content exhibited greater base resistance.

Table 2 also shows that the non-ion exchanged test samples of exemplary glass compositions A-F all demonstrated a hydrolytic resistance of at least Type HGA2 following testing according to the ISO 720 standard with exemplary glass compositions C-F having a hydrolytic resistance of Type HGA1. The hydrolytic resistance of exemplary glass compositions C-F is believed to be due to higher amounts of SiO$_2$ and the lower amounts of Na$_2$O in the glass compositions relative to exemplary glass compositions A and B.

Moreover, the ion exchanged test samples of exemplary glass compositions B-F demonstrated lower amounts of extracted Na$_2$O per gram of glass than the non-ion exchanged test samples of the same exemplary glass compositions following testing according to the ISO 720 standard.

Example 2

Three exemplary inventive glass compositions (compositions G-I) and three comparative glass compositions (compositions 1-3) were prepared. The ratio of alkali oxides to alumina (i.e., Y:X) was varied in each of the compositions in order to assess the effect of this ratio on various properties of the resultant glass melt and glass. The specific compositions of each of the exemplary inventive glass compositions and the comparative glass compositions are reported in Table 3. The strain point, anneal point, and softening point of melts formed from each of the glass compositions were determined and are reported in Table 3. In addition, the coefficient of thermal expansion (CTE), density, and stress optic coefficient (SOC) of the resultant glasses were also determined and are reported in Table 3. The hydrolytic resistance of glass samples formed from each exemplary inventive glass composition and each comparative glass composition was determined according to the ISO 720 Standard both before ion exchange and after ion exchange in a molten salt bath of 100% KNO$_3$ at 450° C. for 5 hours. For those samples that were ion exchanged, the compressive stress was determined with a fundamental stress meter (FSM) instrument, with the compressive stress value based on the measured stress optical coefficient (SOC). The FSM instrument couples light into and out of the birefringent glass surface. The measured birefringence is then related to stress through a material constant, the stress-optic or photoelastic coefficient (SOC or PEC) and two parameters are obtained: the maximum surface compressive stress (CS) and the exchanged depth of layer (DOL). The diffusivity of the alkali ions in the glass and the change in stress per square root of time were also determined. The diffusivity (D) of the glass is calculated from the measured depth of layer (DOL) and the ion exchange time (t) according to the relationship: DOL=~1.4*sqrt(4*D*t). Diffusivity increases with temperature according to an Arrhenius relationship, and, as such, it is reported at a specific temperature.

TABLE 2

Composition and Properties of Exemplary Glass Compositions

| | Composition in mole % | | | | | |
|---|---|---|---|---|---|---|
| | A | B | C | D | E | F |
| SiO$_2$ | 70.8 | 72.8 | 74.8 | 76.8 | 76.8 | 77.4 |
| Al$_2$O$_3$ | 7.5 | 7 | 6.5 | 6 | 6 | 7 |
| Na$_2$O | 13.7 | 12.7 | 11.7 | 10.7 | 11.6 | 10 |
| K$_2$O | 1 | 1 | 1 | 1 | 0.1 | 0.1 |
| MgO | 6.3 | 5.8 | 5.3 | 4.8 | 4.8 | 4.8 |
| CaO | 0.5 | 0.5 | 0.5 | 0.5 | 0.5 | 0.5 |
| SnO$_2$ | 0.2 | 0.2 | 0.2 | 0.2 | 0.2 | 0.2 |
| DIN 12116 (mg/dm$^2$) | 3.2 | 2.0 | 1.7 | 1.6 | 1.2 | 1.7 |
| classification | S3 | S3 | S3 | S3 | S2 | S3 |
| ISO 695 (mg/dm$^2$) | 60.7 | 65.4 | 77.9 | 71.5 | 76.5 | 62.4 |
| classification | A1 | A1 | A2 | A1 | A2 | A1 |
| ISO 720 (µg Na$_2$O/g glass) | 100.7 | 87.0 | 54.8 | 57.5 | 50.7 | 37.7 |
| classification | HGA2 | HGA2 | HGA1 | HGA1 | HGA1 | HGA1 |
| ISO 720 (with IX) (µg Na$_2$O/g glass) | 60.3 | 51.9 | 39.0 | 30.1 | 32.9 | 23.3 |
| classification | HGA1 | HGA1 | HGA1 | HGA1 | HGA1 | HGA1 |

TABLE 3

Glass properties as a function of alkali to alumina ratio
Composition Mole %

|  | G | H | I | 1 | 2 | 3 |
|---|---|---|---|---|---|---|
| $SiO_2$ | 76.965 | 76.852 | 76.962 | 76.919 | 76.960 | 77.156 |
| $Al_2O_3$ | 5.943 | 6.974 | 7.958 | 8.950 | 4.977 | 3.997 |
| $Na_2O$ | 11.427 | 10.473 | 9.451 | 8.468 | 12.393 | 13.277 |
| $K_2O$ | 0.101 | 0.100 | 0.102 | 0.105 | 0.100 | 0.100 |
| MgO | 4.842 | 4.878 | 4.802 | 4.836 | 4.852 | 4.757 |
| CaO | 0.474 | 0.478 | 0.481 | 0.480 | 0.468 | 0.462 |
| $SnO_2$ | 0.198 | 0.195 | 0.197 | 0.197 | 0.196 | 0.196 |
| Strain (° C.) | 578 | 616 | 654 | 683 | 548 | 518 |
| Anneal (° C.) | 633 | 674 | 716 | 745 | 600 | 567 |
| Softening (° C.) | 892 | 946 | 1003 | 1042 | 846 | 798 |
| Expansion ($10^{-7}$ $K^{-1}$) | 67.3 | 64.3 | 59.3 | 55.1 | 71.8 | 74.6 |
| Density (g/cm$^3$) | 2.388 | 2.384 | 2.381 | 2.382 | 2.392 | 2.396 |
| SOC (nm/mm/Mpa) | 3.127 | 3.181 | 3.195 | 3.232 | 3.066 | 3.038 |
| ISO720 (non-IX) | 88.4 | 60.9 | 47.3 | 38.4 | 117.1 | 208.1 |
| ISO720 (IX450° C. - 5 hr) | 25.3 | 26 | 20.5 | 17.8 | 57.5 | 102.5 |
| $R_2O/Al_2O_3$ | 1.940 | 1.516 | 1.200 | 0.958 | 2.510 | 3.347 |
| CS@t = 0 (MPa) | 708 | 743 | 738 | 655 | 623 | 502 |
| CS/√t (MPa/hr$^{1/2}$) | −35 | −24 | −14 | −7 | −44 | −37 |
| D (μm$^2$/hr) | 52.0 | 53.2 | 50.3 | 45.1 | 51.1 | 52.4 |

Figure 14:
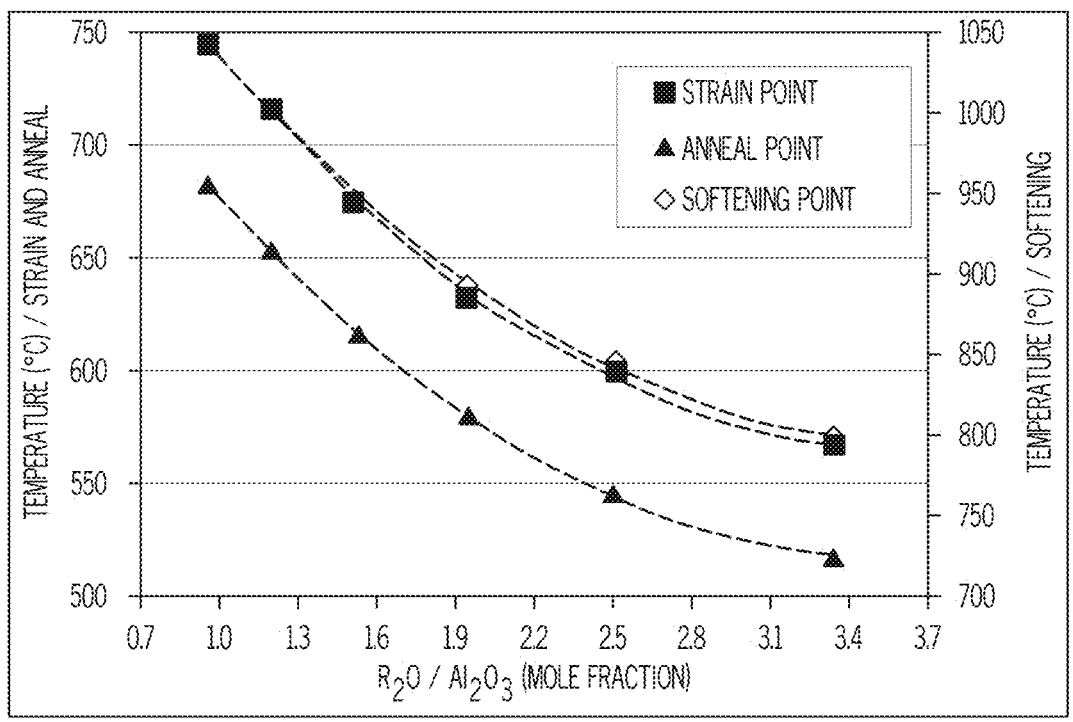
FIG. 14 graphically depicts the relationship between the ratio of alkali oxides to alumina (x-axis) and the strain point, annealing point, and softening point (y-axes) of inventive and comparative glass compositions.

The data in Table 3 indicates that the alkali to alumina ratio Y:X influences the melting behavior, hydrolytic resistance, and the compressive stress obtainable through ion exchange strengthening. In particular, FIG. 14 graphically depicts the strain point, anneal point, and softening point as a function of Y:X ratio for the glass compositions of Table 3. FIG. 14 demonstrates that, as the ratio of Y:X decreases below 0.9, the strain point, anneal point, and softening point of the glass rapidly increase. Accordingly, to obtain a glass which is readily meltable and formable, the ratio Y:X should be greater than or equal to 0.9 or even greater than or equal to 1.

Further, the data in Table 3 indicates that the diffusivity of the glass compositions generally decreases with the ratio of Y:X. Accordingly, to achieve glasses that can be rapidly ion exchanged in order to reduce process times (and costs) the ratio of Y:X should be greater than or equal to 0.9 or even greater than or equal to 1.

Figure 15:
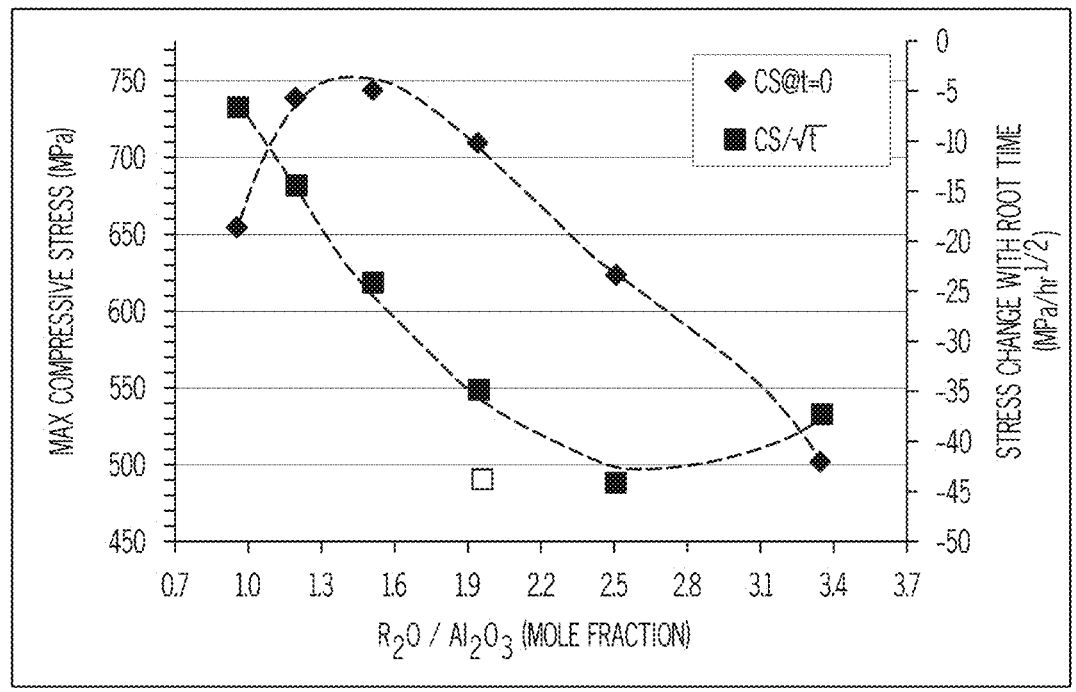
FIG. 15 graphically depicts the relationship between the ratio of alkali oxides to alumina (x-axis) and the maximum compressive stress and stress change (y-axes) of inventive and comparative glass compositions.

Moreover, FIG. 15 indicates that for a given ion exchange time and ion exchange temperature, the maximum compressive stresses are obtained when the ratio of Y:X is greater than or equal to about 0.9, or even greater than or equal to about 1, and less than or equal to about 2, specifically greater than or equal to about 1.3 and less than or equal to about 2.0. Accordingly, the maximum improvement in the load bearing strength of the glass can be obtained when the ratio of Y:X is greater than about 1 and less than or equal to about 2. It is generally understood that the maximum stress achievable by ion exchange will decay with increasing ion-exchange duration as indicated by the stress change rate (i.e., the measured compressive stress divided by the square root of the ion exchange time). FIG. 15 generally shows that the stress change rate decreases as the ratio Y:X decreases.

Figure 16:
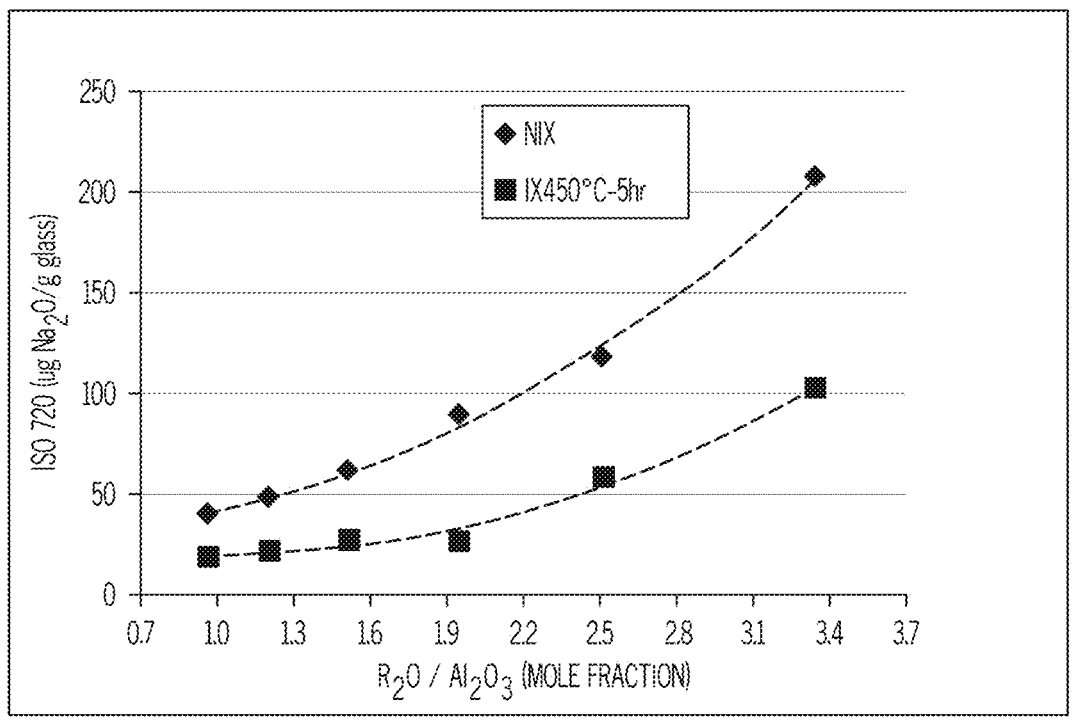
FIG. 16 graphically depicts the relationship between the ratio of alkali oxides to alumina (x-axis) and hydrolytic resistance as determined from the ISO 720 standard (y-axis) of inventive and comparative glass compositions.

FIG. 16 graphically depicts the hydrolytic resistance (y-axis) as a function of the ratio Y:X (x-axis). As shown in FIG. 16, the hydrolytic resistance of the glasses generally improves as the ratio Y:X decreases.

Based on the foregoing it should be understood that glasses with good melt behavior, superior ion exchange performance, and superior hydrolytic resistance can be achieved by maintaining the ratio Y:X in the glass from greater than or equal to about 0.9, or even greater than or equal to about 1, and less than or equal to about 2.

Example 3

Three exemplary inventive glass compositions (compositions J-L) and three comparative glass compositions (compositions 4-6) were prepared. The concentration of MgO and CaO in the glass compositions was varied to produce both MgO-rich compositions (i.e., compositions J-L and 4) and CaO-rich compositions (i.e., compositions 5-6). The relative amounts of MgO and CaO were also varied such that the glass compositions had different values for the ratio (CaO/(CaO+MgO)). The specific compositions of each of the exemplary inventive glass compositions and the comparative glass compositions are reported below in Table 4. The properties of each composition were determined as described above with respect to Example 2.

TABLE 4

Glass properties as function of CaO content
Composition Mole %

|  | J | K | L | 4 | 5 | 6 |
|---|---|---|---|---|---|---|
| $SiO_2$ | 76.99 | 77.10 | 77.10 | 77.01 | 76.97 | 77.12 |
| $Al_2O_3$ | 5.98 | 5.97 | 5.96 | 5.96 | 5.97 | 5.98 |
| $Na_2O$ | 11.38 | 11.33 | 11.37 | 11.38 | 11.40 | 11.34 |
| $K_2O$ | 0.10 | 0.10 | 0.10 | 0.10 | 0.10 | 0.10 |
| MgO | 5.23 | 4.79 | 3.78 | 2.83 | 1.84 | 0.09 |
| CaO | 0.07 | 0.45 | 1.45 | 2.46 | 3.47 | 5.12 |
| $SnO_2$ | 0.20 | 0.19 | 0.19 | 0.19 | 0.19 | 0.19 |
| Strain (° C.) | 585 | 579 | 568 | 562 | 566 | 561 |
| Anneal (° C.) | 641 | 634 | 620 | 612 | 611 | 610 |

TABLE 4-continued

Glass properties as function of CaO content
Composition Mole %

|  | J | K | L | 4 | 5 | 6 |
|---|---|---|---|---|---|---|
| Softening (° C.) | 902 | 895 | 872 | 859 | 847 | 834 |
| Expansion ($10^{-7}$ $K^{-1}$) | 67.9 | 67.1 | 68.1 | 68.8 | 69.4 | 70.1 |
| Density (g/cm$^3$) | 2.384 | 2.387 | 2.394 | 2.402 | 2.41 | 2.42 |
| SOC nm/mm/Mpa | 3.12 | 3.08 | 3.04 | 3.06 | 3.04 | 3.01 |
| ISO720 (non-IX) | 83.2 | 83.9 | 86 | 86 | 88.7 | 96.9 |
| ISO720 (IX450° C. - 5 hr) | 29.1 |  | 28.4 | 33.2 | 37.3 | 40.1 |
| Fraction of RO as CaO | 0.014 | 0.086 | 0.277 | 0.465 | 0.654 | 0.982 |
| CS@t = 0 (MPa) | 707 | 717 | 713 | 689 | 693 | 676 |
| CS/√t (MPa/hr$^{1/2}$) | −36 | −37 | −39 | −38 | −43 | −44 |
| D (μm$^2$/hr) | 57.2 | 50.8 | 40.2 | 31.4 | 26.4 | 20.7 |

Figure 17:
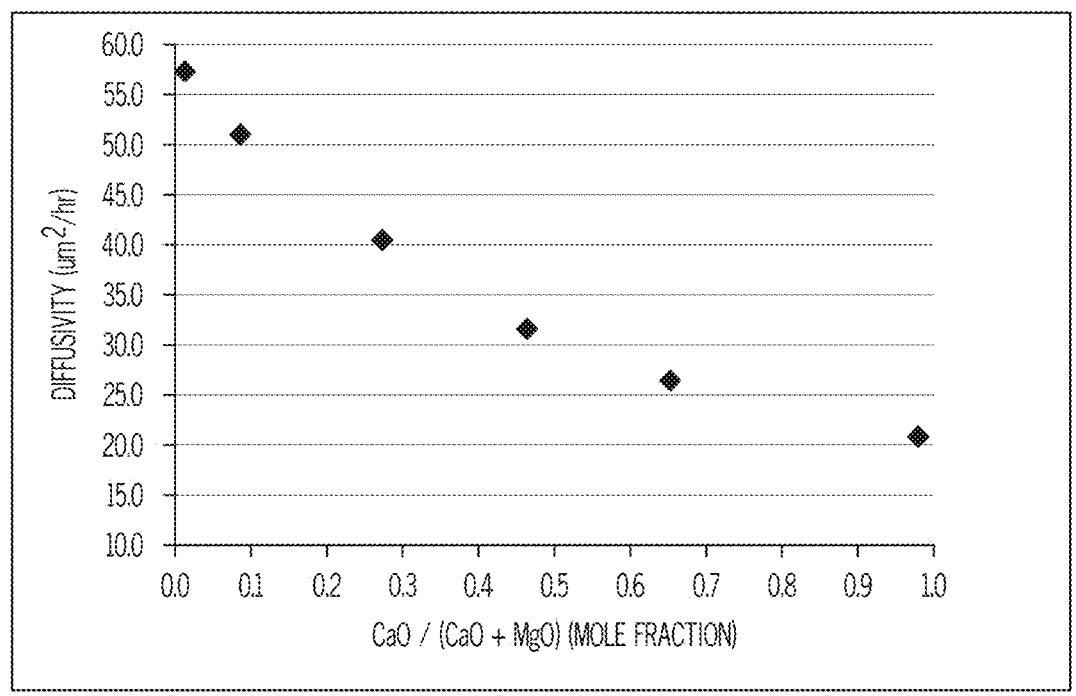
FIG. 17 graphically depicts diffusivity D (y-axis) as a function of the ratio (CaO/(CaO+MgO)) (x-axis) for inventive and comparative glass compositions.
Figure 18:
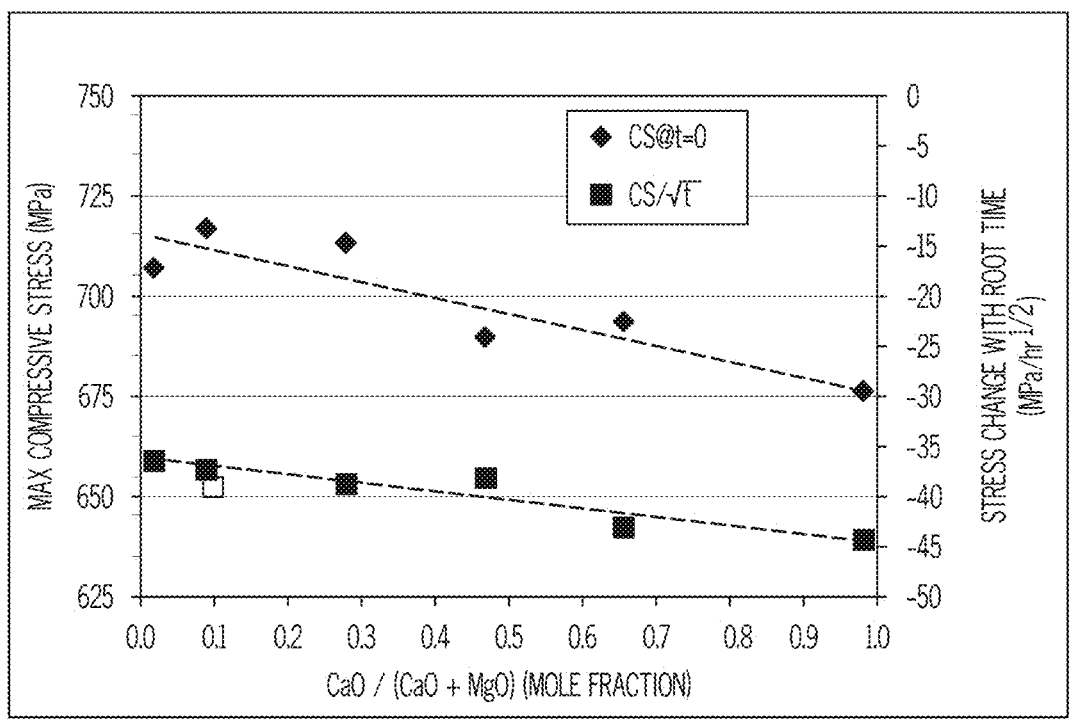
FIG. 18 graphically depicts the maximum compressive stress (y-axis) as a function of the ratio (CaO/(CaO+MgO)) (x-axis) for inventive and comparative glass compositions.

FIG. 17 graphically depicts the diffusivity D of the compositions listed in Table 4 as a function of the ratio (CaO/(CaO+MgO)). Specifically, FIG. 17 indicates that as the ratio (CaO/(CaO+MgO)) increases, the diffusivity of alkali ions in the resultant glass decreases thereby diminishing the ion exchange performance of the glass. This trend is supported by the data in Table 4 and FIG. 18. FIG. 18 graphically depicts the maximum compressive stress and stress change rate (y-axes) as a function of the ratio (CaO/(CaO+MgO)). FIG. 18 indicates that as the ratio (CaO/(CaO+MgO)) increases, the maximum obtainable compressive stress decreases for a given ion exchange temperature and ion exchange time. FIG. 18 also indicates that as the ratio (CaO/(CaO+MgO)) increases, the stress change rate increases (i.e., becomes more negative and less desirable).

Accordingly, based on the data in Table 4 and FIGS. 17 and 18, it should be understood that glasses with higher diffusivities can be produced by minimizing the ratio (CaO/(CaO+MgO)). It has been determined that glasses with suitable diffusivities can be produced when the (CaO/(CaO+MgO)) ratio is less than about 0.5. The diffusivity values of the glass when the (CaO/(CaO+MgO)) ratio is less than about 0.5 decreases the ion exchange process times needed to achieve a given compressive stress and depth of layer. Alternatively, glasses with higher diffusivities due to the ratio (CaO/(CaO+MgO)) may be used to achieve a higher compressive stress and depth of layer for a given ion exchange temperature and ion exchange time.

Moreover, the data in Table 4 also indicates that decreasing the ratio (CaO/(CaO+MgO)) by increasing the MgO concentration generally improves the resistance of the glass to hydrolytic degradation as measured by the ISO 720 standard.

Example 4

Three exemplary inventive glass compositions (compositions M-O) and three comparative glass compositions (compositions 7-9) were prepared. The concentration of $B_2O_3$ in the glass compositions was varied from 0 mol. % to about 4.6 mol. % such that the resultant glasses had different values for the ratio $B_2O_3/(R_2O—Al_2O_3)$. The specific compositions of each of the exemplary inventive glass compositions and the comparative glass compositions are reported below in Table 5. The properties of each glass composition were determined as described above with respect to Examples 2 and 3.

TABLE 5

Glass properties as a function of $B_2O_3$ content
Composition Mole %

|  | M | N | O | 7 | 8 | 9 |
|---|---|---|---|---|---|---|
| SiO$_2$ | 76.860 | 76.778 | 76.396 | 74.780 | 73.843 | 72.782 |
| Al$_2$O$_3$ | 5.964 | 5.948 | 5.919 | 5.793 | 5.720 | 5.867 |
| B$_2$O$_3$ | 0.000 | 0.214 | 0.777 | 2.840 | 4.443 | 4.636 |
| Na$_2$O | 11.486 | 11.408 | 11.294 | 11.036 | 10.580 | 11.099 |
| K$_2$O | 0.101 | 0.100 | 0.100 | 0.098 | 0.088 | 0.098 |
| MgO | 4.849 | 4.827 | 4.801 | 4.754 | 4.645 | 4.817 |
| CaO | 0.492 | 0.480 | 0.475 | 0.463 | 0.453 | 0.465 |
| SnO$_2$ | 0.197 | 0.192 | 0.192 | 0.188 | 0.183 | 0.189 |
| Strain (° C.) | 579 | 575 | 572 | 560 | 552 | 548 |
| Anneal (° C.) | 632 | 626 | 622 | 606 | 597 | 590 |
| Softening (° C.) | 889 | 880 | 873 | 836 | 816 | 801 |
| Expansion ($10^{-7}$ $K^{-1}$) | 68.3 | 67.4 | 67.4 | 65.8 | 64.1 | 67.3 |
| Density (g/cm$^3$) | 2.388 | 2.389 | 2.390 | 2.394 | 2.392 | 2.403 |
| SOC (nm/mm/MPa) | 3.13 | 3.12 | 3.13 | 3.17 | 3.21 | 3.18 |
| ISO720 (non-IX) | 86.3 | 78.8 | 68.5 | 64.4 | 52.7 | 54.1 |
| ISO720 (IX450° C. - 5 hr) | 32.2 | 30.1 | 26 | 24.7 | 22.6 | 26.7 |
| B$_2$O$_3$/(R$_2$O—Al$_2$O$_3$) | 0.000 | 0.038 | 0.142 | 0.532 | 0.898 | 0.870 |
| CS@t = 0 (MPa) | 703 | 714 | 722 | 701 | 686 | 734 |
| CS/√t (MPa/hr$^{1/2}$) | −38 | −38 | −38 | −33 | −32 | −39 |
| D (μm$^2$/hr) | 51.7 | 43.8 | 38.6 | 22.9 | 16.6 | 15.6 |

Figure 19:
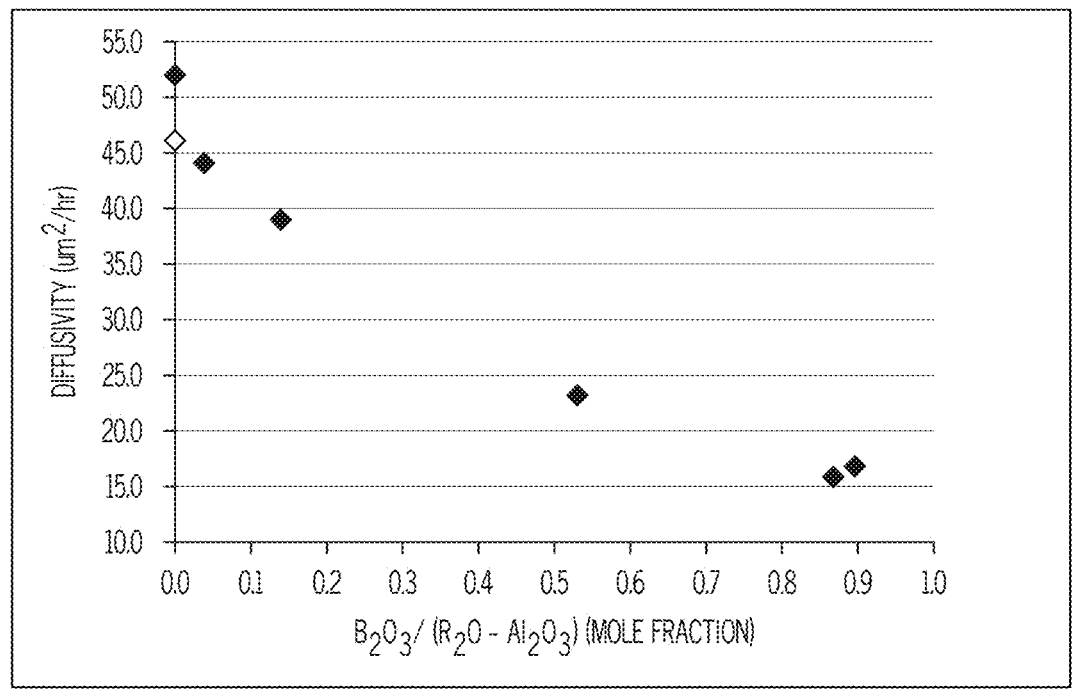
FIG. 19 graphically depicts diffusivity D (y-axis) as a function of the ratio ($B_2O_3$/($R_2O$—$Al_2O_3$)) (x-axis) for inventive and comparative glass compositions.

FIG. 19 graphically depicts the diffusivity D (y-axis) of the glass compositions in Table 5 as a function of the ratio $B_2O_3/(R_2O—Al_2O_3)$ (x-axis) for the glass compositions of Table 5. As shown in FIG. 19, the diffusivity of alkali ions in the glass generally decreases as the ratio $B_2O_3/(R_2O—Al_2O_3)$ increases.

Figure 20:
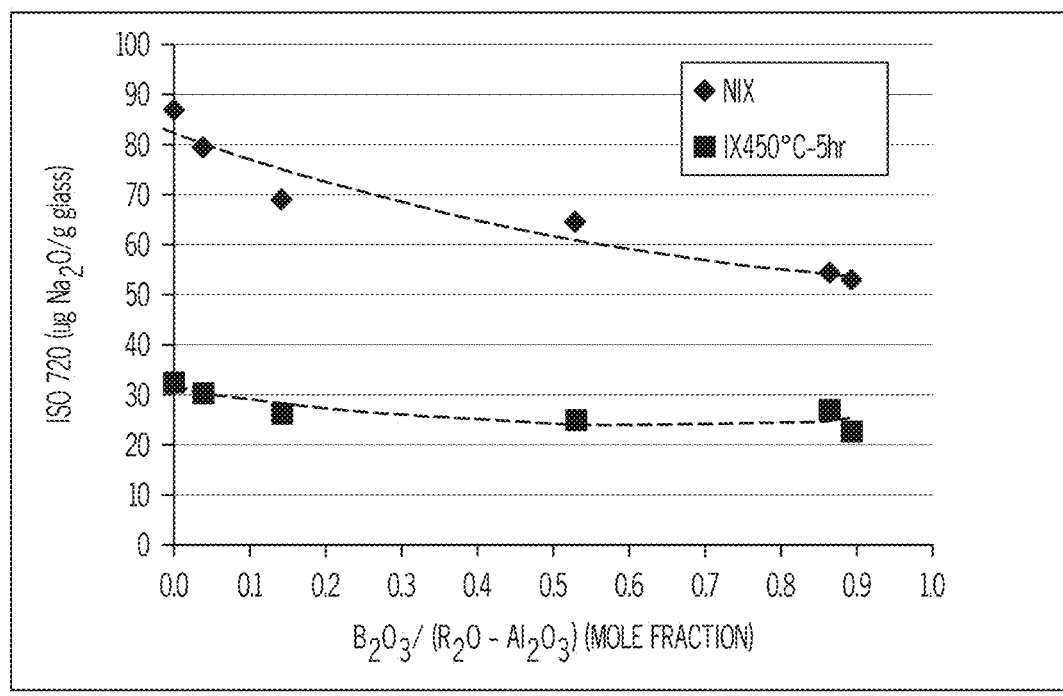
FIG. 20 graphically depicts the hydrolytic resistance as determined from the ISO 720 standard (y-axis) as a function of the ratio ($B_2O_3$/($R_2O$—$Al_2O_3$)) (x-axis) for inventive and comparative glass compositions.

FIG. 20 graphically depicts the hydrolytic resistance according to the ISO 720 standard (y-axis) as a function of the ratio $B_2O_3/(R_2O—Al_2O_3)$ (x-axis) for the glass compositions of Table 5. As shown in FIG. 20, the hydrolytic resistance of the glass compositions generally improves as the ratio $B_2O_3/(R_2O—Al_2O_3)$ increases.

Based on FIGS. 19 and 20, it should be understood that minimizing the ratio $B_2O_3/(R_2O—Al_2O_3)$ improves the diffusivity of alkali ions in the glass thereby improving the ion exchange characteristics of the glass. Further, increasing the ratio $B_2O_3/(R_2O—Al_2O_3)$ also generally improves the resistance of the glass to hydrolytic degradation. In addition, it has been found that the resistance of the glass to degradation in acidic solutions (as measured by the DIN 12116 standard) generally improves with decreasing concentrations of $B_2O_3$. Accordingly, it has been determined that maintaining the ratio $B_2O_3/(R_2O—Al_2O_3)$ to less than or equal to about 0.3 provides the glass with improved hydrolytic and acid resistances as well as providing for improved ion exchange characteristics.

Comparative Example 1

Figure 21:
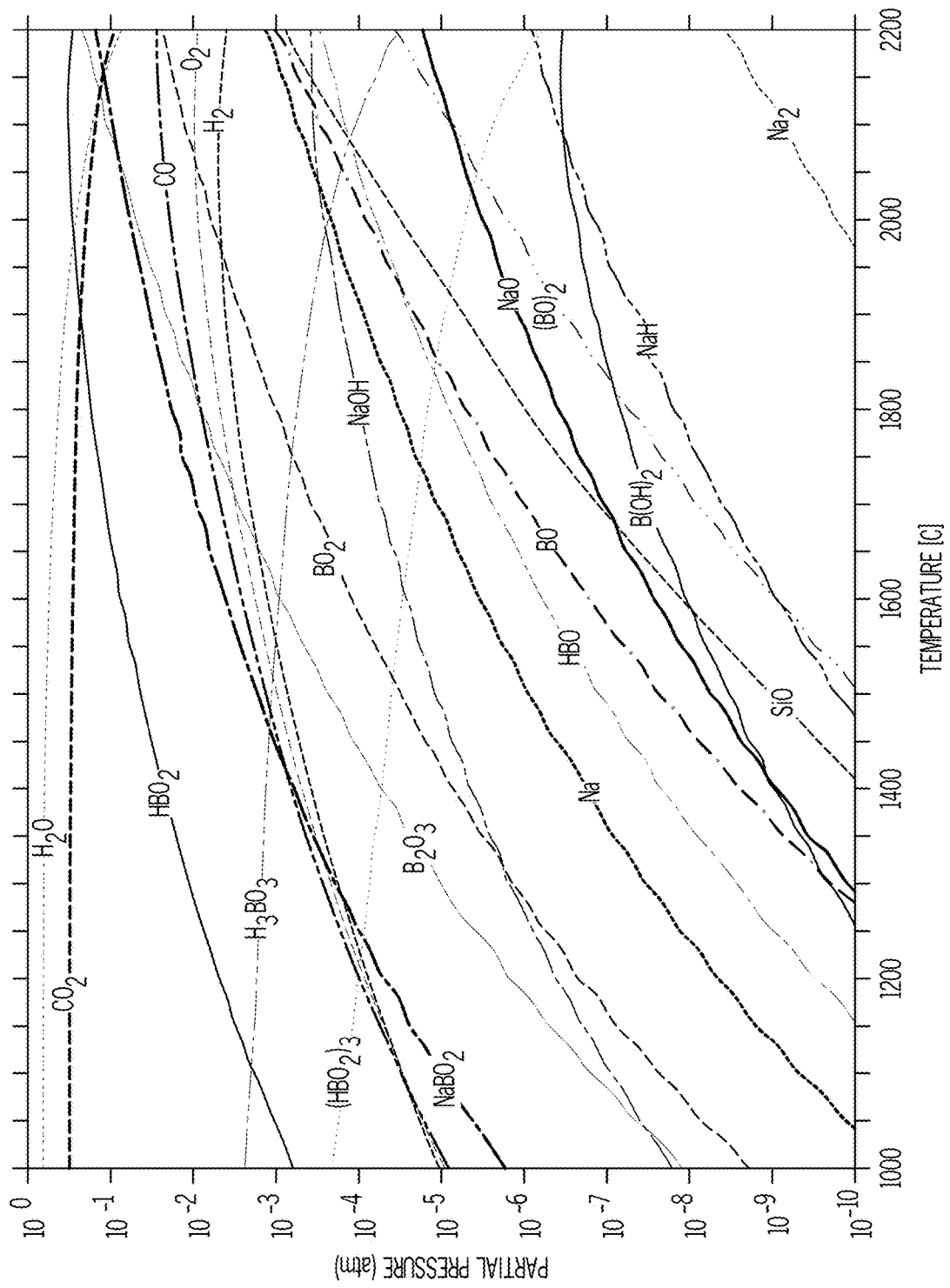
FIG. 21 graphically depicts the partial pressure (y-axis) of various species of the glass composition as a function of temperature (x-axis) for a conventional Type 1A borosilicate glass in equilibrium with a stoichiometric methane flame.

To illustrate the volatility of boron and sodium in a conventional Type 1A borosilicate glass composition, thermochemical calculations were performed on Type 1A glass equilibrated in a stoichiometric flame with an oxygen to methane ratio of 2. The modeled Type 1A glass composition includes 83.4 mol. % $SiO_2$, 1.5 mol. % $Al_2O_3$, 11.2 mol. % $B_2O_3$; and 3.8 mol. % $Na_2O$. The composition of the gas phase in equilibrium with the glass in a stoichiometric methane flame was calculated from chemical thermodynamics using FACTsage software as a function of temperature. FIG. 21 graphically depicts the partial pressure (y-axis) of the main gas phase species as a function of temperature (x-axis). As shown in FIG. 21, both the boron and sodium species have relatively high partial pressures in the temperature range of 1000° C. to 1600° C. This temperature range generally corresponds to the temperatures utilized to reform glass stock into a glass container. Accordingly, it is believed that both the boron and sodium species in the Type 1A glass would volatilize and evaporate from the heated interior surfaces of the glass as the glass is reformed, thereafter condensing on cooler portions of the interior surface of the glass. This behavior causes heterogeneities in the surface composition of the glass which may lead to delamination.

Comparative Example 2

Figure 22:
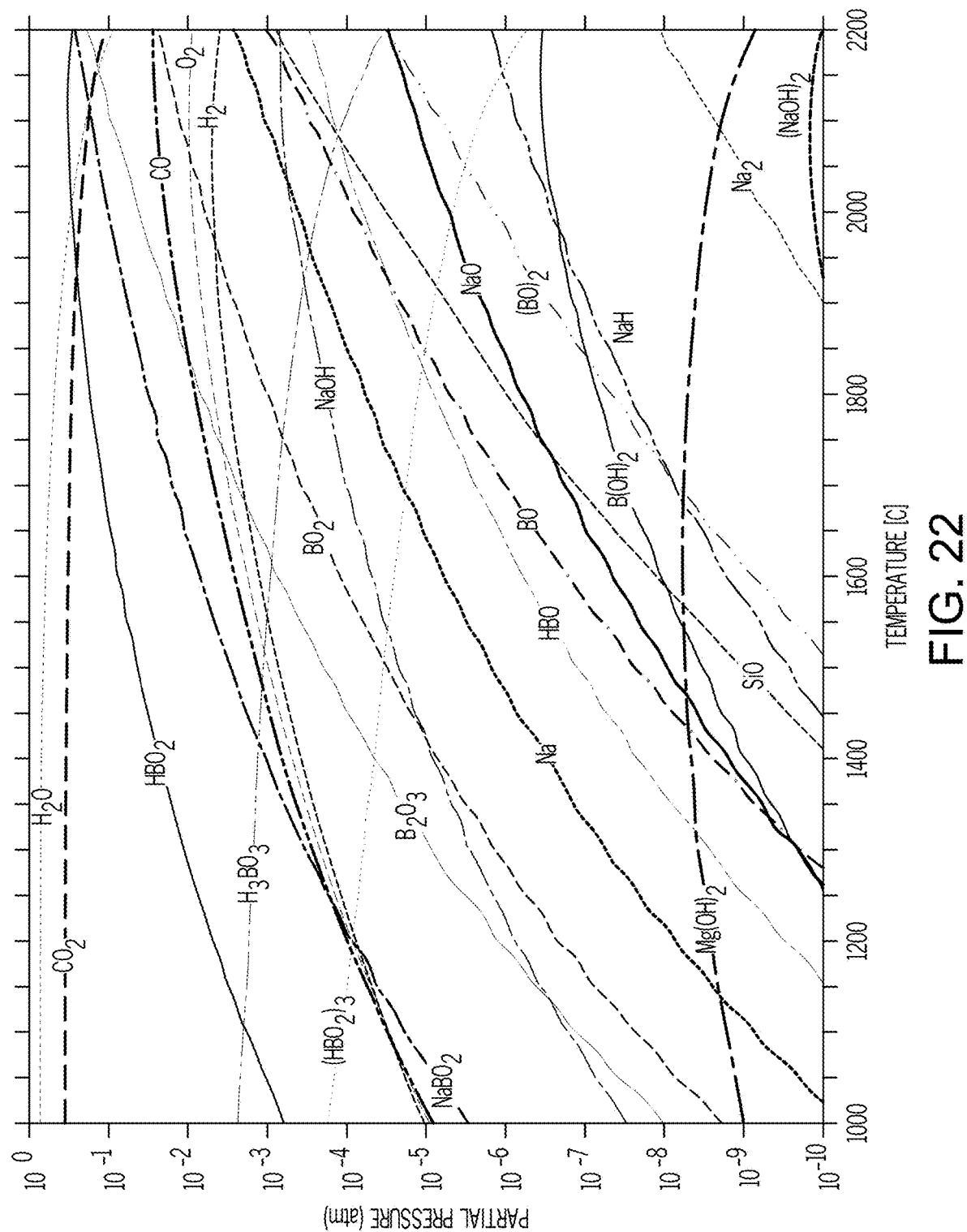
FIG. 22 graphically depicts the partial pressure (y-axis) of various species of the glass composition as a function of temperature (x-axis) for a conventional Type 1B borosilicate glass in equilibrium with a stoichiometric methane flame.

To illustrate the volatility of boron and sodium in a conventional Type 1B borosilicate glass composition, thermochemical calculations were performed on Type 1B glass equilibrated in a stoichiometric flame with an oxygen to methane ratio of 2. This modeled glass composition included 76.2 mol. % $SiO_2$, 4.2 mol. % $Al_2O_3$, 10.5 mol. % $B_2O_3$, 8.2 mol. % $Na_2O$, 0.4 mol. % MgO and 0.5 mol. % CaO. The composition of the gas phase in equilibrium with the glass in a stoichiometric methane flame was calculated from chemical thermodynamics using FACTsage software as a function of temperature. FIG. 22 graphically depicts the partial pressure (y-axis) of the main gas phase species as a function of temperature (x-axis). As with Comparative Example 1, both the boron and sodium species in Comparative Example 2 have relatively high partial pressures in the temperature range of 1000° C. to 1600° C. This temperature range generally corresponds to the temperatures utilized to reform glass stock into a glass container. Accordingly, it is believed that both the boron and sodium species from the Type 1B glass would volatilize and evaporate from the heated interior surfaces of the glass as the glass is reformed and thereafter condense on cooler portions of the glass. This behavior causes heterogeneities in the composition of the glass which may lead to delamination.

Comparative Example 3

Figure 23:
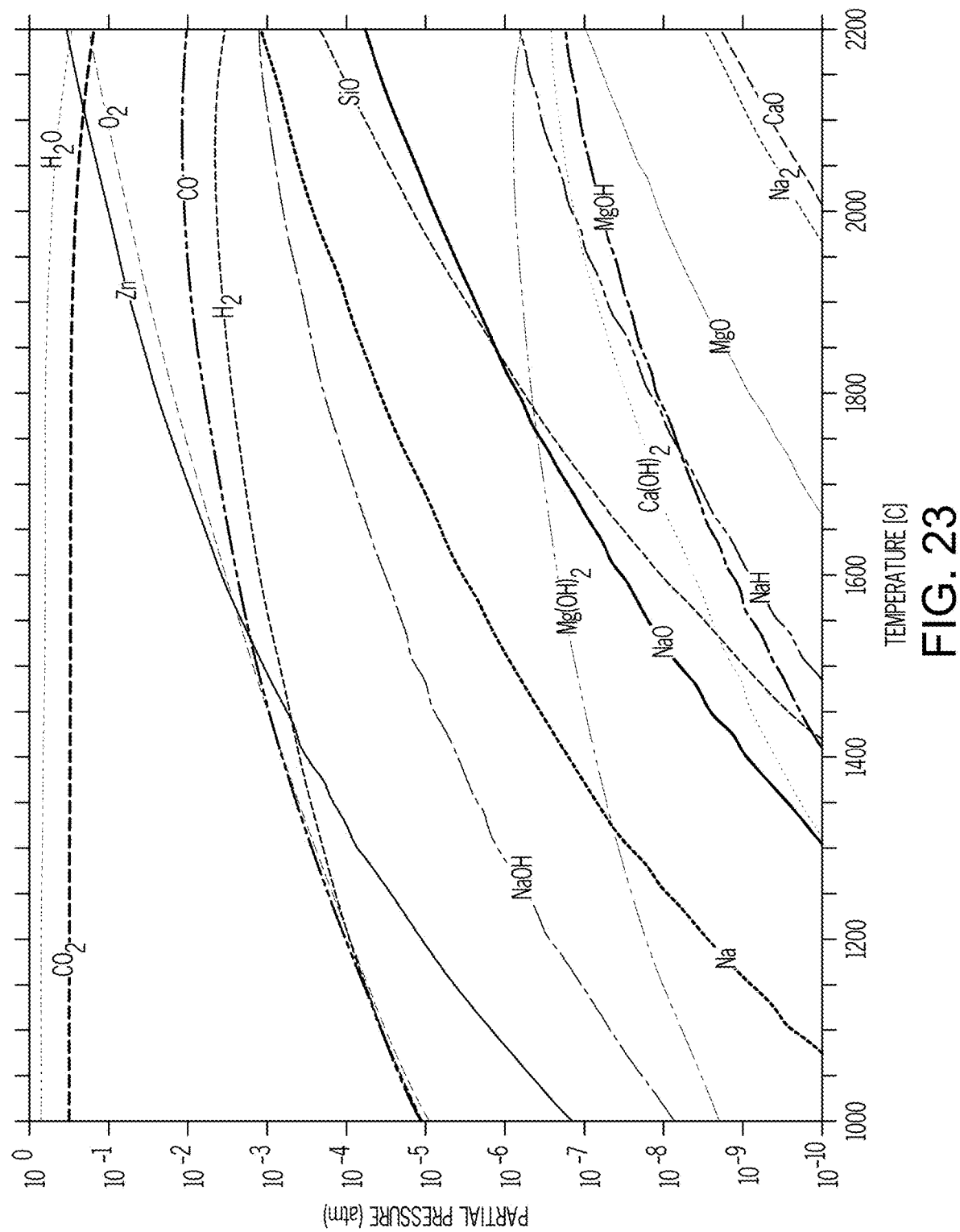
FIG. 23 graphically depicts the partial pressure (y-axis) of various species of the glass composition as a function of temperature (x-axis) for a specific ZnO containing glass in equilibrium with a stoichiometric methane flame.

To illustrate the volatility of zinc in a glass composition comprising ZnO, thermochemical calculations were performed on a ZnO-containing glass equilibrated in a stoichiometric flame with an oxygen to methane ratio of 2. The glass composition included 74.3 mol. % $SiO_2$, 7.4 mol. % $Al_2O_3$, 5.1 mol. % $Na_2O$, 5.0 mol. % MgO, 5.1 mol. % CaO, and 3.1 mol. % ZnO. The composition of the gas phase in equilibrium with the glass in a stoichiometric methane flame was calculated from chemical thermodynamics using FACTsage software as a function of temperature. FIG. 23 graphically depicts the partial pressure (y-axis) of the main gas phase as a function of temperature (x-axis). The zinc species in Comparative Example 3 have relatively high partial pressures in the temperature range of 1000° C. to 1600° C. This temperature range generally corresponds to the temperatures utilized to reform glass stock into a glass container. Accordingly, it is believed that the zinc species in this glass composition would volatilize and evaporate from the heated interior surfaces of the glass as the glass is reformed and thereafter condense on cooler portions of the glass. Volatilization of zinc from this glass when exposed to a flame has been experimentally observed. This behavior causes heterogeneities in the composition of the glass which may lead to delamination.

Example 5

Figure 24:
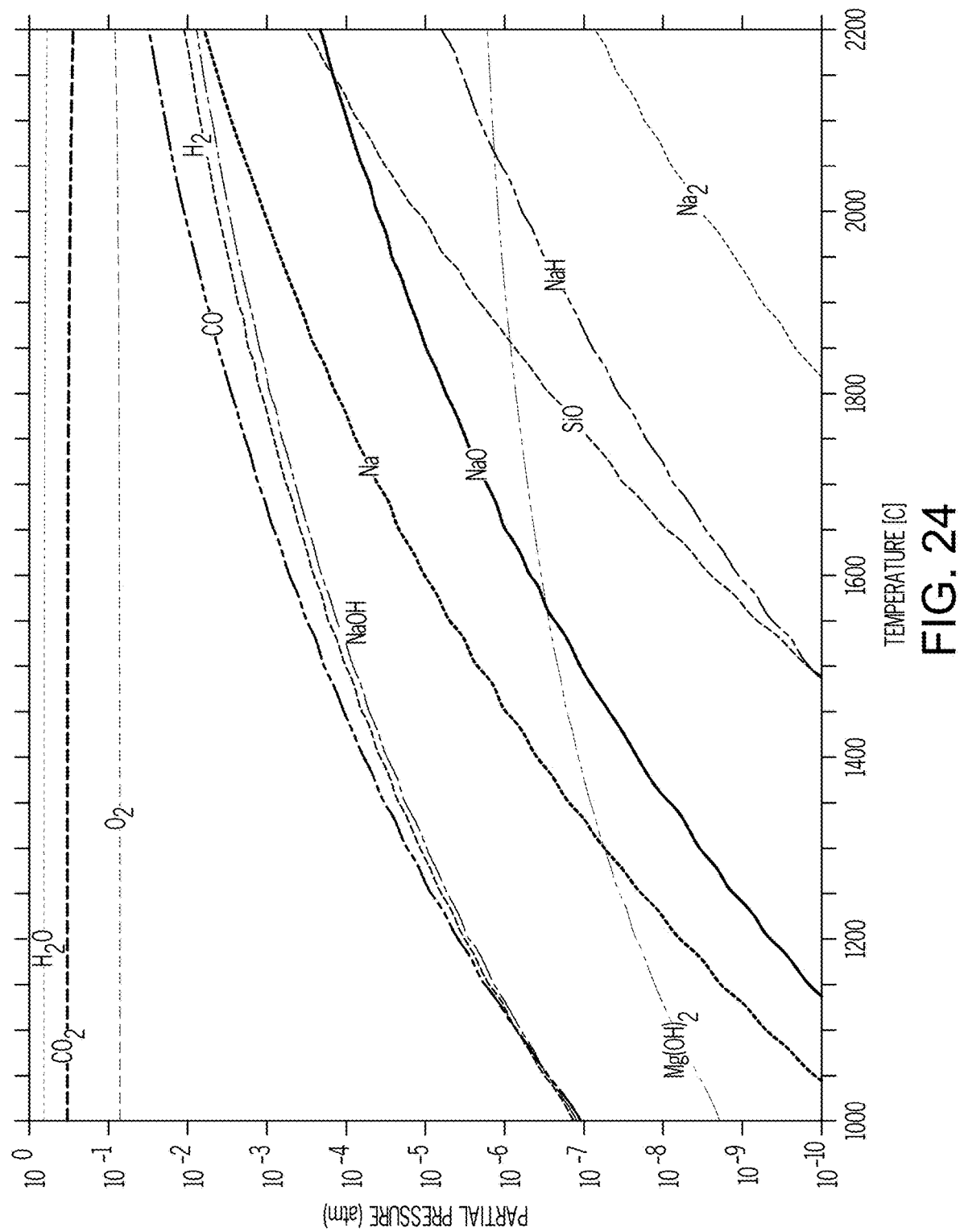
FIG. 24 graphically depicts the partial pressure (y-axis) of various species of the glass composition as a function of temperature (x-axis) for an exemplary alkali aluminosilicate glass in equilibrium with a stoichiometric methane flame.

To illustrate the relatively low volatility of an exemplary alkali aluminosilicate glass composition, thermochemical calculations were performed on this glass equilibrated in a stoichiometric flame with an oxygen to methane ratio of 2. This glass composition includes 76.8 mol. % $SiO_2$, 6.0 mol. % $Al_2O_3$, 11.7 mol. % $Na_2O$, 0.5 mol. % CaO, and 4.8 mol. % MgO. The composition of the gas phase in equilibrium with the glass in a stoichiometric methane flame was calculated from chemical thermodynamics using FACTsage software as a function of temperature. FIG. 24 graphically depicts the partial pressure (y-axis) of the main gas phase species as a function of temperature (x-axis). As shown in FIG. 24, the partial pressure of the sodium, magnesium, and calcium species in the alkali aluminosilicate glass were relatively low over the temperature range of 1000° C. to 1600° C. compared to the boron and sodium species of the Type 1A (Comparative Example 1) and Type 1B (Comparative Example 2) glasses. This indicates that the sodium, magnesium, and calcium species were less likely to volatilize at the reforming temperatures and, as such, glass containers formed from the alkali aluminosilicate glass were more likely to have a homogenous composition at the surface and through the thickness of the glass container.

Comparative Example 4

Figure 25A:
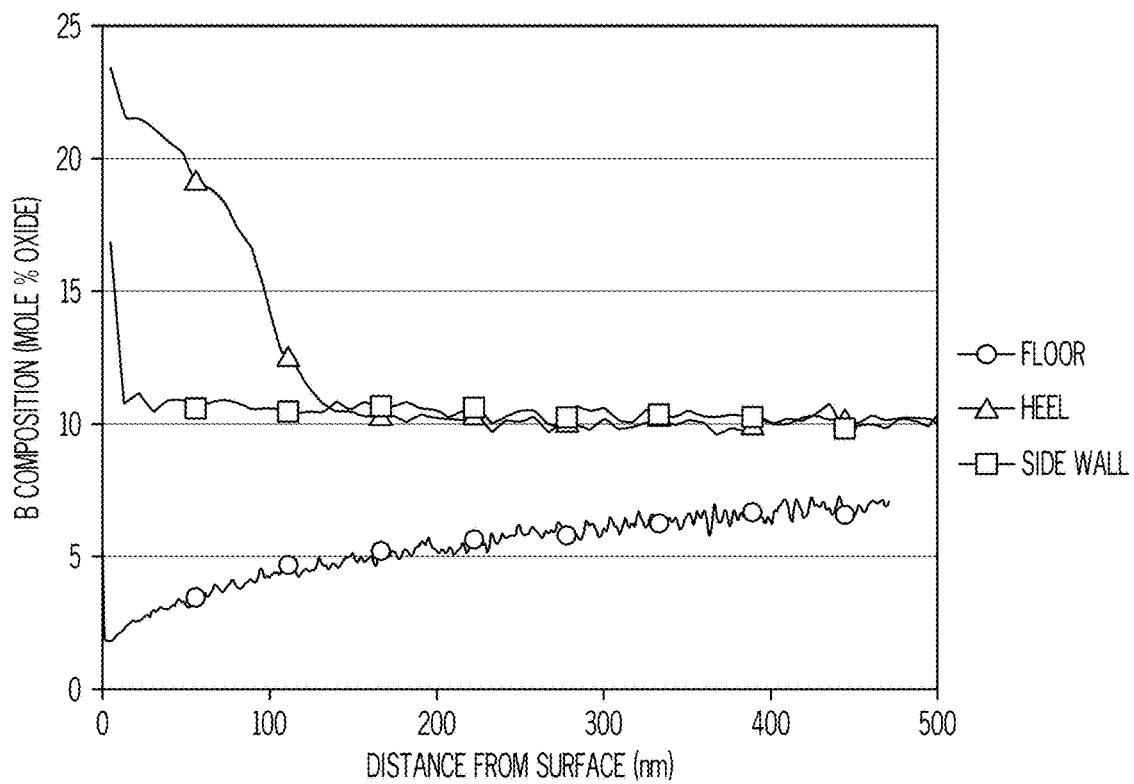
FIG. 25A graphically depicts the concentration (y-axis) of boron as a function of depth from the interior surface of heel floor and sidewall portions of a glass vial formed from a conventional Type 1B borosilicate glass.
Figure 25B:
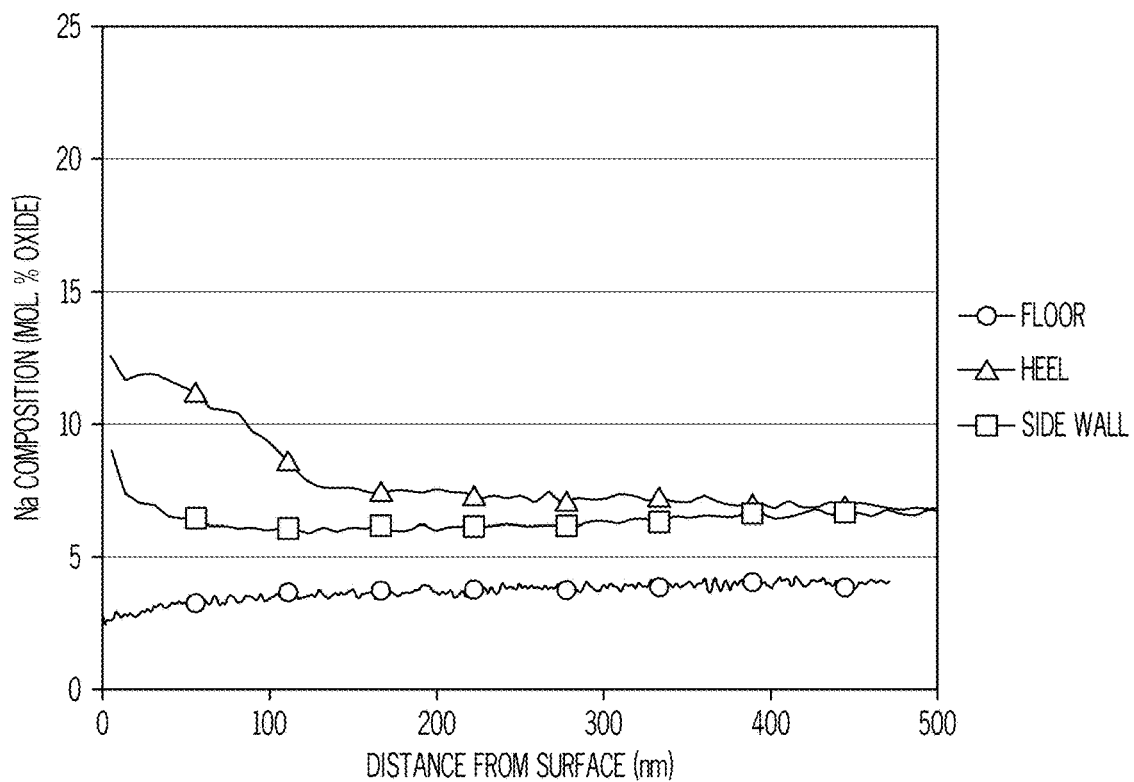
FIG. 25B, graphically depicts the concentration (y-axis) of sodium as a function of depth from the interior surface of heel floor and sidewall portions of a glass vial formed from a conventional Type 1B borosilicate glass.

The compositional characteristics of a glass vial formed from a conventional Type 1B borosilicate glass composition in as-formed condition were assessed. The glass vials were formed from Type 1B borosilicate glass tubing with an outer diameter of approximately 17 mm and a wall thickness of approximately 1.1 mm. Conventional tube-to-vial conversion processes were used to form the glass tubing into standard 3-4 ml vials using direct flames and standard conversion equipment. A sample of the vial was collected from the interior surface of the heel region between the sidewall and the floor portion of the vial at a location approximately 1.5 mm from the floor portion of the vial. A second sample of the vial was collected from the interior surface of the floor portion of the vial near the center of the floor portion. A third sample was collected from the side wall 15 mm up from the floor portion. Each sample was analyzed by dynamic secondary ion mass spectroscopy (D-SIMS). D-SIMS was conducted with a PHI Adept-1010 instrument having a quadrapole mass spectrometer. Because glass is an electrically insulating material, the surface tends to build charge during extended bombardment by the energetic ion beam. As a result, this charging effect must be properly neutralized by use of a secondary ion gun or electron beam in order to prevent migration of mobile sodium ions through the glass surface matrix. In this study, instrumental conditions to minimize sodium migration were arrived at by profiling fresh fracture surfaces of glass rods that were prepared from comparative Type 1B bulk glasses and from bulk glasses alkali aluminosilicate glass compositions, such as the glass composition described in Example 5 above. The proper conditions were ensured by obtaining constant (flat) Na profiles from the outermost glass surface using ions of positive polarity. Relative sensitivity factors for quantization of each glass element (Si, Al, B, Na, K, Ca, Mg) were also obtained from analysis of the glass rod fracture surfaces and calibrating to the bulk glass compositions as measured by inductively coupled plasma mass spectrometry (ICP-MS). Because the matrix and surface electronic properties of the vial surfaces are not identical to fracture surfaces, expected relative error is about 10%. The depth scales were based on sputter rates calculated from the depths of the analytical craters in the glass, as measured by stylus profilimetry with NIST traceable calibration. The one sigma accuracy of the depth calibration was within ±1-10% (i.e. ±0.01-0.1×[depth]). FIG. 25A shows the boron concentration of the sample from the floor, heel, and sidewall regions (y-axis) as a function of depth (x-axis) from the surface while FIG. 25B shows the sodium concentration of the sample from the floor, heel, and sidewall regions (y-axis) as a function of depth (x-axis) from the surface. The composition of the sample in the heel region indicated that a boron-rich and sodium-rich layer was present at the interior surface of the heel region to a depth of 100 nm. However, the concentration of both boron and sodium was significantly lower at depths greater than 100 nm, indicating that additional boron and sodium had been enriched in the heel portion of the vial during formation. FIGS. 25A and 25B show that the concentration of boron and sodium in the floor portion of the vial increased with depth, indicating that boron and sodium had been volatilized from the floor portion during formation. Accordingly, FIGS. 25A and 25B indicate that the borosilicate glass vial had compositional heterogeneities through the thickness of the glass vial as well as over the surface region of the glass vial.

Example 7

Figure 26:
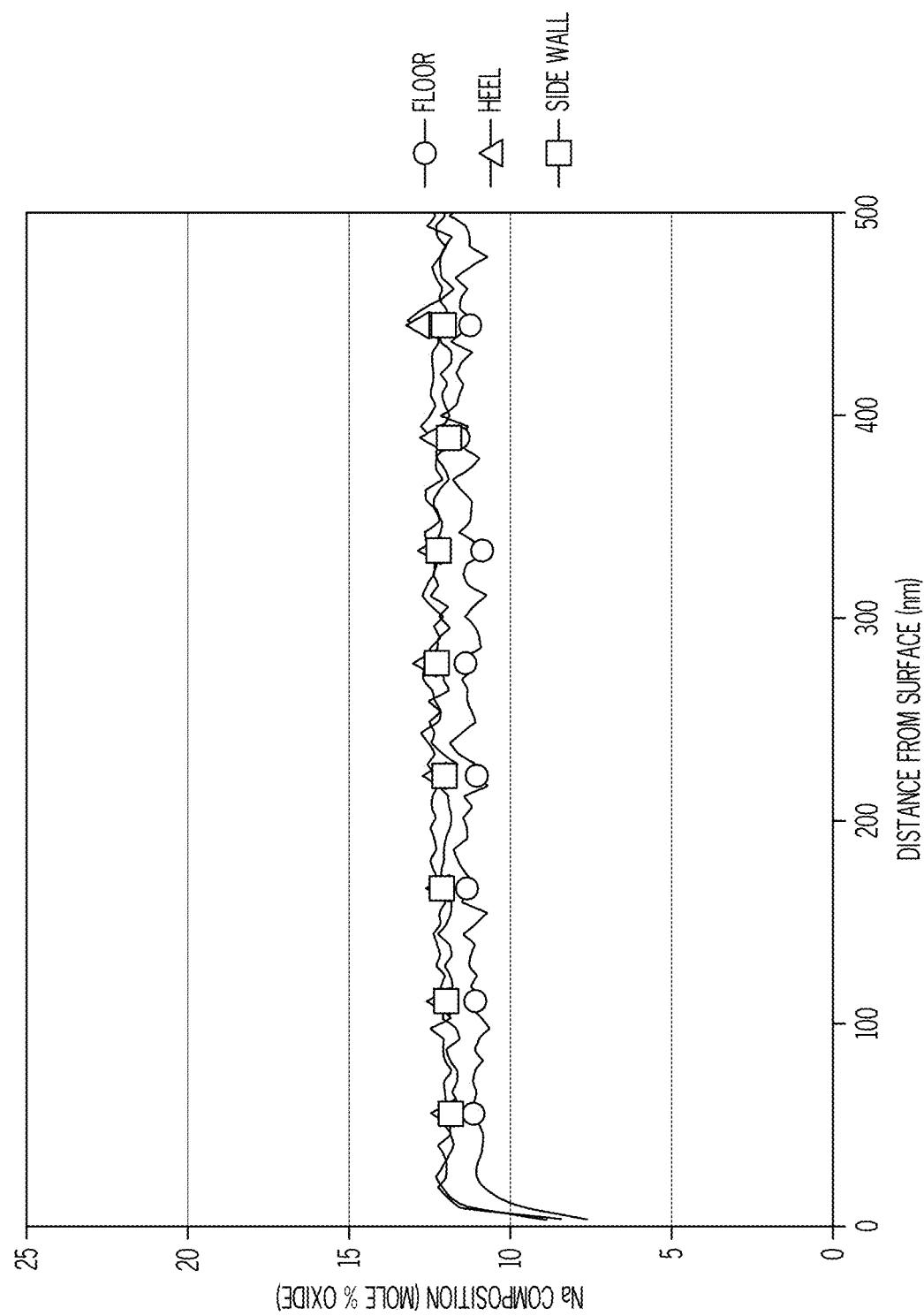
FIG. 26 graphically depicts the concentration (y-axis) of sodium as a function of depth from the interior surface of heel floor and sidewall portions of a glass vial formed from an exemplary boron-free alkali aluminosilicate glass.

The compositional characteristics of a glass vial formed from boron-free alkali aluminosilicate glass composition in as-formed condition were assessed. The glass vials were formed from boron-free alkali aluminosilicate glass tubing (i.e., glass tubing having the same composition as the glass of Example 5) with an outer diameter of approximately 17 mm and a wall thickness of approximately 1.1 mm. Conventional tube-to-vial conversion processes were used to form the glass tubing into standard 3-4 ml vials using direct flames and standard conversion equipment. Samples of the vial were collected from the interior surface of the floor, heel (between the sidewall and the floor portions of the vial at a location approximately 1.5 mm from the floor portion), and sidewall regions. Each sample was analyzed by dynamic secondary ion mass spectroscopy, as described above. FIG. 26 shows the sodium concentration of the sample from the floor, heel, and sidewall regions (y-axis) as a function of depth (x-axis) from the surface. FIG. 26 indicates that the composition of the samples from the floor, heel, and sidewall regions was uniform and homogenous from the interior surface of the vial to a depth of at least 500 nm and usually extends to a depth of at least 2 µm. Accordingly, FIG. 26 indicates that the composition of the vial formed from boron-free alkali aluminosilicate glass was substantially homogenous through the thickness of the glass vial as well as over the surface region of the glass vial. It is believed that this compositional homogeneity is directly related to the reduced delamination observed in the boron-free alkali aluminosilicate glass vials.

Example 8

Figure 27:
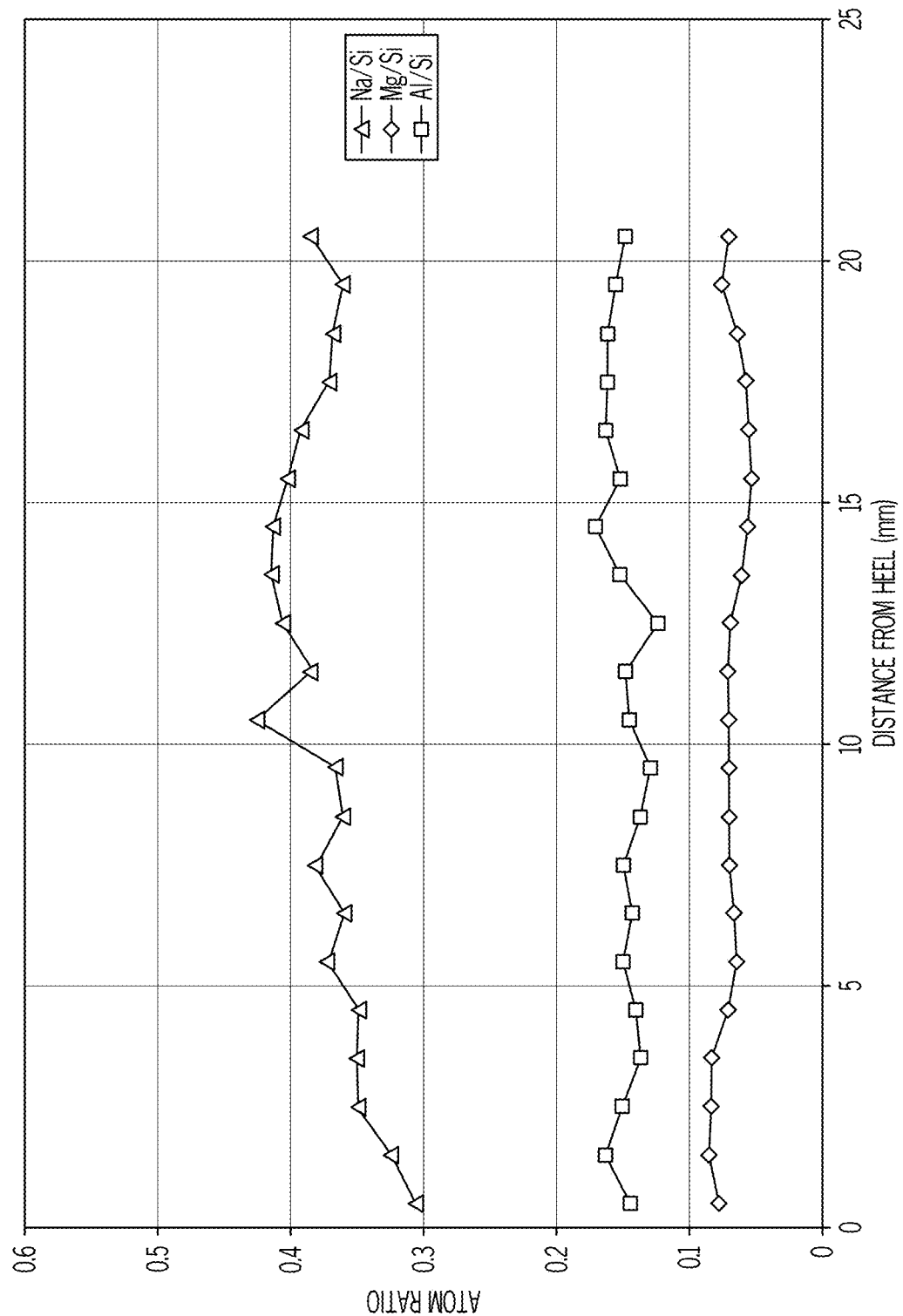
FIG. 27 graphically depicts the atomic ratio (y-axis) as a function of distance (x-axis) for the interior surface of a glass vial formed from an exemplary alkali aluminosilicate glass showing surface homogeneity.

A glass vial was formed from an alkali aluminosilicate glass composition which included 76.8 mol. % $SiO_2$, 6.0 mol. % $Al_2O_3$, 11.6 mol. % $Na_2O$, 0.1 mol. % $K_2O$, 0.5 mol. % CaO, 4.8 mol. % MgO, and 0.2 mol. % $SnO_2$. The glass vials were formed from glass tubing with an outer diameter of approximately 17 mm and a wall thickness of approximately 1.1 mm. Conventional tube-to-vial conversion processes were used to form the glass tubing into standard 3-4 ml vials using direct flames and standard conversion equipment. The surface concentration of constituent components in the glass composition were measured at discrete points within the surface region extending to a depth of 10 nm from the interior surface of the glass composition as a function of distance from the heel of the vial by x-ray photoelectron spectroscopy. The surface concentration of those elements in the glass composition having a concentration of less than 2 mol. % were not analyzed. In order to accurately quantify the surface concentration of the glass composition using x-ray photoelectron spectroscopy (XPS), relative sensitivity factors were employed that were derived from standard reference materials. The analysis volume for the measurement is the product of the analysis area (spot size or aperture size) and the depth of information. Photoelectrons are generated within the x-ray penetration depth (typically many microns), but only the photoelectrons which have sufficient kinetic energy to escape the surface (approximately three times the photoelectron escape depth) are detected. Escape depths are on the order of 15-35 Å, which leads to an analysis depth of approximately 50-100 Å. Typically, 95% of the signal originates from within this depth. An electron energy analyzer and detector were used to collect the emitted photoelectrons from the glass surface and measure their kinetic energies. The specific kinetic energy of each emitted photoelectron is a unique signature of the element and core electronic level from which it originated. The number of emitted photoelectrons are counted (signal intensity) and plotted as a function of kinetic energy to create a photoelectron spectrum. Peaks in the spectrum are unique to core electronic levels of individual elements. The area under each peak is integrated and then divided by the appropriate relative sensitivity factor (derived from standard reference materials) in order to quantify the atom fraction of each constituent in the glass surface. When analyzing data by XPS, there are multiple lines associated with each element. For elements with low bulk concentration, the line with the highest signal to noise ratio should be used. For example, the Mg KLL line over the Mg (2p) line should be used even though the latter is more conventionally used since it can easily be included with other elements. The samples were measured with a carbon content less than 5 atomic %. The surfaces of the samples may be cleaned by UV/ozone, alcohols or other non-aqueous measures. The elemental composition (in atomic %) as determined from XPS was ratioed vs. Si. This atom ratio was then plotted as function of distance from the heel in mm, as shown in FIG. 27. As shown in FIG. 27, the composition of the glass container in the surface region varied by less than 25% from the average.

Comparative Example 5

Figure 28:
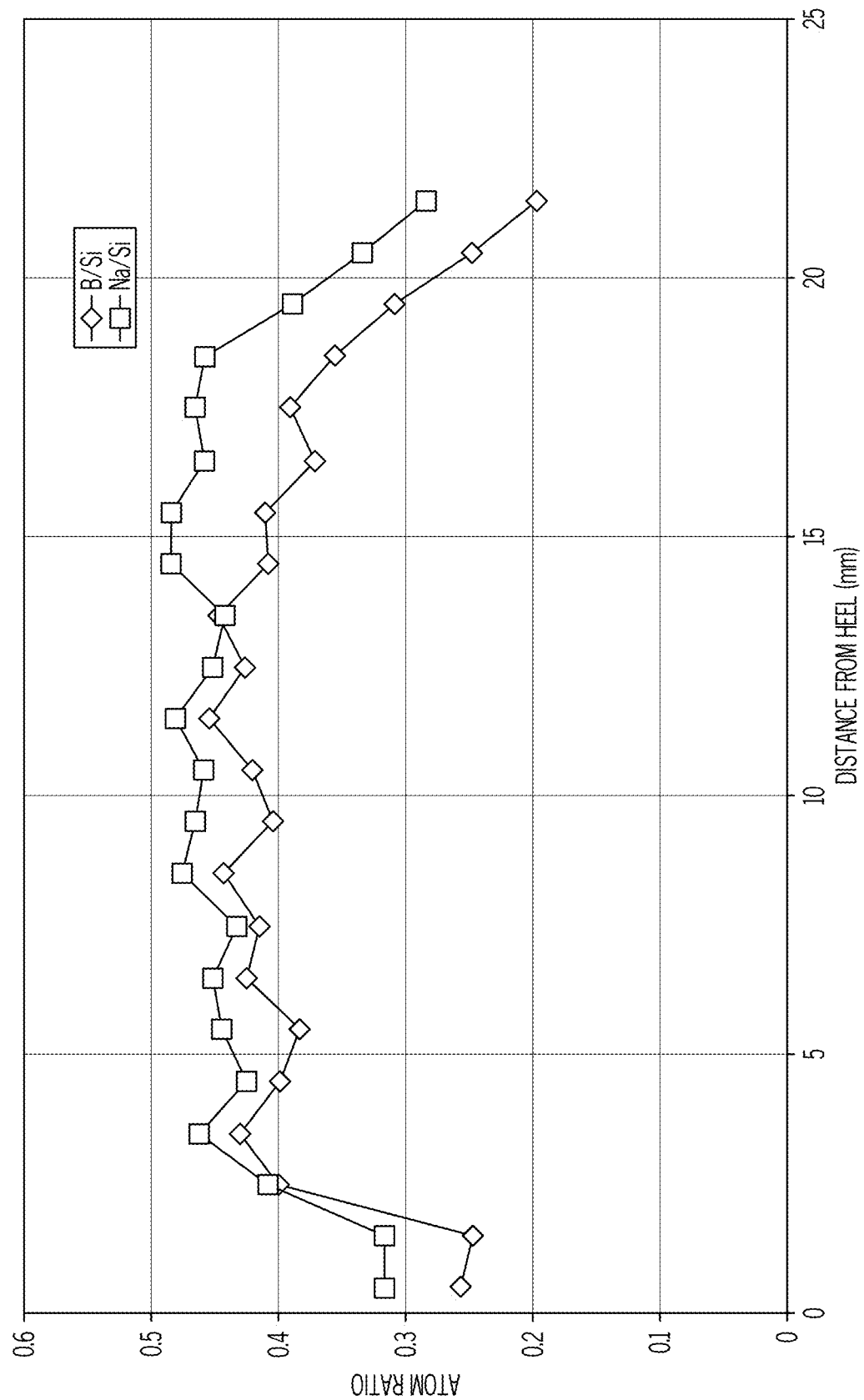
FIG. 28 graphically depicts the atomic ratio (y-axis) as a function of distance (x-axis) for the interior surface of a glass vial formed from a conventional Type 1B glass showing surface heterogeneity.

A glass vial was formed from Type 1B borosilicate glass tubing with an outer diameter of approximately 17 mm and a wall thickness of approximately 1.1 mm. Conventional tube-to-vial conversion processes were used to form the glass tubing into standard 3-4 ml vials using direct flames and standard conversion equipment. The surface concentration of constituent components in the glass composition were measured at discrete points within the surface region extending to a depth of 10 nm from the interior surface of the glass composition as a function of distance from the heel of the vial by XPS, as described above. The surface concentration of those elements in the glass composition having a concentration of less than 2 mol. % were not analyzed. The elemental composition (in atomic %) as determined from XPS was ratioed vs. Si. This atom ratio was then plotted as function of distance from the heel in mm, as shown in FIG. 28. As shown in FIG. 28, the composition of the glass container in the surface region varied by more than 30% for boron and sodium species.

Example 9

To illustrate the threshold volatility of boron in an alkali aluminosilicate glass composition, thermochemical calculations were performed on this glass equilibrated in a stoichiometric flame with an oxygen to methane ratio of 2 at a temperature of 1500° C. The modeled glass composition included 76.8 mol. % $SiO_2$, 6.0 mol. % $Al_2O_3$, 11.7 mol. % $Na_2O$, 0.5 mol. % CaO, and 4.8 mol. % MgO. The composition of the gas phase in equilibrium with the glass in a stoichiometric methane flame was calculated from chemical thermodynamics using FACTsage software as a function of added $B_2O_3$. The amount of $B_2O_3$ added on top of the composition was varied from about 0.001 mol. % to about 10 mol. %. In this Example, the composition of the equilibrated gas phase was expressed as element fractions. Instead of actual specific species (e.g. $HBO_2$, $NaBO_2$, etc.), the gas phase is viewed as being comprised of elements (e.g. H, B, Na, O, etc.). All of the species in the gas phase are broken into their constituent elements (e.g. 1 mol $HBO_2$ becomes 1 mol H+1 mol B+2 mol O) and then the concentrations are expressed on an elemental basis. As an example, consider the glass from Comparative Example 1 in a stoichiometric flame (shown in FIG. 21). The number of moles of Na in the equilibrated gas is:

$$nNa=nNaBO_2+nNa+nNaOH+nNaO+nNaH+2nNa_2$$

and the elemental fraction of Na is:

$$nNa/(nNa+nB+nSi+nAl+nO+nH+nC)$$

where n denotes number of moles. The elemental fraction of boron in the equilibrated gas of the present example was calculated in the same manner.

Figure 29:
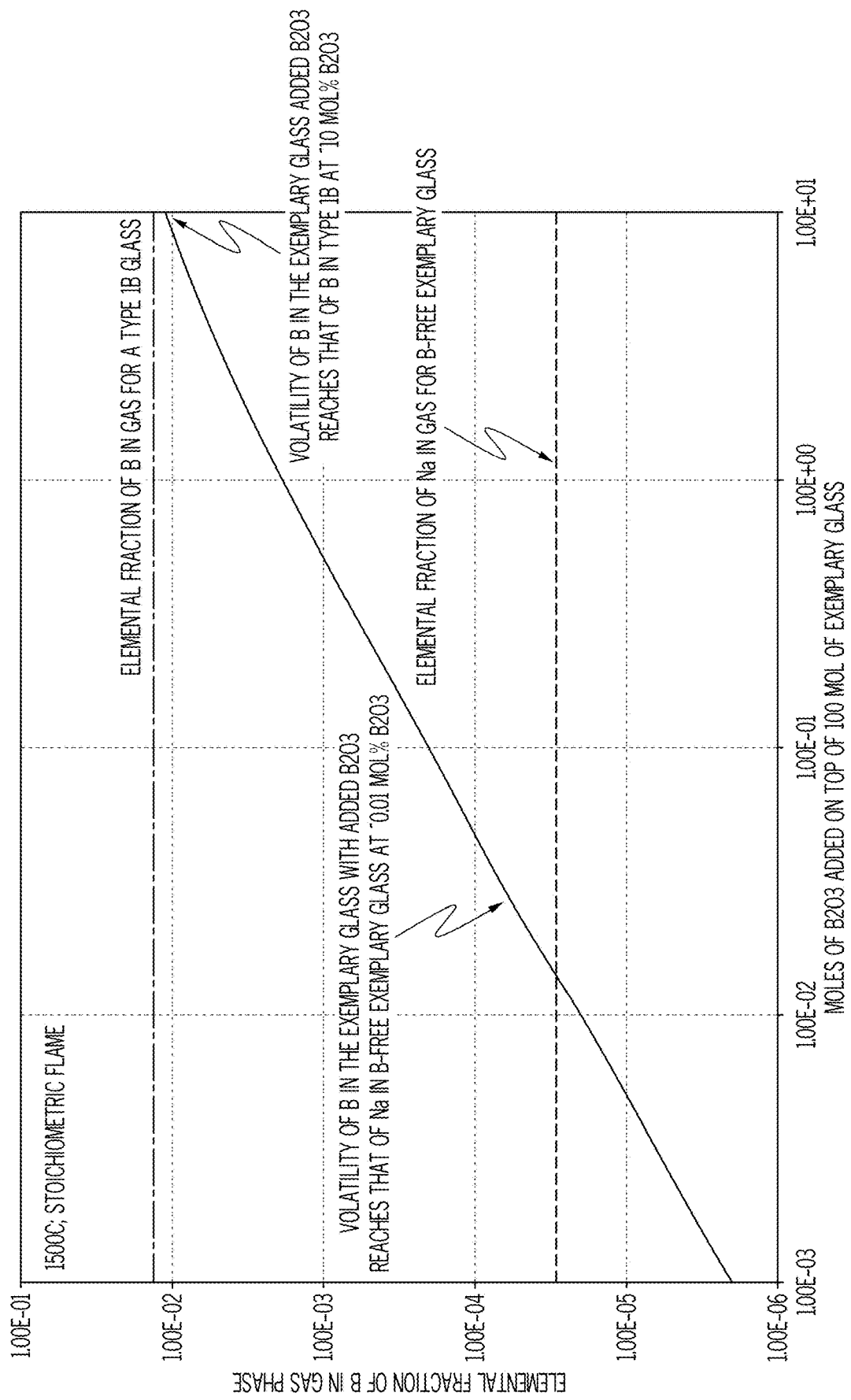
FIG. 29 graphically depicts the elemental fraction (y-axis) of boron in the gas phase as a function of $B_2O_3$ (x-axis) added to an inventive glass composition in equilibrium with a stoichiometric methane flame at 1500° C.

FIG. 29 graphically depicts the elemental fraction of boron in the gas phase as a function of $B_2O_3$ added on top of the glass composition. FIG. 29 also depicts the elemental fraction of Na for this particular glass composition as well as the elemental fraction of boron for a conventional Type 1B borosilicate glass. Without the addition of $B_2O_3$, sodium is the most volatile component in the glass composition. However, as $B_2O_3$ is added to the composition, boron quickly becomes the most volatile component in the glass, exceeding sodium at a concentration of approximately 0.01 mol. %. Utilizing this modeling data, it has been determined that some concentration of $B_2O_3$ can be introduced into a glass composition without significantly increasing the propensity for delamination. As noted above, the threshold for $B_2O_3$ additions in the embodiments described herein is less than or equal to 1.0 mol. %.

Example 10

Vials prone to delamination were compared to vials that are not prone to delamination by forming a borosilicate glass composition (Composition A) and aluminosilicate glass composition (Composition B) into tubes, converting the tubes into vials and subjecting the vials to accelerated delamination testing. Composition A included 75.9 mol. % $SiO_2$, 4.1 mol. % $Al_2O_3$, 10.5 mol. % $B_2O_3$, 6.6 mol. % $Na_2O$, 1.6 mol. % $K_2O$, 0.5 mol. % MgO, 0.6 mol. % CaO, and 0.1 mol. % Cl. Composition B included 76.8 mol. % $SiO_2$, 6.0 mol. % $Al_2O_3$, 11.6 mol. % $Na_2O$, 0.1 mol. % $K_2O$, 4.8 mol. % MgO, 0.5 mol. % CaO, and 0.2 mol. % $SnO_2$. The melted compositions were formed into tubes directly from the melt and then subsequently converted into vials of approximately 3 mL size using industry standard converting equipment such as an AMBEG machine. The glass tubing had an outer diameter of approximately 17 mm and a wall thickness of approximately 1.1 mm. Conversion of the tubes was performed using exaggerated heating conditions while still maintaining the ability to form a quality vial. The vials were then subjected to the accelerated delamination test described herein. Thirty vials of each type were washed of debris in a sink, depyrogenated at 320° C. for 1 hour, and filled with 20 mM Glycine solution brought to a pH=10 with NaOH. The vials were stoppered and capped. The vials were autoclaved for 2 hours at 121° C. and then placed into a convection oven at 50° C. for 10 days. Flakes were counted in the manner previously described herein. The results of that test are shown in Table 6 below.

TABLE 6

Delamination Test Results of Vials Formed From Composition A and Composition B

| Vial Type | Trial # | Number of Flakes larger than 50 μm | Delamination Factor |
|---|---|---|---|
| Composition A | 1 | 137 | 71 |
| | 2 | 116 | |
| | 3 | 128 | |

TABLE 6-continued

Delamination Test Results of Vials Formed From
Composition A and Composition B

| Vial Type | Trial # | Number of Flakes larger than 50 µm | Delamination Factor |
|---|---|---|---|
| Composition B | 1 | 1* | 1 |
|  | 2 | 0 |  |
|  | 3 | 1* |  |

Figure 30A:
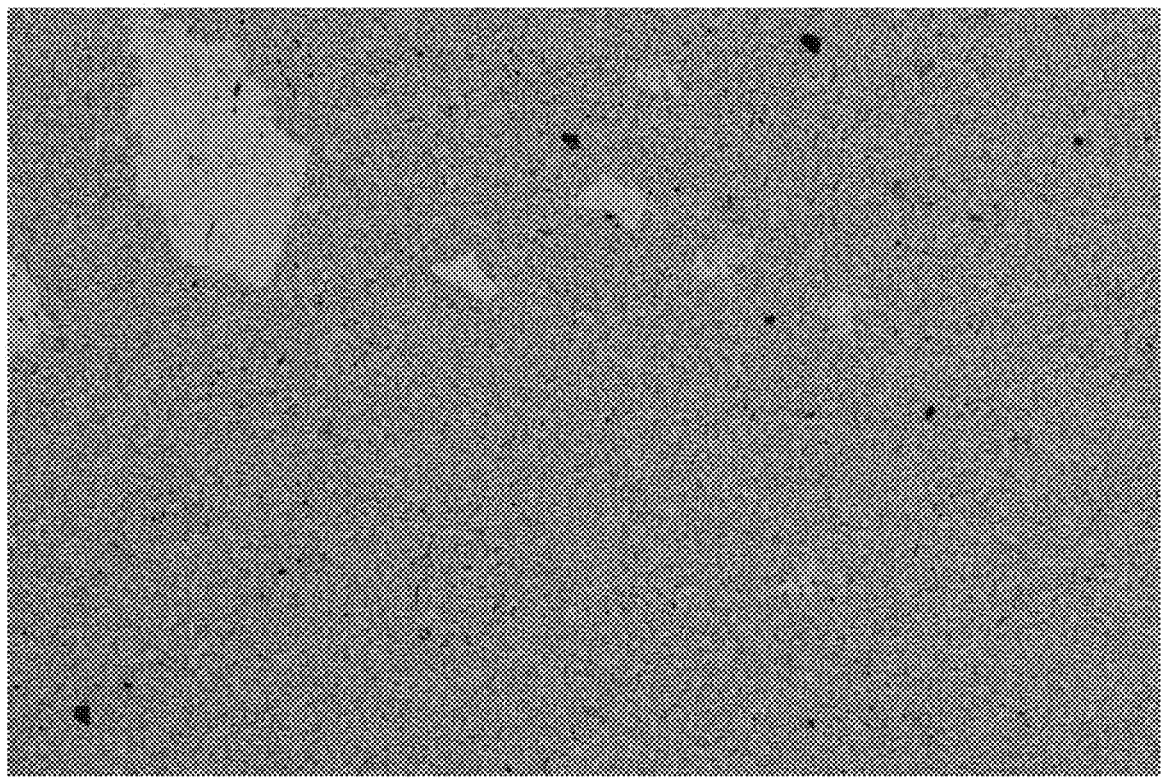
FIG. 30A is an optical micrograph of flakes developed during a delamination test for a glass vial formed from a glass composition prone to delamination.
Figure 30B:
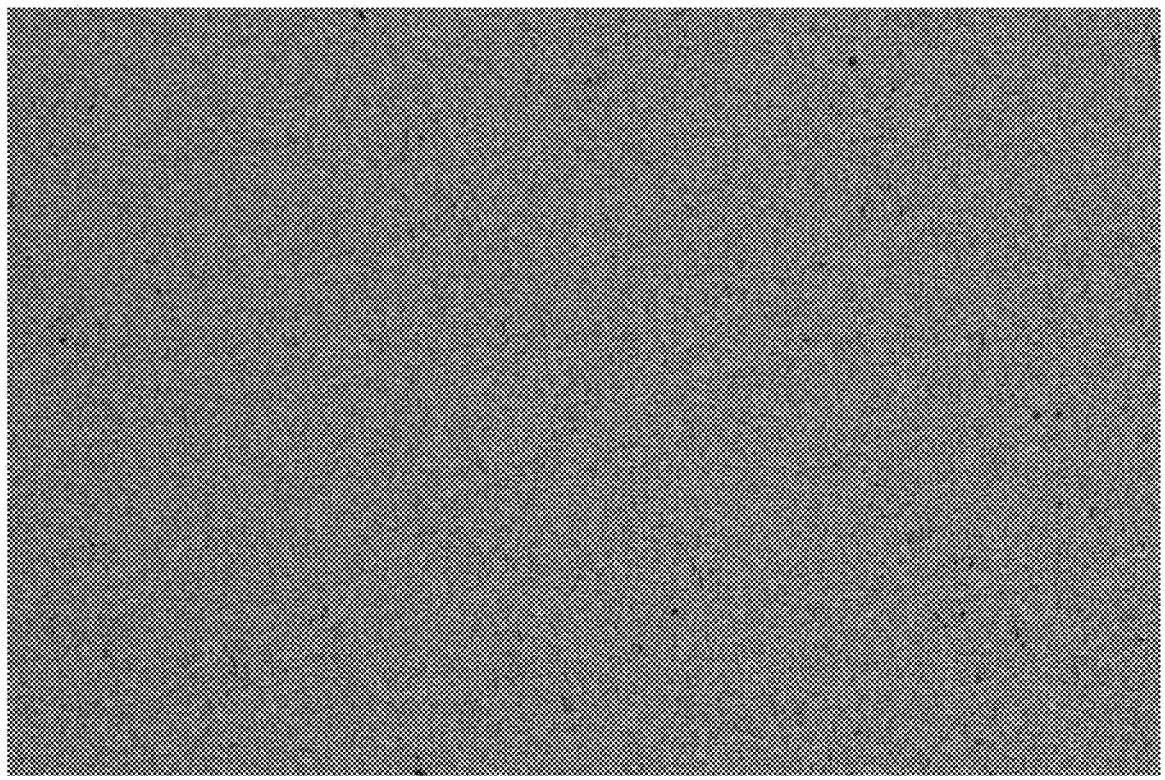
FIG. 30B is an optical micrograph of flakes developed during a delamination test for a glass vial formed from a glass composition resistant to delamination.

The results show that Composition B did not delaminate under the test conditions while Composition A did delaminate. Furthermore, in Composition B, the detected particles (indicated by * in Table 6) were just over 50 µm in length. It could not be clearly ascertained by optical microscopy if these detected particles were flakes or tramp particles. Accordingly, the particles were counted as flakes. Similar arguments could be made for one or two particles from Composition A. However, the large number of flakes consistently observed from the vials formed from Composition A indicates that the flakes primarily originate from delamination and are not tramp particles. Examples of the flakes observed for each composition are shown in FIGS. 30A (Composition A) and 30B (Composition B). In FIG. 30A there are flakes with shiny surfaces and black flakes which have rough surfaces, both of which are displayed on a mottled gray background. It is believed that the shiny surfaces of the flakes are indicative of the interior surface of the vial while the rough surfaces of the black flakes are most likely the underside of the shiny flakes. In FIG. 30B, the image is essentially of the surface of the filter medium used due to the lack of flakes shed from the surface of the vials formed from Composition B.

Example 11

Ion exchanged (IOX) vials prone to delamination were compared to ion exchanged vials that are not prone to delamination by forming a borosilicate glass composition (Composition A) and aluminosilicate glass composition (Composition B) into tubes, converting the tubes into vials, ion exchanging the vials, and subjecting the vials to accelerated delamination testing. Composition A included 75.9 mol. % $SiO_2$, 4.1 mol. % $Al_2O_3$, 10.5 mol. % $B_2O_3$, 6.6 mol. % $Na_2O$, 1.6 mol. % $K_2O$, 0.5 mol. % MgO, 0.6 mol. % CaO, and 0.1 mol. % Cl prior to ion exchange. Composition B included 76.8 mol. % $SiO_2$, 6.0 mol. % $Al_2O_3$, 11.6 mol. % $Na_2O$, 0.1 mol. % $K_2O$, 4.8 mol. % MgO, 0.5 mol. % CaO, and 0.2 mol. % $SnO_2$ prior to ion exchange. The melted compositions were formed into tubes directly from the melt and then subsequently converted into vials of approximately 3 mL size using industry standard converting equipment such as an AMBEG machine. The glass tubing had an outer diameter of approximately 17 mm and a wall thickness of approximately 1.1 mm. Conversion of the tubes was performed using exaggerated heating conditions while still maintaining the ability to form a quality vial. The vials formed from Composition A and Composition B were ion exchanged in a 100% $KNO_3$ salt bath from 3-10 hours at a temperature of 400-500° C. The vials were then subjected to the accelerated delamination test described herein. Thirty vials of each type were washed of debris in a sink, depyrogenated at 320° C. for 1 hour, and filled with 20 mM Glycine solution brought to a pH=10 with NaOH. The vials were stoppered and capped. The vials were autoclaved for 2 hours at 121° C. and then placed into a convection oven at 50° C. for 10 days. Flakes were counted in a manner previously described. The results of the test are shown in Table 7 below.

TABLE 7

Delamination Test Results of Ion Exchanged Vials formed
from Composition A and Composition B

| Vial Type | Trial # | Number of Flakes larger than 50 µm | Delamination Factor |
|---|---|---|---|
| Composition A, IOX | 1 | 125 | 94 |
|  | 2 | 226 |  |
|  | 3 | 151 |  |
| Composition B, IOX | 1 | 1* | 1 |
|  | 2 | 1* |  |
|  | 3 | 0 |  |

Figure 31A:
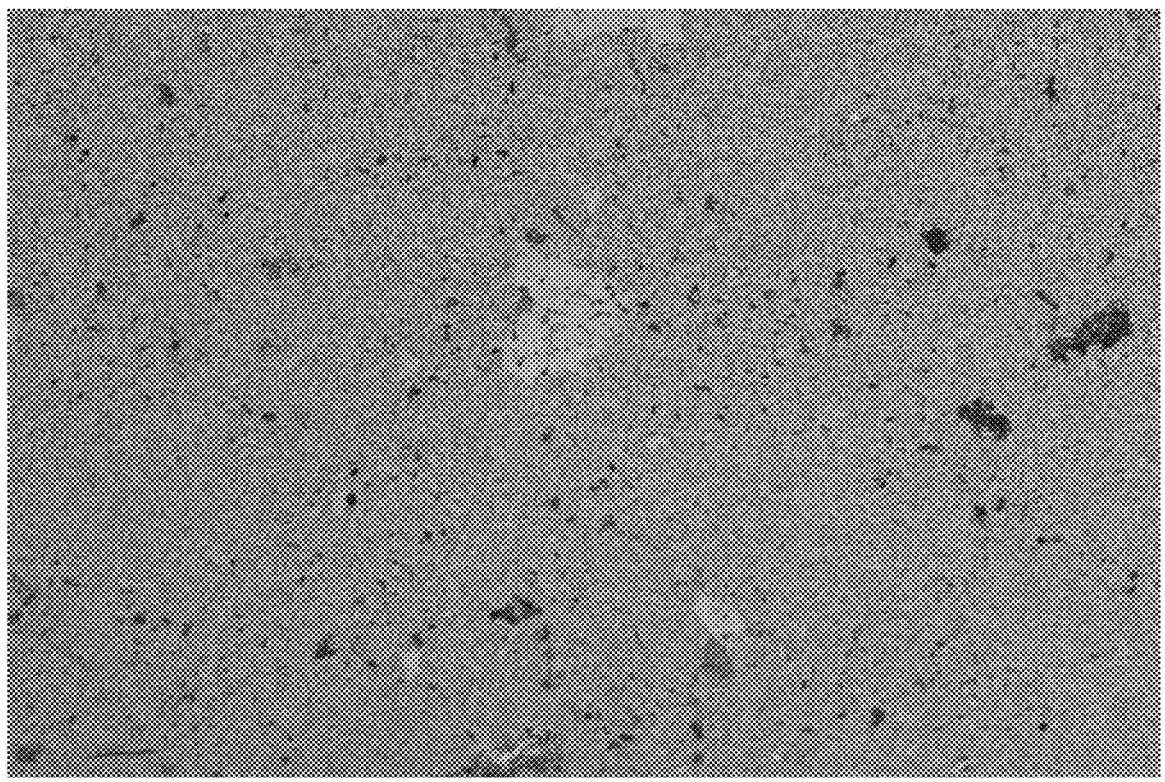
FIG. 31A is an optical micrograph of flakes developed during a delamination test for an ion exchanged glass vial formed from a glass composition prone to delamination.
Figure 31B:
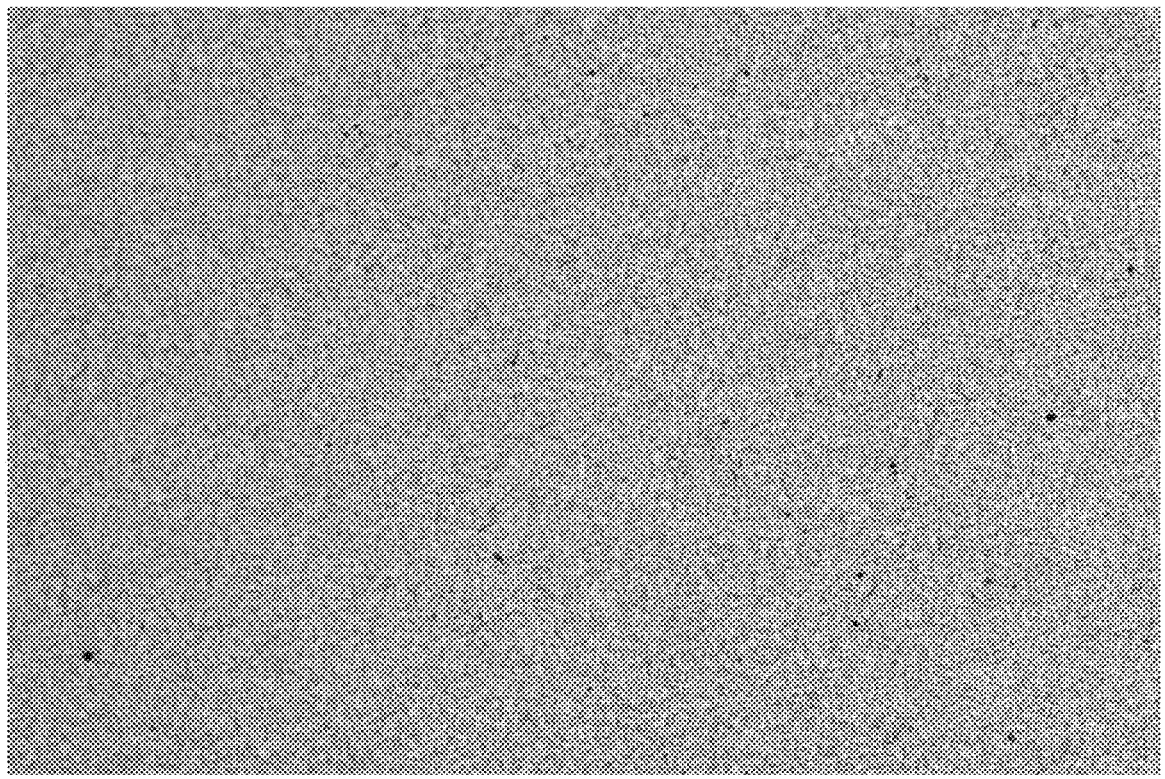
FIG. 31B is an optical micrograph of flakes developed during a delamination test for an ion exchanged glass vial formed from a glass composition resistant to delamination.

The results show that the ion exchanged vials formed from Composition B did not delaminate under the test conditions while the ion exchanged vials formed from Composition A did delaminate. Furthermore, for the ion exchanged vials formed from Composition B, the detected particles (indicated by * in Table 7) were just over 50 µm in length. It could not be clearly ascertained by optical microscopy whether these detected particles were flakes or tramp particles. Accordingly, these particles were counted as flakes. Similar arguments could be made for one or two particles from the ion exchanged vials formed from Composition A. However, the large number of flakes consistently observed from the ion exchanged vials formed from Composition A indicates that the flakes primarily originate from delamination and are not tramp particles. Examples of the flakes observed for each composition are shown in FIGS. 31A (Composition A) and 31B (Composition B). In FIG. 31A there are flakes with shiny surfaces that are smooth and black flakes which have rough surfaces, both of which are displayed on a mottled gray background. It is believed that the shiny surfaces of the flakes are indicative of the interior surface of the vial while the rough surfaces of the black flakes are most likely the underside of the shiny flakes. In FIG. 31B, the image is essentially of the surface of the filter medium used due to the lack of flakes shed from the surface of the ion exchanged vials formed from Composition B.

Example 12

A glass formed from an alkali aluminosilicate glass composition described herein was formed and ion exchanged. The glass had a composition that included 76.8 mol. % $SiO_2$, 6.0 mol. % $Al_2O_3$, 11.6 mol. % $Na_2O$, 0.1 mol. % $K_2O$, 0.5 mol. % CaO, 4.8 mol. % MgO, and 0.2 mol. % $SnO_2$. The glass was ion exchanged for in a 100% $KNO_3$ salt bath at 450° C. for 5 hours. The concentration of potassium ions (mol. %) was measured as function of depth from the surface of the glass. The results are graphically depicted in FIG. 32 with the concentration of potassium ions on the y-axis and the depth in microns on the x-axis. The compressive stress generated at the glass surface is generally proportional to the concentration of potassium ions at the surface.

Figure 32:
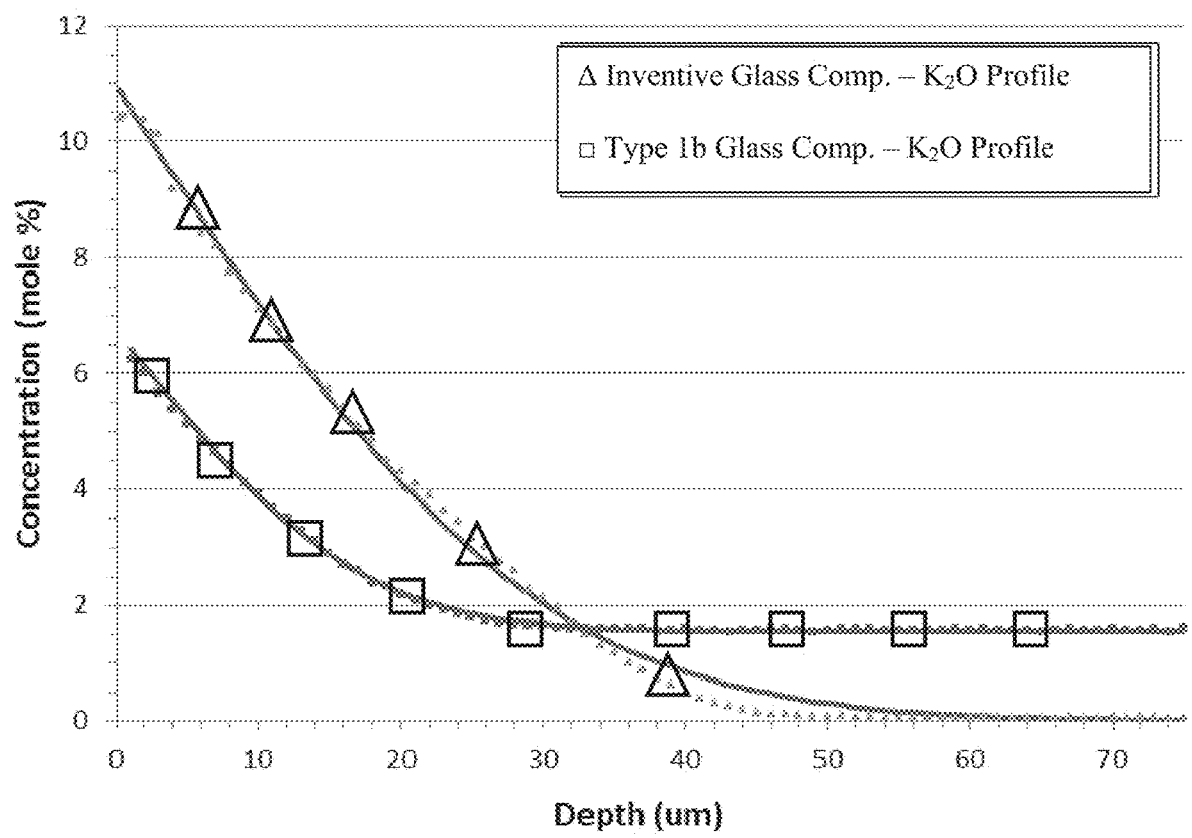
FIG. 32 graphically depicts the concentration of potassium ions (y-axis) as a function of depth (x-axis) for an inventive glass composition and for a conventional Type 1B glass composition.

For purposes of comparison, a conventional Type 1B glass was formed and ion exchanged. The glass composition comprised 74.6 mol. % $SiO_2$, 5.56 mol. % $Al_2O_3$, 6.93 mol. % $Na_2O$, 10.9 mol. % $B_2O_3$, and 1.47 mol. % CaO. The Type 1B glass was ion exchanged under similar conditions as the alkali aluminosilicate glass described above. Specifically, the Type 1B glass was ion exchanged in a 100% $KNO_3$ salt bath at 475° C. for 6 hours. The concentration of potassium ions (mol. %) was measured as function of depth from the surface of the glass. The results are graphically depicted in FIG. 32 with the concentration of potassium ions on the y-axis and the depth in microns on the x-axis. As shown in FIG. 32, the inventive alkali aluminosilicate glass composition had a greater concentration of potassium ions at the surface of the glass than the Type 1B glass generally indicating that the inventive alkali aluminosilicate glass would have higher compressive stress when processed under similar conditions. FIG. 32 also indicates that the inventive alkali aluminosilicate glass composition also produces greater compressive stresses to deeper depths relative to Type 1B glass processed under similar conditions. Accordingly, it is expected that glass containers produced with the inventive alkali aluminosilicate glass compositions described herein would have improved mechanical properties and damage resistance relative to Type 1B glasses processed under the same conditions.

Example 13

Glass tubing was formed from an alkali aluminosilicate glass composition described herein. The inventive glass tubing had a composition that included 76.8 mol. % $SiO_2$, 6.0 mol. % $Al_2O_3$, 11.6 mol. % $Na_2O$, 0.1 mol. % $K_2O$, 0.5 mol. % CaO, 4.8 mol. % MgO, and 0.2 mol. % $SnO_2$. Some samples of the glass tubing were ion exchanged in a 100% $KNO_3$ salt bath at 450° C. for 8 hours. Other samples of the glass tubing remained in as-received condition (non-ion exchanged). For purposes of comparison, glass tubing was also formed from a Type 1B glass composition. The comparative glass tubing had a composition which included 74.6 mol. % $SiO_2$, 5.56 mol. % $Al_2O_3$, 6.93 mol. % $Na_2O$, 10.9 mol. % $B_2O_3$, and 1.47 mol. % CaO. Some samples of the comparative glass tubing were ion exchanged in a 100% $KNO_3$ salt bath at 450° C. for 8 hours. Other samples of the glass tubing remained in as-received condition (non-ion exchanged).

Figure 33:
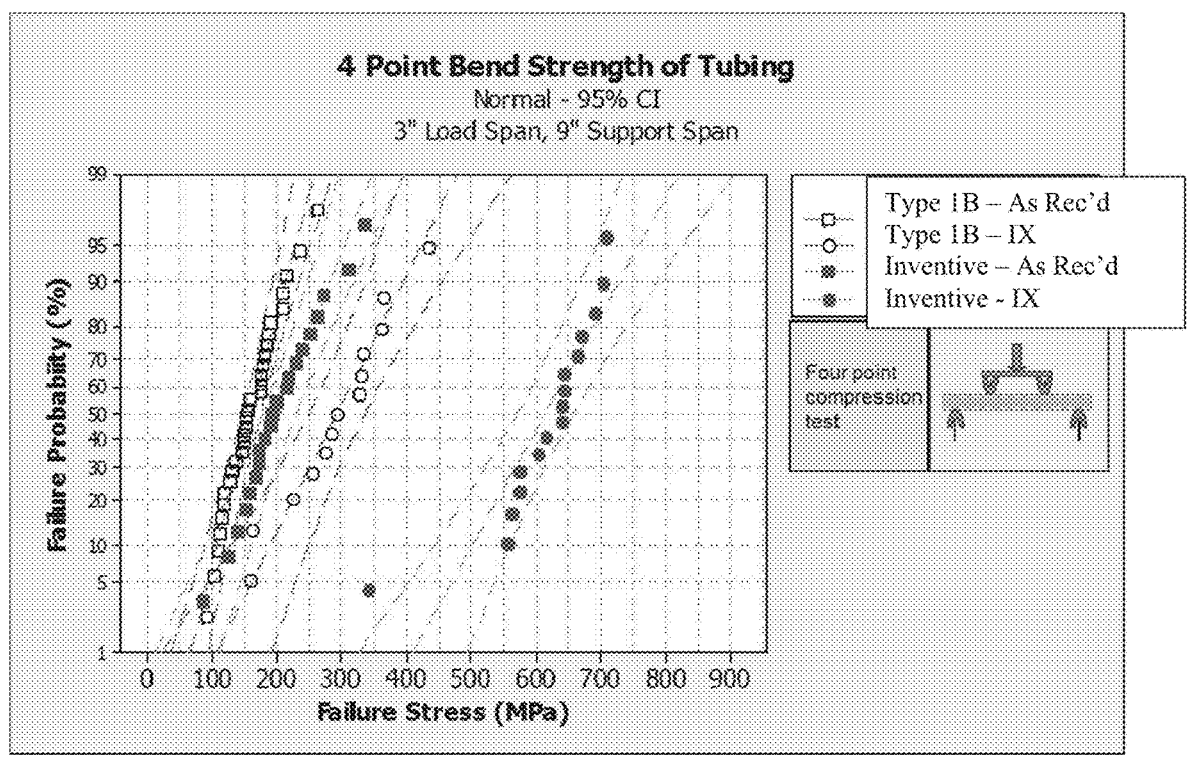
FIG. 33 graphically depicts the bend stress failure probability (y-axis) as a function of failure stress (x-axis) for glass tubes formed from inventive glass compositions and conventional Type 1B glass compositions.

All of the samples were tested in a 4 point bend test to determine the bending strength of the individual tubing. The 4 point bend jig had a 3 inch load span and a 9 inch support span, as shown in FIG. 33. FIG. 33 also includes a Weibull plot of the failure probability (y-axis) as a function of the failure stress (x-axis). As shown in FIG. 33, the inventive alkali aluminosilicate glass tubing had slightly better bend strength in as received condition compared to the as received Type 1B glass tubing. However, following ion exchange strengthening, the inventive alkali aluminosilicate glass tubing had significantly greater bend strength than the Type 1B glass tubing indicating that glass containers formed from the inventive glass tubing would have improved mechanical properties relative to glass containers formed from the Type 1B glass tubing.

Example 14

Figure 34:
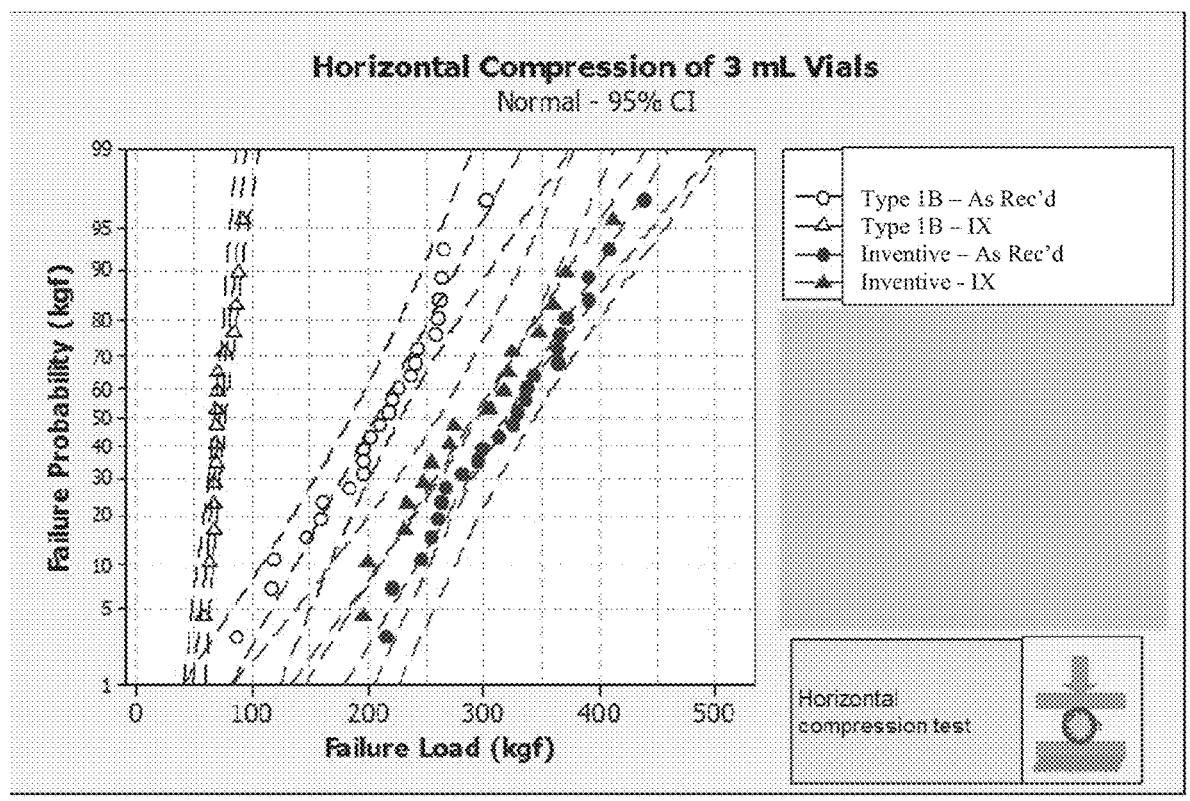
FIG. 34 graphically depicts the horizontal compression failure probability (y-axis) as a function failure stress (x-axis) for coated glass containers formed from inventive glass compositions and comparative glass compositions.

Referring now to FIG. 34, the effect of the high temperature coating on the retained strength of the vials was measured in a horizontal compression test. Specifically, uncoated Type 1B borosilicate vials having a compositions of 74.6 mol. % $SiO_2$, 5.56 mol. % $Al_2O_3$, 6.93 mol. % $Na_2O$, 10.9 mol. % $B_2O_3$, and 1.47 mol. % CaO and coated vials formed from an inventive glass composition comprising 76.8 mol. % $SiO_2$, 6.0 mol. % $Al_2O_3$, 11.6 mol. % $Na_2O$, 0.1 mol. % $K_2O$, 0.5 mol. % CaO, 4.8 mol. % MgO, and 0.2 mol. % $SnO_2$ were tested in scratched and unscratched conditions. Scratch damage was introduced to the vials through a vial-on-vial frictive test under an applied load of 30 N. As shown in FIG. 34, the coated vials have a greater retained strength following frictive damage than the uncoated vials formed from the Type 1B borosilicate glass composition.

Example 15

Glass vials were formed from Schott Type 1B glass and the glass composition identified as "Example E" of Table 2 (hereinafter "the Reference Glass Composition"). The vials were washed with deionized water, blown dry with nitrogen, and dip coated with a 0.1% solution of APS (aminopropylsilsesquioxane). The APS coating was dried at 100° C. in a convection oven for 15 minutes. The vials were then dipped into a 0.1% solution of Novastrat® 800 polyamic acid in a 15/85 toluene/DMF solution or in a 0.1% to 1% poly(pyromellitic dianhydride-co-4,4'-oxydianiline) amic acid solution (Kapton precursor) in N-Methyl-2-pyrrolidone (NMP). The coated vials were heated to 150° C. and held for 20 minutes to evaporate the solvents. Thereafter, the coatings were cured by placing the coated vials into a preheated furnace at 300° C. for 30 minutes. After curing, the vials coated with the 0.1% solution of Novastrat® 800 had no visible color. However, the vials coated with the solution of poly(pyromellitic dianhydride-co-4,4'oxydianiline) were visibly yellow in color. Both coatings exhibited a low coefficient of friction in vial-to-vial contact tests.

Example 16

Glass vials formed from Schott Type 1B glass vials (as received/uncoated) and vials coated with a heat-tolerant coating were compared to assess the loss of mechanical strength due to abrasion. The coated vials were produced by first ion exchange strengthening glass vials produced from the Reference Glass Composition. The ion exchange strengthening was performed in a 100% $KNO_3$ bath at 450° C. for 8 hours. Thereafter, the vials were washed with deionized water, blown dry with nitrogen, and dip coated with a 0.1% solution of APS (aminopropylsilsesquioxane). The APS coating was dried at 100° C. in a convection oven for 15 minutes. The vials were then dipped into a 0.1% solution of Novastrat® 800 polyamic acid in a 15/85 toluene/DMF solution. The coated vials were heated to 150° C. and held for 20 minutes to evaporate the solvents. Thereafter, the coatings were cured by placing the coated vials into a preheated furnace at 300° C. for 30 minutes. The coated vials were then soaked in 70° C. de-ionized water for 1 hour and heated in air at 320° C. for 2 hours to simulate actual processing conditions.

Figure 35:
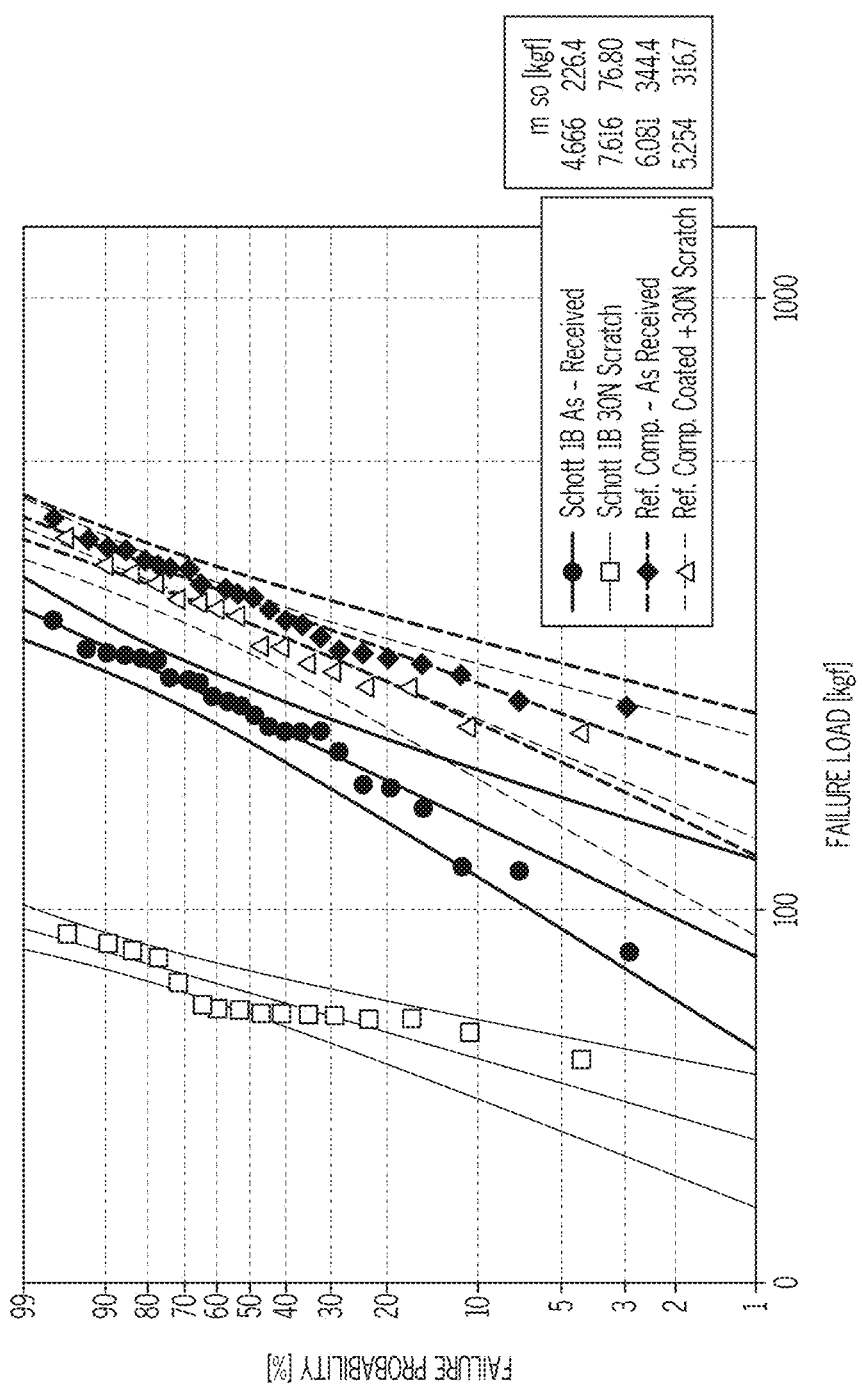
FIG. 35 graphically depicts the failure probability as a function of applied load in a horizontal compression test for vials, according to one or more embodiments shown and described herein.

Unabraded vials formed from the Schott Type 1B glass and unabraded vials formed from the ion-exchange strengthened and coated Reference Glass Composition were tested to failure in a horizontal compression test (i.e., a plate was placed over the top of the vial and a plate was placed under the bottom of the vial and the plates were pressed together and the applied load at failure was determined with a load cell). FIG. 35 graphically depicts the failure probability as a function of applied load in a horizontal compression test for vials formed from a Reference Glass Composition, vials formed from a Reference Glass Composition in a coated and abraded condition, vials formed from Schott Type 1B glass, and vials formed from Schott Type 1B glass in an abraded condition. The failure loads of the unabraded vials are graphically depicted in the Weibull plots. Sample vials formed from the Schott Type 1B glass and unabraded vials formed from the ion-exchange strengthened and coated glass were then placed in the vial-on-vial jig of FIG. 11 to abrade the vials and determine the coefficient of friction between the vials as they were rubbed together over a contact area having a 0.3 mm diameter. The load on the vials during the test was applied with a UMT machine and was varied between 24 N and 44 N. The applied loads and the corresponding maximum coefficient of friction are reported in the Table contained in FIG. 36. For the uncoated vials, the maximum coefficient of friction varied from 0.54 to 0.71 (shown in FIG. 36 as vial samples "3&4" and "7&8", respectively) and while for the coated vials the maximum coefficient of friction varied from 0.19 to 0.41 (shown in FIG. 36 as vial samples "15&16" and "12&14", respectively). Thereafter, the scratched vials were tested in the horizontal compression test to assess the loss of mechanical strength relative to the unabraded vials. The failure loads applied to the unabraded vials are graphically depicted in the Weibull plots of FIG. 35.

As shown in FIG. 35, the uncoated vials had a significant decrease in strength after abrasion whereas the coated vials had a relatively minor decrease in strength after abrasion. Based on these results, it is believed that the coefficient of friction between the vials should be less than 0.7 or 0.5, or even less than 0.45 in order to mitigate the loss of strength following vial-on-vial abrasion.

Example 17

In this example, multiple sets of glass tubes were tested in four point bending to assess their respective strengths. A first set of tubes formed from the Reference Glass Composition was tested in four point bending in as received condition (un-coated, non-ion exchange strengthened). A second set of tubes formed from the Reference Glass Composition was tested in four point bending after being ion exchange strengthened in a 100% KNO₃ bath at 450° C. for 8 hours. A third set of tubes formed from the Reference Glass Composition was tested in four point bending after being ion exchange strengthened in a 100% KNO₃ bath at 450° C. for 8 hours and coated with 0.1% APS/0.1% Novastrat® 800 as described in Example 16. The coated tubes were also soaked in 70° C. de-ionized water for 1 hour and heated in air at 320° C. for 2 hours to simulate actual processing conditions. These coated tubes were also abraded in the vial-on-vial jig shown in FIG. 11 under a 30 N load prior to bend testing. A fourth set of tubes formed from the Reference Glass Composition was tested in four point bending after being ion exchange strengthened in a 100% KNO₃ bath at 450° C. for 1 hour. These uncoated, ion exchange strengthened tubes were also abraded in the vial-on-vial jig shown in FIG. 11 under a 30 N load prior to bend testing. A fifth set of tubes formed from Schott Type 1B glass was tested in four point bending in as received condition (uncoated, non-ion exchange strengthened). A sixth set of tubes formed from Schott Type 1B glass was tested in four point bending after being ion exchange strengthened in a 100% KNO₃ bath at 450° C. for 1 hour. The results of testing are graphically depicted in the Weibull plots displayed in FIG. 37.

Figure 37:
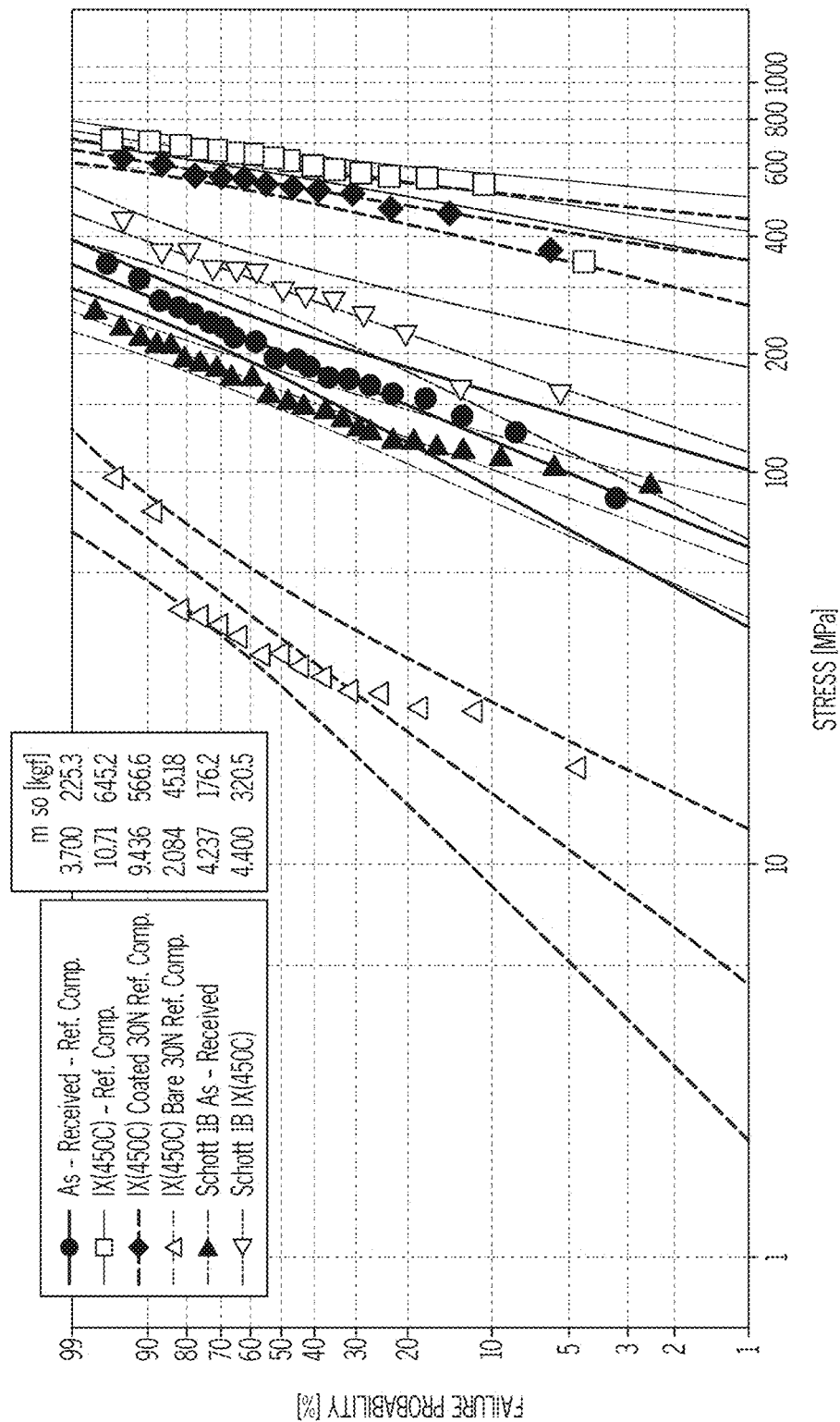
FIG. 37 graphically depicts the failure probability as a function of applied stress in four point bending for tubes formed from a Reference Glass Composition in as received condition, in ion exchanged condition (uncoated), in ion exchanged condition (coated and abraded), in ion exchanged condition (uncoated and abraded) and for tubes formed from Type 1B glass in as received condition and in ion exchanged condition, according to one or more embodiments shown and described herein.

Referring to FIG. 37, the second set of tubes which were non-abraded and formed from the Reference Glass Composition and ion exchange strengthened withstood the highest stress before breaking. The third set of tubes which were coated with the 0.1% APS/0.1% Novastrat® 800 prior to abrading showed a slight reduction in strength relative to their uncoated, non-abraded equivalents (i.e., the second set of tubes). However, the reduction in strength was relatively minor despite being subjected to abrading after coating.

Example 18

Two sets of vials were prepared and run through a pharmaceutical filling line. A pressure sensitive tape (commercially available from FujiFilm) was inserted in between the vials to measure contact/impact forces between the vials and between the vials and the equipment. The first set of vials was formed from the Reference Glass Composition and was not coated. The second set of vials was formed from the Reference Glass Composition and was coated with a low-friction polyimide based coating having a coefficient of friction of about 0.25, as described above. The pressure sensitive tapes were analyzed after the vials were run through the pharmaceutical filling line and demonstrated that the coated vials of the second set exhibited a 2-3 times reduction in stress compared to the un-coated vials of the first set.

Example 19

Figure 38:
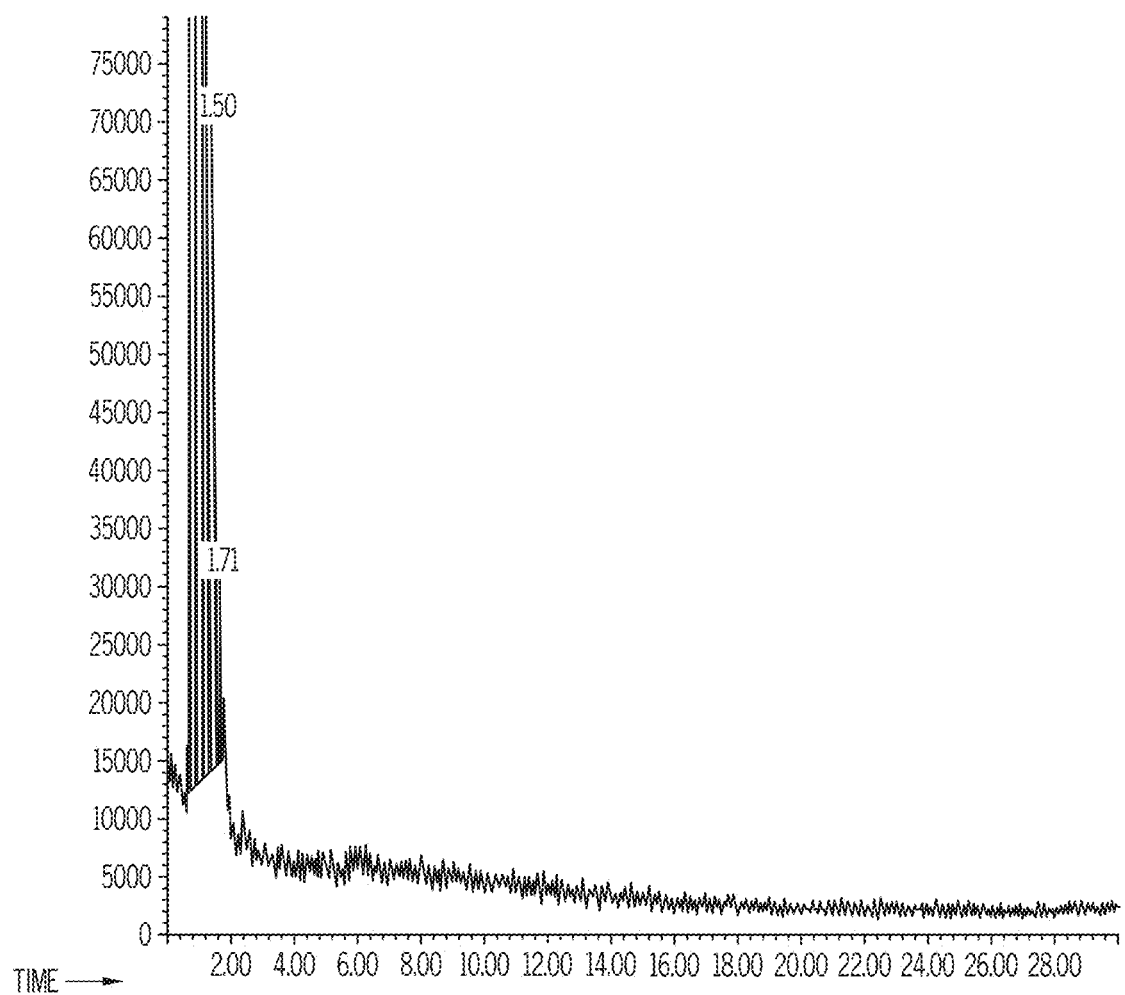
FIG. 38 depicts gas chromatograph-mass spectrometer output data for a APS/Novastrat® 800 coating, according to one or more embodiments shown and described herein.
Figure 39:
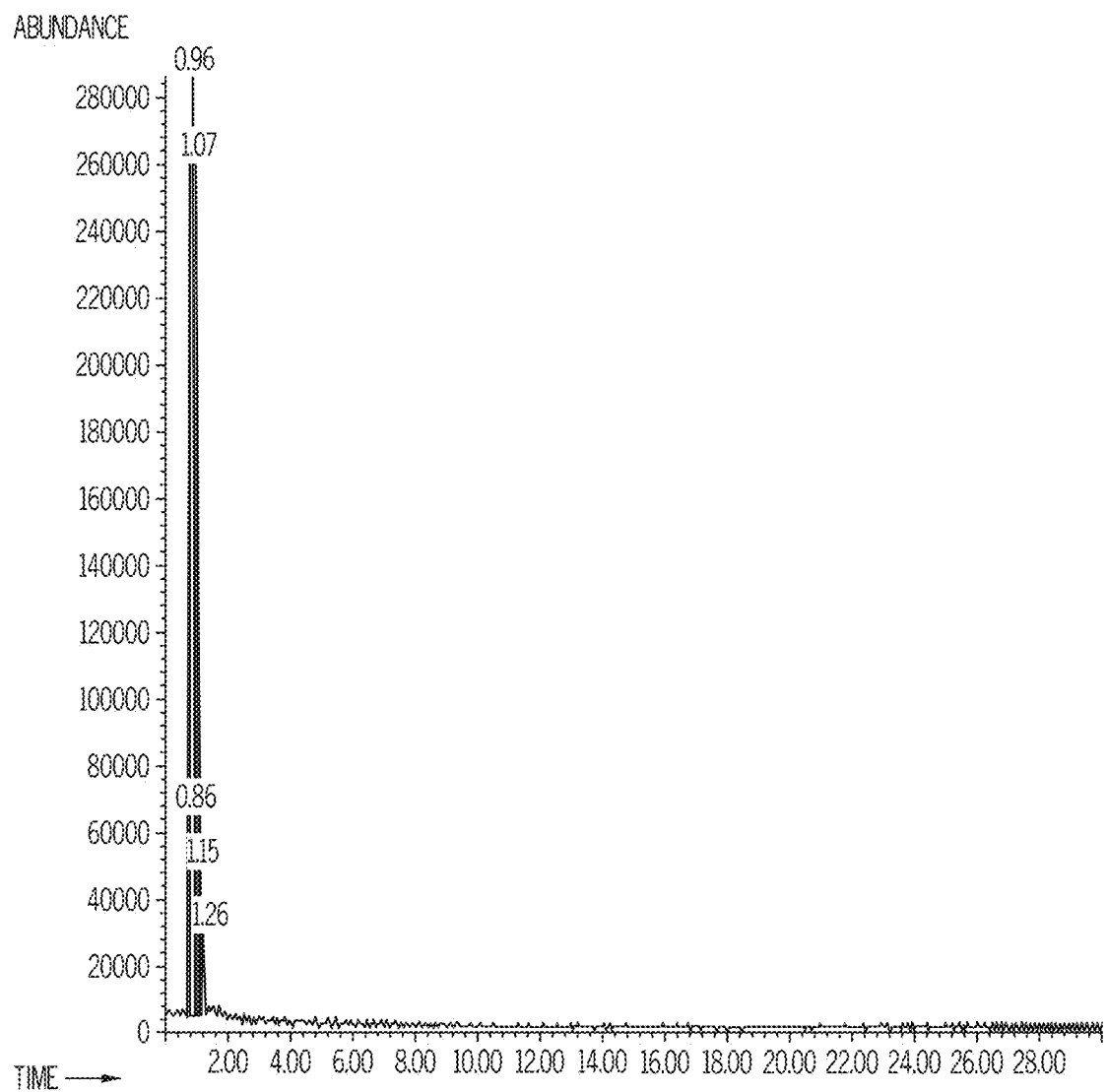
FIG. 39 depicts gas chromatography-mass spectrometer output data for a DC806A coating, according to one or more embodiments shown and described herein.

Three sets of four vials each were prepared. All the vials were formed from the Reference Glass Composition. The first set of vials was coated with the APS/Novastrat® 800 coating as described in Example 16. The second set of vials was dip coated with 0.1% DC806A in toluene. The solvent was evaporated at 50° C. and the coating was cured at 300° C. for 30 min. Each set of vials was placed in a tube and heated to 320° C. for 2.5 hours under an air purge to remove trace contaminants adsorbed into the vials in the lab environment. Each set of samples was then heated in the tube for another 30 minutes and the outgassed volatiles were captured on an activated carbon sorbent trap. The trap was heated to 350° C. over 30 minutes to desorb any captured material which was fed into a gas chromatograph-mass spectrometer. FIG. 38 depicts gas chromatograph-mass spectrometer output data for the APS/Novastrat® 800 coating. FIG. 39 depicts gas chromatography-mass spectrometer output data for the DC806A coating. No outgassing was detected from the 0.1% APS/0.1% Novastrat® 800 coating or the DC806A coating.

A set of four vials was coated with a tie-layer using 0.5%/0.5% GAPS/APhTMS solution in methanol/water mixture. Each vial had a coated surface area of about 18.3 cm². Solvent was allowed to evaporate at 120° C. for 15 min from the coated vials. Then a 0.5% Novastrat® 800 solutions in dimethylacetamide was applied onto the samples. The solvent was evaporated at 150° C. for 20 min. These uncured vials were subjected to an outgassing test described above. The vials were heated to 320° C. in a stream of air (100 mL/min) and upon reaching 320° C. the outgassed volatiles were captured on an activated carbon sorbent traps every 15 min. The traps then were heated to 350° C. over 30 minutes to desorb any captured material which was fed into a gas chromatograph-mass spectrometer. Table 8 shows the amount of captured materials over the segments of time that the samples were held at 320° C. Time zero corresponds with the time that the sample first reached a temperature of 320° C. As seen in Table 8, after 30 min of heating the amount of volatiles decreases below the instrument detection limit of 100 ng. Table 8 also reports the volatiles lost per square cm of coated surface.

TABLE 8

Volatiles per vial and per area.

| Time Period at 320° C. | Amount, ng/vial | Amount ng/cm² |
| --- | --- | --- |
| 25° C. to 320° C. ramp (t = 0) | 60404 | 3301 |
| t = 0 to 15 min | 9371 | 512 |
| t = 15 to 30 min | 321 | 18 |
| t = 30 to 45 min | <100 | <5 |
| t = 45 to 60 min | <100 | <5 |
| t = 60 to 90 min | <100 | <5 |

Example 20

A plurality of vials was prepared with various coatings based on silicon resin or polyimides with and without coupling agents. When coupling agents were used, the coupling agents included APS and GAPS (3-aminopropyl-trialkoxysilane), which is a precursor for APS. The outer coating layer was prepared from Novastrat® 800, the poly (pyromellitic dianhydride-co-4,4'oxydianiline) described above, or silicone resins such as DC806A and DC255. The APS/Kapton coatings were prepared using a 0.1% solution of APS (aminopropylsilsesquioxane) and 0.1% solution, 0.5% solution or 1.0% solutions of poly(pyromellitic dian-hydride-co-4,4'-oxydianiline) amic acid (Kapton precursor) in N-methyl-2-pyrrolidone (NMP). Kapton coatings were also applied without a coupling agent using a 1.0% solution of the poly(pyromellitic dianhydride-co-4,4'oxydianiline) in NMP. The APS/Novastrat® 800 coatings were prepared using a 0.1% solution of APS (aminopropylsilsesquioxane) and a 0.1% solution of Novastrat® 800 polyamic acid in a 15/85 toluene/DMF solution. The DC255 coatings were applied directly to the glass without a coupling agent using a 1.0% solution of DC255 in Toluene. The APS/DC806A coatings were prepared by first applying a 0.1% solution of APS in water and then a 0.1% solution or a 0.5% solution of DC806A in toluene. The GAPS/DC806A coatings were applied using a 1.0% solution of GAPS in 95 wt. % ethanol in water as a coupling agent and then a 1.0% solution of DC806A in toluene. The coupling agents and coatings were applied using dip coating methods as described herein with the coupling agents being heat treated after application and the silicon resin and polyimide coatings being dried and cured after application. The coating thicknesses were estimated based on the concentrations of the solutions used. The Table contained in FIG. 40 lists the various coating compositions, estimated coating thicknesses and testing conditions.

Thereafter, some of the vials were tumbled to simulate coating damage and others were subjected to abrasion under 30 N and 50 N loads in the vial-on-vial jig depicted in FIG. 11. Thereafter, all the vials were subjected to a lyophilization (freeze drying process) in which the vials were filled with 0.5 mL of sodium chloride solution and then frozen at –100° C. Lyophilization was then performed for 20 hours at –15° C. under vacuum. The vials were inspected with optical quality assurance equipment and under microscope. No damage to the coatings was observed due to lyophilization.

Example 21

Figure 41:
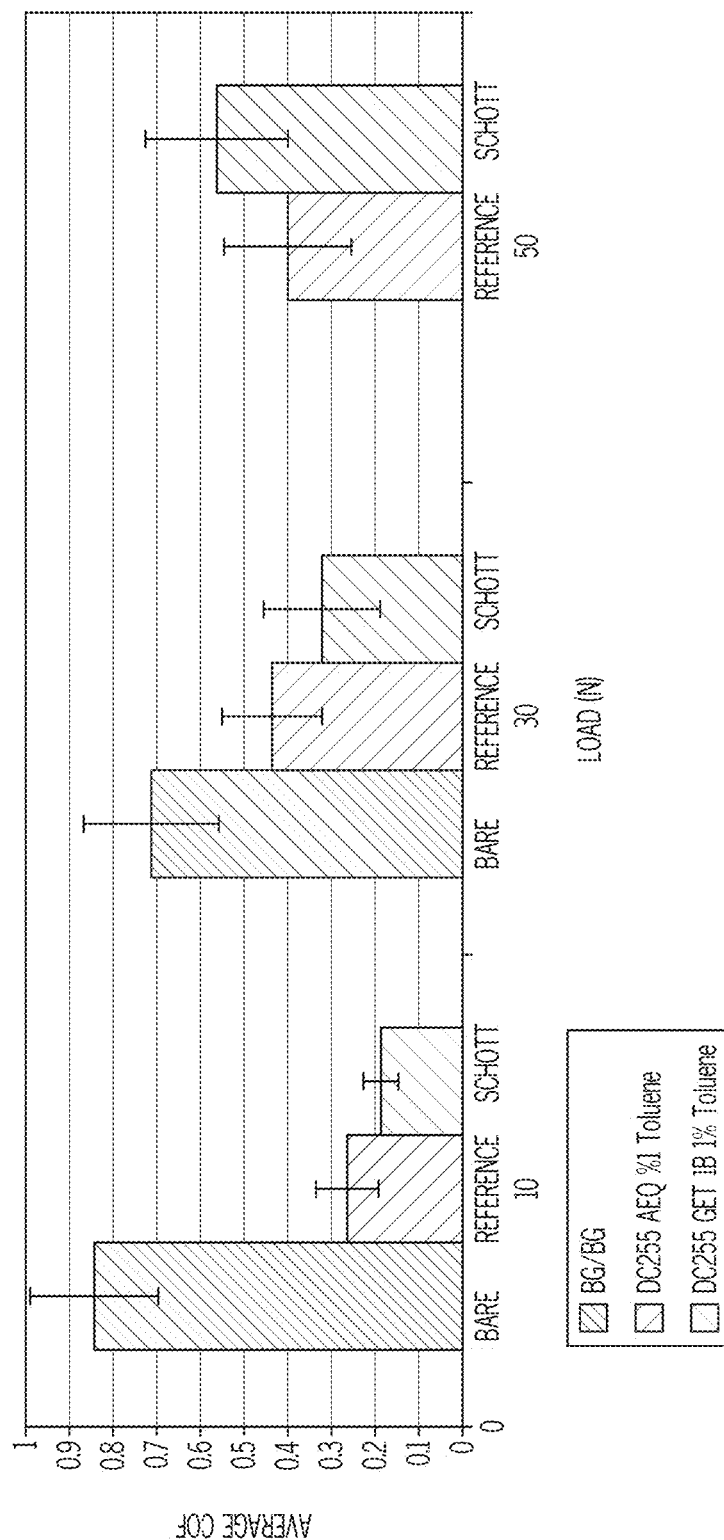
FIG. 41 contains a chart reporting the coefficient of friction for bare glass vials and vials having a silicone resin coating tested in a vial-on-vial jig, according to one or more embodiments shown and described herein.

Three sets of six vials were prepared to assess the effect of increasing load on the coefficient of friction for uncoated vials and vials coated with Dow Corning DC 255 silicone resin. A first set of vials was formed from Type 1B glass and left uncoated. The second set of vials was formed from the Reference Glass Composition and coated with a 1% solution of DC255 in Toluene and cured at 300° C. for 30 min. The third set of vials was formed from Schott Type 1B glass and coated with a 1% solution of DC255 in Toluene. The vials of each set were placed in the vial-on-vial jig depicted in FIG. 11 and the coefficient of friction relative to a similarly coated vial was measured during abrasion under static loads of 10 N, 30 N, and 50 N. The results are graphically reported in FIG. 41. As shown in FIG. 41, coated vials showed appreciably lower coefficients of friction compared to uncoated vials when abraded under the same conditions irrespective of the glass composition.

Example 22

Three sets of two glass vials were prepared with an APS/Kapton coating. First, each of the vials was dip coated in a 0.1% solution of APS (aminopropylsilsesquioxane). The APS coating was dried at 100° C. in a convection oven for 15 minutes. The vials were then dipped into a 0.1% poly (pyromellitic dianhydride-co-4,4'-oxydianiline) amic acid solution (Kapton precursor) in N-methyl-2-pyrrolidone (NMP). Thereafter, the coatings were cured by placing the coated vials into a preheated furnace at 300° C. for 30 minutes.

Figure 42:
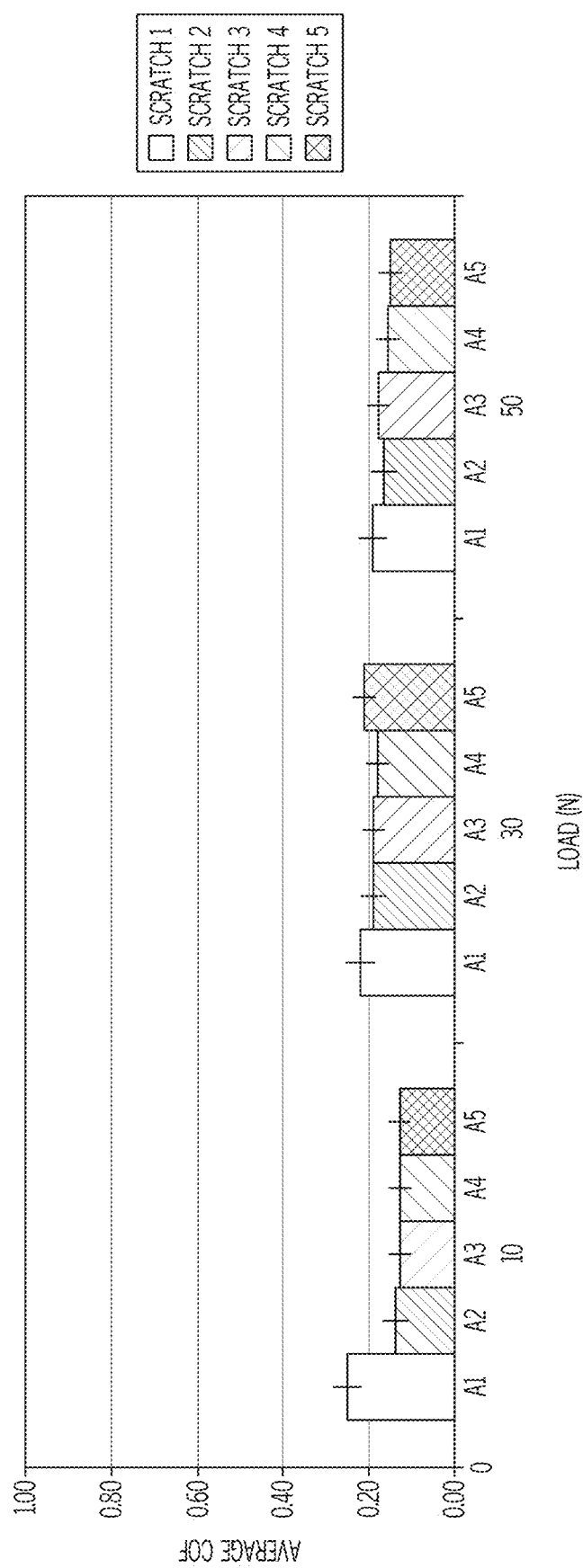
FIG. 42 contains a chart reporting the coefficient of friction for vials coated with an APS/Kapton polyimide coating and abraded multiple times under different applied loads in a vial-on-vial jig, according to one or more embodiments shown and described herein.

Two vials were placed in the vial-on-vial jig depicted in FIG. 11 and abraded under a 10 N loaded. The abrasion procedure was repeated 4 more times over the same area and the coefficient of friction was determined for each abrasion. The vials were wiped between abrasions and the starting point of each abrasion was positioned on a previously non-abraded area. However, each abrasion traveled over the same "track". The same procedure was repeated for loads of 30 N and 50 N. The coefficients of friction of each abrasion (i.e., A1-A5) are graphically depicted in FIG. 42 for each load. As shown in FIG. 42, the coefficient of friction of the APS/Kapton coated vials was generally less than 0.30 for all abrasions at all loads. The examples demonstrate improved resistance to abrasion for polyimide coating when applied over a glass surface treated with a coupling agent.

Example 23

Figure 43:
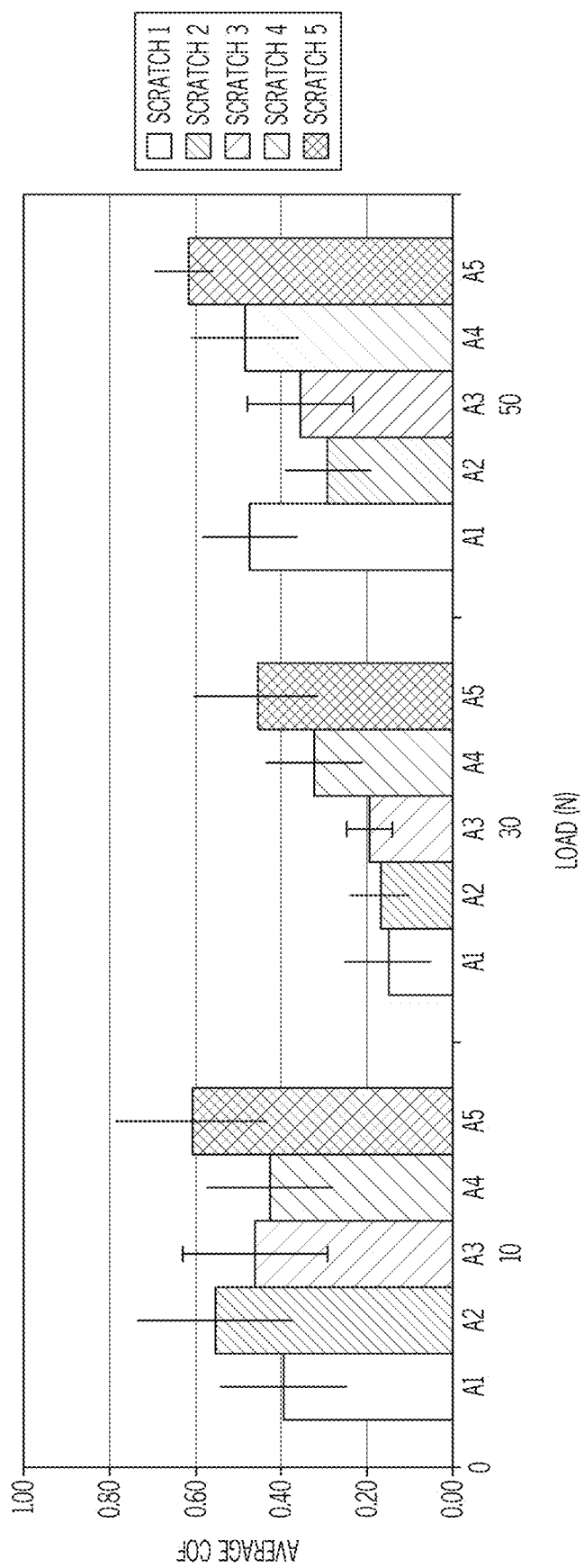
FIG. 43 contains a chart reporting the coefficient of friction for vials coated with an APS coating and abraded multiple times under different applied loads in a vial-on-vial jig, according to one or more embodiments shown and described herein.

Three sets of two glass vials were prepared with an APS coating. Each of the vials were dip coated in a 0.1% solution of APS (aminopropylsilsesquioxane) and heated at 100° C. in a convection oven for 15 minutes. Two vials were placed in the vial-on-vial jig depicted in FIG. 11 and abraded under a 10 N load. The abrasion procedure was repeated 4 more times over the same area and the coefficient of friction was determined for each abrasion. The vials were wiped between abrasions and the starting point of each abrasion was positioned on a previously non-abraded area. However, each abrasion traveled over the same "track". The same procedure was repeated for loads of 30 N and 50 N. The coefficients of friction of each abrasion (i.e., A1-A5) are graphically depicted in FIG. 43 for each load. As shown in FIG. 43, the coefficient of friction of the APS only coated vials is generally higher than 0.3 and often reached 0.6 or even higher.

Example 24

Three sets of two glass vials were prepared with an APS/Kapton coating. Each of the vials was dip coated in a 0.1% solution of APS (aminopropylsilsesquioxane). The APS coating was heated at 100° C. in a convection oven for 15 minutes. The vials were then dipped into a 0.1% poly (pyromellitic dianhydride-co-4,4'-oxydianiline) amic acid solution (Kapton precursor) in N-methyl-2-pyrrolidone (NMP). Thereafter, the coatings were cured by placing the coated vials in into a preheated furnace at 300° C. for 30 minutes. The coated vials were then depyrogenated (heated) at 300° C. for 12 hours.

Figure 44:
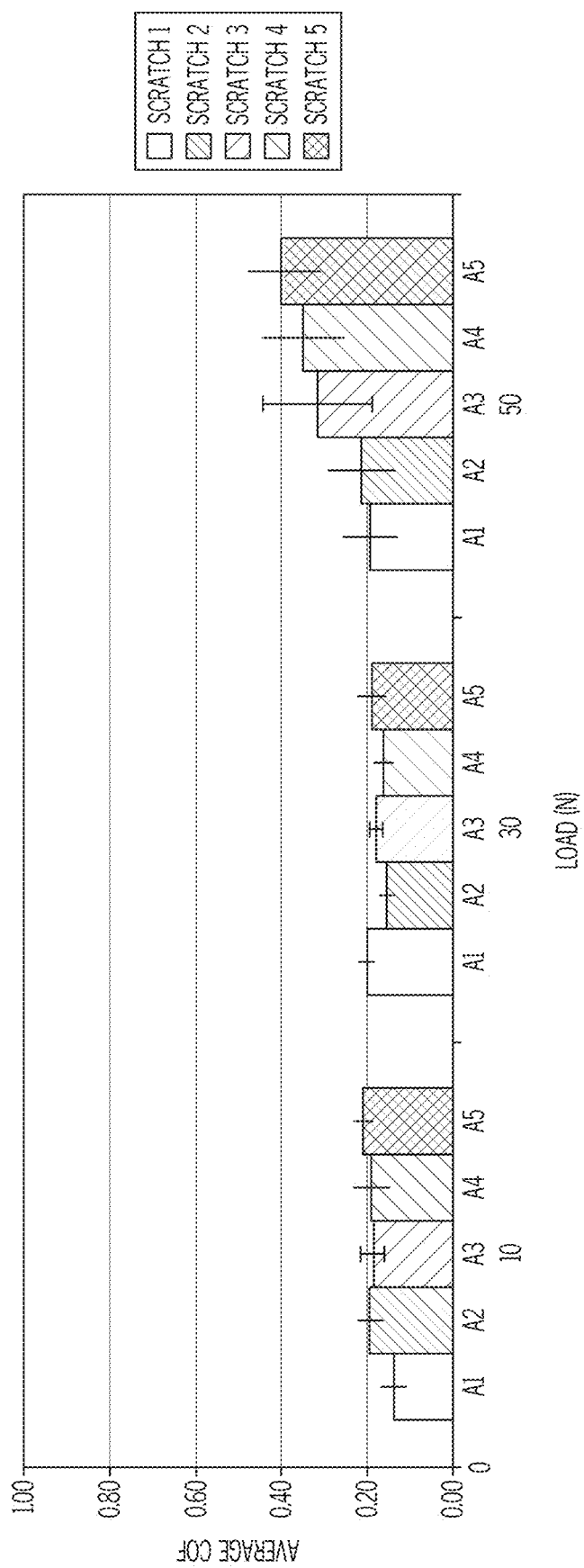
FIG. 44 contains a chart reporting the coefficient of friction for vials coated with an APS/Kapton polyimide coating and abraded multiple times under different applied loads in a vial-on-vial jig after the vials were exposed to 300° C. for 12 hours, according to one or more embodiments shown and described herein.

Two vials were placed in the vial-on-vial jig depicted in FIG. 11 and abraded under a 10 N load. The abrasion procedure was repeated 4 more times over the same area and the coefficient of friction was determined for each abrasion. The vials were wiped between abrasions and the starting point of each abrasion was positioned on a previously abraded area and each abrasion was performed over the same "track". The same procedure was repeated for loads of 30 N and 50 N. The coefficients of friction of each abrasion (i.e., A1-A5) are graphically depicted in FIG. 44 for each load. As shown in FIG. 44, the coefficients of friction of the APS/Kapton coated vials were generally uniform and approximately 0.20 or less for the abrasions introduced at loads of 10 N and 30 N. However, when the applied load was increased to 50 N, the coefficient of friction increased for each successive abrasion, with the fifth abrasion having a coefficient of friction slightly less than 0.40.

Example 25

Figure 45:
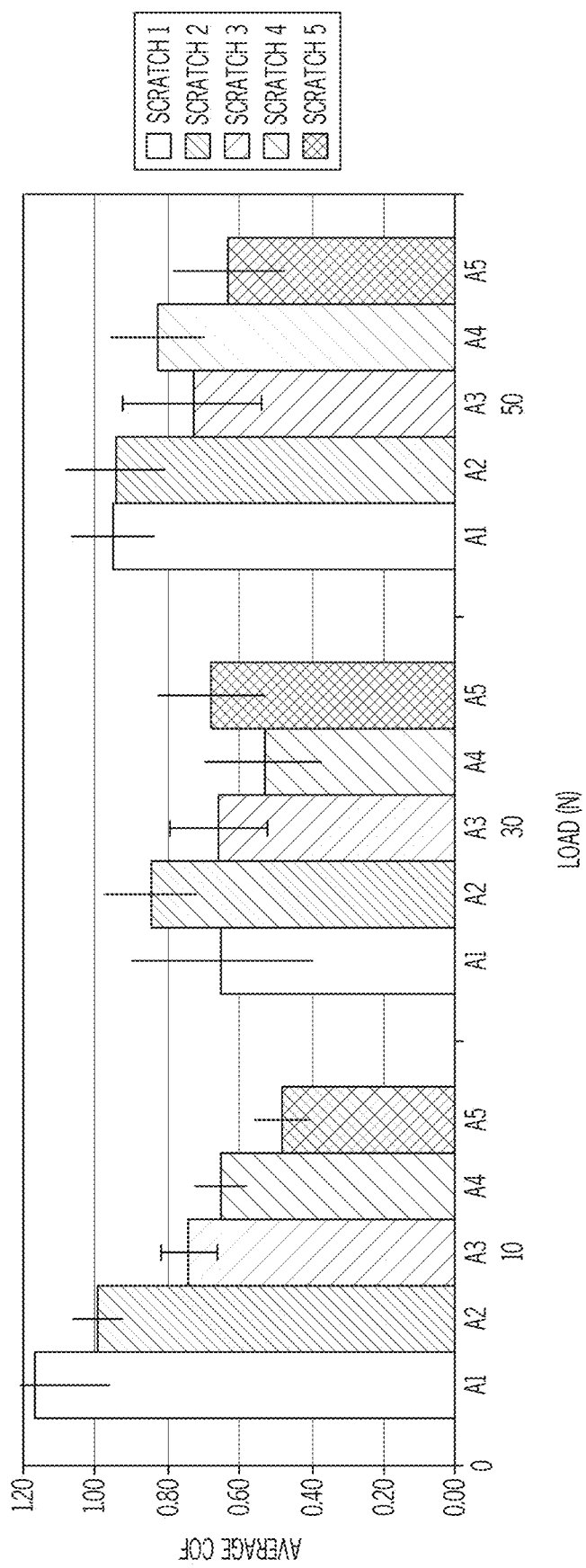
FIG. 45 contains a chart reporting the coefficient of friction for vials coated with an APS coating and abraded multiple times under different applied loads in a vial-on-vial jig after the vials were exposed to 300° C. for 12 hours, according to one or more embodiments shown and described herein.

Three sets of two glass vials were prepared with an APS (aminopropylsilsesquioxane) coating. Each of the vials was dip coated in a 0.1% solution of APS and heated at 100° C. in a convection oven for 15 minutes. The coated vials were then depyrogenated (heated) at 300° C. for 12 hours. Two vials were placed in the vial-on-vial jig depicted in FIG. 11 and abraded under a 10 N loaded. The abrasion procedure was repeated 4 more times over the same area and the coefficient of friction was determined for each abrasion. The vials were wiped between abrasions and the starting point of each abrasion was positioned on a previously abraded area and each abrasion traveled over the same "track". The same procedure was repeated for loads of 30 N and 50 N. The coefficients of friction of each abrasion (i.e., A1-A5) are graphically depicted in FIG. 45 for each load. As shown in FIG. 45, the coefficients of friction of the APS coated vials depyrogenated for 12 hours were significantly higher than the APS coated vials shown in FIG. 43 and were similar to coefficients of friction exhibited by uncoated glass vials, indicating that the vials may have experienced a significant loss of mechanical strength due to the abrasions.

Example 26

Three sets of two glass vials formed from Schott Type 1B glass were prepared with a Kapton coating. The vials were dipped into a 0.1% poly(pyromellitic dianhydride-co-4,4'-oxydianiline) amic acid solution (Kapton precursor) in N-Methyl-2-pyrrolidone (NMP). Thereafter, the coatings were dried at 150° C. for 20 min and then cured by placing the coated vials in into a preheated furnace at 300° C. for 30 minutes.

Figure 46:
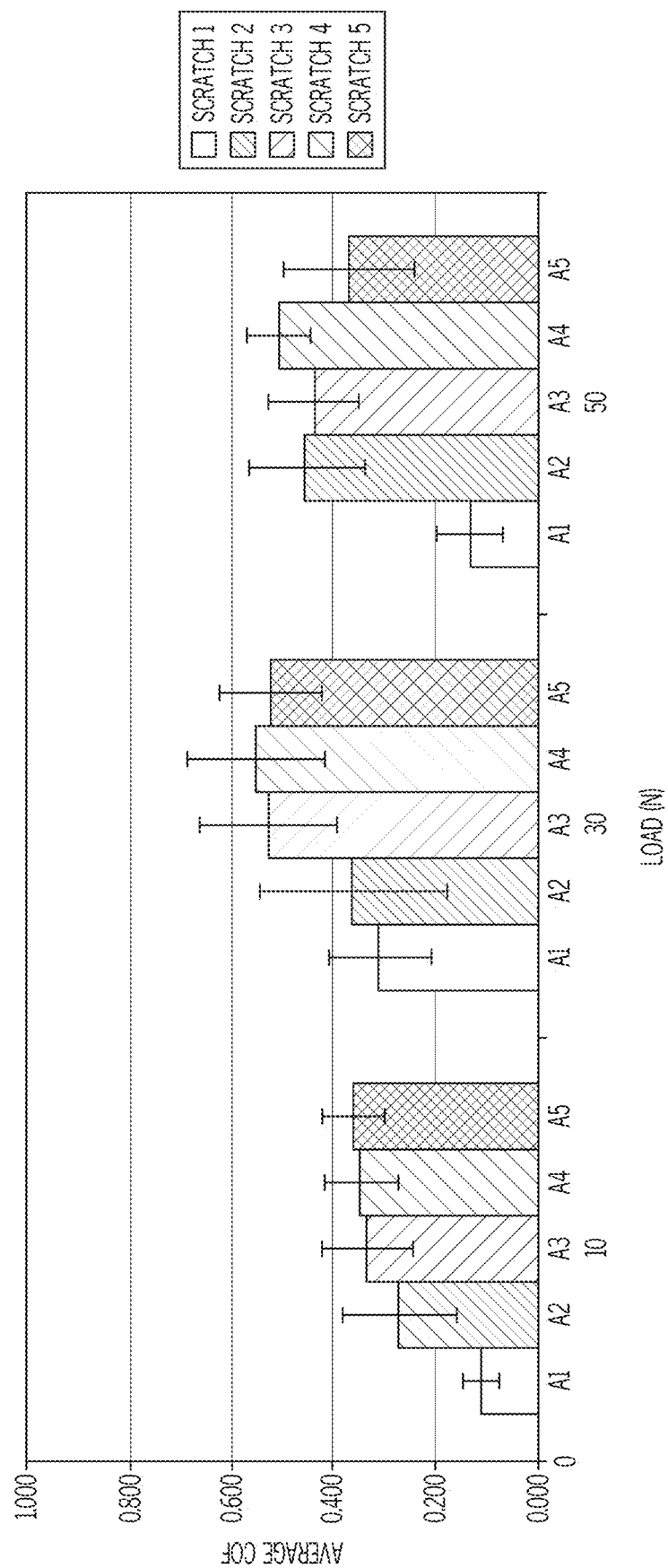
FIG. 46 contains a chart reporting the coefficient of friction for Type 1B vials coated with a Kapton polyimide coating and abraded multiple times under different applied loads in a vial-on-vial jig, according to one or more embodiments shown and described herein.

Two vials were placed in the vial-on-vial jig depicted in FIG. 11 and abraded under a 10 N loaded. The abrasion procedure was repeated 4 more times over the same area and the coefficient of friction was determined for each abrasion. The vials were wiped between abrasions and the starting point of each abrasion was positioned on a previously non-abraded area. However, each abrasion traveled over the same "track". The same procedure was repeated for loads of 30 N and 50 N. The coefficients of friction of each abrasion (i.e., A1-A5) are graphically depicted in FIG. 46 for each load. As shown in FIG. 46, the coefficients of friction of the Kapton coated vials generally increased after the first abrasion demonstrating poor abrasion resistance of a polyimide coating applied onto a glass without a coupling agent.

Example 27

The APS/Novastrat® 800 coated vials of Example 20 were tested for their coefficient of friction after lyophilization using a vial-on-vial jig shown in FIG. 11 with a 30 N load. No increase in coefficient of friction was detected after lyophilization. FIG. 47 contains Tables showing the coefficient of friction for the APS/Novastrat® 800 coated vials before and after lyophilization.

Example 28

The Reference Glass Composition vials were ion exchanged and coated as described in Example 16. The coated vials were autoclaved using the following protocol: 10 minute steam purge at 100° C., followed by a 20 minute dwelling period wherein the coated glass container 100 is exposed to a 121° C. environment, followed by 30 minutes of treatment at 121° C. The coefficient of friction for autoclaved and non-autoclaved vials was measured using a vial-on-vial jig shown in FIG. 11 with 30 N load. FIG. 48 shows the coefficient of friction for APS/Novastrat® 800 coated vials before and after autoclaving. No increase in coefficient of friction was detected after autoclaving.

Example 29

Figure 49:
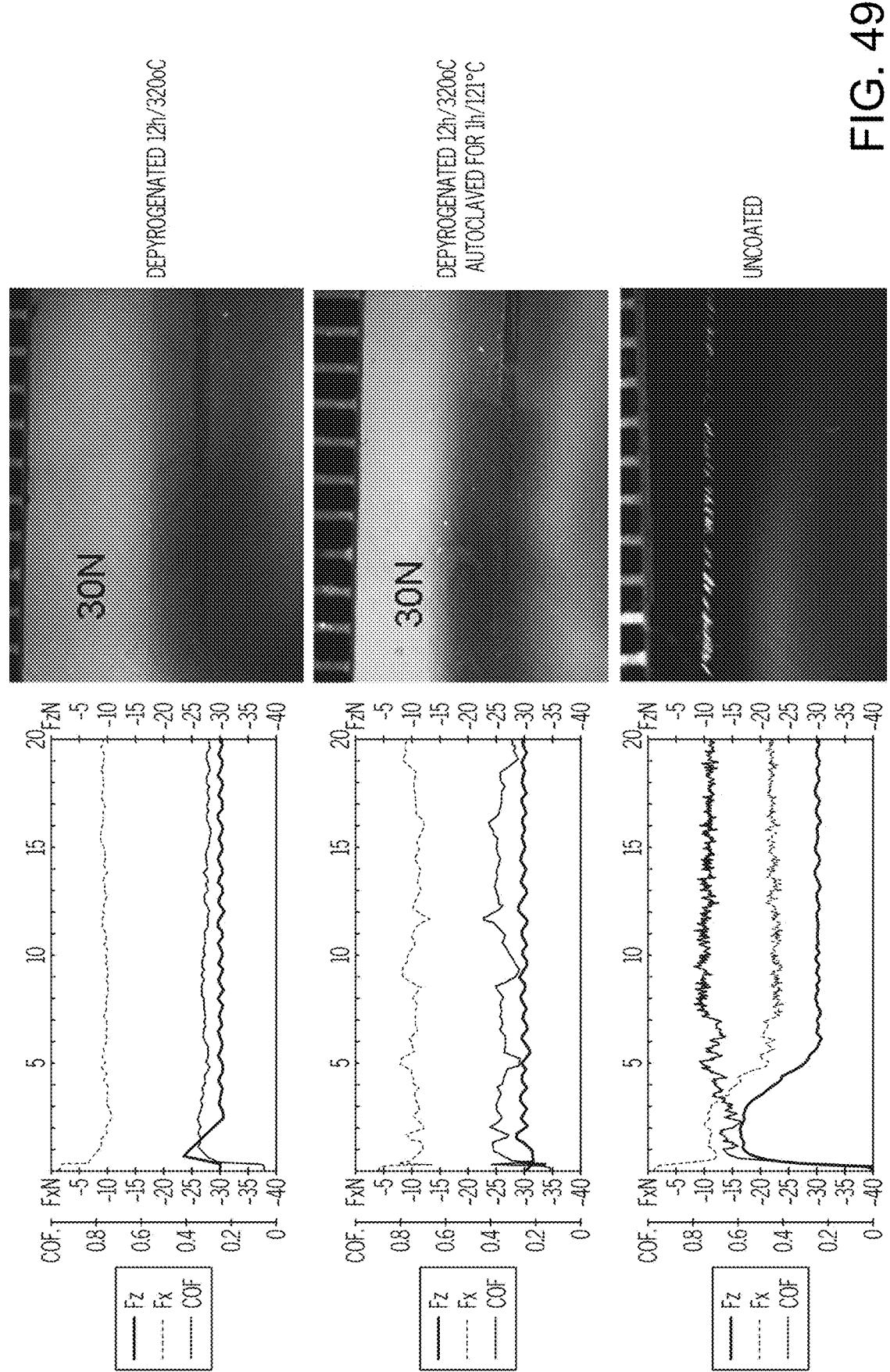
FIG. 49 graphically depicts the coefficient of friction for coated glass containers exposed to different temperature conditions and for an uncoated glass container.

Three sets of vials were prepared to assess the efficacy of coatings on mitigating damage to the vials. A first set of vials was coated with a polyimide outer coating later with an intermediate coupling agent layer. The outer layer consisted of the Novastrat® 800 polyimide, which was applied as a solution of polyamic acid in dimethylacetamide and imidized by heating to 300° C. The coupling agent layer consisted of the APS and aminophenyltrimethoxysilane (APhTMS) in a 1:8 ratio. These vials were depyrogenated for 12 hours at 320° C. As with the first set of vials, the second set of vials was coated with a polyimide outer coating layer with an intermediate coupling agent layer. The second set of vials was depyrogenated for 12 hours at 320° C. and then autoclaved for 1 hour at 121° C. A third set of vials was left uncoated. Each set of vials was then subjected to a vial-on-vial frictive test under a 30 N load. The coefficient of friction for each set of vials is reported in FIG. 49. Photographs of the vial surface showing damage (or the lack of damage) experienced by each vial is also depicted in FIG. 49. As shown in FIG. 49, the uncoated vials generally had a coefficient of friction greater than about 0.7. The uncoated vials also incurred visually perceptible damage as a result of the testing. However, the coated vials had a coefficient of friction of less than 0.45 without any visually perceptible surface damage.

Figure 50:
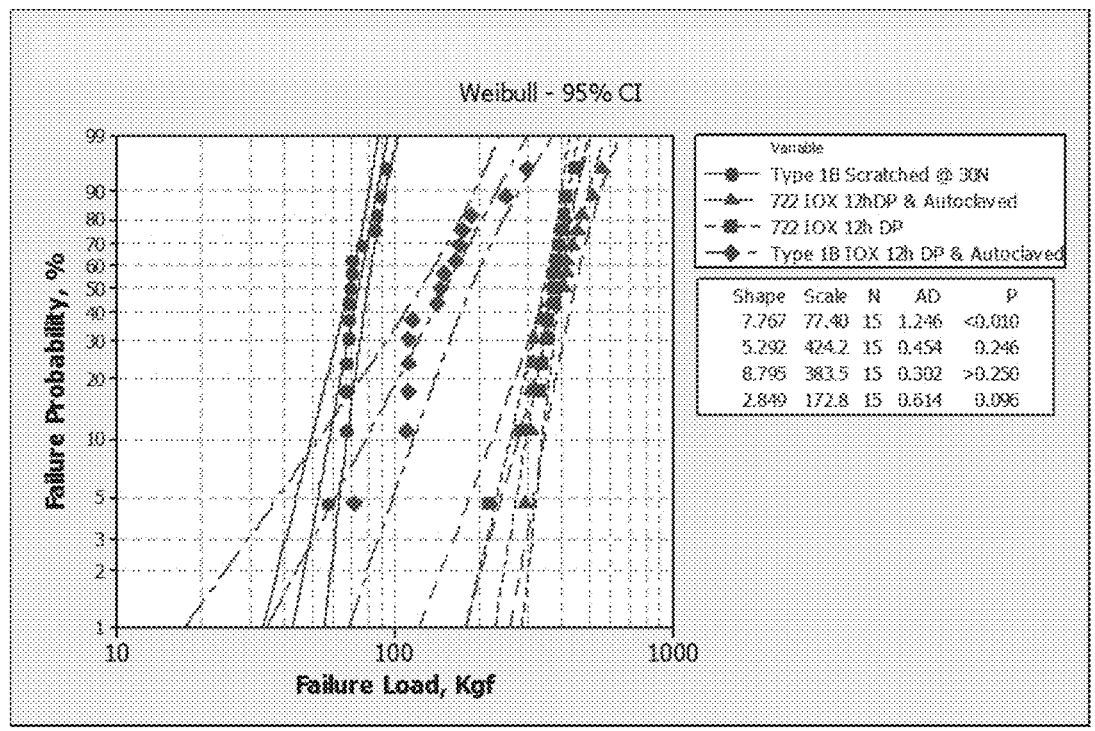
FIG. 50 graphically depicts the failure probability as a function of applied load in a horizontal compression test for vials, according to one or more embodiments shown and described herein.

The coated vials were also subjected to depyrogenation, as described above, autoclave conditions, or both. FIG. 50 graphically depicts the failure probability as a function of applied load in a horizontal compression test for the vials. There was no statistical difference between depyrogenated vials and depyrogenated and autoclaved vials.

Example 30

Referring now to FIG. 51, vials were prepared with three different coating compositions to assess the effect of different ratios of silanes on the coefficient of friction of the applied coating. The first coating composition included a coupling agent layer having a 1:1 ratio of GAPS to aminophenyltrimethyloxysilane and an outer coating layer which consisted of 1.0% Novastrat® 800 polyimide. The second coating composition included a coupling agent layer having a 1:0.5 ratio of GAPS to aminophenyltrimethyloxysilane and an outer coating layer which consisted of 1.0% Novastrat® 800 polyimide. The third coating composition included a coupling agent layer having a 1:0.2 ratio of GAPS to aminophenyltrimethyloxysilane and an outer coating layer which consisted of 1.0% Novastrat® 800 polyimide. All the vials were depyrogenated for 12 hours at 320° C. Thereafter, the vials were subjected to a vial-on-vial frictive test under loads of 20 N and 30 N. The average applied normal force, coefficient of friction, and maximum frictive force (Fx) for each vial is reported in FIG. 51. As shown in FIG. 51, decreasing the amount of aromatic silane (i.e., the aminophenytrimethyloxysilane) increases the coefficient of friction between the vials as well as the frictive force experienced by the vials.

Example 31

Vials formed from type 1B ion-exchanged glasses were prepared with heat-tolerant coatings have varying ratios of silanes.

Figure 52:
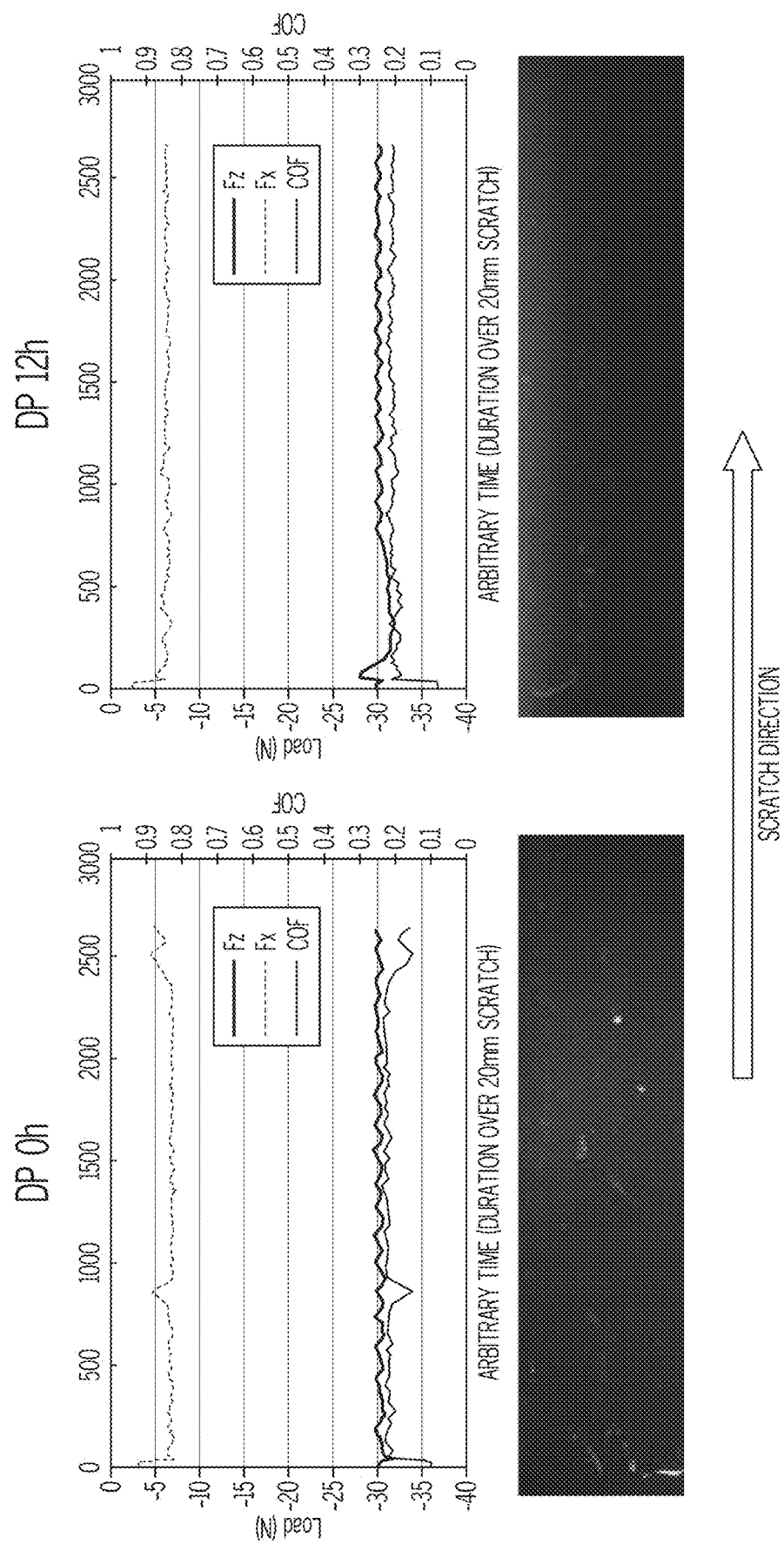
FIG. 52 graphically depicts the coefficient of friction, applied force and frictive force for coated glass containers before and after depyrogenation.

Samples were prepared with a composition which included a coupling agent layer formed from 0.125% APS and 1.0% aminophenyltrimethyloxysilane (APhTMS), having a ratio of 1:8, and an outer coating layer formed from 0.1% Novastrat® 800 polyimide. The thermal stability of the applied coating was evaluated by determining the coefficient of friction and frictive force of vials before and after depyrogenation. Specifically, coated vials were subjected to a vial-on-vial frictive test under a load of 30 N. The coefficient of friction and frictive force were measured and are plotted in FIG. 52 as a function of time. A second set of vials were depyrogenated for 12 hours at 320° C. and subjected to the same vial-on-vial frictive test under a load of 30 N. The coefficient of friction remained the same both before and after depyrogenation indicating that the coatings were thermally stable. A photograph of the contacted area of the glass is also shown.

Figure 53:
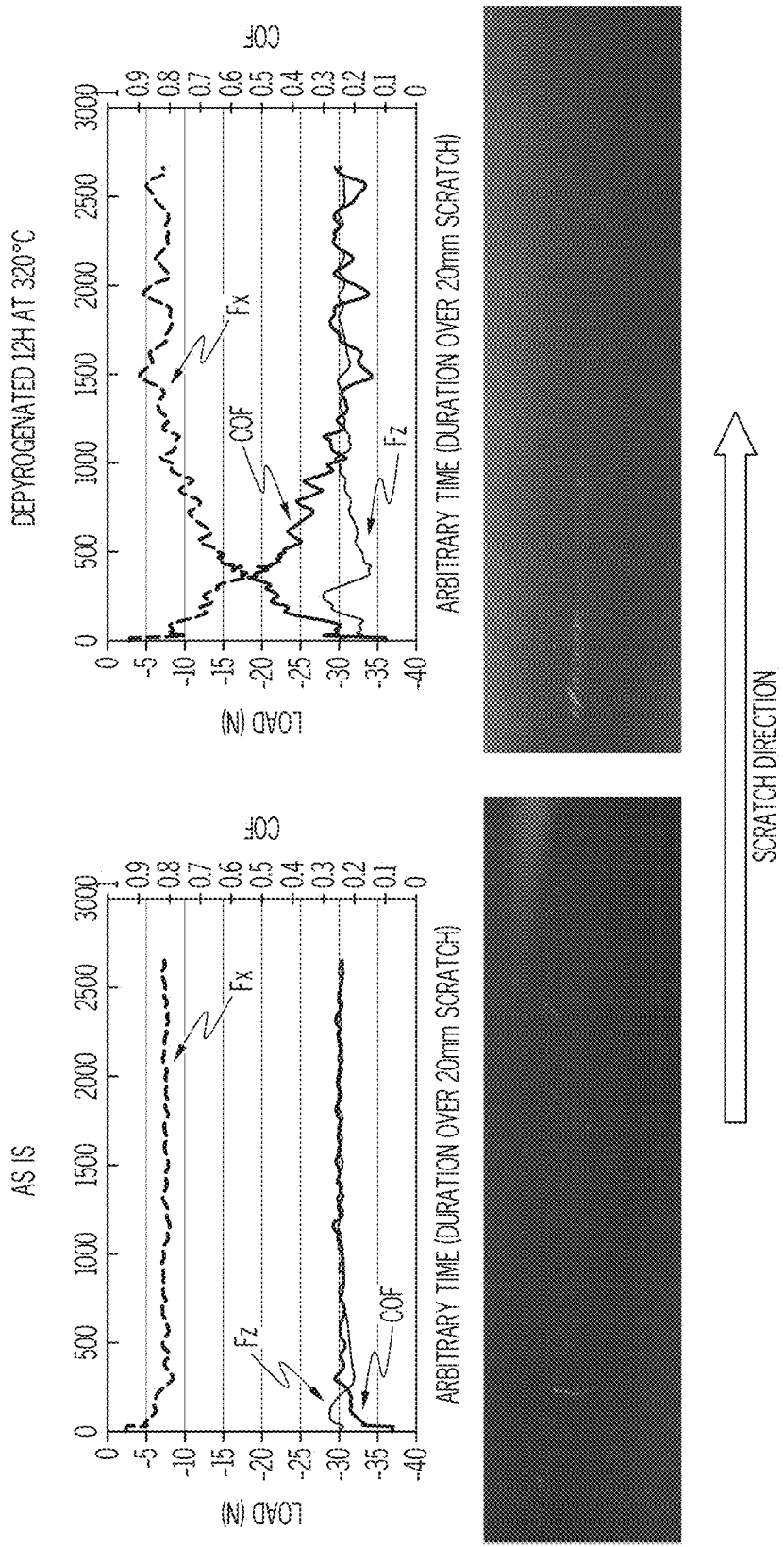
FIG. 53 graphically depicts the coefficient of friction, applied force and frictive force for coated glass containers before and after depyrogenation, according to one or more embodiments shown and described herein.

Samples were prepared with a composition which included a coupling agent layer formed from 0.0625% APS and 0.5% aminophenyltrimethyloxysilane (APhTMS), having a ratio of 1:8, and an outer coating layer formed from 0.05% Novastrat® 800 polyimide. The thermal stability of the applied coating was evaluated by determining the coefficient of friction and frictive force of vials before and after depyrogenation. Specifically, coated vials were subjected to a vial-on-vial frictive test under a load of 30 N. The coefficient of friction and frictive force were measured and are plotted in FIG. 53 as a function of time. A second set of vials were depyrogenated for 12 hours at 320° C. and subjected to the same vial-on-vial frictive test under a load of 30 N. The coefficient of friction remained the same both before and after depyrogenation indicating that the coatings were thermally stable. A photograph of the contacted area of the glass is also shown.

Figure 54:
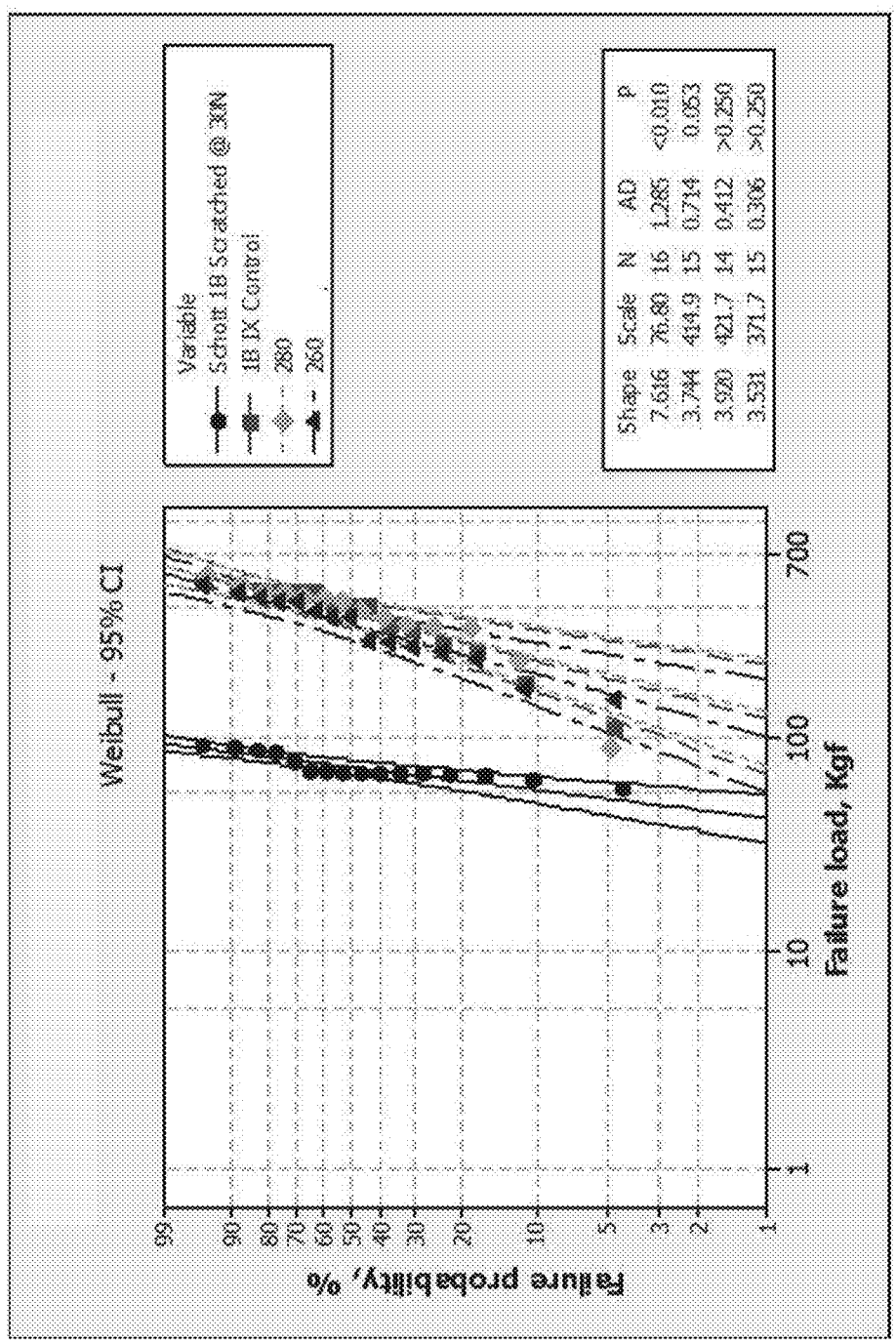
FIG. 54 graphically depicts the failure probability as a function of applied load in a horizontal compression test for vials, according to one or more embodiments shown and described herein.

FIG. 54 graphically depicts the failure probability as a function of applied load in a horizontal compression test for the vials with heat-tolerant coatings formed from 0.125% APS and 1.0% aminophenyltrimethyloxysilane (APhTMS), having a ratio of 1:8, and an outer coating layer formed from 0.1% Novastrat® 800 polyimide (Shown as "260" on FIG. 54), and formed from 0.0625% APS and 0.5% aminophenyltrimethyloxysilane (APhTMS), having a ratio of 1:8, and an outer coating layer formed from 0.05% Novastrat® 800 polyimide (Shown as "280" on FIG. 54). A photograph of the contacted area of the glass is also shown. The data shows that failure load remains unchanged from uncoated unscratched samples for coated, depyrogenated, and scratched samples demonstrating glass protection from damage by the coating.

Figure 55:
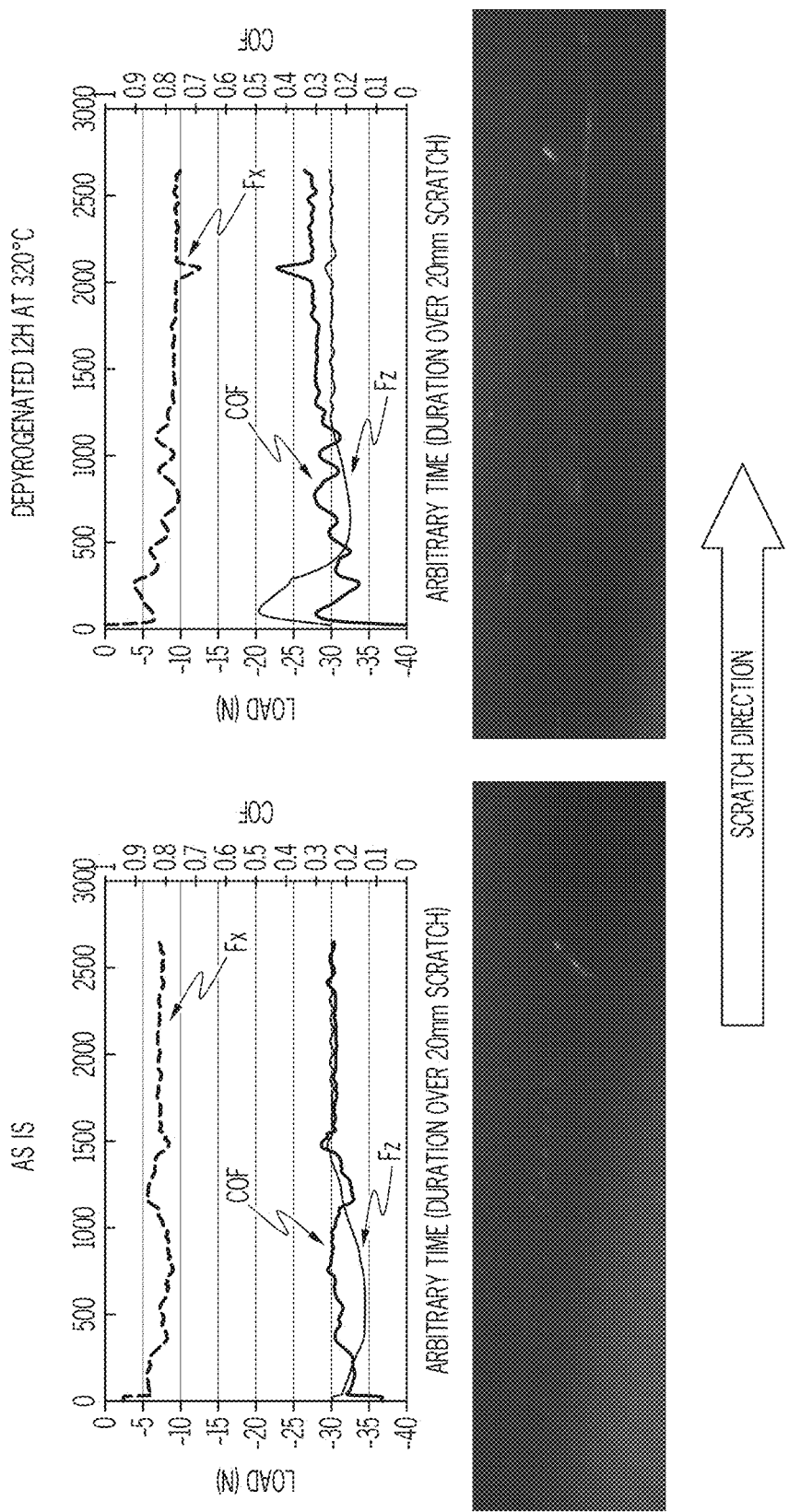
FIG. 55 graphically depicts the coefficient of friction, applied force and frictive force for coated glass containers before and after depyrogenation, according to one or more embodiments shown and described herein.

Vials were prepared with heat-tolerant coatings have varying ratios of silanes. Samples were prepared with a composition which included a coupling agent layer formed from 0.5% Dynasylan® Hydrosil 1151 and 0.5% aminophenyltrimethyloxysilane (APhTMS), having a ratio of 1:1, and an outer coating layer formed from 0.05% Novastrat® 800 polyimide. The thermal stability of the applied coating was evaluated by determining the coefficient of friction and frictive force of vials before and after depyrogenation. Specifically, coated vials were subjected to a vial-on-vial frictive test under a load of 30 N. The coefficient of friction and frictive force were measured and are plotted in FIG. 55 as a function of time. A second set of vials were depyrogenated for 12 hours at 320° C. and subjected to the same vial-on-vial frictive test under a load of 30 N. The coefficient of friction remained the same both before and after depyrogenation indicating that the coatings were thermally stable. A photograph of the contacted area of the glass is also shown. This suggests that hydrolysates of aminosilanes, such as aminosilsesquioxanes, are useful in the coating formulations as well.

Figure 56:
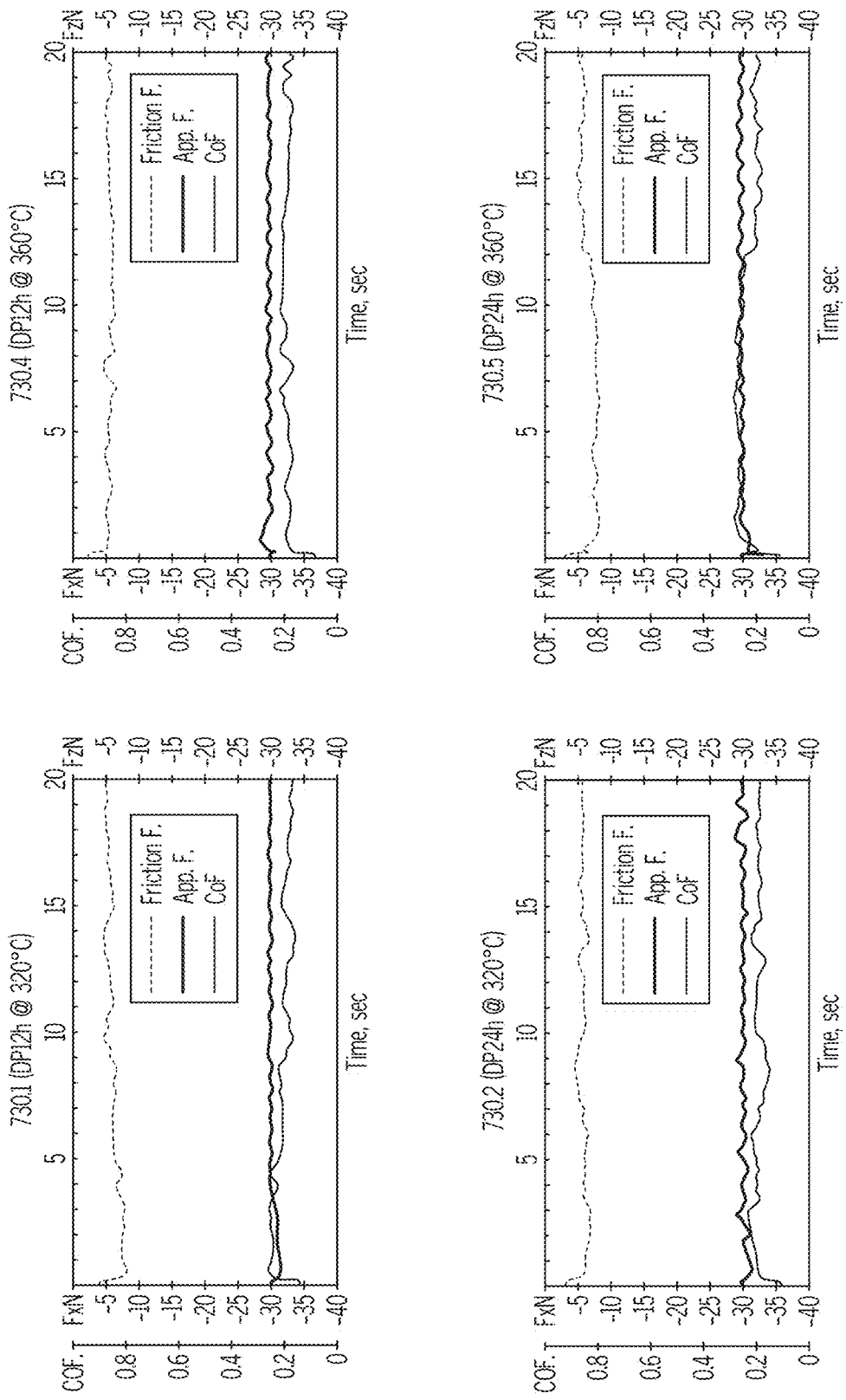
FIG. 56 graphically depicts the coefficient of friction, applied force and frictive force for coated glass containers for different depyrogenation conditions.
Figure 57:
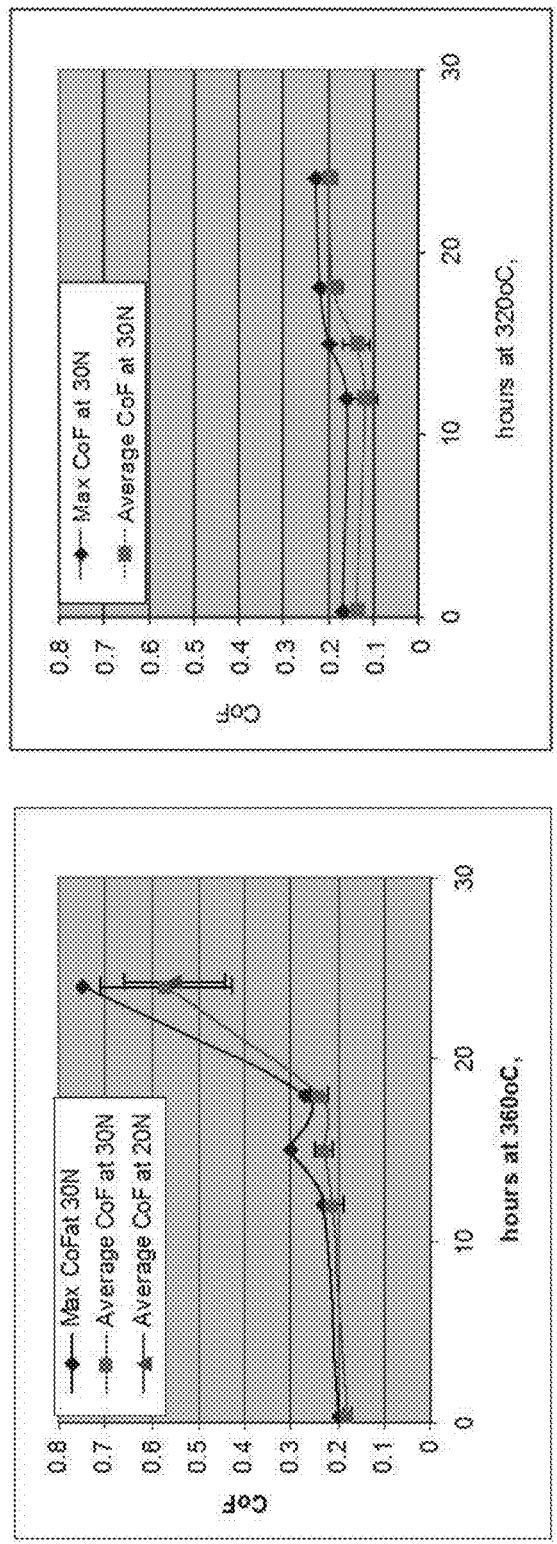
FIG. 57 graphically depicts the coefficient of friction after varying heat treatment times, according to one or more embodiments shown and described herein, according to one or more embodiments shown and described herein.

The thermal stability of the applied coating was also evaluated for a series of depyrogenation conditions. Specifically, Type 1B ion-exchanged glass vials were prepared with a composition which included a coupling agent layer having a 1:1 ratio of GAPS (0.5%) to aminophenyltrimethyloxysilane (0.5%) and an outer coating layer which consisted of 0.5% Novastrat® 800 polyimide. Sample vials were subjected to one of the following depyrogenation cycles: 12 hours at 320° C.; 24 hours at 320° C.; 12 hours at 360° C.; or 24 hours at 360° C. The coefficient of friction and frictive force were then measured using a vial-on-vial frictive test and plotted as a function of time for each depyrogenation condition, as shown in FIG. 56. As shown in FIG. 56, the coefficient of friction of the vials did not vary with the depyrogenation conditions indicating that the coating was thermally stable. FIG. 57 graphically depicts the coefficient of friction after varying heat treatment times at 360° C. and 320° C.

Example 32

Vials were coated as described in Example 16 with a APS/Novastrat 800 coating. The light transmission of coated vials, as well as uncoated vials, was measured within a range of wavelengths between 400-700 nm using a spectrophotometer. The measurements are performed such that a light beam is directed normal to the container wall such that the beam passes through the heat-tolerant coating twice, first when entering the container and then when exiting it. FIG. 13 graphically depicts the light transmittance data for coated and uncoated vials measured in the visible light spectrum from 400-700 nm. Line 440 shows an uncoated glass container and line 442 shows a coated glass container.

Example 33

Figure 58:
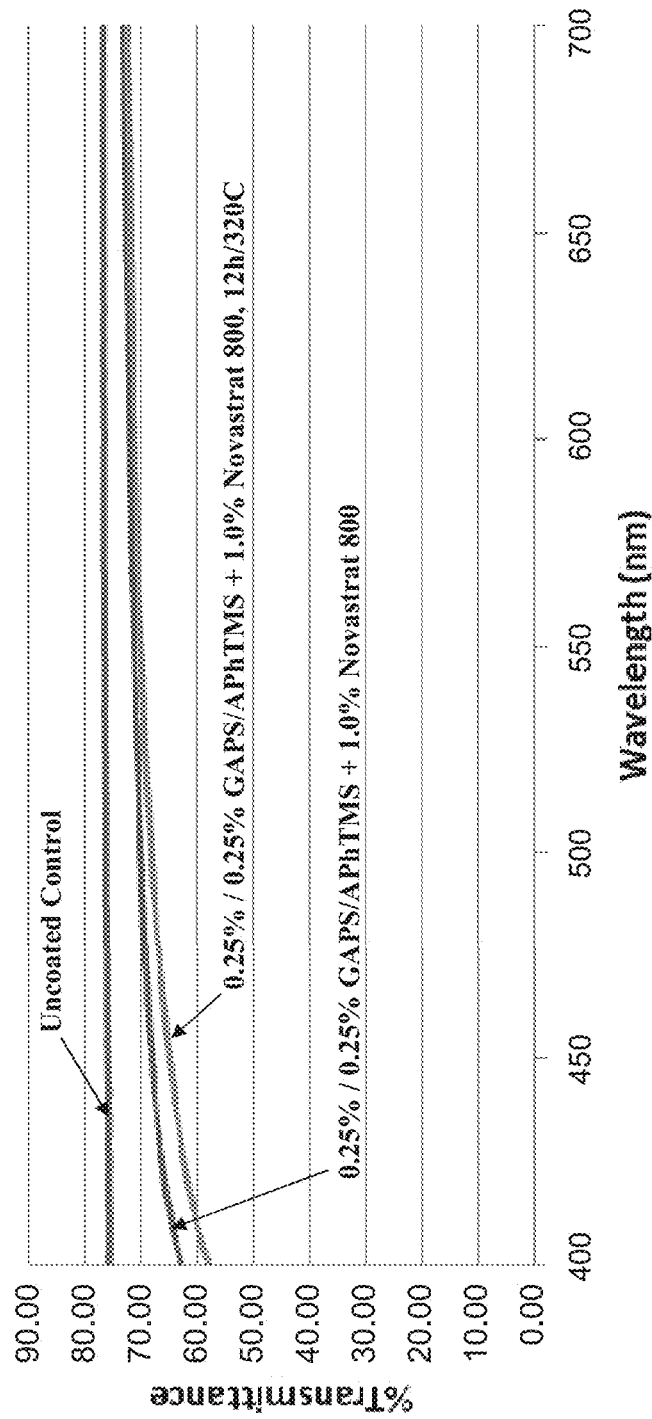
FIG. 58 graphically depicts the light transmittance data for coated and uncoated vials measured in the visible light spectrum from 400-700 nm, according to one or more embodiments shown and described herein.

Vials were coated with a 0.25% GAPS/0.25% APhTMS coupling agent and 1.0% Novastrat® 800 polyimide and were tested for light transmission before and after depyrogenation at 320° C. for 12 hours. An uncoated vial was also tested. Results are shown in FIG. 58.

Example 34

To improve polyimide coating uniformity, the Novastrat® 800 polyamic acid was converted into polyamic acid salt and dissolved in methanol, significantly faster evaporating solvent compared to dimethylacetamide, by adding 4 g of triethylamine to 1 L of methanol and then adding Novastrat® 800 polyamic acid to form 0.1% solution.

Figure 59:
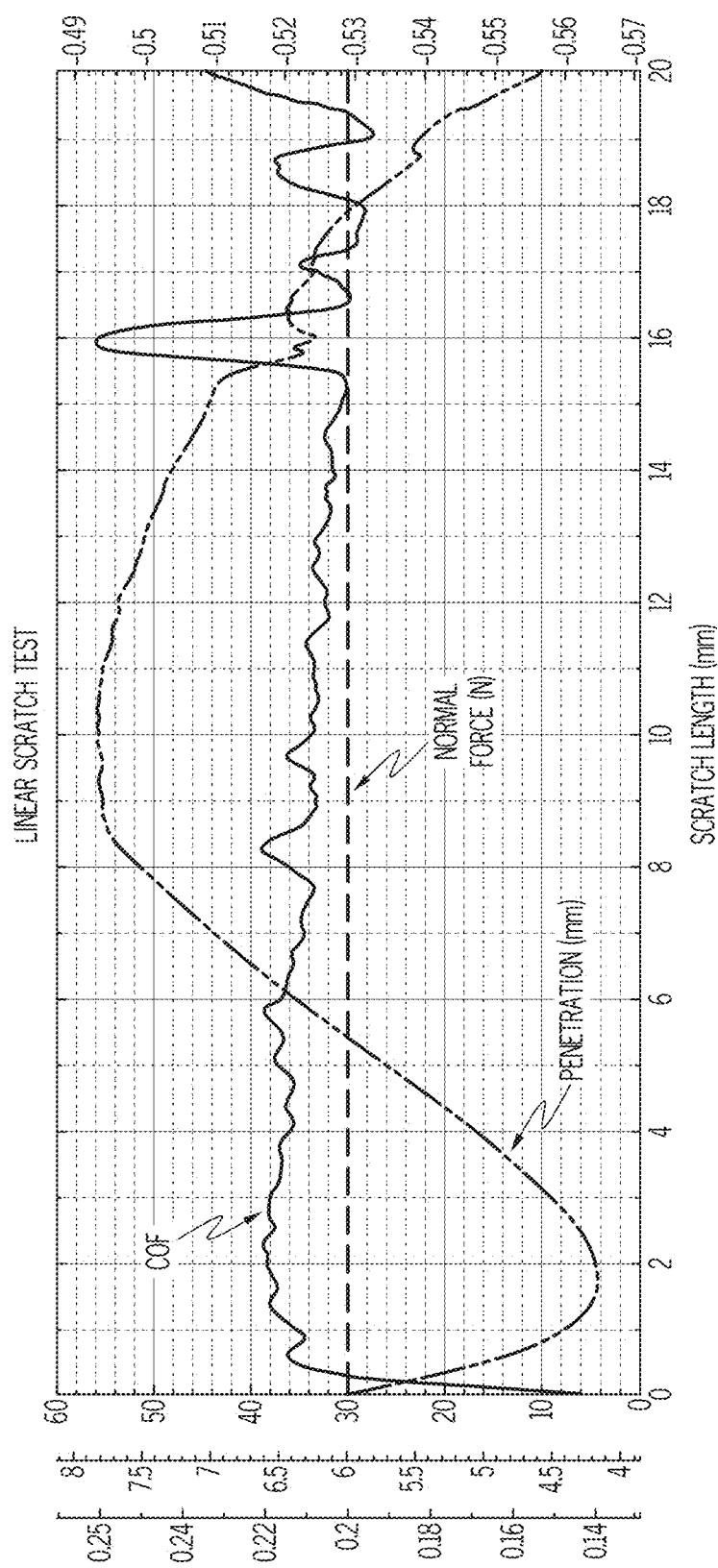
FIG. 59 graphically depicts the coefficient of friction, applied force and frictive force for coated glass containers before and after depyrogenation, according to one or more embodiments shown and described herein.
Figure 60:
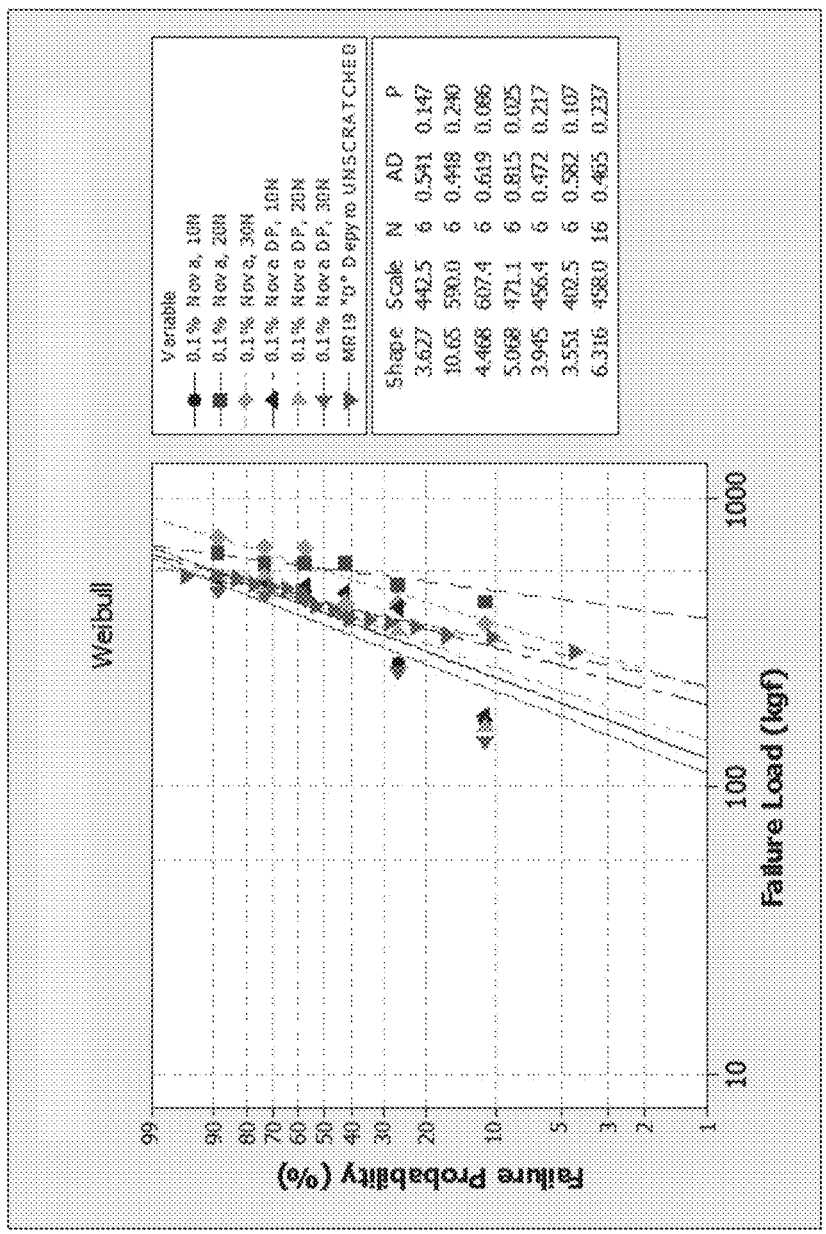
FIG. 60 graphically depicts the failure probability as a function of applied load in a horizontal compression test for vials, according to one or more embodiments shown and described herein.

Type 1B ion-exchanged vials were coated with 1.0% GAPS/1.0% APhTMS in methanol/water mixture and 0.1% Novastrat® 800 polyamic acid salt in methanol. The coated vials were depyrogenated for 12 h at 360° C. and undepyrogenated and depyrogenated samples were scratched in vial-on-cial jig at 10, 20 and 30 N normal loads. No glass damage was observed at normal formes of 10 N, 20 N and 30 N. FIG. 59 shows the coefficient of friction, applied force and frictive force for the samples after a heat treatment at 360° C. for 12 hours. FIG. 60 graphically depicts the failure probability as a function of applied load in a horizontal compression test for the samples. Statistically the sample series at 10 N, 20N, and 30 N were indistinguishable from each other. The low load failure samples broke from origines located away from the scratch.

Figure 62:
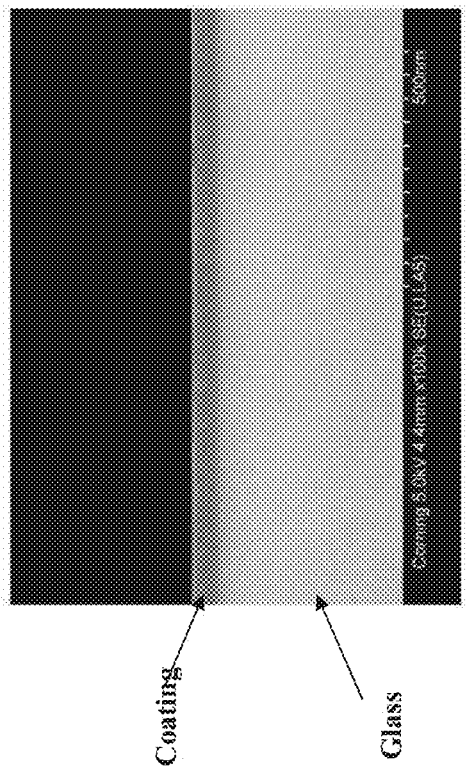
FIG. 62 shows a scanning electron microscope image of a coating, according to one or more embodiments shown and described herein.
Figure 63:
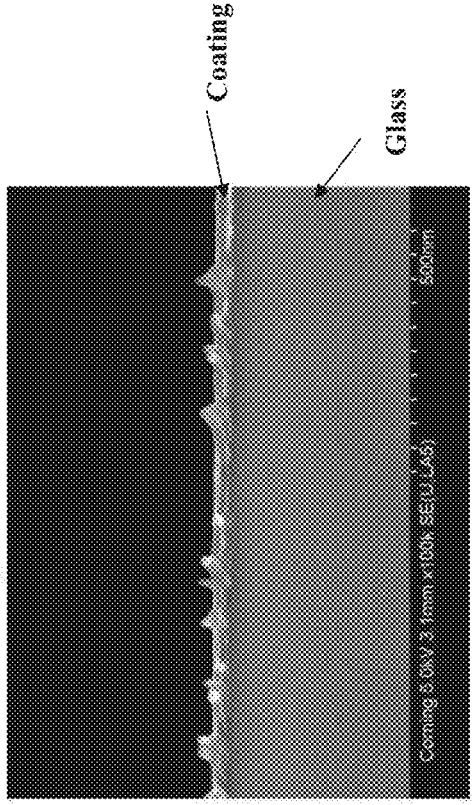
FIG. 63 shows a scanning electron microscope image of a coating, according to one or more embodiments shown and described herein.
Figure 61:
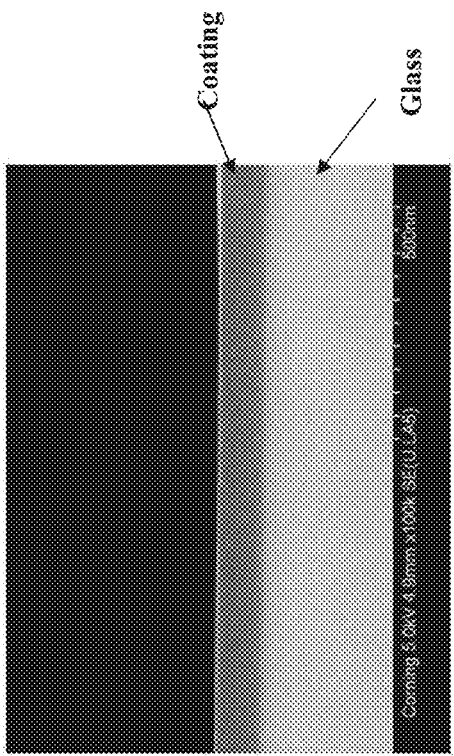
FIG. 61 shows a scanning electron microscope image of a coating, according to one or more embodiments shown and described herein.

Thickness of the coaing layers was estimated using ellipsometry and scanning electron microscopy (SEM), shown in FIGS. 61-63, respectively. The samples for coating thickness measurements were produced using silicon wafer (ellipsometry) and glass slides (SEM). The methods show thicknesses varying from 55 to 180 nm for silsesquioxane tie-layer and 35 nm for Novastrat® 800 poyamic acid salt.

Example 35

Plasma cleaned Si wafers pieces were dip coated using 0.5% GAPS, 0.5% APhTMS solution in 75/25 methanol/water vol/vol mixture. The coating was exposed to 120° C. for 15 minutes. The coating thickness was determined using ellipsometry. Three samples were prepared, and had thicknesses of 92.1 nm, 151.7 nm, and 110.2 nm, respectively, with a standard deviation of 30.6 nm.

Glass slides were dip coated and examined with a scanning electron microscope. FIG. 61 shows an SEM image glass slide dipped in a coating solution of 1.0% GAPS, 1.0% APhTMS, and 0.3% NMP with an 8 mm/s pull out rate after a curing at 150° C. for 15 minutes. The coating appears to be about 93 nm thick. FIG. 62 shows an SEM image glass slide dipped in a coating solution of 1.0% GAPS, 1.0% APhTMS, and 0.3 NMP with a 4 mm/s pull out rate after a curing at 150° C. for 15 minutes. The coating appears to be about 55 nm thick. FIG. 63 shows an SEM image glass slide dipped in a coating solution of 0.5 Novastrat® 800 solution with a 2 mm/s pull up rate after a curing at 150° C. for 15 min and heat treatment at 320° C. for 30 minutes. The coating appears to be about 35 nm thick.

Comparative Example 6

Glass vials formed from a Type 1B glass were coated with a diluted coating of Bayer Silicone aqueous emulsion of Baysilone M with a solids content of about 1-2%. The vials were treated at 150° C. for 2 hours to drive away water from the surface leaving a polydimethylsiloxane coating on the exterior surface of the glass. The nominal thickness of the coating was about 200 nm. A first set of vials were maintained in untreated condition (i.e., the "as-coated vials"). A second set of vials were treated at 280° C. for 30 minutes (i.e., the "treated vials"). Some of the vials from each set were first mechanically tested by applying a scratch with a linearly increasing load from 0-48N and a length of approximately 20 mm using a UMT-2 tribometer. The scratches were evaluated for coefficient of friction and morphology to determine if the scratching procedure damaged the glass or if the coating protected the glass from damage due to scratching.

Figure 64:
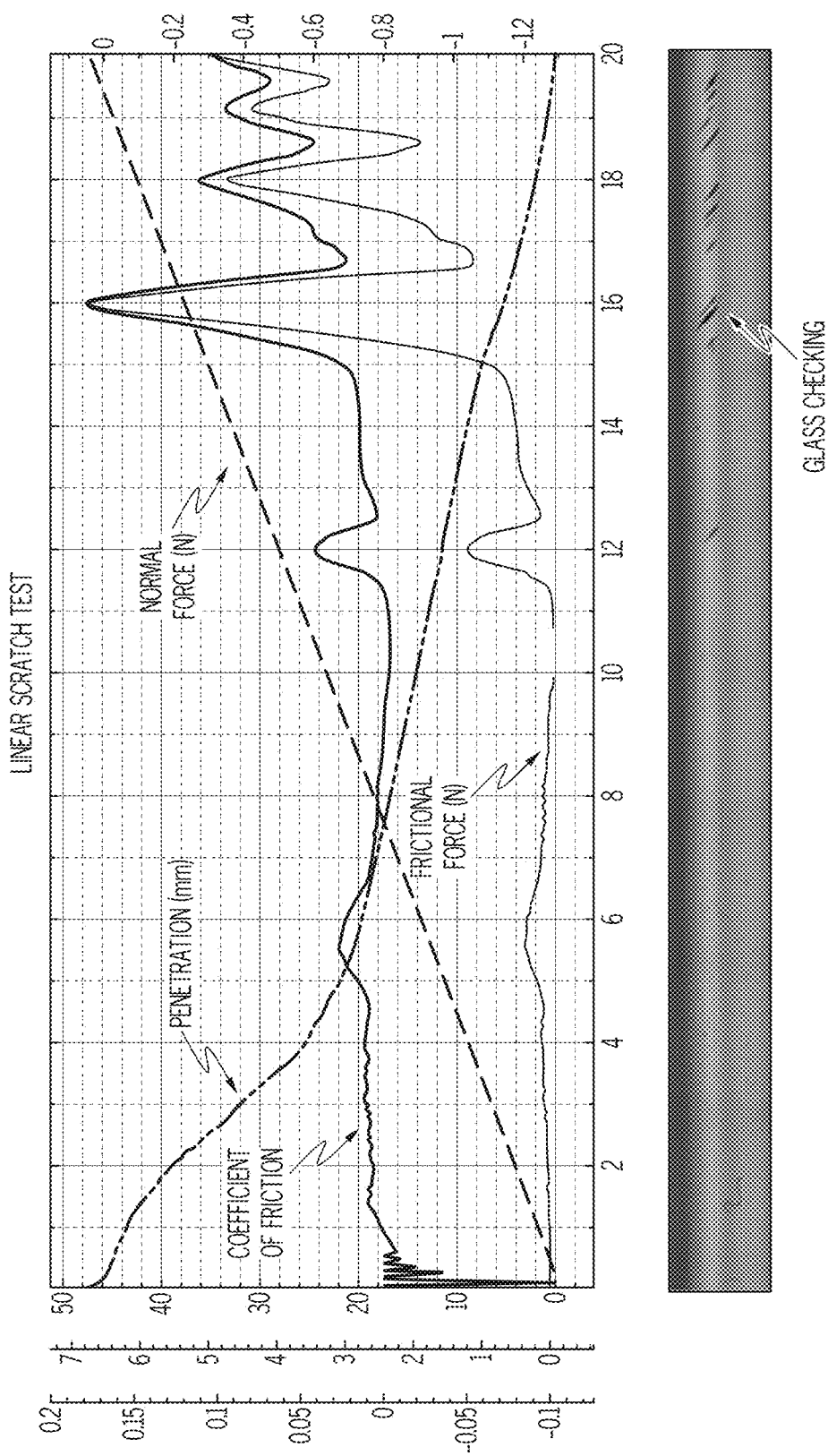
FIG. 64 graphically depicts the coefficient of friction, scratch penetration, applied normal force, and frictional force (y-ordinates) as a function of the length of the applied scratch (x-ordinate) for the as-coated vials of a Comparative Example.

FIG. 64 is a plot showing the coefficient of friction, scratch penetration, applied normal force, and frictional force (y-ordinates) as a function of the length of the applied scratch (x-ordinate) for the as-coated vials. As graphically depicted in FIG. 64, the as-coated vials exhibited a coefficient of friction of approximately 0.03 up to loads of about 30 N. The data shows that below approximately 30 N the COF is always below 0.1. However, at normal forces greater than 30 N, the coating began to fail, as indicated by the presence of glass checking along the length of scratch. Glass checking is indicative of glass surface damage and an increased propensity of the glass to fail as a result of the damage.

FIG. 65 is a plot showing the coefficient of friction, scratch penetration, applied normal force, and frictional force (y-ordinates) as a function of the length of the applied scratch (x-ordinate) for the treated vials. For the treated vials, the coefficient of friction remained low until the applied load reached a value of approximately 5 N. At that point the coating began to fail and the glass surface was severely damaged as evident from the increased amount of glass checking which occurred with increasing load. The coefficient of friction of the treated vials increased to about 0.5. However, the coating failed to protect the surface of the glass at loads of 30 N following thermal exposure, indicating that the coating was not thermally stable.

The vials were then tested by applying 30 N static loads across the entire length of the 20 mm scratch. Ten samples of as-coated vials and ten samples of treated vials were tested in horizontal compression by applying a 30 N static load across the entire length of the 20 mm scratch. None of the as-coated samples failed at the scratch while 6 of the 10 treated vials failed at the scratch indicating that the treated vials had lower retained strength.

Comparative Example 7

A solution of Wacker Silres MP50 (part #60078465 lot #EB21192) was diluted to 2% and was applied to vials formed from the Reference Glass Composition. The vials were first cleaned by applying plasma for 10 seconds prior to coating. The vials were dried at 315° C. for 15 minutes to drive off water from the coating. A first set of vials was maintained in "as-coated" condition. A second set of vials was treated for 30 minutes at temperatures ranging from 250° C. to 320° C. (i.e., "treated vials"). Some of the vials from each set were first mechanically tested by applying a scratch with a linearly increasing load from 0-48N and a length of approximately 20 mm using a UMT-2 tribometer. The scratches were evaluated for coefficient of friction and morphology to determine if the scratching procedure damaged the glass or if the coating protected the glass from damage due to scratching.

Figure 66:
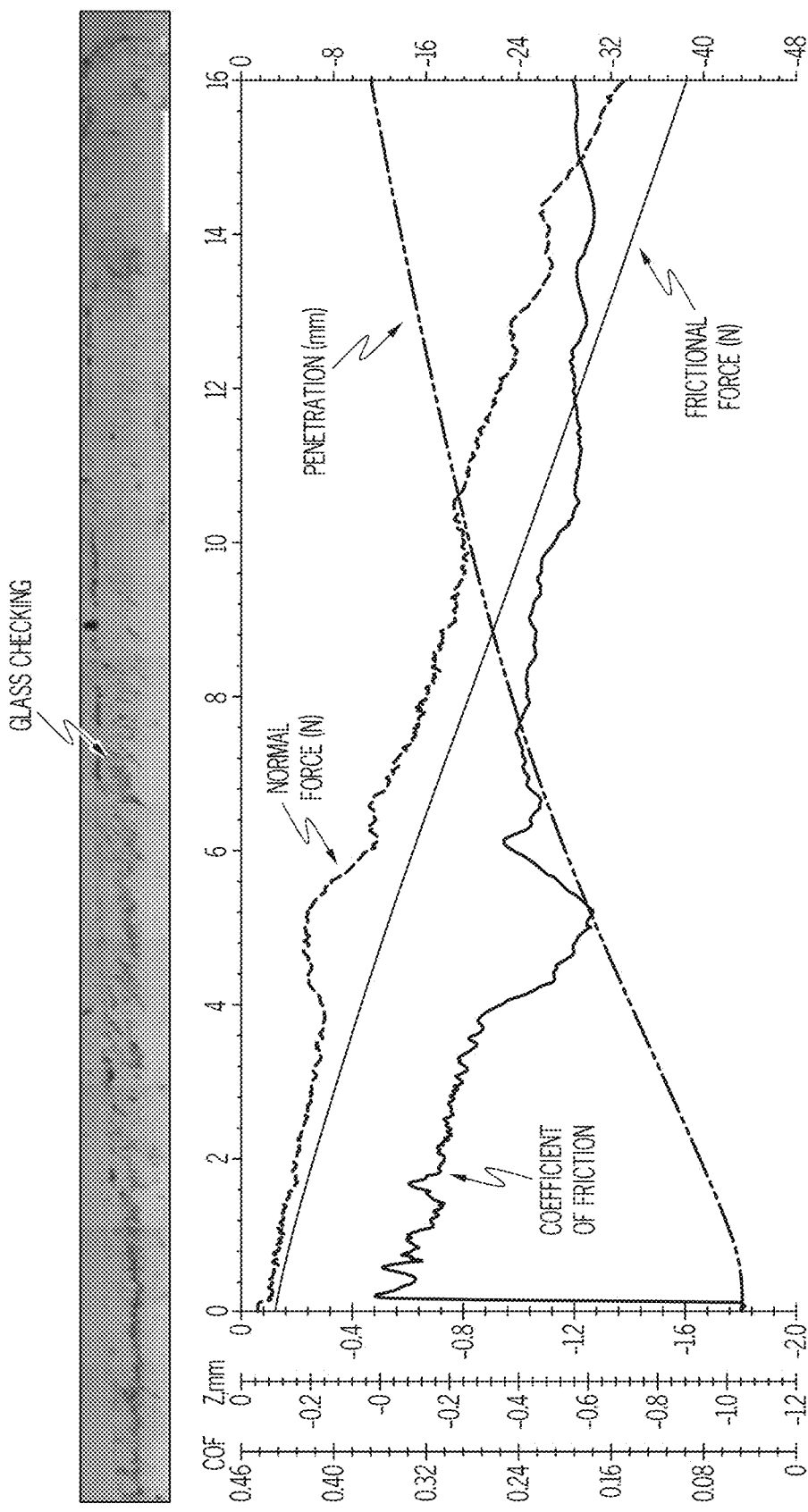
FIG. 66 graphically depicts the coefficient of friction, scratch penetration, applied normal force, and frictional force (y-ordinates) as a function of the length of the applied scratch (x-ordinate) for the as-coated vials of a Comparative Example.

FIG. 66 is a plot showing the coefficient of friction, scratch penetration, applied normal force, and frictional force (y-ordinates) as a function of the length of the applied scratch (x-ordinate) for the as-coated vials. The as-coated vials exhibited damage to the coating, but no damage to the glass.

Figure 67:
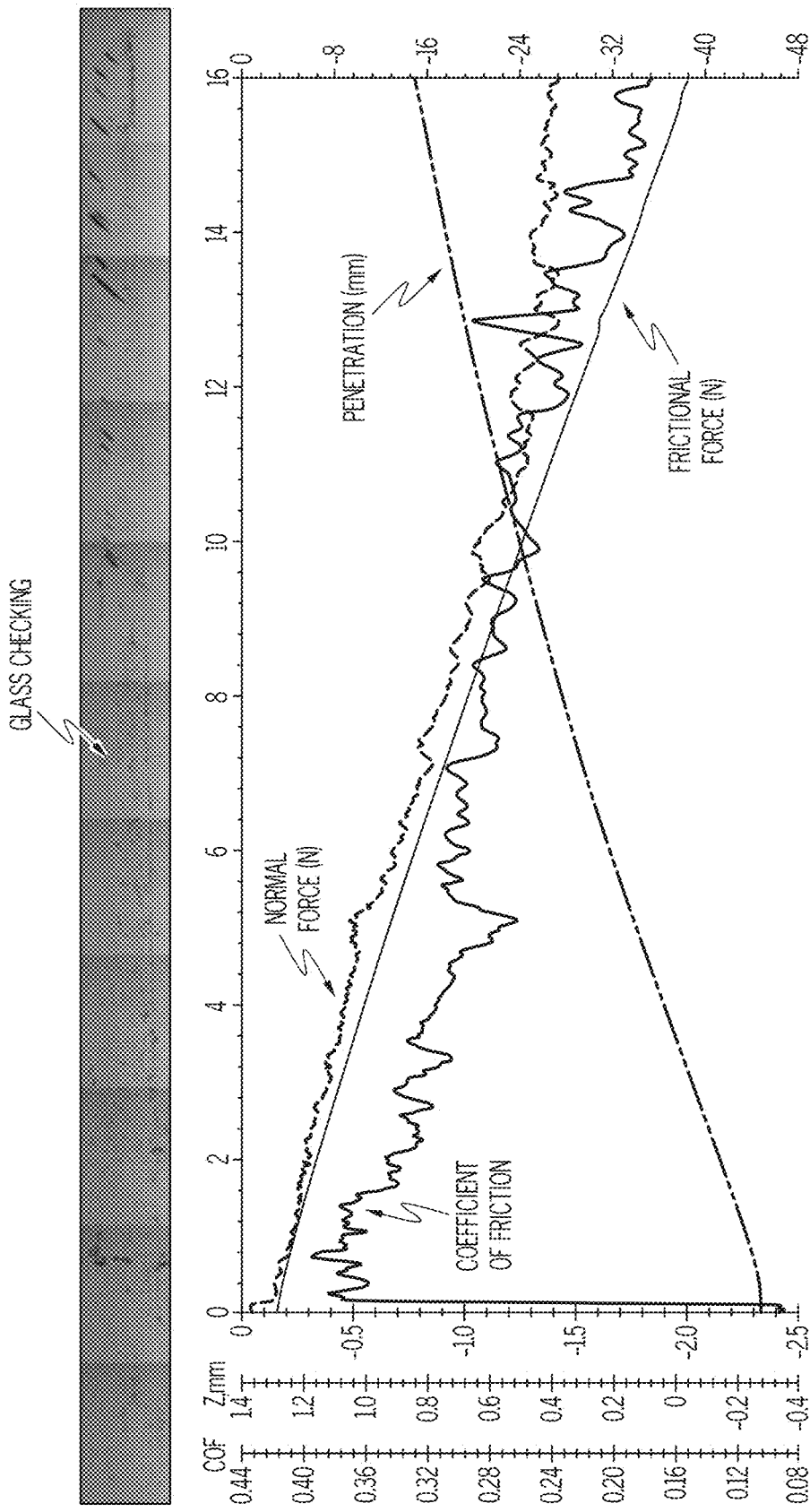
FIG. 67 graphically depicts the coefficient of friction, scratch penetration, applied normal force, and frictional force (y-ordinates) as a function of the length of the applied scratch (x-ordinate) for the thermally treated vials of a Comparative Example.

FIG. 67 is a plot showing the coefficient of friction, scratch penetration, applied normal force, and frictional force (y-ordinates) as a function of the length of the applied scratch (x-ordinate) for the treated vials treated at 280° C. The treated vials exhibited significant glass surface damage at applied loads greater than about 20N. It was also determined that the load threshold to glass damage decreased with increasing thermal exposure temperatures, indicating that the coatings degraded with increasing temperature (i.e., the coating is not thermally stable). Samples treated at temperatures lower than 280° C. showed glass damage at loads above 30N.

Comparative Example 8

Vials formed from the Reference Glass Composition were treated with Evonik Silikophen P 40/W diluted to 2% solids in water. The samples were then dried at 150° C. for 15 minutes and subsequently cured at 315° C. for 15 minutes. A first set of vials was maintained in "as-coated" condition. A second set of vials was treated for 30 minutes at a temperature of 260° C. (i.e., "the 260° C. treated vials"). A third set of vials was treated for 30 minutes at a temperature of 280° C. (i.e., "the 280° C. treated vials"). The vials were scratched with a static load of 30 N using the testing jig depicted in FIG. 11. The vials were then tested in horizontal compression. The 260° C. treated vials and the 280° C. treated vials failed in compression while 2 of 16 of the as-coated vials failed at the scratch. This indicates that the coating degraded upon exposure to elevated temperatures and, as a result, the coating did not adequately protect the surface from the 30 N load.

It should now be understood that the glass containers with heat-tolerant coatings described herein exhibit chemical durability, resistance to delamination, and increased mechanical strength following ion exchange. It should also be understood that the glass containers with heat-tolerant coatings described herein exhibit improved resistance to mechanical damage as a result of the application of the heat-tolerant coating and, as such, the glass containers have enhanced mechanical durability. These properties makes the glass containers well suited for use in various applications including, without limitation, pharmaceutical packages for storing pharmaceutical formulations.

It should now be understood that the glass containers described herein may embody a number of different aspects. In a first aspect, a glass container may include a glass body having an interior surface and an exterior surface. At least the interior surface of the glass body may have a delamination factor of less than or equal to 10 and a threshold diffusivity of greater than about 16 $\mu m^2$/hr at a temperature less than or equal to 450° C. A heat-tolerant coating may be bonded to at least a portion of the exterior surface of the glass body. The heat-tolerant coating may be thermally stable at a temperature of at least 260° C. for 30 minutes.

In a second aspect, a glass container may include a glass body having an interior surface and an exterior surface. At least the interior surface of the glass body may have a delamination factor of less than or equal to 10 and a threshold diffusivity of greater than about 16 $\mu m^2$/hr at a temperature less than or equal to 450° C. A heat-tolerant coating may be bonded to at least a portion of the exterior surface of the glass body. The exterior surface of the glass body with the heat-tolerant coating may have a coefficient of friction of less than about 0.7.

In a third aspect, a glass container may include a glass body having an interior surface and an exterior surface. At least the interior surface of the glass body may have a threshold diffusivity of greater than about 16 $\mu m^2$/hr at a temperature less than or equal to 450° C. An interior region may extend between the interior surface of the glass body and the exterior surface of the glass body. The interior region may have a persistent layer homogeneity. A heat-tolerant coating may be bonded to at least a portion of the exterior surface of the glass body. The heat-tolerant coating may be thermally stable at a temperature of at least 260° C. for 30 minutes.

In a fourth aspect, a glass container may include a glass body having an interior surface and an exterior surface. The interior surface may have a persistent surface homogeneity. At least the interior surface of the glass body may have a threshold diffusivity of greater than about 16 $\mu m^2$/hr at a temperature less than or equal to 450° C. A heat-tolerant coating may be bonded to at least a portion of the exterior surface of the glass body. The heat-tolerant coating maybe thermally stable at a temperature of at least 260° C. for 30 minutes.

In a fifth aspect, a glass container may include a glass body having an interior surface and an exterior surface. The glass body may be formed from an alkali aluminosilicate glass composition which has a threshold diffusivity of greater than about 16 $\mu m^2$/hr at a temperature less than or equal to 450° C. and a type HGA1 hydrolytic resistance according to ISO 720. The glass composition may be substantially free of boron and compounds of boron such that at least the interior surface of the glass body has a delamination factor of less than or equal to 10. A heat-tolerant coating may be bonded to at least a portion of the exterior surface of the glass body. The heat-tolerant coating may be thermally stable at a temperature of at least 260° C. for 30 minutes.

In a sixth aspect, a glass container may include a glass body having an interior surface and an exterior surface. The glass body may be formed from a glass composition comprising: from about 74 mol. % to about 78 mol. % $SiO_2$; from about 4 mol. % to about 8 mol. % alkaline earth oxide, wherein the alkaline earth oxide comprises MgO and CaO and a ratio (CaO (mol. %)/(CaO (mol. %)+MgO (mol. %))) is less than or equal to 0.5; X mol. % $Al_2O_3$, wherein X is greater than or equal to about 4 mol. % and less than or equal to about 8 mol. %; and Y mol. % alkali oxide, wherein the alkali oxide comprises $Na_2O$ in an amount greater than or equal to about 9 mol. % and less than or equal to about 15 mol. %, a ratio of Y:X is greater than 1. The glass body may have a delamination factor less than or equal to 10. A heat-tolerant coating may be positioned on the exterior surface of the glass body and comprise a low-friction layer and a coupling agent layer, the low-friction layer comprising a polymer chemical composition and the coupling agent layer comprising at least one of: a mixture of a first silane chemical composition, a hydrolysate thereof, or an oligomer thereof, and a second silane chemical composition, a hydrolysate thereof, or an oligomer thereof, wherein the first silane chemical composition is an aromatic silane chemical composition and the second silane chemical composition is an aliphatic silane chemical composition; and a chemical composition formed from the oligomerization of at least the first silane chemical composition and the second silane chemical composition.

In a seventh aspect, a glass container may include a glass body having an interior surface and an exterior surface. The glass body may be formed from a glass composition comprising from about 74 mol. % to about 78 mol. % $SiO_2$; alkaline earth oxide comprising both CaO and MgO, wherein the alkaline earth oxide comprises CaO in an amount greater than or equal to about 0.1 mol. % and less than or equal to about 1.0 mol. % and a ratio (CaO (mol. %)/(CaO (mol. %)+MgO (mol. %))) is less than or equal to 0.5; X mol. % $Al_2O_3$, wherein X is greater than or equal to about 2 mol. % and less than or equal to about 10 mol. %; and Y mol. % alkali oxide, wherein the alkali oxide comprises from about 0.01 mol. % to about 1.0 mol. % $K_2O$ and a ratio of Y:X is greater than 1, wherein the glass body has a delamination factor less than or equal to 10. A heat-tolerant coating may be positioned on the exterior surface of the glass body and comprise a low-friction layer and a coupling agent layer. The low-friction layer may include a polymer chemical composition and the coupling agent layer may include at least one of a mixture of a first silane chemical composition, a hydrolysate thereof, or an oligomer thereof, and a second silane chemical composition, a hydrolysate thereof, or an oligomer thereof, wherein the first silane chemical composition is an aromatic silane chemical composition and the second silane chemical composition is an aliphatic silane chemical composition; and a chemical composition formed from the oligomerization of at least the first silane chemical composition and the second silane chemical composition.

An eighth aspect includes the glass container of any of the first and third through seventh aspects, wherein the exterior surface of the glass body with the heat-tolerant coating has a coefficient of friction of less than about 0.7.

A ninth aspect includes the glass container of any of the first through eighth aspects, wherein the heat-tolerant coating has a mass loss of less than about 5% of its mass when heated from a temperature of 150° C. to 350° C. at a ramp rate of about 10° C./minute.

A tenth aspect includes the glass container of any of the first through second and fourth through seventh aspects, wherein the glass body has an interior region extending between the interior surface of the glass body and the exterior surface of the glass body, the interior region having a persistent layer homogeneity.

An eleventh aspect includes the glass container of any of the third and tenth aspects, wherein the interior region has a thickness $T_{LR}$ of at least about 100 nm.

A twelfth aspect includes the glass container of any of the third and tenth aspects, wherein the interior region extends from 10 nm below the interior surface of the glass body and has a thickness $T_{LR}$ of at least about 100 nm.

A thirteenth aspect includes the glass container of any of the first through third aspects or fifth through twelfth aspects, wherein the interior surface of the glass body has a persistent surface homogeneity.

A fourteenth aspect includes the glass container of any of the fourth aspect or thirteenth aspect, wherein the persistent surface homogeneity extends into a wall thickness of the glass body to a depth less than or equal to about 50 nm including from about 10 nm to about 50 nm from the interior surface of the glass body.

A fifteenth aspect includes the glass container of any of the first through fourteenth aspects, wherein the glass body has a surface region that extends from the interior surface of the glass body into a wall thickness of the glass body, the surface region having a persistent surface homogeneity.

A sixteenth aspect includes the glass container of the fifteenth aspect, wherein the surface region extends into a wall thickness of the glass body to a depth of at least 10 nm from the interior surface of the glass body.

A seventeenth aspect includes the glass container of any of the first through sixteenth aspects, wherein the heat-tolerant coating comprises a coupling agent layer.

An eighteenth aspect includes the glass container of the seventeenth aspect, wherein the coupling agent layer comprises at least one silane chemical composition.

A nineteenth aspect includes the glass container of any of the seventeenth or eighteenth aspects, wherein the heat-tolerant coating comprises a low-friction layer contacting the coupling agent layer.

A twentieth aspect includes the glass container of the nineteenth aspect, wherein the heat-tolerant coating comprises a low-friction layer comprising a polymer chemical composition.

A twenty first aspect includes the glass container of any of the first through twentieth aspects, wherein a light transmission through the coated portion of the glass container is greater than or equal to about 55% of a light transmission through an uncoated glass article for wavelengths from about 400 nm to about 700 nm.

A twenty second aspect includes the glass container of any of the first through twenty first aspects, wherein the glass body has at least a class S3 acid resistance according to DIN 12116.

A twenty third aspect includes the glass container of any of the first through twenty second aspects, wherein the glass body has at least a class A2 base resistance according to ISO 695.

A twenty fourth aspect includes the glass container of any of the first through twenty third aspects, wherein the glass body has at least a type HgB2 hydrolytic resistance according to ISO 719.

A twenty fifth aspect includes the glass container of any of the first through twenty fourth aspects, wherein the glass body has at least a type HgA2 hydrolytic resistance according to ISO 720.

A twenty sixth aspect includes the glass container of any of the first through twenty fifth aspects, wherein the glass container is a pharmaceutical package.

A twenty seventh aspect includes the glass container of any of the first through twenty sixth aspects, wherein the glass body has a compressive stress greater than or equal to 300 MPa in at least the exterior surface of the glass body and a depth of layer of at least 30 μm.

A twenty eighth aspect includes the glass container of any of the second and sixth through seventh aspects, wherein the heat-tolerant coating is thermally stable at a temperature of at least 260° C. for 30 minutes.

A twenty ninth aspect includes the glass container of any of the first through twenty seventh aspects, wherein the heat-tolerant coating is thermally stable at a temperature of at least 320° C. for 30 minutes.

A thirtieth aspect includes the glass container of any of the first through twenty ninth aspects, wherein the glass body comprises an alkali aluminosilicate glass composition.

A thirty first aspect includes the glass container of the thirtieth aspect, wherein the glass body is substantially free from boron and compounds containing boron.

A thirty second aspect includes the glass container of any of the fourth aspect or the thirteenth aspect, wherein the persistent surface homogeneity extends into a wall thickness of the glass body to a depth of at least 10 nm from the interior surface of the glass body.

A thirty third aspect includes the glass container of the thirty second aspect, wherein the depth of persistent surface homogeneity is less than or equal to 50 nm.

A thirty fourth aspect includes the glass container of the thirty third aspect, wherein the glass body has a surface region that extends from the interior surface of the glass body into a wall thickness of the glass body to a depth $D_{SR}$; and the persistent surface homogeneity extends to the depth $D_{SR}$ of the surface region throughout the surface region.

A thirty fifth aspect includes the glass container of the thirty fourth aspect, wherein the depth $D_{SR}$ of the surface region is at least 10 nm from the interior surface of the glass body.

A thirty sixth aspect includes the glass container of the thirtieth aspect, wherein the alkali aluminosilicate glass composition is substantially free of phosphorous and compounds containing phosphorous.

A thirty sixth aspect includes the glass container of any of the first through fifth aspects, wherein the glass container is formed from an alkali aluminosilicate glass composition comprising from about 74 mol. % to about 78 mol. % $SiO_2$; from about 4 mol. % to about 8 mol. % alkaline earth oxide, wherein the alkaline earth oxide comprises both MgO and CaO and a ratio (CaO (mol. %)/(CaO (mol. %)+MgO (mol. %))) is less than or equal to 0.5; X mol. % $Al_2O_3$, wherein X is greater than or equal to about 2 mol. % and less than or equal to about 10 mol. %; and Y mol. % alkali oxide, wherein the alkali oxide comprises $Na_2O$ in an amount greater than or equal to about 9 mol. % and less than or equal to about 15 mol. %, a ratio of Y:X is greater than 1, and the glass composition is free of boron and compounds of boron.

A thirty seventh aspect includes the glass container of the thirty sixth aspect, wherein X is from about 4 mol. % to about 8 mol. %.

A thirty eighth aspect includes the glass container of any of the thirty sixth through thirty seventh aspects, wherein the alkaline earth oxide comprises CaO in an amount greater than or equal to about 0.1 mol. % and less than or equal to about 1.0 mol. %.

A thirty ninth aspect includes the glass container of any of the thirty sixth through thirty seventh aspects, wherein the alkaline earth oxide comprises from about 3 mol. % to about 7 mol. % MgO.

A fortieth aspect includes the glass container of any of the thirty sixth through thirty ninth aspects, wherein the alkali oxide further comprises $K_2O$ in an amount greater than or equal to 0.01 mol. % and less than or equal to 1.0 mol. %.

A forty first aspect includes the glass container of any of the first through fortieth aspects, wherein the glass body is ion-exchange strengthened.

A forty second aspect includes the glass container of the forty first aspect, wherein the glass body has a compressive stress greater than or equal to 300 MPa in at least the exterior surface of the glass body and a depth of layer of at least 3 µm.

A forty third aspect includes the glass container of any of the first through forty second aspects, wherein the heat-tolerant coating comprises a coupling agent layer comprising at least one of: a first silane chemical composition, a hydrolysate thereof, or an oligomer thereof; and a chemical composition formed from the oligomerization of at least the first silane chemical composition and a second silane chemical composition, wherein the first silane chemical composition and the second silane chemical composition are different chemical compositions.

A forty fourth aspect includes the glass container of the forty third aspect wherein the first silane chemical composition is an aromatic silane chemical composition.

A forty fifth aspect includes the glass container of the forty fourth aspect, wherein the first silane chemical composition comprises at least one amine moiety.

A forty sixth aspect includes the glass container of the forty fourth aspect, wherein the first silane chemical composition is an aromatic alkoxysilane chemical composition, an aromatic acyloxysilane chemical composition, an aromatic halogen silane chemical composition, or an aromatic aminosilane chemical composition.

A forty seventh aspect includes the glass container of the forty fourth aspect, wherein the coupling agent comprises at least one of: a mixture of the first silane chemical composition and the second silane chemical composition, wherein the second silane chemical composition is an aliphatic silane chemical composition; and a chemical composition formed from the oligomerization of at least the first silane chemical composition and the second silane chemical composition.

A forty eighth aspect includes the glass container of the forty seventh aspect, wherein the first silane chemical composition is an aromatic alkoxysilane chemical composition comprising at least one amine moiety and the second silane chemical composition is an aliphatic alkoxysilane chemical composition comprising at least one amine moiety.

A forty ninth aspect includes the glass container of the forty seventh aspect, wherein the first silane chemical composition is selected from the group consisting of aminophenyl, 3-(m-aminophenoxy) propyl, N-phenylaminopropyl, or (chloromethy) phenyl substituted alkoxy, acyloxy, hylogen, or amino silanes, hydrolysates thereof, or oligomers thereof, and the second silane chemical composition is selected from the group consisting of 3-aminopropyl, N-(2-aminoethyl)-3-aminopropyl, vinyl, methyl, N-phenylaminopropyl, (N-phenylamino)methyl, N-(2-Vinylbenzylaminoethyl)-3-aminopropyl substituted alkoxy, acyloxy, hylogen, or amino silanes, hydrolysates thereof, or oligomers thereof.

A fiftieth aspect includes the glass container of the forty seventh aspect, wherein the first silane chemical composition is aminophenyltrimethoxy silane and the second silane chemical composition is 3-aminopropyltrimethoxy silane.

A fifty first aspect includes the glass container of the forty third aspect, wherein the heat-tolerant coating further comprises a low-friction layer comprising a polymer chemical composition.

A fifty second aspect includes the glass container of the fifty first aspect, wherein the polymer chemical composition is a polyimide chemical composition.

A fifty third aspect includes the glass container of a fifty second aspect, wherein the polyimide chemical composition is formed from the polymerization of: at least one monomer chemical composition comprising at least two amine moieties; and at least one monomer chemical composition comprising at least two anhydride moieties and having a benzophenone structure.

A fifty fourth aspect includes the glass container of the sixth aspect, wherein the glass composition is free of boron and compounds of boron.

A fifty fifth aspect includes the glass container of any of the sixth and fifty fourth aspects, wherein the glass composition comprises $B_2O_3$, wherein a ratio ($B_2O_3$ (mol. %)/(Y mol. %–X mol. %) is greater than 0 and less than 0.3.

A fifty sixth aspect includes the glass container of any of the sixth and fifty fourth through fifty fifth aspects, wherein the glass composition is substantially free of phosphorous and compounds containing phosphorous.

A fifty seventh aspect includes the glass container of any of the sixth and fifty fourth through fifty sixth aspects, wherein CaO is present in the glass composition in an amount greater than or equal to 0.1 mol. % and less than or equal to 1.0 mol. %.

A fifty eighth aspect includes the glass container of any of the sixth and fifty fourth through fifty seventh aspects wherein MgO is present in the glass composition in an amount from about 3 mol. % to about 7 mol. %.

A fifty ninth aspect includes the glass container of any of the sixth and fifty fourth through fifty eighth aspects, wherein the alkali oxide in the glass composition further comprises $K_2O$ in an amount greater than or equal to 0.01 mol. % and less than or equal to 1.0 mol. %.

A sixtieth aspect includes the glass container of the sixth aspect, wherein the first silane chemical composition is an aromatic alkoxysilane chemical composition comprising at least one amine moiety and the second silane chemical composition is an aliphatic alkoxysilane chemical composition comprising at least one amine moiety.

A sixty first aspect includes the glass container of the sixth aspect, wherein the first silane chemical composition is selected from the group consisting of aminophenyl, 3-(m-aminophenoxy) propyl, N-phenylaminopropyl, or (chloromethy) phenyl substituted alkoxy, acyloxy, hylogen, or amino silanes, hydrolysates thereof, or oligomers thereof, and the second silane chemical composition is selected from the group consisting of 3-aminopropyl, N-(2-aminoethyl)-3-aminopropyl, vinyl, methyl, N-phenylaminopropyl, (N-phenylamino)methyl, N-(2-Vinylbenzylaminoethyl)-3-aminopropyl substituted alkoxy, acyloxy, hylogen, or amino silanes, hydrolysates thereof, or oligomers thereof.

A sixty second aspect includes the glass container of the seventh aspect, wherein the first silane chemical composition is aminophenyltrimethoxy silane and the second silane chemical composition is 3-aminopropyltrimethoxy silane.

A sixty third aspect includes the glass container of any of the sixth aspect or the seventh aspect, wherein the polymer chemical composition is a polyimide chemical composition.

A sixty fourth aspect includes the glass container of the sixty third aspect, wherein the polyimide chemical composition is formed from the polymerization of: at least one monomer chemical composition comprising at least two amine moieties; and at least one monomer chemical composition comprising at least two anhydride moieties and having a benzophenone structure.

A sixty fifth aspect includes the glass container of the seventh aspect, wherein the glass composition comprises $B_2O_3$, wherein a ratio ($B_2O_3$ (mol. %)/(Y mol. %–X mol. %) is greater than 0 and less than 0.3.

A sixty sixth aspect includes the glass container of any of the seventh and sixty fifth aspects, wherein the alkali oxide comprises greater than or equal to 9 mol. % $Na_2O$ and less than or equal to 15 mol. % $Na_2O$.

A sixty seventh aspect includes the glass container of any of the seventh and sixty fourth through sixty sixth aspects, wherein the first silane chemical composition is an aromatic alkoxysilane chemical composition comprising at least one amine moiety and the second silane chemical composition is an aliphatic alkoxysilane chemical composition comprising at least one amine moiety.

A sixty eighth aspect includes the glass container of the seventh aspect, wherein the first silane chemical composition is selected from the group consisting of aminophenyl, 3-(m-aminophenoxy) propyl, N-phenylaminopropyl, or (chloromethy) phenyl substituted alkoxy, acyloxy, hylogen, or amino silanes, hydrolysates thereof, or oligomers thereof, and the second silane chemical composition is selected from the group consisting of 3-aminopropyl, N-(2-aminoethyl)-3-aminopropyl, vinyl, methyl, N-phenylaminopropyl, (N-phenylamino)methyl, N-(2-Vinylbenzylaminoethyl)-3-aminopropyl substituted alkoxy, acyloxy, hylogen, or amino silanes, hydrolysates thereof, or oligomers thereof.

A sixty ninth aspect includes the glass container of the seventh aspect, wherein the first silane chemical composition is aminophenyltrimethoxy silane and the second silane chemical composition is 3-aminopropyltrimethoxy silane.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of making a delamination-resistant glass pharmaceutical container, the method comprising the steps of:
   combining constituent elements of a glass composition into a glass melt;
   forming the glass melt into a glass tube;
   re-forming the glass tube into a glass pharmaceutical container having an interior surface and an exterior surface, wherein an interior surface of the glass pharmaceutical container does not comprise a boron-rich layer when the glass pharmaceutical container is in as-formed condition;
   chemically strengthening the glass pharmaceutical container; and
   applying a coating having a thickness of less than 100 microns to the exterior surface such that a portion of the glass pharmaceutical container with the coating has a coefficient of friction less than or equal to 0.7.

2. The method of claim 1, further comprising the step of subjecting the glass pharmaceutical container to a depyrogenation cycle whereby the coefficient of friction does not increase by more than 30% after the depyrogenation cycle.

3. The method of claim 2, wherein the depyrogenation cycle comprises heating the glass pharmaceutical container with the coating to a temperature of at least 250° C. for at least 30 minutes.

4. The method of claim 2, wherein the depyrogenation cycle comprises heating the glass pharmaceutical container with the coating to a temperature of at least 250° C. for up to 72 hours.

5. The method of claim 2, wherein the depyrogenation cycle comprises heating the glass pharmaceutical container with the coating to a temperature of from about 250° C. to about 400° C. for a time period of from about 30 minutes to about 72 hours.

6. The method of claim 1, wherein the step of applying a coating comprises:
   applying a coupling agent layer in direct contact with the exterior surface; and
   applying a polymer layer in direct contact with the coupling agent layer.

7. The method of claim 1, further comprising subjecting the glass container to a lyophilization cycle, whereby the coefficient of friction does not increase by more than 30% after the lyophilization cycle.

8. The method of claim 7, wherein the lyophilization cycle comprises filling the glass container with a liquid that contains protein and then freezing at a temperature of −100° C., followed by water sublimation for 20 hours at −15° C. under vacuum.

9. The method of claim 1, wherein the glass composition comprises more than or equal to 67 mol. % $SiO_2$ and less than or equal to about 80 mol. % $SiO_2$.

10. A method of manufacturing a glass pharmaceutical container comprising:
providing a glass composition;
melting the glass composition to form a molten glass;
forming the molten glass into the glass pharmaceutical container having an interior surface and an exterior surface, wherein an interior surface of the glass pharmaceutical container does not comprise a boron-rich layer when the glass pharmaceutical container is in an as-formed condition; and
coating the exterior surface of the glass pharmaceutical container with a coating material wherein a portion of the glass pharmaceutical container comprising the coating comprises a coefficient of friction of ≤0.7, the coating material comprising a thickness of ≤100 μm.

11. The method of claim 10, wherein the glass composition comprises, in mol. %:
$SiO_2$ 68-80%;
$Al_2O_3$ 2-10%;
alkaline earth oxides 3-10%;
alkali oxides 8-15%;
$SnO_2$<1.0%; and
$B_2O_3$ 0-5%.

12. The method of claim 10, further comprising the step of subjecting the glass pharmaceutical container to a depyrogenation cycle whereby the coefficient of friction does not increase by more than 30% after the depyrogenation cycle.

13. The method of claim 12, wherein the depyrogenation cycle comprises heating the glass pharmaceutical container with the coating to a temperature of at least 250° C. for at least 30 minutes.

14. The method of claim 12, wherein the depyrogenation cycle comprises heating the glass pharmaceutical container with the coating to a temperature of at least 250° C. for up to 72 hours.

15. The method of claim 12, wherein the depyrogenation cycle comprises heating the glass pharmaceutical container with the coating to a temperature of from about 250° C. to about 400° C. for a time period of from about 30 minutes to about 72 hours.

16. The method of claim 10, wherein the step of applying a coating comprises:
applying a coupling agent layer in direct contact with the exterior surface; and
applying a polymer layer in direct contact with the coupling agent layer.

17. The method of claim 10, further comprising subjecting the glass container to a lyophilization cycle, whereby the coefficient of friction does not increase by more than 30% after the lyophilization cycle.

18. The method of claim 17, wherein the lyophilization cycle comprises filling the glass container with a liquid that contains protein and then freezing at a temperature of −100° C., followed by water sublimation for 20 hours at −15° C. under vacuum.

19. The method of claim 10, wherein the glass composition comprises more than or equal to 67 mol. % $SiO_2$ and less than or equal to about 80 mol. % $SiO_2$.

20. A method of manufacturing a glass pharmaceutical container comprising:
providing a glass composition;
melting the glass composition to form a molten glass;
forming the molten glass into a tube; and
converting the tube into the glass pharmaceutical container having an interior surface and an exterior surface, wherein an interior surface of the glass pharmaceutical container does not comprise a boron-rich layer when the glass pharmaceutical container is in an as-formed condition; and
coating the exterior surface of the glass pharmaceutical container with a coating material wherein a portion of the glass pharmaceutical container comprising the coating comprises a coefficient of friction of ≤0.7, the coating material comprising a thickness of ≤100 μm.

21. The method of claim 20, wherein the glass composition comprises, in mol. %:
$SiO_2$ 68-80%;
$Al_2O_3$ 2-10%;
alkaline earth oxides 3-10%;
alkali oxides 8-15%;
$SnO_2$<1.0%; and
$B_2O_3$ 0-5%.

22. The method of claim 20, further comprising the step of subjecting the glass pharmaceutical container to a depyrogenation cycle whereby the coefficient of friction does not increase by more than 30% after the depyrogenation cycle.

23. The method of claim 22, wherein the depyrogenation cycle comprises heating the glass pharmaceutical container with the coating to a temperature of at least 250° C. for at least 30 minutes.

24. The method of claim 22, wherein the depyrogenation cycle comprises heating the glass pharmaceutical container with the coating to a temperature of at least 250° C. for up to 72 hours.

25. The method of claim 22, wherein the depyrogenation cycle comprises heating the glass pharmaceutical container with the coating to a temperature of from about 250° C. to about 400° C. for a time period of from about 30 minutes to about 72 hours.

26. The method of claim 20, wherein the step of applying a coating comprises:
applying a coupling agent layer in direct contact with the exterior surface; and
applying a polymer layer in direct contact with the coupling agent layer.

27. The method of claim 20, further comprising subjecting the glass container to a lyophilization cycle, whereby the coefficient of friction does not increase by more than 30% after the lyophilization cycle.

28. The method of claim 27, wherein the lyophilization cycle comprises filling the glass container with a liquid that contains protein and then freezing at a temperature of −100° C., followed by water sublimation for 20 hours at −15° C. under vacuum.

29. The method of claim 20, wherein the glass composition comprises more than or equal to 67 mol. % $SiO_2$ and less than or equal to about 80 mol. % $SiO_2$.

* * * * *

UNITED STATES PATENT AND TRADEMARK OFFICE
CERTIFICATE OF CORRECTION

| | | |
|---|---|---|
| PATENT NO. | : 11,608,290 B2 | Page 1 of 1 |
| APPLICATION NO. | : 16/355797 | |
| DATED | : March 21, 2023 | |
| INVENTOR(S) | : Kaveh Adib et al. | |

It is certified that error appears in the above-identified patent and that said Letters Patent is hereby corrected as shown below:

On the Title Page

On the page 7, in Column 1, under Item (56) "Other Publications", Line 37, delete "keytone)" and insert -- ketone) --.

On the page 7, in Column 2, under Item (56) "Other Publications", Line 32, delete "thermomerchanical" and insert -- thermomechanical --.

Signed and Sealed this
Sixth Day of January, 2026

John A. Squires
*Director of the United States Patent and Trademark Office*